(12) United States Patent
Miyatani et al.

(10) Patent No.: US 11,470,247 B2
(45) Date of Patent: Oct. 11, 2022

(54) INFORMATION PROCESSING DEVICE, INFORMATION PROCESSING METHOD, PROGRAM, AND INFORMATION PROCESSING SYSTEM

(71) Applicant: SONY CORPORATION, Tokyo (JP)

(72) Inventors: Yoshitaka Miyatani, Tokyo (JP); Mitsuaki Kita, Tokyo (JP); Takayoshi Hirai, Tokyo (JP); Yuto Ishizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 16/980,772

(22) PCT Filed: Mar. 19, 2019

(86) PCT No.: PCT/JP2019/011321
§ 371 (c)(1),
(2) Date: Sep. 14, 2020

(87) PCT Pub. No.: WO2019/188536
PCT Pub. Date: Oct. 3, 2019

(65) Prior Publication Data
US 2021/0014412 A1  Jan. 14, 2021

(30) Foreign Application Priority Data

Mar. 29, 2018  (JP) ............................. JP2018-063528

(51) Int. Cl.
*H04N 5/228* (2006.01)
*H04N 5/232* (2006.01)
(Continued)

(52) U.S. Cl.
CPC ......... *H04N 5/23229* (2013.01); *G06T 5/001* (2013.01); *G06T 5/50* (2013.01);
(Continued)

(58) Field of Classification Search
CPC ........... H04N 5/23229; H04N 5/23219; H04N 5/23245; H04N 5/345; H04N 5/3696;
(Continued)

(56) References Cited

U.S. PATENT DOCUMENTS

| | | | |
|---|---|---|---|
| 2009/0016632 A1* | 1/2009 | Yano | H04N 5/23235 348/E9.01 |
| 2011/0007176 A1* | 1/2011 | Hamano | H04N 5/2356 348/222.1 |

(Continued)

FOREIGN PATENT DOCUMENTS

| | | |
|---|---|---|
| CN | 101258740 A | 9/2008 |
| EP | 3 487 165 A1 | 5/2019 |

(Continued)

OTHER PUBLICATIONS

International Search Report dated Jun. 11, 2019 in PCT/JP2019/011321 filed Mar. 19, 2019, 1 page.

(Continued)

*Primary Examiner* — Stephen P Coleman
(74) *Attorney, Agent, or Firm* — Oblon, McClelland, Maier & Neustadt, L.L.P.

(57) ABSTRACT

The present technology relates to an information processing device, an information processing method, a program, and an information processing system for enabling reduction in a load by enabling selective arithmetic processing in performing imaging without using an imaging lens.

The information processing device includes an acquisition unit configured to acquire a detection image output from an imaging element that receives incident light incident without through an imaging lens, and restoration information including setting information set by a user and to be used to generate a restoration image from the detection image, a restoration processing unit configured to perform restoration processing of generating the restoration image using the (Continued)

detection image and the restoration information, and an output control unit configured to control an output of the restoration image. The present technology can be applied to, for example, a device or a system that restores a detection image captured by a lensless camera.

20 Claims, 79 Drawing Sheets

(51) Int. Cl.
  *G06T 5/00* (2006.01)
  *G06T 5/50* (2006.01)
(52) U.S. Cl.
  CPC ............... *G06T 2200/21* (2013.01); *G06T 2207/20081* (2013.01); *G06T 2207/20092* (2013.01)
(58) Field of Classification Search
  CPC .......... H04N 5/225; H04N 5/30; H04N 5/341; G06T 5/001; G06T 5/50; G06T 2200/21; G06T 2207/20081; G06T 2207/20092; G06T 2207/10052; G02B 2207/129
  USPC ...................................................... 348/222.1
  See application file for complete search history.

(56) References Cited

U.S. PATENT DOCUMENTS

| | | | |
|---|---|---|---|
| 2011/0026815 A1* | 2/2011 | Han | G06T 5/008 382/284 |
| 2011/0135216 A1* | 6/2011 | Hatakeyama | G06T 5/003 382/260 |
| 2011/0157399 A1* | 6/2011 | Ogasahara | H04N 5/217 348/265 |
| 2011/0174998 A1 | 7/2011 | Molnar et al. | |
| 2016/0239946 A1* | 8/2016 | Naruse | H04N 5/23245 |
| 2016/0269514 A1* | 9/2016 | Ito | H04M 1/0256 |
| 2018/0068423 A1* | 3/2018 | Adachi | G06T 7/11 |
| 2019/0268548 A1* | 8/2019 | Watanabe | H04N 5/243 |

FOREIGN PATENT DOCUMENTS

| | | | |
|---|---|---|---|
| EP | 3 678 365 A1 | 7/2020 | |
| EP | 3 700 181 A1 | 8/2020 | |
| EP | 3 700 182 A1 | 8/2020 | |
| EP | 3 700 185 A1 | 8/2020 | |
| EP | 3 700 186 A1 | 8/2020 | |
| EP | 3 700 187 A1 | 8/2020 | |
| EP | 3 700 191 A1 | 8/2020 | |
| EP | 3 700 192 A1 | 8/2020 | |
| EP | 3 700 194 A1 | 8/2020 | |
| EP | 3 700 195 A1 | 8/2020 | |
| EP | 3 700 197 A1 | 8/2020 | |
| EP | 3 720 116 A1 | 10/2020 | |
| EP | 3 780 580 A1 | 2/2021 | |
| EP | 3 780 594 A1 | 2/2021 | |
| JP | 2019-009622 | 1/2019 | |
| WO | WO 2016/123529 A1 | 8/2016 | |
| WO | WO 2017/149687 A1 | 9/2017 | |
| WO | WO2018/012492 A1 | 1/2018 | |
| WO | WO-2018012492 A1 * | 1/2018 | ............... G02B 5/00 |

OTHER PUBLICATIONS

M. Salman Asif et al: "FlatCam: Thin, Bare-Sensor Cameras using Coded Aperture and Computation", XP055250990, Aug. 31, 2015, XP055250990, pp. 1-12 Retrieved from the Internet: URL:http://arxiv.org/pdf/1509.00116v2.pdf [retrieved on Feb. 17, 2016].

Nick Antipa et al: "DiffuserCam: Lensless Single-exposure 3D Imaging", Arxiv.Org, Cornell University Library, 201 Olin Library Cornell University Ithaca, NY14853, XP080826466, Oct. 5, 2017, pp. 1-9.

Yuan Xin et al: "Parallel Lensless Compressive Imaging Via Deep Convolutional Neural Networks", Optics Express, vol. 26, No. 2, XP055782827, Jan. 18, 2018, pp. 1962-1306, DOI: 10.1364/0E.26.001962.

* cited by examiner

FIG. 27

| OPERATION MODE | | CONDITION | EFFECT |
|---|---|---|---|
| ALL PIXELS | | — | · HIGH RESOLUTION |
| PIXEL ARBITRARY THINNING | | · DIRECTIVITY OF READ PIXEL BECOMES EQUIVALENT TO DIRECTIVITY OF WHEN READING ALL PIXELS | · LOW POWER CONSUMPTION<br>· HIGH SPEED AND HIGH FRAME RATE<br>· SUFFICIENT FOV |
| PIXEL REGULARITY THINNING | | | |
| AREA DRIVE | | | |
| ADDITION | | · DIRECTIVITY OF PIXEL AFTER ADDITION BECOMES EQUIVALENT TO DIRECTIVITY OF WHEN READING ALL PIXELS<br>· PIXELS TO BE ADDED HAVE SIMILAR DIRECTIVITY AND CLOSE TO EACH OTHER | · LOW POWER CONSUMPTION<br>· HIGH SPEED AND HIGH FRAME RATE<br>· SUFFICIENT FOV<br>· HIGH S/N |

| PLAN | AUTHENTICATION | IMAGE TYPE | REGION DESIGNATION FUNCTION | RECOGNITION FUNCTION | RESTORATION PROCESSING |
|---|---|---|---|---|---|
| FREE | UNNECESSARY | NORMAL IMAGE | ABSENT | ABSENT | CALCULATION MODEL A |
| A | NECESSARY | NORMAL IMAGE | ABSENT | PRESENT | CALCULATION MODEL B |

FIG. 56

| PLAN | AUTHENTICATION | IMAGE TYPE | REGION DESIGNATION FUNCTION | RECOGNITION FUNCTION | RESTORATION PROCESSING |
|---|---|---|---|---|---|
| FREE | UNNECESSARY | NORMAL IMAGE | ABSENT | ABSENT | CALCULATION MODEL A |
| A | NECESSARY | NORMAL IMAGE | ABSENT | PRESENT | CALCULATION MODEL B |
| B | NECESSARY | NORMAL IMAGE | PRESENT | ABSENT | REGION DESIGNATION + CALCULATION MODEL A |
| C | NECESSARY | NORMAL IMAGE | PRESENT | PRESENT | REGION DESIGNATION + CALCULATION MODEL B |
| D | NECESSARY | NORMAL IMAGE FISHEYE IMAGE 360-DEGREE IMAGE | ABSENT | PRESENT | CALCULATION MODEL B |
| E | NECESSARY | NORMAL IMAGE FISHEYE IMAGE 360-DEGREE IMAGE | PRESENT | PRESENT | REGION DESIGNATION + CALCULATION MODEL B |

# INFORMATION PROCESSING DEVICE, INFORMATION PROCESSING METHOD, PROGRAM, AND INFORMATION PROCESSING SYSTEM

TECHNICAL FIELD

The present technology relates to an information processing device, an information processing method, a program, and an information processing system, and in particular relates to an information processing device, an information processing method, a program, and an information processing system favorable used in a case of performing imaging without using an imaging lens.

BACKGROUND ART

Conventionally, imaging devices in which an imaging lens and an imaging element are combined are generally known. However, there is a limit to miniaturization of the imaging devices in which an imaging lens and an imaging element are combined.

In contrast, in recent years, an imaging device (hereinafter referred to as lensless camera) that captures an object without using an imaging lens, and generates (restores) a restoration image that allows the object to be viewable, using computational photography, has been proposed (for example, see Patent Document 1).

CITATION LIST

Patent Document

Patent Document 1: International Publication No. 2016/123529

SUMMARY OF THE INVENTION

Problems to be Solved by the Invention

However, the lensless camera requires arithmetic processing for generating the restoration image, and the load of the arithmetic processing is larger than that of a conventional imaging device using an imaging lens.

The present technology has been made in view of the foregoing, and enables reduction in a load by enabling selective arithmetic processing in performing imaging without using an imaging lens.

Solutions to Problems

An information processing device according to the first aspect of the present technology includes an acquisition unit configured to acquire a detection image output from an imaging element that receives incident light incident without through an imaging lens, and restoration information including setting information set by a user and to be used to generate a restoration image from the detection image, a restoration processing unit configured to perform restoration processing of generating the restoration image using the detection image and the restoration information, and an output control unit configured to control an output of the restoration image.

An information processing method according to the first aspect of the present technology includes acquiring a detection image output from an imaging element that receives incident light incident without through an imaging lens, and restoration information including setting information set by a user and to be used to generate a restoration image from the detection image, performing restoration processing of generating the restoration image using the detection image and the restoration information, and controlling an output of the restoration image.

A program according to the first aspect of the present technology causes a computer to execute processing of acquiring a detection image output from an imaging element that receives incident light incident without through an imaging lens, and restoration information including setting information set by a user and to be used to generate a restoration image from the detection image, performing restoration processing of generating the restoration image using the detection image and the restoration information, and controlling an output of the restoration image.

An information processing device according to the second aspect of the present technology includes an output control unit configured to control an output of a detection image output from an imaging element that receives incident light incident without through an imaging lens, and restoration information including setting information set by a user and to be used to generate a restoration image from the detection image, and an acquisition unit configured to acquire the restoration image generated using the detection image and the restoration information An information processing method according to the second aspect of the present technology includes controlling an output of a detection image output from an imaging element that receives incident light incident without through an imaging lens, and restoration information including setting information set by a user and to be used to generate a restoration image from the detection image, and acquiring the restoration image generated using the detection image and the restoration information.

A program according to the second aspect of the present technology causes a computer to execute processing of controlling an output of a detection image output from an imaging element that receives incident light incident without through an imaging lens, and restoration information including setting information set by a user and to be used to generate a restoration image from the detection image, and acquiring the restoration image generated using the detection image and the restoration information.

An information processing system according to the third aspect of the present technology includes a first information processing device, and a second information processing device, in which the first information processing device includes a first output control unit configured to control an output of a detection image output from an imaging element that receives incident light incident without through an imaging lens, and restoration information including setting information set by a user and to be used to generate a restoration image from the detection image, to the second information processing device, and a first acquisition unit configured to acquire the restoration image generated using the detection image and the restoration information from the second information processing device, and the second information processing device includes a second acquisition unit configured to acquire the detection image and the restoration information from the first information processing device, a restoration processing unit configured to perform restoration processing of generating the restoration image using the detection image and the restoration information, and a second output control unit configured to control an output of the restoration image to the first information processing device.

In the first aspect of the present technology, a detection image output from an imaging element that receives incident light incident without through an imaging lens, and restoration information including setting information set by a user and to be used to generate a restoration image from the detection image are acquired, restoration processing of generating the restoration image using the detection image and the restoration information is performed, and an output of the restoration image is controlled.

In the second aspect of the present technology, an output of a detection image output from an imaging element that receives incident light incident without through an imaging lens, and restoration information including setting information set by a user and to be used to generate a restoration image from the detection image are controlled, and the restoration image generated using the detection image and the restoration information is acquired.

In the third aspect of the present technology, a first information processing device controls an output of a detection image output from an imaging element that receives incident light incident without through an imaging lens, and restoration information including setting information set by a user and to be used to generate a restoration image from the detection image, to a second information processing device, and acquires the restoration image generated using the detection image and the restoration information from the second information processing device, and the second information processing device acquires the detection image and the restoration information from the first information processing device, generates the restoration image using the detection image and the restoration information, and controls an output of the restoration image to the first information processing device.

Effects of the Invention

According to the first to third aspects of the present technology, it is possible to reduce a load in arithmetic processing by enabling selective processing in performing imaging without using an imaging lens.

BRIEF DESCRIPTION OF DRAWINGS

FIG. 27 is a diagram for describing systems by comparison.

FIG. 31 is a diagram for describing the restoration matrix of the method of reading all of pixels.

FIG. 33 is a diagram for describing the restoration matrix of the method of reading some arbitrary pixels.

FIG. 35 is a diagram for describing the restoration matrix of the method of regularly reading some pixels.

FIG. 37 is a diagram for describing the restoration matrix of the method of reading pixels in a partial region.

FIG. 55 is a table illustrating a first example of a service plan.

FIG. 56 is a table illustrating a second example of the service plan.

MODE FOR CARRYING OUT THE INVENTION

Hereinafter, a mode for implementing the present technology (hereinafter referred to as embodiment) will be described. Note that the description will be given in the following order.

1. Basic Configuration Example of Present Technology
2. First Embodiment (Information Processing System)
3. Second Embodiment (Information Processing System)
4. Third Embodiment (Prosthetic Hand)
5. Fourth Embodiment (In-vivo Information Acquisition System)
6. Fifth Embodiment (Example of Installation Position of Imaging Element)
7. Modification
8. Others 1. Basic Configuration Example of Present Technology First, a basic configuration example of the present technology will be described with reference to FIGS. 1 to 45. More specifically, an example of applying the present technology to an imaging device will be described.

Imaging Device

Figure 1:
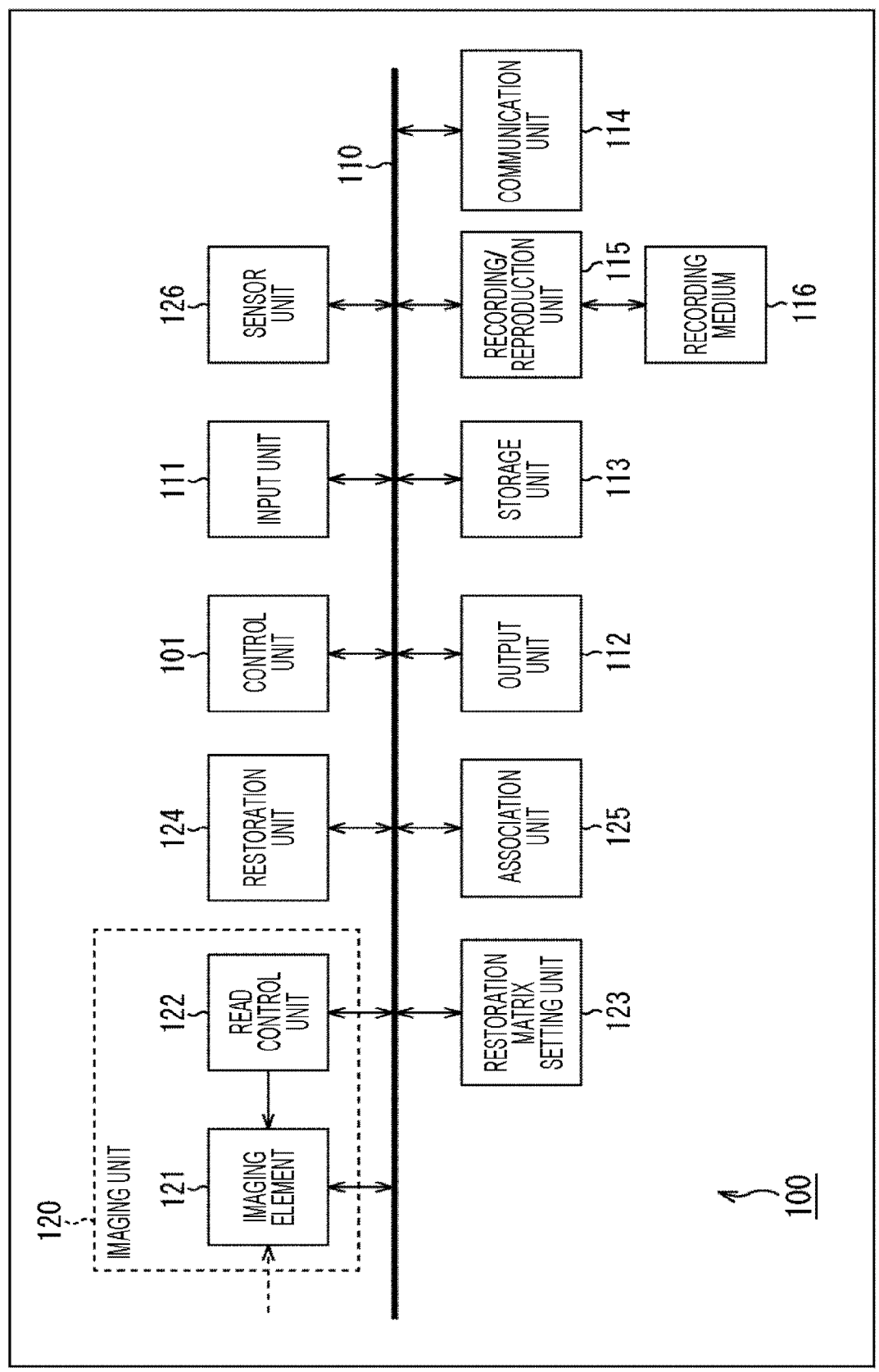
FIG. 1 is a block diagram illustrating a main configuration example of an imaging device.

FIG. 1 is a diagram illustrating a main configuration example of an imaging device 100 to which the present technology is applied. The imaging device 100 is a device that captures an image of an object and obtains electronic data regarding the captured image.

As illustrated in FIG. 1, the imaging device 100 includes a control unit 101, an input unit 111, an output unit 112, a storage unit 113, a communication unit 114, and a recording/reproduction unit 115. Furthermore, the imaging device 100 includes an imaging element 121, a read control unit 122, a restoration matrix setting unit 123, a restoration unit 124, an association unit 125, and a sensor unit 126. The processing units and the like are connected to one another via a bus 110, and can exchange information and commands with one another.

Note that the imaging element 121 and the read control unit 122 may be integrated into an imaging unit 120. The imaging unit 120 may be implemented by any physical configuration. For example, the imaging unit 120 may be implemented as a processor such as a system large scale integration (LSI). Furthermore, the imaging unit 120 may be implemented as a module using a plurality of processors and the like, a unit using a plurality of modules and the like, or a set in which another function is further added to the unit (that is, a partial configuration of a device). Furthermore, the imaging unit 120 may be implemented as a device.

The control unit 101 performs processing regarding control of each processing unit and the like in the imaging device 100. Furthermore, the control unit 101 includes, for example, a central processing unit (CPU), a read only memory (ROM), a random access memory (RAM), and the like, and performs the above-described processing by executing a program using the CPU and the like.

The input unit 111 performs processing regarding information input. For example, the input unit 111 includes input devices such as an operation button, a dial, a switch, a touch panel, a remote controller, and a sensor, and an external input terminal. For example, the input unit 111 receives an instruction (information corresponding to an input operation) from the outside such as a user by using these input devices. Furthermore, for example, the input unit 111 acquires arbitrary information (a program, a command, data, or the like) supplied from an external device via the external input terminal. Furthermore, for example, the input unit 111 supplies the received information (acquired information) to other processing units and the like via the bus 110.

Note that the sensor included in the input unit 111 may be any sensor such as an acceleration sensor as long as the sensor can receive an instruction from the outside such as the user. Furthermore, the type of the input device and the like included in the input unit 111 is arbitrary, and the number thereof is also arbitrary. The input unit 111 may include a plurality of types of input devices and the like. For example, the input unit 111 may include some or all of the above-described examples of the input device and the like. Furthermore, the input unit 111 may include an input device and the like other than the above-described examples. Moreover, for example, the input unit 111 may acquire control information of the input unit 111 itself (the input device or the like) supplied via the bus 110 and drive the input device on the basis of the control information.

The output unit 112 performs processing regarding output of information. For example, the output unit 112 includes an image display device such as a monitor, an image projection device such as a projector, an audio output device such as a speaker, and an external output terminal. For example, the output unit 112 outputs information supplied from another processing unit or the like via the bus 110, using those output devices or the like. For example, the output unit 112 displays the captured image (restoration image to be described below) on a monitor, projects the captured image (restoration image to be described below) from a projector, outputs sound (for example, sound corresponding to an input operation or a processing result), or outputs arbitrary information (a program, a command, data, or the like) to the outside (other devices).

Note that the type of the output device and the like included in the output unit 112 is arbitrary, and the number thereof is also arbitrary. The output unit 112 may include a plurality of types of output devices and the like. For example, the output unit 112 may include some or all of the above-described examples of the output device and the like. Furthermore, the output unit 112 may include an output device and the like other than the above-described examples. Moreover, for example, the output unit 112 may acquire control information of the output unit 112 itself (the output device or the like) supplied via the bus 110 and drive the output device on the basis of the control information.

The storage unit 113 performs processing regarding information storage. For example, the storage unit 113 includes a storage medium such as a hard disk or a semiconductor memory. For example, the storage unit 113 stores information (a program, a command, data, or the like) supplied from another processing unit or the like via the bus 110 in the storage medium. Furthermore, the storage unit 113 may store arbitrary information (a program, a command, data, or the like) at the time of shipment. Furthermore, the storage unit 113 reads information stored in the storage medium at arbitrary timing or in response to a request from another processing unit or the like, and supplies the read information to other processing units and the like via the bus 110.

Note that the type of the storage medium included in the storage unit 113 is arbitrary and the number thereof is also arbitrary. The storage unit 113 may include a plurality of types of storage media. For example, the storage unit 113 may include some or all of the above-described examples of the storage medium. Furthermore, the storage unit 113 may include a storage medium other than the above-described examples. Furthermore, for example, the storage unit 113 may acquire control information of the storage unit 113 itself supplied via the bus 110 and drive the storage unit on the basis of the control information.

The communication unit 114 performs processing regarding communication with other devices. For example, the communication unit 114 includes a communication device that exchanges information such as programs and data with an external device via a predetermined communication medium (for example, an arbitrary network such as the Internet). For example, the communication unit 114 communicates with another device and supplies information (a program, a command, data, or the like) supplied from another processing unit or the like via the bus 110 to the another device as a communication partner. Furthermore, for example, the communication unit 114 communicates with another device and acquires information supplied from the another device as a communication partner, and supplies the information to other processing units and the like via the bus 110.

The communication device included in the communication unit 114 may be of any type. For example, the communication device may be a network interface. The communication method and communication standard are arbitrary. For example, the communication unit 114 may perform wired communication, wireless communication, or both of the wired and wireless communication. Furthermore, for example, the communication unit 114 may acquire control information of the communication unit 114 itself (the communication device or the like) supplied via the bus 110 and drive the communication device on the basis of the control information.

The recording/reproduction unit 115 performs processing regarding recording and reproduction of information using a recording medium 116 attached thereto. For example, the recording/reproduction unit 115 reads information (a program, a command, data, or the like) recorded in the recording medium 116 attached thereto, and supplies the information to other processing units and the like via the bus 110. Furthermore, for example, the recording/reproduction unit 115 acquires information supplied from another processing unit or the like via the bus 110, and writes (records) the information in the recording medium 116 attached thereto. Note that, for example, the recording/reproduction unit 115 may acquire control information of the recording/reproduction unit 115 itself supplied via the bus 110 and may be driven on the basis of the control information.

Note that the recording medium 116 may be of any type. For example, the recording medium 116 may be a magnetic disk, an optical disk, a magneto-optical disk, a semiconductor memory, or the like.

The imaging element 121 performs processing regarding imaging of an object. For example, the imaging element 121 captures an image of the object and obtains data (electronic data) regarding the captured image. At this time, the imaging element 121 can capture an image of the object without an imaging lens, an optical filter such as a diffraction grating, or a pinhole or the like, and can obtain the data regarding the captured image. For example, the imaging element 121 captures an image of the object and obtains data (a detection signal or the like) for obtaining the captured image by a predetermined arithmetic operation.

Note that, the captured image is an image configured using pixel values for forming the image of the object and visually recognizable by a user as an image. Meanwhile, an image (called detection image) configured using the detection signal that is a detection result of incident light in a pixel output unit (described below) of the imaging element 121 is an image that cannot be visually recognized by the user as an image (that is, an image from which the object cannot be visually recognized) because the object image is not formed. That is, the detection image is an image different from the captured image. However, by performing a predetermined arithmetic operation for data of the detection image, as described above, the captured image, that is, an image in which the object image is formed and visually recognizable as an image by the user (that is, an image from which the object can be visually recognized) can be restored. This restored captured image is referred to as a restoration image. That is, the detection image is an image different from the restoration image.

Note that an image configuring the restoration image and before demosaic processing (or color separation processing or the like) is referred to as a raw image. This raw image is also an image visually recognizable by the user as an image (that is, the object can be visually recognized), similarly to the captured image. In other words, the detection image is an image according to a color filter array but is an image different from a raw image.

However, in the case where the imaging element 121 has sensitivity only to invisible light such as infrared light or ultraviolet light, the restoration image (raw image or captured image) becomes an image that cannot be visually recognized by the user as an image (an image from which the object cannot be visually recognized). Note that the above case depends on a wavelength range of detected light. Therefore, the restoration image can be made to an image from which the object can be visually recognized by converting the wavelength range into a visible light range. In contrast, since the object image is not formed in the detection image, the object image cannot be made to an image from which the object can be visually recognized only by converting the wavelength range. Therefore, even in the case where the imaging element 121 has sensitivity only to invisible light, an image obtained by performing a predetermined arithmetic operation for the detection image as described above is referred to as a restoration image. Note that, hereinafter, the present technology will be basically described using an example in which the imaging element 121 receives visible light unless otherwise specified.

That is, the imaging element 121 can capture the image of the object and obtain data regarding the detection image. The imaging element 121 can supply the data regarding the detection image to the restoration unit 124 via the read control unit 122, and can generate (restore) a restoration image, for example. Furthermore, the imaging element 121 supplies the data regarding the detection image to the association unit 125 and the like via the read control unit 122, and can associate the data with metadata and the like, for example. Of course, the imaging element 121 can supply the data regarding the detection image to an arbitrary processing unit and the like. Furthermore, for example, the imaging element 121 may acquire control information of the imaging element 121 itself supplied via the bus 110 and may be driven on the basis of the control information.

The read control unit 122 performs processing regarding read control for the data from the imaging element 121, and controls a resolution of the detection image. For example, the read control unit 122 controls reading of the detection image from the imaging element 121, and selectively reads the detection signal that is an output from each pixel output unit of the imaging element 121.

For example, the read control unit 122 reads the detection signals from all of pixel output units of the imaging element 121, and can select the read detection signals in all the pixel output units as detection signals to be included in the detection image.

For example, the read control unit 122 can select some pixel output units from a plurality of pixel output units of the imaging element 121, and can read the detection signals from the selected pixel output units. Furthermore, for example, the read control unit 122 reads the detection signals from all of the pixel output units of the imaging element 121, and can select some of the read detection signals in all the pixel output units as detection signals to be included in the detection image.

For example, the read control unit 122 can read the detection signals from all the pixel output units of the imaging element 121, add the read detection signals in the pixel output units for every predetermined number, and use an added detection signal group as the detection image.

Selecting a detection signal to be adopted for a detection image also means selecting a non-adopted detection signal. That is, the read control unit 122 controls (sets) the resolution of the detection image by selecting the detection signal (including the case of selecting all the detection signals). For example, the read control unit 122 controls (sets) the resolution of the detection image by reading the detection signals of all the pixels from the imaging element 121, thinning and reading the detection signals from the imaging element 121, thinning the detection signals read from the imaging element 121, or adding the detection signals read from the imaging element 121 for every predetermined number.

The read control unit 122 supplies the read detection image (to which the resolution is set) (the detection image after processing in the case of performing thinning or adding) to other processing units and the like (for example, the restoration matrix setting unit 123, the restoration unit 124, the association unit 125, and the like) via the bus 110.

The restoration matrix setting unit 123 performs processing regarding setting of a restoration matrix. The detection image can be converted into the restoration image by performing a predetermined arithmetic operation. Although the details of the predetermined arithmetic operation will be described below, but the arithmetic operation is to multiply the detection signals included in the detection image by a predetermined coefficient and add the detection signals. That is, the detection image can be converted into the restoration image by performing a predetermined matrix operation. In the present specification, a matrix including the above-described coefficients, which is used for the matrix operation, is referred to as restoration matrix.

The restoration matrix setting unit 123 sets the restoration matrix corresponding to the detection image to which the resolution has been set by the read control unit 122 (the restoration matrix used when the restoration image is generated from the detection signal selectively read by the read control unit 122), for example. That is, the restoration matrix corresponds to the resolution of the detection image to be processed. The restoration matrix setting unit 123 supplies, for example, the set restoration matrix to other processing units and the like (for example, the restoration unit 124 and the association unit 125) via the bus 110.

Note that, in the predetermined matrix operation for converting the detection image into the restoration image, the detection image may be converted into the restoration image having an arbitrary resolution. In that case, the restoration matrix setting unit 123 is only required to set a restoration matrix of the number of rows and the number of columns according to the resolution of the detection image and the resolution of the target restoration image.

Note that, for example, the restoration matrix setting unit 123 may acquire control information of the restoration matrix setting unit 123 itself supplied via the bus 110 and may be driven on the basis of the control information.

The restoration unit 124 performs processing regarding generation of the restoration image. For example, the restoration unit 124 performs a predetermined arithmetic operation to generate the restoration image from data (the detection signal and the like) regarding the detection image supplied from the imaging element 121. Furthermore, the restoration unit 124 supplies data (pixel values and the like) regarding the generated restoration image to other processing units and the like via the bus 110.

Note that, the imaging element 121 obtains the detection image in which a plurality of color components is mixed by using a color filter or the like, and the restoration unit 124 may obtain a raw image in which a plurality of color components is mixed by performing a predetermined arithmetic operation for the detection image. Then, the restoration unit 124 may supply the raw image in which a plurality of color components is mixed to other processing units and the like as the restoration image, or may perform demosaic processing (or color separation processing) on the raw image and supply the image after the demosaic processing (or the color separation processing) to other processing units and the like as the restoration image. Of course, in the imaging element 121, a monochrome detection image or a detection image for each color may be obtained, and the demosaic processing (or the color separation processing or the like) may be unnecessary.

Furthermore, the restoration unit 124 may apply arbitrary image processing such as gamma correction (γ correction) and white balance adjustment to the restoration image, and supply data regarding the restoration image after the image processing to other processing units and the like. Moreover, the restoration unit 124 may convert a format of the data of the restoration image or compress the data of the restoration image by a predetermined compression method such as the Joint Photographic Experts Group (JPEG), Tagged Image File Format (TIFF), or Graphics Interchange Format (GIF), and supply the converted (compressed) data to other processing units and the like.

Note that, for example, the restoration unit 124 may acquire control information of the restoration unit 124 itself supplied via the bus 110 and may be driven on the basis of the control information.

The association unit 125 performs processing regarding data association. For example, the association unit 125 associates data (for example, a coefficient and the like) to be used for the predetermined arithmetic operation for generating the restoration image with the data (detection signal and the like) regarding the detection image supplied from the imaging element 121 and the like.

Here, the term "associate" means, for example, making one information usable (linkable) when processing the other information (data, commands, programs, and the like). That is, pieces of information associated with each other may be collected as one file or may be individual information. For example, information B associated with information A may be transmitted on a different transmission path from the information A. Furthermore, for example, information B associated with information A may be recorded on a different recording medium (or another recording area of the same recording medium) from the information A. Note that this "association" may be part of information instead of entire information. For example, an image and information corresponding to the image may be associated with each other in an arbitrary unit such as a plurality of frames, one frame, or a part in a frame.

Furthermore, for example, the association unit 125 supplies the associated data to other processing units and the like via the bus 110. Note that, for example, the association unit 125 may acquire control information of the association unit 125 itself supplied via the bus 110 and may be driven on the basis of the control information.

The sensor unit 126 performs processing regarding detection. For example, the sensor unit 126 has an arbitrary sensor and detects a predetermined parameter. For example, the sensor unit 126 detects a parameter related to a state around the imaging device 100, a parameter related to a state of the imaging device 100, and the like. For example, the sensor unit 126 detects a parameter related to a state of the imaging element 121. Furthermore, for example, the sensor unit 126 supplies information including the detected parameter to other processing units and the like via the bus 110. Note that, for example, the sensor unit 126 may acquire control information of the sensor unit 126 itself supplied via the bus 110 and may be driven on the basis of the control information.

Imaging Element

Next, the imaging element 121 will be described with reference to FIGS. 2 to 20.

Pixel and Pixel Output Unit

In the present specification, the present technology will be described using the term "pixel" (or "pixel output unit"). In the present specification, the "pixel" (or "pixel output unit") refers to a division unit of a region (also called pixel region) including at least a physical configuration capable of receiving incident light of the imaging element 121 independently of the other physical configurations. The physical configuration capable of receiving light is, for example, a photoelectric conversion element, and is, for example, a photodiode (PD). The number of physical configurations (for example, photodiodes) formed in one pixel is arbitrary and may be one or plural. The type, size, shape, and the like are also arbitrary.

Furthermore, the physical configuration in "pixel" units includes not only the above-described "physical configuration capable of receiving light" but also, for example, all physical configurations regarding receiving incident light, such as an on-chip lens, a light-shielding film, a color filter, a flattening film, and an anti-reflection film. Moreover, a configuration such as a readout circuit may be included. That is, the physical configuration in pixel units is arbitrary as long as the physical configuration has at least the "physical configuration capable of receiving light".

Furthermore, the detection signal read from the "pixel" (that is, the physical configuration in pixel units) may be referred to as "a detection signal in pixel units (or in pixel output units)" or the like. Moreover, the detection signal in pixel units (or in pixel output units) is also referred to as "pixel unit detection signal (or pixel output unit detection signal)". Furthermore, the pixel unit detection signal is also referred to as "pixel output". Moreover, a value of the pixel output is also referred to as "output pixel value".

The value (output pixel value) of the detection signal in pixel units of the imaging element 121 can have incident angle directivity (a characteristic with respect to an incident angle) of incident light from an object independently of the others. That is, each pixel unit (pixel output unit) of the imaging element 121 has a configuration capable of independently setting the incident angle directivity of the output pixel value. Therefore, in the imaging element 121, the output pixel values of at least two pixel units have different incident angle directivities from each other.

Note that, as described above, the number of "physical configurations capable of receiving light" included in the "pixel (or pixel output unit)" is arbitrary. Therefore, the pixel unit detection signal may be a detection signal obtained by a single "physical configuration capable of receiving light" or may be a detection signal obtained by a plurality of the "physical configurations capable of receiving light".

Furthermore, a plurality of the pixel unit detection signals (output pixel values) can be combined into one signal (one value) at an arbitrary stage. For example, the output pixel values of a plurality of pixels may be added in a state of an analog signal or may be converted into a digital signal and then added.

Furthermore, after the detection signal is read from the imaging element 121, that is, in the detection image, a plurality of the detection signals can be combined into a single signal, or a single detection signal can be divided into a plurality of detection signals. That is, the resolution (the number of data) of the detection image is variable.

By the way, hereinafter, description will be given on the assumption that the imaging element 121 includes a pixel region where a plurality of pixels is arranged in a matrix (a pixel region where a pixel array is formed) unless otherwise specified, for convenience of description. Note that an array pattern of pixels (or pixel output units) of the imaging element 121 is arbitrary and is not limited to this example. For example, the pixels (or pixel output units) may be arranged in a honeycomb manner. Furthermore, for example, the pixels (or pixel output units) may be arranged in one row (or one column). That is, the imaging element 121 may be a line sensor.

Note that the wavelength range in which (the pixels of) the imaging element 121 has sensitivity is arbitrary. For example, (the pixels of) the imaging element 121 may have sensitivity to visible light, may have sensitivity to invisible light such as infrared light or ultraviolet light, or may have sensitivity to both the visible light and invisible light.

Note that, hereinafter, in a case where the terms "pixel" and "pixel output unit" are used in different meanings, the meanings will be specified. Therefore, "pixel" and "pixel output unit" can be interchanged with each other unless otherwise specified.

Incident Angle Directivity

As described above, the imaging element 121 has a plurality of pixel output units. Then, the imaging element 121 has a configuration for making the incident angle directivities of the output pixel values of at least two pixel output units among the plurality of pixel output units have different characteristics from each other. That is, the imaging element 121 can obtain the detection signals (a plurality of pixel output unit detection signals) for a plurality of pixel output units, and the incident angle directivities of the detection signals of at least two pixel output units among the plurality of pixel output units are different from each other.

Here, the "incident angle directivity" refers to a light-receiving sensitivity characteristic according to the incident angle of the incident light, that is, detection sensitivity to the incident angle of the incident light. For example, there are some cases where the detection sensitivity varies depending on the incident angle even if the incident light has the same light intensity. Such deviation of the detection sensitivity (including a case where there is no deviation) is referred to as "incident angle directivity".

For example, even when incident lights having the same light intensity enter the physical configurations of two pixel output units at the same incident angle, signal levels (detection signal levels) of the detection signals of the pixel output units may be different values from each other. (Each pixel output unit of) the imaging element 121 has a physical configuration having such characteristics.

More specifically, the imaging element 121 may have a similar configuration to an imaging element such as a complementary metal oxide semiconductor (CMOS) image sensor in a basic structure. Note that the imaging element 121 has a configuration for making the incident angle directivities of the output pixel values have different characteristics from each other between at least two pixel output units. The incident angle directivity may be implemented by any method. For example, the incident angle directivity may be implemented by providing a light-shielding film in front of (on light incident side) of a photoelectric conversion element (photodiode or the like).

When an image is captured only by a typical imaging element including pixels having the same incident angle directivity, light with approximately the same light intensity enters all the pixels of the imaging element, and signal levels of the detection signals of all the pixels become substantially the same. Therefore, a formed image of the object cannot be obtained. Therefore, generally, an imaging lens or a pinhole is provided in front of the imaging element (on the light incident side). For example, by providing an imaging lens, light from the object plane can be formed on an imaging plane of the imaging element. Therefore, the imaging element can obtain a detection signal at a level corresponding to the formed image of the object at each pixel (that is, the imaging element can obtain the formed captured image of the object). However, in this case, the size physically becomes large, and it may be difficult to reduce the size of the device. Furthermore, in the case where the pinhole is provided, the size can be reduced as compared with the case where an imaging lens is provided, but the amount of light incident on the imaging element is very small and it cannot be put to practical use. If measures such as lengthening an exposure time and increasing a gain are taken, blurring may easily occur during high-speed image capturing of the object, or natural color expression may not be achieved.

Figure 2:
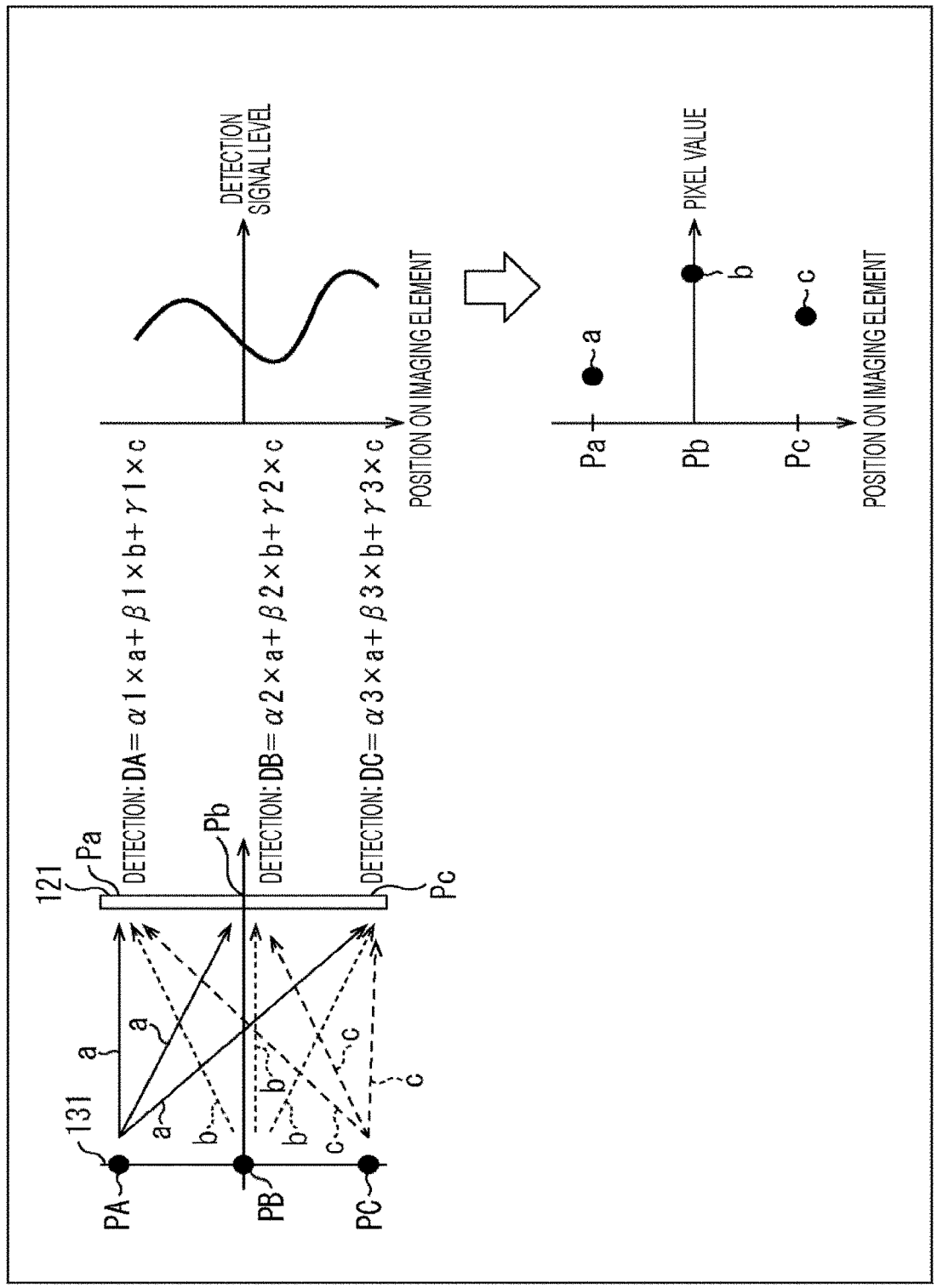
FIG. 2 is a diagram for describing a principle of imaging in the imaging device to which the present technology is applied.

In contrast, the imaging element 121 has the incident angle directivity in which the detection sensitivities of the pixels are different from one another, as illustrated in the upper left part in FIG. 2. That is, the light-receiving sensitivity characteristic according to the incident angle of the incident light is different for each pixel. However, the light-receiving sensitivity characteristics of all the pixels do not have to be completely different, and for example, some pixels may have the same light-receiving sensitivity characteristic.

Assuming that a light source forming an object plane 131 is a point light source, light beams with the same light intensity emitted from the same point light source enter all the pixels but the light beam is incident at a different incident angle for each pixel in the imaging element 121. Then, since the pixels of the imaging element 121 have different incident angle directivities, the pixels detect the light beams with the same light intensity, with different sensitivities. That is, a detection signal at a different signal level is detected for each pixel.

More specifically, the sensitivity characteristic according to the incident angle of the incident light received in each pixel of the imaging element 121, that is, the incident angle directivity in each pixel is expressed by a coefficient representing the light-receiving sensitivity according to the incident angle. Furthermore, the signal level of the detection signal corresponding to the incident light in each pixel (also referred to as detection signal level) is obtained by being multiplied by the coefficient set corresponding to the light-receiving sensitivity corresponding to the incident angle of the incident light.

More specifically, as illustrated in the upper left part in FIG. 2, detection signal levels DA, DB, and DC at positions Pa, Pb, and Pc are expressed by the following equations (1) to (3), respectively.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

Here, $\alpha 1$ is a coefficient set according to the incident angle of a light beam from a point light source PA on the object plane 131 at the position Pa on the imaging element 121. Furthermore, $\beta 1$ is a coefficient set according to the incident angle of a light beam from a point light source PB on the object plane 131 at the position Pa on the imaging element 121. Moreover, $\gamma 1$ is a coefficient set according to the incident angle of a light beam from a point light source PC on the object plane 131 at the position Pa on the imaging element 121.

As illustrated in the equation (1), the detection signal level DA at the position Pa is expressed by a sum (combined value) of a product of the light intensity "a" of the light beam from the point light source PA at the position Pa and the coefficient $\alpha 1$, a product of the light intensity "b" of the light beam from the point light source PB at the position Pa and the coefficient $\beta 1$, and a product of the light intensity "c" of the light beam from the point light source PC at the position Pa and the coefficient $\gamma 1$. Hereinafter, the coefficients $\alpha x$, $\beta x$, and $\gamma x$ (x is a natural number) are collectively referred to as a coefficient set.

Similarly, a coefficient set $\alpha 2$, $\beta 2$, and $\gamma 2$ in the equation (2) is a coefficient set set according to the incident angle of the light beams from the point light sources PA, PB, and PC on the object plane 131 at the position Pb on the imaging element 121. That is, as illustrated in the above-described equation (2), the detection signal level DB at the position Pb is expressed by a sum (combined value) of a product of the light intensity "a" of the light beam from the point light source PA at the position Pb and the coefficient $\alpha 2$, a product of the light intensity "b" of the light beam from the point light source PB at the position Pb and the coefficient $\beta 2$, and a product of the light intensity "c" of the light beam from the point light source PC at the position Pb and the coefficient $\gamma 2$. Furthermore, the coefficients $\alpha 3$, $\beta 3$, and $\gamma 3$ in the equation (3) are a coefficient set set according to the incident angle of the light beams from the point light sources PA, PB, and PC on the object plane 131 at the position Pc on the imaging element 121. That is, as illustrated in the above-described equation (3), the detection signal level DC at the position Pc is expressed by a sum (combined value) of a product of the light intensity "a" of the light beam from the point light source PA at the position Pc and the coefficient $\alpha 3$, a product of the light intensity "b" of the light beam from the point light source PB at the position Pc and the coefficient $\beta 3$, and a product of the light intensity "c" of the light beam from the point light source PC at the position Pc and the coefficient $\gamma 3$.

As described above, these detection signal levels are mixture of the light intensities of the light beams emitted from the point light sources PA, PB, and PC, and thus are different from a formed image of the object. That is, the detection signal level illustrated in the upper right part in FIG. 2 is not the detection signal level corresponding to an image in which the image of the object is formed (captured image), and thus is different from the pixel value illustrated in the lower right part in FIG. 2 (in general, the signal levels do not match).

Note that the pixel values at the positions Pa, Pb, and Pc as illustrated in the lower right part in FIG. 2 can be obtained by configuring simultaneous equations using the coefficient set $\alpha 1$, $\beta 1$, and $\gamma 1$, the coefficient set $\alpha 2$, $\beta 2$, and $\gamma 2$, the coefficient set $\alpha 3$, $\beta 3$, and $\gamma 3$, and the detection signal levels DA, DB, and DC, and solving the simultaneous equations (1) to (3) with a, b, and c as variables. As a result, a restoration image (a formed image in which the image of the object is formed), which is an aggregation of pixel values, is restored.

With such a configuration, the imaging element 121 has the incident angle directivities different from each other in at least two pixel output units without using an imaging lens, an optical filter including a diffraction grating and the like, a pinhole, or the like. As a result, the optical filter using an imaging lens, a diffraction grating, and the like, or the pinhole or the like is not an indispensable configuration. Therefore, the height of the imaging device, that is, the thickness in the light incident direction in the configuration for implementing an imaging function can be reduced.

Formation of Incident Angle Directivity

Figure 3:
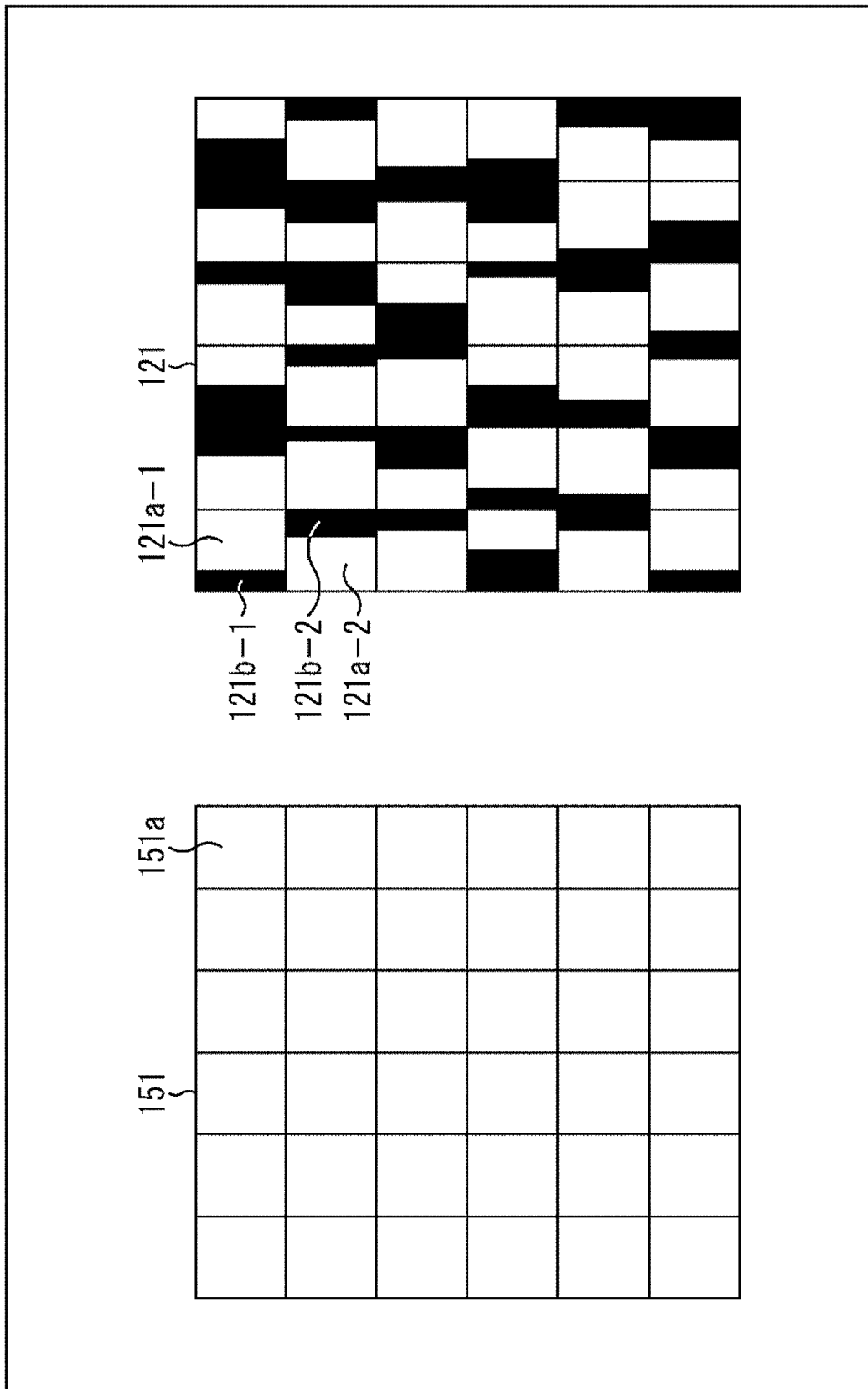
FIG. 3 is a diagram for describing a difference in configuration between a conventional imaging element and an imaging element of the present technology.

The left part in FIG. 3 illustrates a front view of a part of a pixel array unit of a typical imaging element, and the right part in FIG. 3 illustrates a front view of a part of a pixel array unit of the imaging element 121. Note that FIG. 3 illustrates an example in which the numbers of pixels in a horizontal direction×in a vertical direction are 6 pixels×6 pixels. However, the configuration of the numbers of pixels is not limited to the example.

The incident angle directivity can be formed by, for example, a light-shielding film. In a typical imaging element 151, pixels 151a having the same incident angle directivity are arranged in an array manner, as illustrated in the left example in FIG. 3. In contrast, the imaging element 121 in the right example in FIG. 3 is provided with a light-shielding film 121*b* for each pixel 121*a* in a part of a light-receiving region of the photodiode and in a different range for each pixel 121*a*, and the light-receiving sensitivity with respect to the incident angle of the incident light is different for each pixel 121*a* (that is, the incident angle directivities are different from one another).

More specifically, for example, a pixel 121*a*-1 and a pixel 121*a*-2 have different ranges to be shielded from light by provided light-shielding film 121*b*-1 and light-shielding film 121*b*-2 (at least one of regions (positions) to be shielded from light or areas to be shielded from light are different). That is, in the pixel 121*a*-1, the light-shielding film 121*b*-1 is provided so as to shield light in a part of a left side of a light-receiving region of the photodiode by a predetermined width, and in the pixel 121*a*-2, the light-shielding film 121*b*-2 is provided so as to shield light in a part of a right side of a light-receiving region by a width wider in the horizontal direction than the light-shielding film 121*b*-1. Similarly, in the other pixels 121*a*, the light-shielding films 121*b* are provided so as to shield light in different ranges in the light-receiving region for respective pixels, and are randomly arranged in the pixel array.

Note that the range of the light-shielding film 121*b* is favorably an area in which a desired amount of light can be secured because the amount of receivable light decreases as the ratio of covering the light-receiving region of each pixel increases. For example, the area of the light-shielding film 121*b* may be configured to be limited to about ¾ of the maximum receivable range. By doing so, an amount of light equal to or larger than the desired amount can be secured. Note that a minimum amount of light can be received by each pixel as long as a range not shielded from light with a width corresponding to a wavelength of received light is provided. That is, for example, in the case of a B pixel (blue pixel), the wavelength is about 500 nm. The minimum amount of light can be received unless the B pixel is shielded from light by the width corresponding to the wavelength or larger.

Configuration Example of Imaging Element

Figure 4:
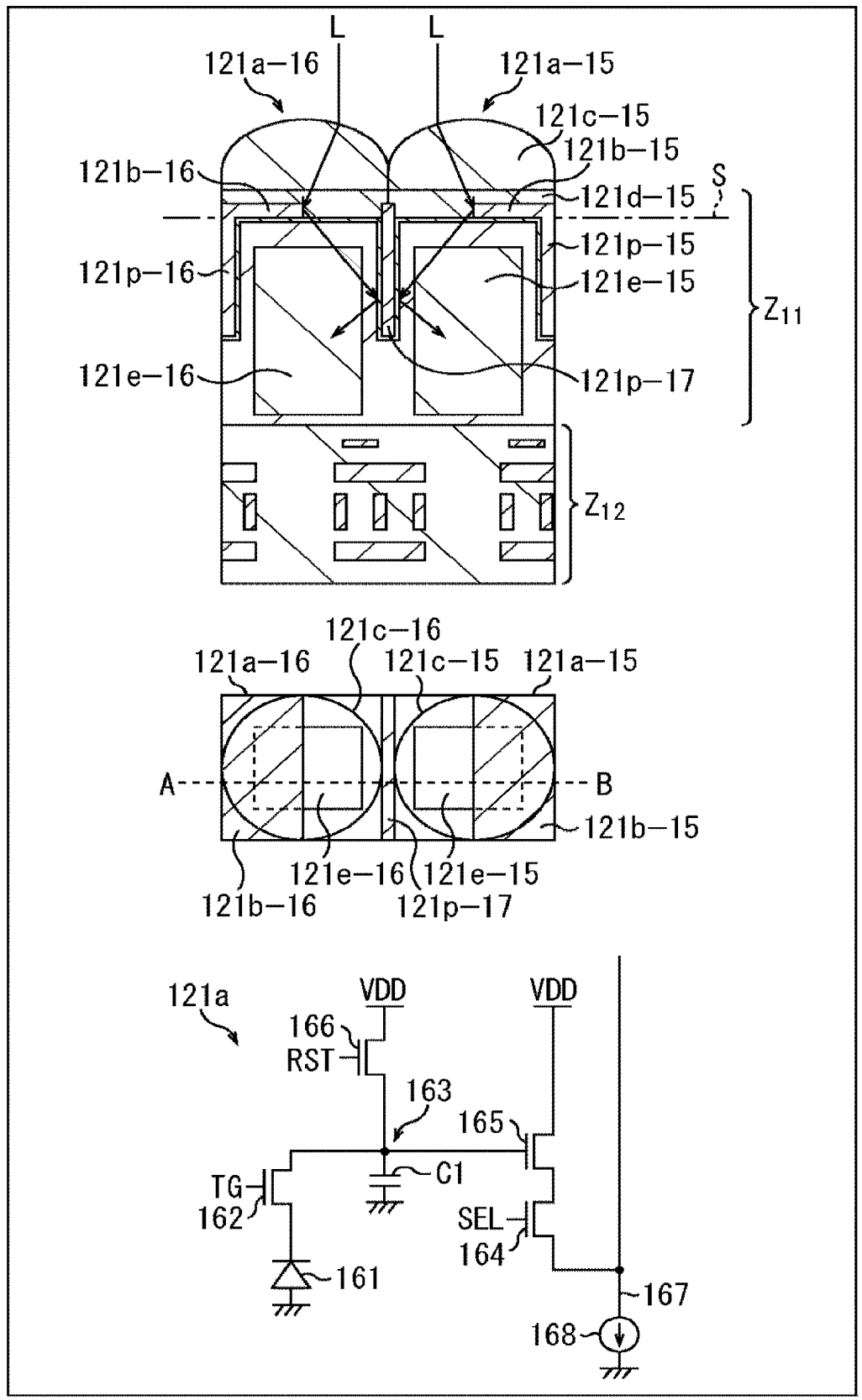
FIG. 4 is a diagram for describing a first configuration example of the imaging element.

A configuration example of the imaging element 121 in this case will be described with reference to FIG. 4. The upper part in FIG. 4 is a side-sectional view of the imaging element 121 and the middle part in FIG. 4 is a top view of the imaging element 121. Furthermore, the side-sectional view in the upper part in FIG. 4 is an AB cross section in the middle part in FIG. 4. Moreover, the lower part in FIG. 4 illustrates a circuit configuration example of the imaging element 121.

The imaging element 121 having the configuration illustrated in FIG. 4 includes a plurality of pixel output units each configured to receive incident light incident without through both of an imaging lens and a pinhole, and has a configuration for making the incident angle directivities of the output pixel values of at least two pixel output units among the plurality of pixel output units different from each other. Furthermore, the imaging element 121 in this case has a configuration in which the plurality of pixel output units is capable of independently setting, for each pixel output unit, the incident angle directivity with respect to the incident light from the object.

In the imaging element 121 in the upper part in FIG. 4, the incident light is incident from an upper side to a lower side in FIG. 4. Adjacent pixels 121*a*-15 and 121*a*-16 are so-called back-illuminated-type pixels provided with a wiring layer Z12 in the lowermost layer and a photoelectric conversion layer Z11 on the wiring layer Z12 in FIG. 4.

Note that in a case where it is not necessary to distinguish the pixels 121*a*-15 and 121*a*-16, they are simply referred to as pixel(s) 121*a*, and other configurations are also similarly referred to. Furthermore, FIG. 4 illustrates only a side view and a top view of two pixels configuring the pixel array of the imaging element 121. It goes without saying that a larger number of pixels 121*a* are arranged and illustration thereof is omitted.

Moreover, the pixels 121*a*-15 and 121*a*-16 respectively include photodiodes 121*e*-15 and 121*e*-16 in the photoelectric conversion layer Z11. Furthermore, on-chip lenses 121*c*-15 and 121*c*-16 and color filters 121*d*-15 and 121*d*-16 are provided on the photodiodes 121*e*-15 and 121*e*-16, respectively, from above.

The on-chip lenses 121*c*-15 and 121*c*-16 condense the incident light on the photodiodes 121*e*-15 and 121*e*-16.

The color filters 121*d*-15 and 121*d*-16 are, for example, optical filters that transmit light having specific wavelengths such as red, green, blue, infrared, and white. Note that, in the case of white, the color filters 121*d*-15 and 121*d*-16 may be transparent filters or may be omitted.

Light-shielding films 121*p*-15 to 121*p*-17 are formed at boundaries between pixels in the photoelectric conversion layer Z11 of the pixels 121*a*-15 and 121*a*-16 and suppress crosstalk between adjacent pixels.

Furthermore, light-shielding films 121*b*-15 and 121*b*-16 partially shield a light-receiving surface S as viewed from above, as illustrated in the upper and middle parts in FIG. 4. Different ranges are respectively shielded by the light-shielding films 121*b*-15 and 121*b*-16 on the light-receiving surface S of the photodiodes 121*e*-15 and 121*e*-16 in the pixels 121*a*-15 and 121*a*-16. Thereby, different incident angle directivity is set for each pixel. Note that the shielded ranges do not necessarily have to be different for all the pixels 121*a* of the imaging element 121, and may be the same for some pixels 121*a*.

With the configuration illustrated in the upper part in FIG. 4, a right end of the light-shielding film 121*p*-15 and an upper end of the light-shielding film 121*b*-15 are connected and a left end of the light-shielding film 121*b*-16 and an upper end of the light-shielding film 121*p*-16 are connected to form L shapes as viewed from the side.

Furthermore, the light-shielding films 121*b*-15 to 121*b*-17 and the light-shielding films 121*p*-15 to 121*p*-17 are formed using metal, and for example, formed using tungsten (W), aluminum (Al), or an alloy of Al and copper (Cu). Furthermore, the light-shielding films 121*b*-15 to 121*b*-17 and the light-shielding films 121*p*-15 to 121*p*-17 may be formed at the same time using the same metal as wiring in the same process as a process of forming the wiring in a semiconductor process. Note that the light-shielding films 121*b*-15 to 121*b*-17 and the light-shielding films 121*p*-15 to 121*p*-17 do not have to have the same thickness depending on positions.

Furthermore, as illustrated in the lower part in FIG. 4, the pixel 121*a* includes a photodiode 161 (corresponding to a photodiode 121*e*), a transfer transistor 162, a floating diffusion (FD) part 163, a selection transistor 164, an amplification transistor 165, and a reset transistor 166, and is connected to a current source 168 via a vertical signal line 167.

The photodiode 161 has a configuration in which an anode electrode is grounded and a cathode electrode is connected to a gate electrode of the amplification transistor 165 via the transfer transistor 162.

Each transfer transistor 162 is driven according to a transfer signal TG. For example, when the transfer signal TG supplied to a gate electrode of the transfer transistor 162 becomes a high level, the transfer transistor 162 is turned on. As a result, an electric charge accumulated in the photodiode 161 is transferred to the FD part 163 via the transfer transistor 162.

The amplification transistor 165 serves as an input unit of a source follower that is a readout circuit for reading a signal obtained by photoelectric conversion in the photodiode 161, and outputs a pixel signal of a level corresponding to the electric charge accumulated in the FD part 163 to a vertical signal line 23. That is, the amplification transistor 165 configures the source follower with the current source 168 connected to one end of the vertical signal line 167 as a drain terminal is connected to a power supply voltage VDD and a source terminal is connected to the vertical signal line 167 via the selection transistor 164.

The FD part 163 is a floating diffusion region having an electric charge capacitance C1 provided between the transfer transistor 162 and the amplification transistor 165, and temporarily accumulates the electric charge transferred from the photodiode 161 via the transfer transistor 162. The FD part 163 is a charge detection unit that converts the electric charge into a voltage, and the electric charge accumulated in the FD part 163 is converted into a voltage in the amplification transistor 165.

The selection transistor 164 is driven according to a selection signal SEL, and is turned on when the selection signal SEL supplied to a gate electrode becomes a high level and connects the amplification transistor 165 and the vertical signal line 167.

The reset transistor 166 is driven according to a reset signal RST. For example, the reset transistor 166 is turned on when the reset signal RST supplied to a gate electrode becomes a high level, and discharges the electric charge accumulated in the FD part 163 to the power supply voltage VDD to reset the FD part 163.

With the above circuit configuration, the pixel circuit illustrated in the lower part in FIG. 4 operates as follows.

That is, as a first operation, the reset transistor 166 and the transfer transistor 162 are turned on, and the electric charges accumulated in the FD part 163 are discharged to the power supply voltage VDD to reset the FD part 163.

As a second operation, the reset transistor 166 and the transfer transistor 162 are turned off, and an exposure period starts, and the photodiode 161 accumulates electric charges according to the amount of the incident light.

As a third operation, the reset transistor 166 is turned on, and the reset transistor 166 is turned off after the FD part 163 is reset. By the operation, the FD part 163 is reset and a reference potential is set.

As a fourth operation, the potential of the FD part 163 in the reset state is output from the amplification transistor 165 as a reference potential.

As a fifth operation, the transfer transistor 162 is turned on, and the electric charge accumulated in the photodiode 161 is transferred to the FD part 163.

As a sixth operation, the potential of the FD part 163 to which the electric charge of the photodiode has been transferred is output from the amplification transistor 165 as a signal potential.

By the above processing, the reference potential is subtracted from the signal potential, and the signal potential is output as a detection signal by correlated double sampling (CDS).

As described above, the pixel 121*a* in the case of FIG. 4 is provided with one photodiode 121*e* for each pixel, and a different range for each pixel 121*a* is shielded from light by the light-shielding film 121*b*, and one pixel 121*a* can express a detection signal of one pixel of a detection image having the incident angle directivity by optical modulation using the light-shielding film 121*b*. The value of the detection signal (output pixel value) is modulated according to the incident angle of the incident light from the object, and the characteristic (directivity) differs (has an incident angle directivity) depending on the incident angle.

Other Configuration Examples of Imaging Element

Furthermore, the incident angle directivity can be formed according to, for example, the position, size, shape, and the like of a light-receiving element (for example, a photodiode) in a pixel. Pixels having different parameters have different sensitivities with respect to the incident light having the same light intensity from the same direction. That is, by setting these parameters for each pixel, the incident angle directivity can be set for each pixel.

For example, a plurality of light-receiving elements (for example, photodiodes) may be provided in a pixel, and these light-receiving elements may be selectively used. By doing so, the incident angle directivity can be set for each pixel by selecting the light-receiving element.

Figure 5:
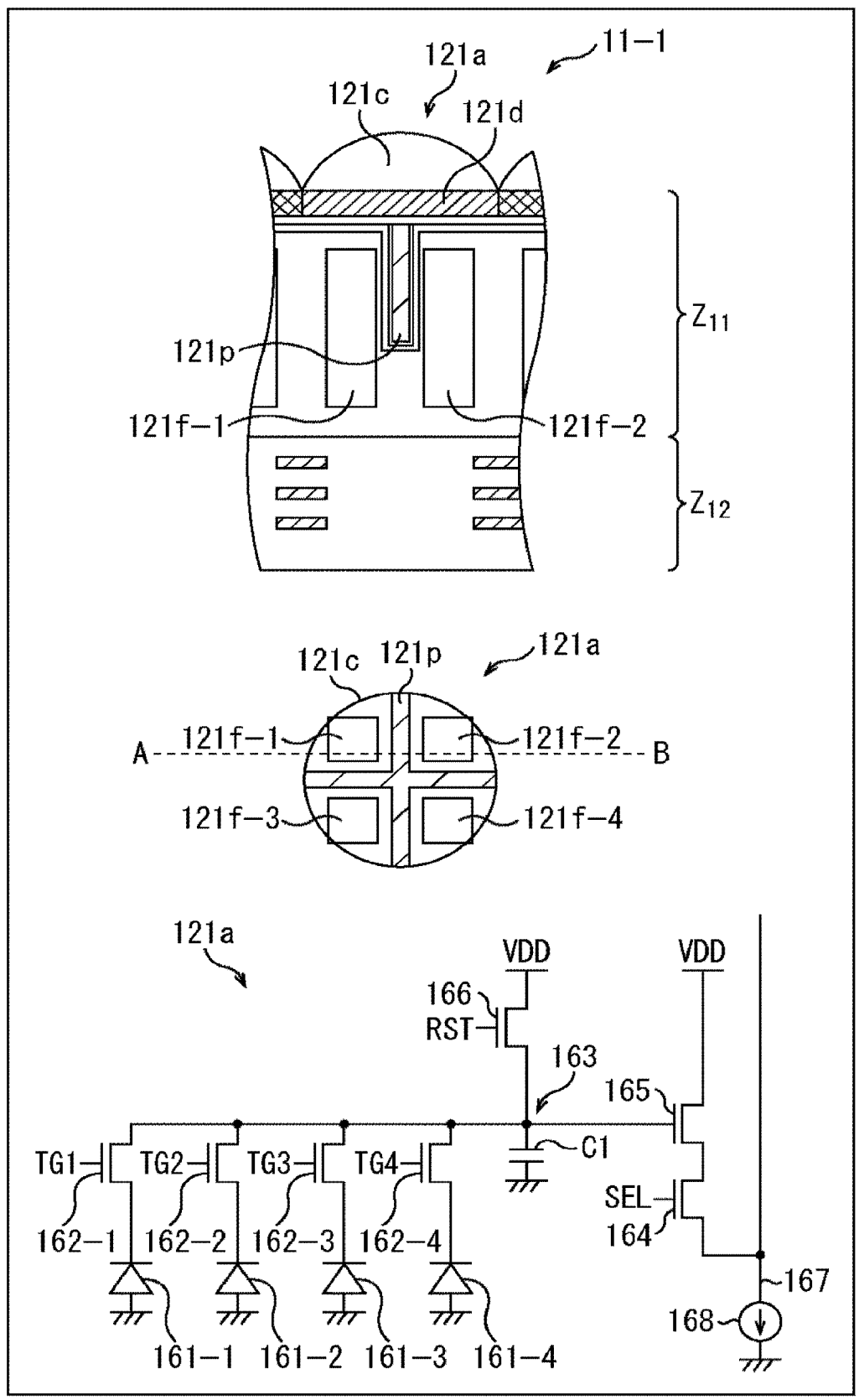
FIG. 5 is a diagram for describing the first configuration example of the imaging element.

FIG. 5 is a diagram illustrating another configuration example of the imaging element 121. The upper part in FIG. 5 is a side-sectional view of the pixel 121*a* of the imaging element 121 and the middle part in FIG. 5 is a top view of the imaging element 121. Furthermore, the side-sectional view in the upper part in FIG. 5 is an AB cross section in the middle part in FIG. 5. Moreover, the lower part in FIG. 5 illustrates a circuit configuration example of the imaging element 121.

The imaging element 121 having the configuration illustrated in FIG. 5 includes a plurality of pixel output units each configured to receive incident light incident without through both of an imaging lens and a pinhole, and has a configuration for making the incident angle directivities of the output pixel values of at least two pixel output units among the plurality of pixel output units different from each other. Furthermore, in the imaging element 121 in this case, the plurality of pixel output units makes the photodiodes (PDs) contributing to the output different from one another so as to be able to independently set the incident angle directivity of the output pixel value for each pixel output unit.

As illustrated in FIG. 5, the imaging element 121 has a different configuration from the imaging element 121 in FIG. 4 in that four photodiodes 121*f*-1 to 121*f*-4 are formed in the pixel 121*a*, and the light-shielding film 121*p* is formed in a region for isolating the photodiodes 121*f*-1 to 121*f*-4. That is, in the imaging element 121 in FIG. 5, the light-shielding film 121*p* is formed in a "+" shape when viewed from above. Note that the common configurations are denoted by the same reference numerals and detailed description thereof will be omitted.

In the imaging element 121 configured as illustrated in FIG. 5, the light-shielding film 121*p* isolates the photodiodes 121*f*-1 to 121*f*-4, whereby electrical and optical crosstalk among the photodiodes 121*f*-1 to 121*f*-4 can be prevented. That is, the light-shielding film 121*p* in FIG. 5 is for preventing crosstalk similarly to the light-shielding film 121*p* of the imaging element 121 in FIG. 4 and is not for providing the incident angle directivity.

Although details will be described below, the photodiodes 121*f*-1 to 121*f*-4 have different incident angles at which the light-receiving sensitivity characteristic increases. That is, the output pixel value of the pixel 121*a* can have desired incident angle directivity depending on from which of the photodiodes 121*f*-1 to 121*f*-4 the electric charge is read. That is, the incident angle directivity of the output pixel value of the pixel 121*a* can be controlled.

In the configuration example of the imaging element 121 in FIG. 5, one FD part 163 is shared by the four photodiodes 121*f*-1 to 121*f*-4. The lower part of FIG. 5 shows a circuit configuration example in which one FD part 163 is shared by four photodiodes 121*f*-1 to 121*f*-4. Note that description of the same configuration in the lower part in FIG. 5 as that in the lower part in FIG. 4 is omitted.

The lower part in FIG. 5 differs from the circuit configuration in the lower part in FIG. 4 in that photodiodes 161-1 to 161-4 (corresponding to the photodiodes 121*f*-1 to 121*f*-4 in the upper part in FIG. 5) and transfer transistors 162-1 to 162-4 are provided instead of the photodiode 161 and the transfer transistor 162, and the FD part 163 is shared.

In the circuit illustrated in the lower part in FIG. 5, the photodiodes 161-1 to 161-4 are referred to as photodiode(s) 161 in a case where it is not necessary to distinguish the photodiodes 161-1 to 161-4 from one another. Furthermore, the transfer transistors 162-1 to 162-4 are referred to as transfer transistor(s) 162 in a case where it is not necessary to distinguish the transfer transistors 162-1 to 162-4 from one another.

In the circuit illustrated in the lower part in FIG. 5, when any of the transfer transistors 162 is turned on, the electric charge of the photodiode 161 corresponding to the transfer transistor 162 is read and transferred to the common FD part 163. Then, a signal according to the level of the electric charge held in the FD part 163 is read as the detection signal of the pixel output unit. That is, the electric charges of the photodiodes 161 can be read independently of one another, and which electric charge is read from which photodiode 161 can be controlled according to which transfer transistor 162 is turned on. In other words, the degree of contribution by each photodiode 161 to the output pixel value can be controlled according to which transfer transistor 162 is turned on. For example, by making the photodiodes 161 that read the electric charges different between at least two pixels, the photodiodes 161 contributing to the output pixel value can be made different from each other. That is, the output pixel value of the pixel 121*a* can have desired incident angle directivity by selection of the photodiode 161 that reads the electric charge.

For example, in FIG. 5, the electric charges of the photodiodes 121*f*-1 and 121*f*-3 are transferred to the FD part 163 and signals obtained by reading the electric charges are added, so that the output pixel value of the pixel 121*a* can have the incident angle directivity in the right-left direction in FIG. 5. Similarly, the electric charges of the photodiodes 121*f*-1 and 121*f*-2 are transferred to the FD part 163 and signals obtained by reading the electric charges are added, so that the output pixel value of the pixel 121*a* can have the incident angle directivity in the up-down direction in FIG. 5.

Note that the signals obtained on the basis of the respective electric charges of the photodiodes 121*f* of the pixel 121*a* in FIG. 5 may be added after read from the pixel or may be added in the pixel (for example, in the FD part 163).

Furthermore, the combination of the photodiodes 121*f* of which the electric charges (or the signals corresponding to the electric charges) are added is arbitrary and is not limited to the above-described examples. For example, the electric charges of three or more photodiodes 121*f* (or the signals corresponding to the electric charges) may be added. Furthermore, for example, the electric charge of one photodiode 121*f* may be read without performing the addition.

Note that (the detection sensitivity of) the pixel 121*a* can have desired incident angle directivity by resetting the detection value (electric charge) accumulated in the photodiode 161 (photodiode 121*f*) before reading the electric charge to the FD part 163, using an electric shutter function.

In the case of using the electronic shutter function, the photodiode 121*f* can be set to a state of not contributing to the detection signal level of the pixel 121*a* by resetting the electric charge of the photodiode 121*f* immediately before reading the electric charge to the FD part 163, whereas the photodiode 121*f* can partially contribute to the detection signal level by setting a time between the resetting and the readout to the FD part 163.

As described above, the four photodiodes 121*f* are provided for one pixel 121*a* in FIG. 5, and no light-shielding film 121*b* is formed on the light-receiving surface. However, the light-receiving surface is divided into the plurality of regions by the light-shielding film 121*p*, and the four photodiodes 121*f*-1 to 121*f*-4 are formed, and generate the detection signal for one pixel of the detection image and having the incident angle directivity. In other words, for example, a range not contributing to the output, of the photodiodes 121*f*-1 to 121*f*-4, functions similarly to the shielded region, and the photodiodes 121*f*-1 to 121*f*-4 generate the detection signal for one pixel of the detection image and having the incident angle directivity. The value of the detection signal (output pixel value) is modulated according to the incident angle of the incident light from the object, and the characteristic (directivity) differs (has an incident angle directivity) depending on the incident angle. Note that in the case of generating the detection signal for one pixel using the photodiodes 121*f*-1 to 121*f*-4, the detection signal is not a signal obtained by optical modulation because the light-shielding film 121*b* is not used.

Although an example in which four photodiodes are arranged in a pixel has been described, the number of photodiodes arranged in a pixel is arbitrary and is not limited to the above example. That is, the number of partial regions in which the photodiodes are arranged in the pixel is also arbitrary.

Furthermore, the description has been made such that the photodiodes are arranged in the four partial regions obtained by equally dividing the pixel into four. However, the partial regions may not be equally divided. That is, the sizes and shapes of the partial regions may not be all unified (partial regions having different sizes and shapes may be included). Alternatively, the position (the position in the partial region), size, shape, and the like of the photodiode arranged in each partial region may be different for each photodiode (for each partial region). At that time, the sizes and shapes of the partial regions may be all unified or may not be unified.

Moreover, these parameters do not have to be unified for all the pixels of the imaging element 121. That is, in one or more pixels of the imaging element 121, one or more of these parameters may be different from other pixels.

For example, a pixel in which a division position for forming the partial region where the photodiode is arranged in the pixel is different from other pixels may be included in the pixel group of the imaging element 121. That is, the imaging element 121 may include one or more pixels in which the size and shape of the partial region are different from other pixels. For example, by making this division position different for each pixel, even if only the upper left photodiode is used in a plurality of pixels, the incident angle directivities of the detection signals detected in the respective pixels of the plurality of pixels can be made different from one another.

Furthermore, for example, a pixel in which the positions, sizes, shapes, and the like of the plurality of photodiodes arranged in the pixel are different from other pixels may be included in the pixel group of the imaging element 121. That is, the imaging element 121 may include one or more pixels in which at least one of the positions, sizes, or shapes of the plurality of photodiodes to be arranged is different from other pixels. For example, by making the position, size, shape, and the like of the photodiode different for each pixel, even if only the upper left photodiode is used in a plurality of pixels, the incident angle directivities of the detection signals detected in the respective pixels of the plurality of pixels can be made different from one another.

Further, for example, one or more pixels in which both the parameters (size and shape) of the partial region and the parameters (position, size, and shape) of the photodiode are different from other pixels may be included.

Furthermore, for example, a pixel in which the number of divisions for forming the partial region where the photodiode is arranged in the pixel is different from other pixels may be included in the pixel group of the imaging element 121. That is, the imaging element 121 may include one or more pixels in which the number of photodiodes to be arranged is different from other pixels. For example, by making the number of divisions (the number of photodiodes) different for each pixel, the incident angle directivity can be more freely set.

Principle of Generating Incident Angle Directivity

Figure 6:
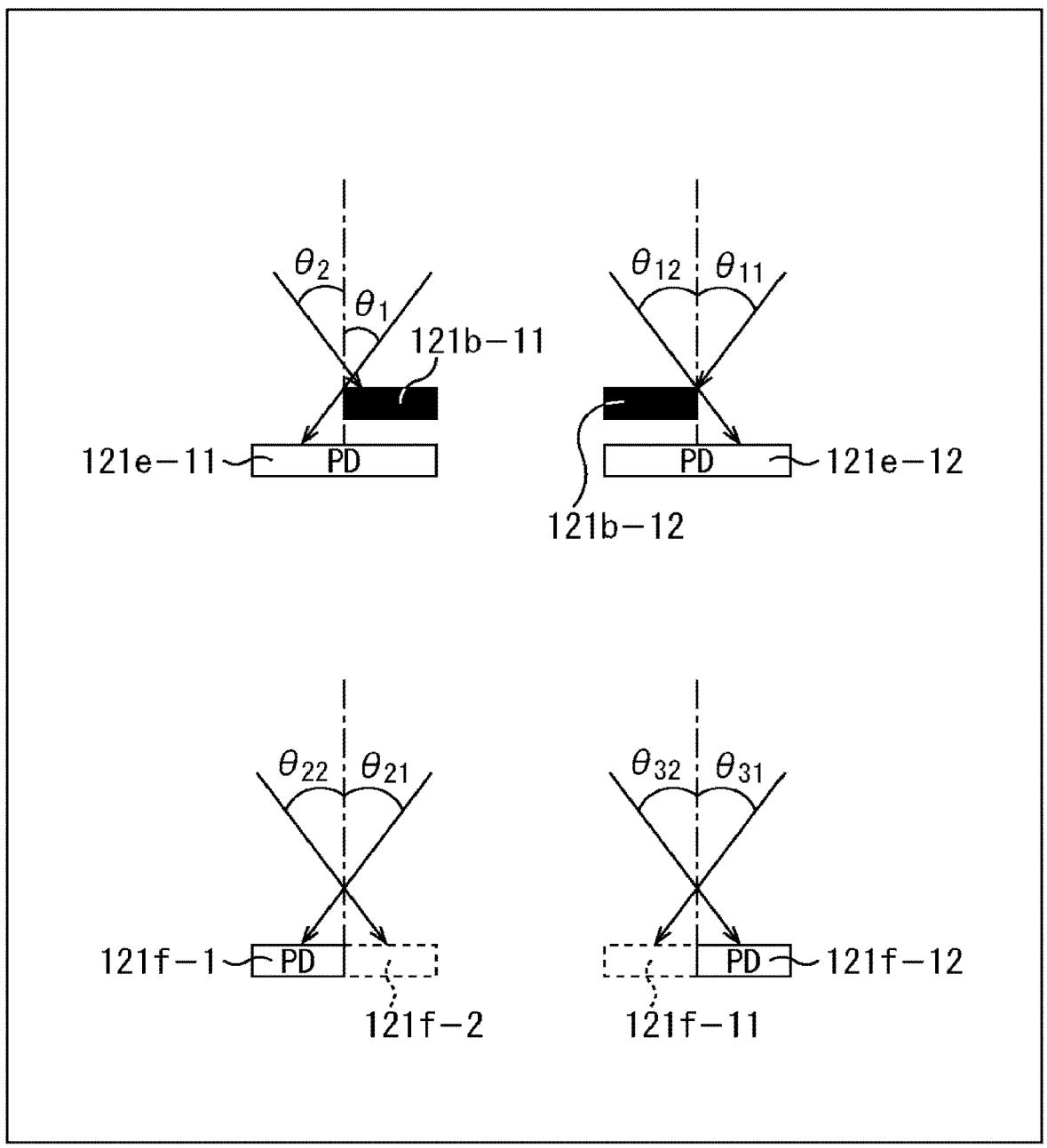
FIG. 6 is a diagram for describing a principle of occurrence of incident angle directivity.

The incident angle directivity of each pixel in the imaging element 121 is generated according to, for example, the principles illustrated in FIG. 6. Note that the upper left part and upper right parts in FIG. 6 are diagrams for describing generation principles of the incident angle directivity in the imaging element 121 in FIG. 4, and the lower left and lower right part in FIG. 6 are diagrams for describing generation principles of the incident angle directivity in the imaging element 121 in FIG. 5.

Furthermore, one pixels in the upper left and upper right parts in FIG. 6 are each configured by one photodiode 121e. In contrast, one pixels in the lower left and lower right parts in FIG. 6 are each configured by two photodiodes 121f. Note that, here, the example in which one pixel is configured by two photodiodes 121f has been described. However, this is for convenience of description. The number of photodiodes 121f configuring one pixel may be another number.

In the upper left part in FIG. 6, a light-shielding film 121b-11 is formed to shield a right half of a light-receiving surface of a photodiode 121e-11 when incident light is incident from above to below in FIG. 6. Furthermore, in the upper right part in FIG. 6, a light-shielding film 121b-12 is formed to shield a left half of a light-receiving surface of a photodiode 121e-12. Note that the alternate long and short dash line in FIG. 6 represents a center position of the light-receiving surface of the photodiode 121e in the horizontal direction in FIG. 6 and a direction perpendicular to the light-receiving surface.

For example, in the case of the upper left configuration in FIG. 6, the incident light from the upper right direction in FIG. 6, which is illustrated by the arrow forming an incident angle θ1 with respect to the alternate long and short dash line in FIG. 6, can be easily received in the left half range not shielded by the light-shielding film 121b-11 of the photodiode 121e-11. Meanwhile, the incident light from the upper left direction in FIG. 6, which is illustrated by the arrow forming an incident angle θ2 with respect to the alternate long and short dash line in FIG. 6, is less easily received in the left half range not shielded by the light-shielding film 121b-11 of the photodiode 121e-11. Therefore, in the case of the upper left configuration in FIG. 6, incident angle directivity that the light-receiving sensitivity characteristic is high with respect to the incident light from the upper right in FIG. 6, and the light-receiving sensitivity characteristic is low with respect to the incident light from the upper left is provided.

In contrast, for example, in the case of the upper right configuration in FIG. 6, the incident light from the upper right direction in FIG. 6, which is illustrated by the arrow forming an incident angle θ11 with respect to the alternate long and short dash line in FIG. 6, is less easily received in the left half range shielded by the light-shielding film 121b-12 of the photodiode 121e-12. Meanwhile, the incident light from the upper left direction in FIG. 6, which is illustrated by the arrow forming an incident angle θ12 with respect to the alternate long and short dash line in FIG. 6, is easily received in the right half range not shielded by the light-shielding film 121b-12 of the photodiode 121e-12. Therefore, in the case of the upper right configuration in FIG. 6, incident angle directivity that the light-receiving sensitivity characteristic is low with respect to the incident light from the upper right in FIG. 6, and the light-receiving sensitivity characteristic is high with respect to the incident light from the upper left is provided.

Furthermore, in the case of the lower left part in FIG. 6, the photodiodes 121f-1 and 121f-2 are provided side by side in FIG. 6, and the incident angle directivity is provided without the light-shielding film 121b by reading either one of the detection signals.

That is, as illustrated in the lower left part in FIG. 6, in a case where the two photodiodes 121f-1 and 121f-2 are formed in the pixel 121a, the detection signal of the photodiode 121f-1 provided on the left side in FIG. 6 is caused to contribute to the detection signal level of the pixel 121a, so that incident angle directivity similar to that of the upper left configuration in FIG. 6 can be provided. That is, the incident light from the upper right direction in FIG. 6, which is indicated by the arrow forming an incident angle θ21 with respect to the alternate long and short dash line in FIG. 6, is incident on and received by the photodiode 121f-1 and contributes to the detection signal level of the pixel 121a. In contrast, the incident light from the upper left direction in FIG. 6, which is indicated by the arrow forming an incident angle θ22 with respect to the alternate long and short dash line in FIG. 6, is incident on the photodiode 121f-2 but the detection signal is not read and does not contribute to the detection signal level of the pixel 121a.

Similarly, as illustrated in the lower right part in FIG. 6, in a case where the two photodiodes 121f-11 and 121f-12 are formed in the pixel 121a, the detection signal of the photodiode 121f-12 provided on the left side in FIG. 6 is caused to contribute to the detection signal level of the pixel 121a, so that incident angle directivity similar to that of the upper right configuration in FIG. 6 can be provided. That is, the incident light from the upper right direction in FIG. 6, which is indicated by the arrow forming an incident angle θ31 with respect to the alternate long and short dash line in FIG. 6, is incident on the photodiode 121f-11 but the detection signal is not read and does not contribute to the detection signal level of the pixel 121a. In contrast, the incident light from the upper left direction in FIG. 6, which is indicated by the arrow forming an incident angle θ32 with respect to the alternate long and short dash line in FIG. 6, is incident on and received by the photodiode 121*f*-12 and contributes to the detection signal level of the pixel 121*a*.

Note that, in FIG. 6, an example in which the alternate long and short dash line in the vertical direction represents the center position in the horizontal direction in FIG. 6 of the light-receiving surface of the photodiode 121*e* has been described. However, the example is for convenience of description and another position may be adopted. When the position of the light-shielding film 121*b* in the horizontal direction indicated by the alternate long and short dash line in the vertical direction is different, different incident angle directivity can be generated.

<Incident Angle Directivity in Configuration Including On-chip Lens>

In the above, the generation principle of the incident angle directivity has been described. Here, the incident angle directivity in the configuration including the on-chip lens 121*c* will be described.

Figure 7:
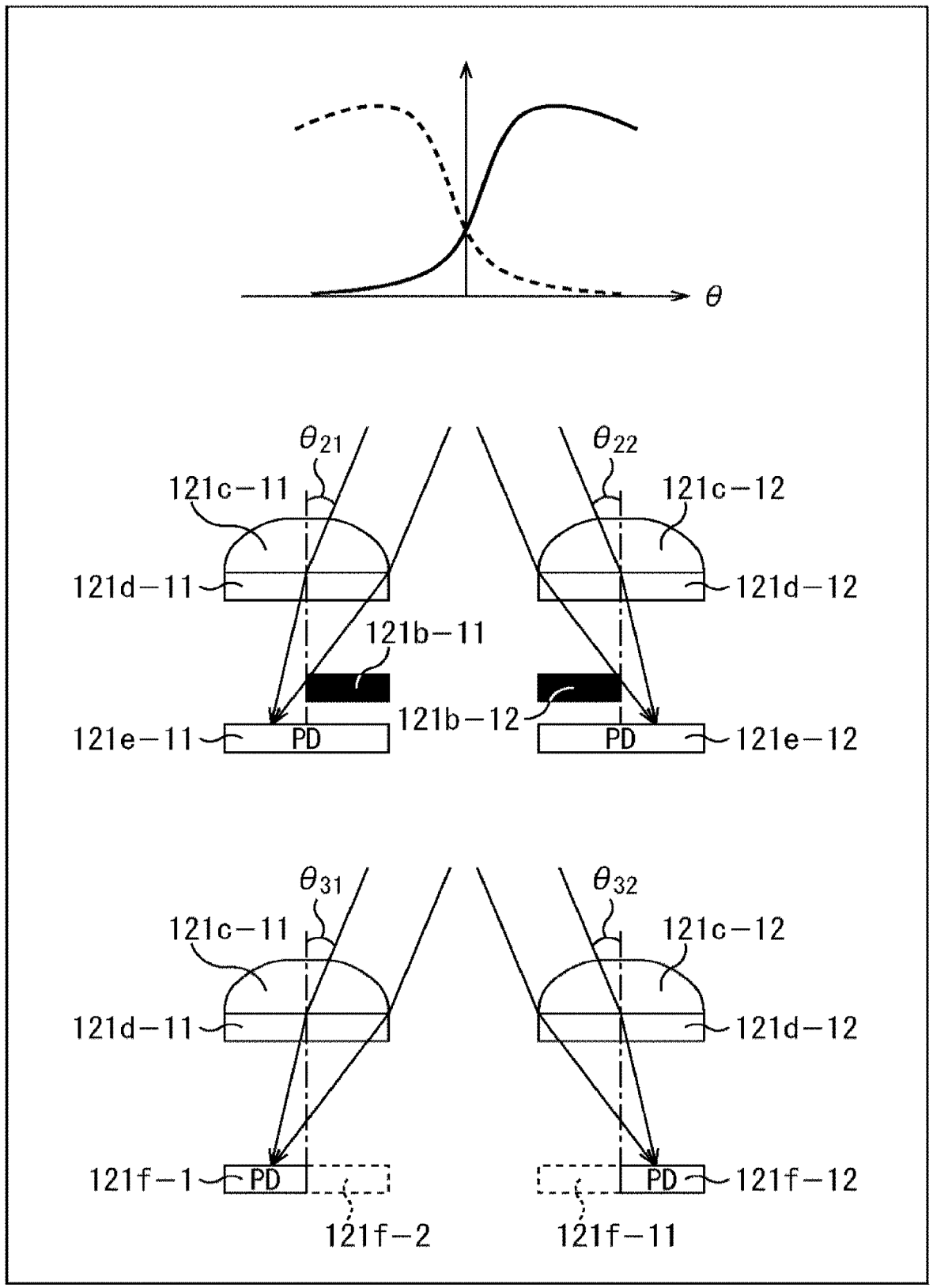
FIG. 7 is a diagram for describing changes in the incident angle directivity using an on-chip lens.

That is, the incident angle directivity of each pixel in the imaging element 121 is set as illustrated in FIG. 7, for example, by using the on-chip lens 121*c* in addition to the above-described light-shielding film 121*b*. That is, in the middle left part in FIG. 7, an on-chip lens 121*c*-11 that condenses the incident light, a color filter 121*d*-11 that transmits light of a predetermined wavelength, and the photodiode 121*e*-11 that generates the pixel signal by photoelectric conversion are stacked in order from an upper incident direction in FIG. 7. In the middle right part in FIG. 7, an on-chip lens 121*c*-12, a color filter 121*d*-12, and a photodiode 121*e*-12 are configured in this order from the upper incident direction in FIG. 7.

Note that in a case where it is not necessary to distinguish the on-chip lenses 121*c*-11 and 121*c*-12, the color filters 121*d*-11 and 121*d*-12, and the photodiodes 121*e*-11 and 121*e*-12, they are simply referred to as on-chip lens(es) 121*c*, color filter(s) 121*d*, and photodiode(s) 121*e*.

In the imaging element 121, as illustrated in the middle left part and the middle right part in FIG. 7, the light-shielding films 121*b*-11 and 121*b*-12 that shield part of regions for receiving the incident light are further provided.

As illustrated in the middle left part in FIG. 7, in the case where the light-shielding film 121*b*-11 that shields the right-side half of the photodiode 121*e*-11 in FIG. 7 is provided, the detection signal level of the photodiode 121*e*-11 changes according to the incident angle θ of the incident light, as illustrated by the solid line waveform in the upper part in FIG. 7.

That is, when the incident angle θ, which is an angle made by the incident light, becomes large (when the incident angle θ becomes large in a positive direction (when the incident angle θ inclines rightward in FIG. 7)) with respect to the alternate long and short dash line representing the center position of the photodiode 121*e* and the on-chip lens 121*c* and perpendicular to the photodiode 121*e* and the on-chip lens 121*c*, the light is condensed to a range where the light-shielding film 121*b*-11 is not provided, so that the detection signal level of the photodiode 121*e*-11 becomes large. Conversely, the light is further condensed to a range where the light-shielding film 121*b*-11 is provided as the incident angle becomes smaller (as the incident angle θ is larger in a negative direction (when the incident angle θ inclines leftward in FIG. 7)), so that the detection signal level of the photodiode 121*e*-11 becomes smaller.

Note that the incident angle θ here is 0 degrees in the case where the incident light direction coincides with the alternate long and short dash line, the incident angle θ on an incident angle θ21 side on the middle left side in FIG. 7 in which the incident light from the upper right in FIG. 7 is incident is a positive value, and the incident angle θ on an incident angle θ22 side on the middle right side in FIG. 7 is a negative value. Therefore, in FIG. 7, the incident light entering the on-chip lens 121*c* from the upper right becomes larger in the incident angle than the incident light incident from the upper left. That is, in FIG. 7, the incident angle θ becomes larger as a traveling direction of the incident light inclines more rightward (becomes larger in the positive direction), and becomes smaller as the traveling direction inclines more leftward (becomes larger in the negative direction).

Furthermore, as illustrated in the middle right part in FIG. 7, in the case where the light-shielding film 121*b*-12 that shields the left-side half of the photodiode 121*e*-12 in FIG. 7 is provided, the detection signal level of the photodiode 121*e*-12 changes according to the incident angle θ of the incident light, as illustrated by the dotted line waveform in the upper part in FIG. 7.

That is, as illustrated by the dotted line waveform in the upper part in FIG. 7, the light is further condensed to a range where the light-shielding film 121*b*-12 is provided as the incident angle θ, which is an angle made by the incident light, becomes larger (when the incident angle θ becomes larger in the positive direction) with respect to the alternate long and short dash line representing the center position of the photodiode 121*e* and the on-chip lens 121*c* and perpendicular to the photodiode 121*e* and the on-chip lens 121*c*, so that the detection signal level of the photodiode 121*e*-12 becomes smaller. Conversely, the light enters a range where the light-shielding film 121*b*-12 is not provided as the incident angle θ becomes smaller (as the incident angle θ is larger in the negative direction), so that the detection signal level of the photodiode 121*e*-12 becomes larger.

Note that, in the upper part in FIG. 7, the horizontal axis represents the incident angle θ, and the vertical axis represents the detection signal level in the photodiode 121*e*.

The waveforms illustrated by the solid line and the dotted line indicating the detection signal level corresponding to the incident angle θ illustrated in the upper part in FIG. 7 can be changed according to the range of the light-shielding film 121*b*. Thereby, the incident angle directivities different from each other can be provided in units of pixels. Note that the solid line waveform in the upper part in FIG. 7 corresponds to the solid line arrows indicating the state where the incident light in the middle left part and in the lower left part in FIG. 7 is condensed with a changed incident angle θ. Furthermore, the dotted line waveform in the upper part in FIG. 7 corresponds to the dotted line arrows indicating the state where the incident light in the middle right part and in the lower right part in FIG. 7 is condensed with a changed incident angle θ.

The incident angle directivity referred to here is the characteristic (light-receiving sensitivity characteristic) of the detection signal level of each pixel according to the incident angle θ, but in the case of the examples in the middle part in FIG. 7, the incident angle directivity can be said to be a characteristic of a light-shielding value according to the incident angle θ. That is, the light-shielding film 121*b* shields the incident light in a specific direction at a high level but cannot sufficiently shield the incident light from a direction other than the specific direction. This change in the level of shielding light causes different detection signal levels depending on the incident angle θ as illustrated in the upper part in FIG. 7. Therefore, when the direction in which light can be shielded at the highest level in each pixel is defined as a light-shielding direction of each pixel, having different incident angle directivities from one another in pixel units means, in other words, having different light-shielding directions from one another in pixel units.

Moreover, as illustrated in the lower left part in FIG. 7, a configuration in which the two photodiodes 121f-1 and 121f-2 are provided for one on-chip lens 121c-11 (the pixel output unit is configured by two photodiodes 121f-1 and 121f-2) is adopted, and the detection signal of only the photodiode 121f-1 in the left part in FIG. 7 is used, whereby the detection signal of the same detection signal level as the state where the right side of the photodiode 121e-11 is shielded in the middle left part in FIG. 7 can be obtained.

That is, when the incident angle θ, which is an angle made by the incident light, becomes large (when the incident angle θ becomes large in the positive direction) with respect to the alternate long and short dash line representing the center position of the on-chip lens 121c and perpendicular to the on-chip lens 121c, the light is condensed to the range of the photodiode 121f-1 where the detection signal is read, so that the detection signal level becomes large. Conversely, when the light is further condensed to the range of the photodiode 121f-2 where the detection signal is not read as the incident angle θ is smaller (the incident angle θ is larger in the negative direction), the detection signal level becomes smaller.

Furthermore, similarly, as illustrated in the lower right part in FIG. 7, a configuration in which the two photodiodes 121f-11 and 121f-12 are provided for one on-chip lens 121c-12 is adopted, and the detection signal of only the photodiode 121f-12 in the right part in FIG. 7 is used, whereby the detection signal of the same detection signal level as the state where the left side of the photodiode 121e-12 is shielded in the middle right part in FIG. 7 can be obtained.

That is, when the incident angle θ, which is an angle made by the incident light, becomes large (when the incident angle θ becomes large in the positive direction) with respect to the alternate long and short dash line representing the center position of the on-chip lens 121c and perpendicular to the on-chip lens 121c, the light is condensed to the range of the photodiode 121f-11 where the detection signal is not read, so that the detection signal level becomes small. Conversely, when the light is further condensed to the range of the photodiode 121f-12 where the detection signal is read as the incident angle θ is smaller (the incident angle θ is larger in the negative direction), the detection signal level becomes larger.

Note that the incident angle directivity having higher randomness is more desirable. For example, when adjacent pixels have the same incident angle directivity, there is a possibility that the above-described equations (1) to (3) or the equations (4) to (6) to be described below become the same equations, and the relationship between unknowns, which will be a solution of the simultaneous equations, and the number of equations cannot be satisfied, and a pixel value configuring a restoration image cannot be obtained. Furthermore, in the configurations illustrated in the middle part in FIG. 7, one photodiode 121e-11 and one photodiode 121e-12 are formed in the pixel 121a. In contrast, in the configurations illustrated in the lower part in FIG. 7, the two photodiodes 121f-1 and 121f-2 and the two photodiodes 121f-11 and 121f-12 are formed in the pixel 121a. Therefore, for example, in the lower part in FIG. 7, one pixel is not configured by the photodiode 121f alone.

Furthermore, as illustrated in the lower part in FIG. 7, in the case where one pixel output unit is configured by the plurality of photodiodes 121f, the output pixel value of the pixel output unit can be regarded to be modulated according to the incident angle. Therefore, the characteristic (incident angle directivity) of the output pixel value can be made different for each pixel output unit, and the incident angle directivity is set for each pixel output unit.

Moreover, in the case where one pixel output unit is configured by the plurality of photodiodes 121f, one on-chip lens 121c is an indispensable configuration for one pixel output unit to generate the incident angle directivity in one pixel output unit.

Furthermore, as illustrated in the middle part in FIG. 7, in the case where one photodiode 121e-11 or one photodiode 121e-12 configures one pixel output unit, the incident light to one photodiode 121e-11 or one photodiode 121e-12 configuring one pixel output unit is modulated according to the incident angle, and as a result, the output pixel value is modulated. Therefore, the characteristic (incident angle directivity) of the output pixel value can be made different, and the incident angle directivity is set for each pixel output unit. Moreover, in the case where one photodiode 121e-11 or one photodiode 121e-12 configures one pixel output unit, the incident angle directivity is independently set at the time of manufacturing by the light-shielding film 121b set for each pixel output unit.

Furthermore, as illustrated in the lower part in FIG. 7, in the case where the plurality of photodiodes 121f configures one pixel output unit, the number (the number of divisions for the photodiodes 121f configuring one pixel output unit) and positions of the plurality of photodiodes 121f for setting the incident angle directivity for each pixel output unit are independently set at the time of manufacturing for each pixel output unit. Moreover, which photodiode 121f among the photodiodes 121f is used to set the incident angle directivity can be switched at the time of capturing an image.

Setting of Incident Angle Directivity

Figure 8:
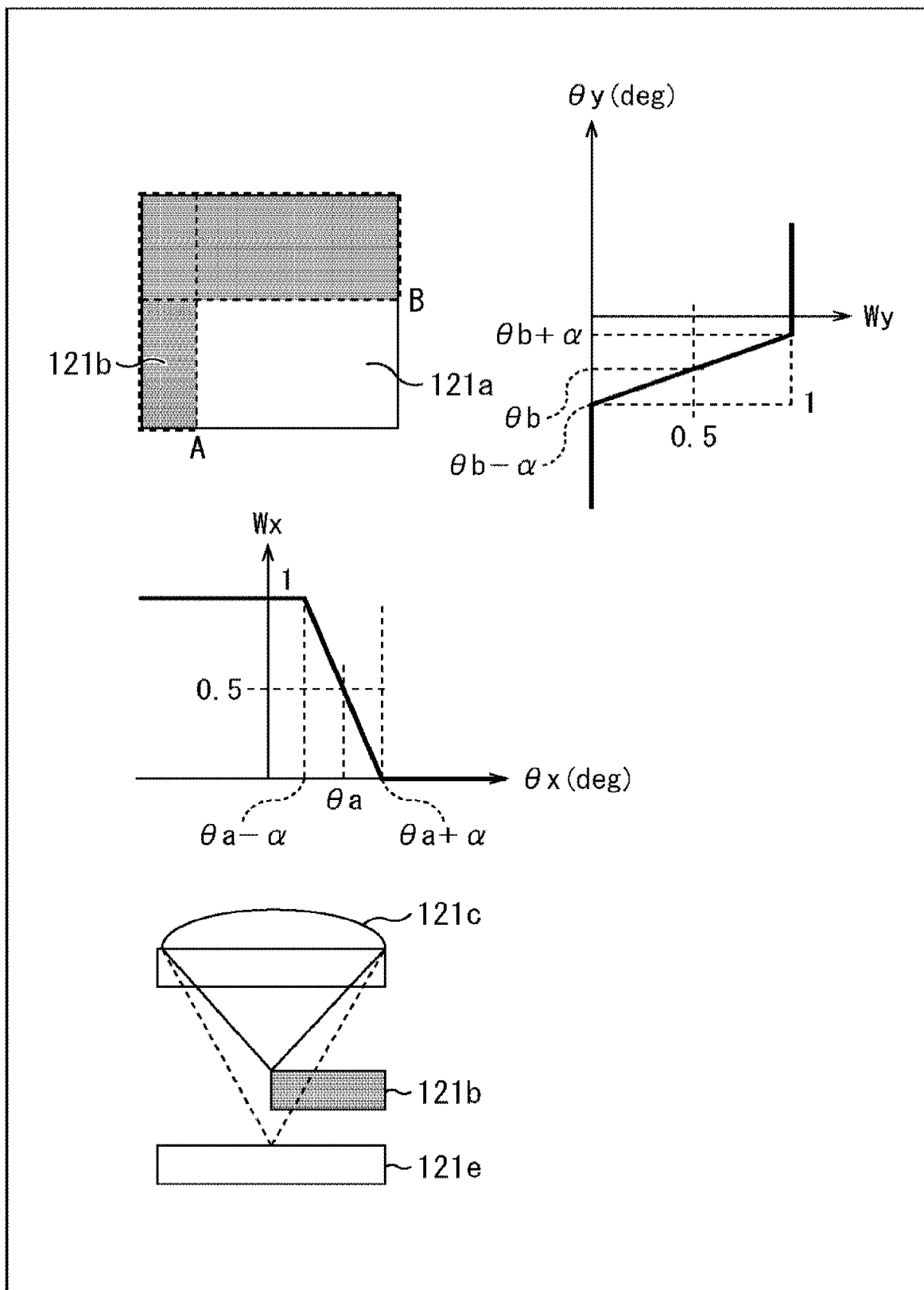
FIG. 8 is a diagram for describing design of the incident angle directivity.

For example, as illustrated in the upper part in FIG. 8, setting ranges of the light-shielding film 121b are a range from a left end to a position A in the horizontal direction in the pixel 121a and a range from an upper end to a position B in the vertical direction in the pixel 121a.

In this case, a weight Wx of 0 to 1 in the horizontal direction, which is an index of the incident angle directivity, is set according to an incident angle θx (deg) from a horizontal center position of each pixel.

More specifically, in the case of assuming that the weight Wx becomes 0.5 at the incident angle θx=θa corresponding to the position A, the weight Wx is set such that the weight Wx becomes 1 at the incident angle θx<θa−α, the weight Wx becomes $(-(\theta x - \theta a)/2\alpha + \frac{1}{2})$ when θa−α≤the incident angle θx≤θa+α, and the weight Wx becomes 0 at the incident angle θx≥θa+α. Note that, here, examples in which the weight Wx is 0, 0.5, and 1 will be described. However, the weight Wx becomes 0, 0.5, and 1 when ideal conditions are satisfied.

Similarly, a weight Wy of 0 to 1 in the vertical direction, which is an index of the incident angle directivity, is set according to an incident angle θy (deg) from a vertical center position of each pixel. More specifically, in the case of assuming that a weight Wv becomes 0.5 at the incident angle θy=θb corresponding to the position B, the weight Wy is set such that the weight Wy becomes 0 at the incident angle θy<θb−α, the weight Wy becomes ((θy−θb)/2α+½) when θb−α≤the incident angle θy≤θb+α, and the weight Wy becomes 1 at the incident angle θy≥θb+α.

Then, coefficients corresponding to the incident angle directivities of the pixel 121a, that is, corresponding to the light-receiving sensitivity characteristics (coefficient set) can be obtained by using the weights Wx and Wy thus obtained.

Furthermore, at this time, an inclination (½α) indicating a change in the weight in a range where the horizontal weight Wx and the vertical weight Wy are around 0.5 can be set by using the on-chip lenses 121c having different focal lengths.

In other words, different focal lengths can be obtained by using the on-chip lenses 121c having different curvatures.

For example, the inclination (½α) becomes steep when the focal length is condensed to be on the light-shielding film 121b, as illustrated by the solid line in the lower part in FIG. 8, by using the on-chip lenses 121c having different curvatures. That is, the horizontal weight Wx and the vertical weight Wy in the upper part in FIG. 8 abruptly change to 0 or 1 near a boundary of the horizontal incident angle θx=θa and the vertical incident angle θy=θb, which are around 0.5.

Furthermore, for example, the inclination (½α) becomes gentle when the focal length is condensed to be on the photodiode 121e, as illustrated by the dotted line in the lower part in FIG. 8, by using the on-chip lenses 121c having different curvatures. That is, the horizontal weight Wx and the vertical weight Wy in the upper part in FIG. 8 gently change to 0 or 1 near the boundary of the horizontal incident angle θx=θa and the vertical incident angle θy=θb, which are around 0.5.

As described above, different incident angle directivities, that is, different light-receiving sensitivity characteristics can be obtained by having different focal lengths by using the on-chip lenses 121c having different curvatures.

Therefore, the incident angle directivity of the pixel 121a can be set to a different value by making the range in which the photodiode 121e is shielded from light by the light-shielding film 121b different from the curvature of the on-chip lens 121c. Note that the curvatures of the on-chip lenses may be the same in all the pixels in the imaging element 121 or may be different in some pixels.

Difference Between On-Chip Lens and Imaging Lens

As described above, the imaging element 121 does not require an imaging lens. Note that the on-chip lens 121c is at least necessary in the case of implementing the incident angle directivity using the plurality of photodiodes in the pixel, as described with reference to FIG. 5. The on-chip lens 121c and the imaging lens have different physical functions.

The imaging lens has a light condensing function for causing incident light incident from the same direction to enter a plurality of pixels adjacent to each other. In contrast, light passing through the on-chip lens 121c enters only the light-receiving surface of the photodiode 121e or 121f configuring one corresponding pixel. In other words, the on-chip lens 121c is provided for each pixel output unit and condenses the object light entering the on-chip lens 121c itself to only the corresponding pixel output unit. That is, the on-chip lens 121c does not have a light condensing function for causing the diffused light emitted from a virtual point light source to enter a plurality of pixels adjacent to each other.

Distance Relationship Between Object Plane and Imaging Element

Next, a distance relationship between the object plane and the imaging element 121 will be described with reference to FIG. 9.

Figure 9:
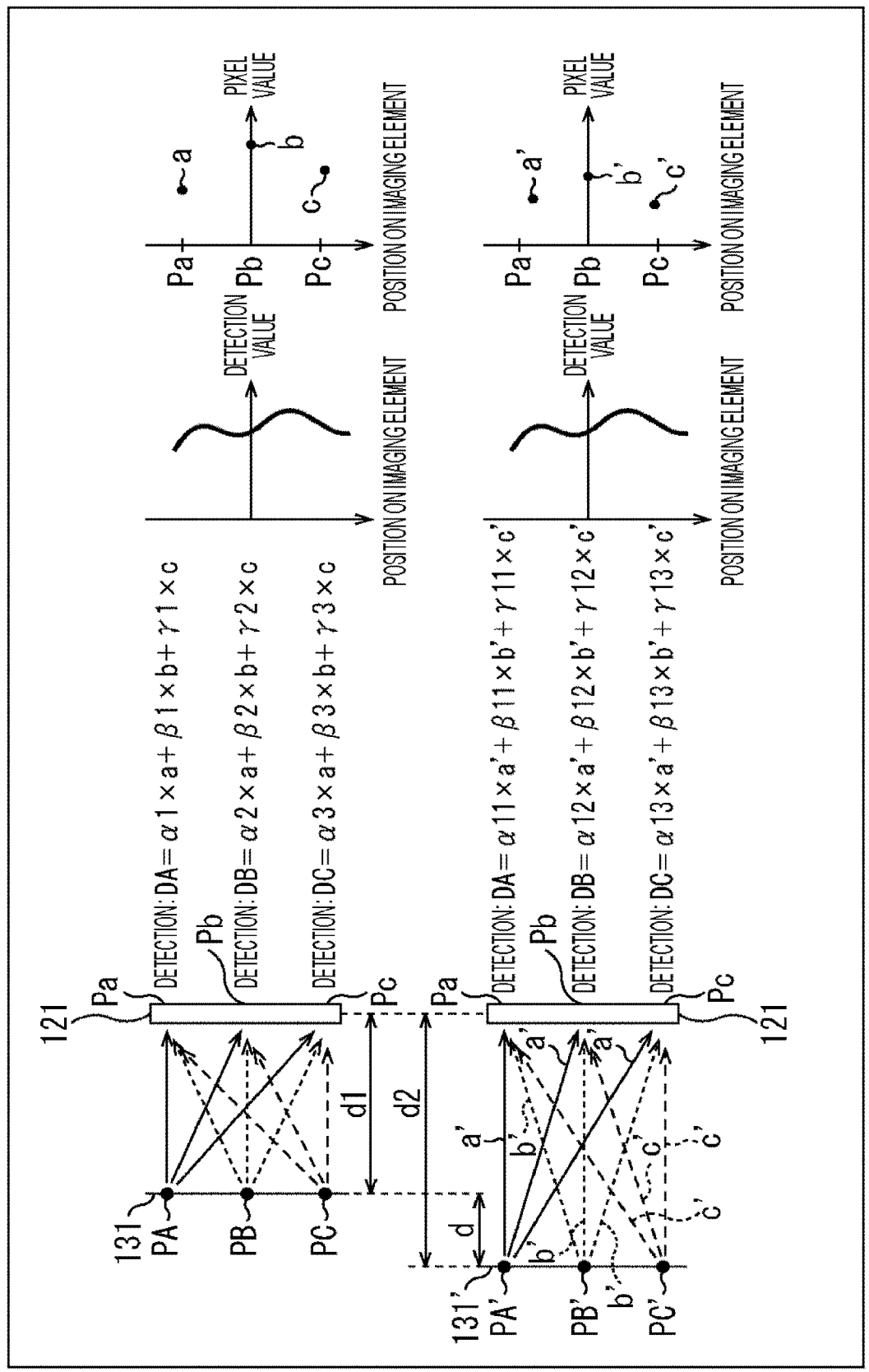
FIG. 9 is a diagram for describing a relationship between an object distance and a coefficient expressing the incident angle directivity.

As illustrated in the upper left part in FIG. 9, in the case where an object distance between the imaging element 121 and the object plane 131 is a distance d1, it is assumed that the detection signal levels DA, DB, and DC at the positions Pa, Pb, and Pc on the imaging element 121 corresponding to the point light sources PA, PB, and PC on the object plane 131 can be expressed by the same equations as the above-described equations (1) to (3), for example.

$$DA = \alpha1 \times a + \beta1 \times b + \gamma1 \times c \quad (1)$$

$$DA = \alpha2 \times a + \beta2 \times b + \gamma2 \times c \quad (2)$$

$$DA = \alpha3 \times a + \beta3 \times b + \gamma3 \times c \quad (3)$$

In contrast, in a case of an object plane 131' in which the object distance between the imaging element 121 and the object plane 131' is a distance d2 that is larger than the distance d1 by d, as illustrated in the lower left part in FIG. 9, that is, in a case of the object plane 131' at a deeper position than the object plane 131, as viewed from the imaging element 121, the detection signal levels DA, DB, and DC are all similar, as illustrated in the upper center part and a lower center part in FIG. 9.

However, in this case, light beams having light intensities a', b', and c' from point light sources PA', PB', and PC' on the object plane 131' are received by each pixel of the imaging element 121. At this time, since the incident angles of the light beams having the light intensities a', b', and c' received on the imaging element 121 are different (change), different coefficient sets are required, and the detection signal levels DA, DB, and DC at the respective positions Pa, Pb, and Pc are expressed by the following equations (4) to (6), for example.

$$DA = \alpha11 \times a' + \beta11 \times b' + \gamma11 \times c' \quad (4)$$

$$DA = \alpha12 \times a' + \beta12 \times b' + \gamma12 \times c' \quad (5)$$

$$DA = \alpha13 \times a' + \beta13 \times b' + \gamma13 \times c' \quad (6)$$

Here, a coefficient set group including a coefficient set α11, β11, and γ11, a coefficient set α12, β12, and γ12, and a coefficient set α13, β13, and γ13 is a coefficient set group of the object plane 131' corresponding to a coefficient set α1, β1, and γ1, a coefficient set α2, γ2, and γ2, and a coefficient set α3, β3, and γ3 on the object plane 131.

Therefore, by solving the equations (4) to (6) using the preset coefficient set group α11, β11, γ11, α12, β12, γ12, α13, β13, and γ13, the light intensities (a', b', and c') of the light beams from the point light sources PA', PB', and PC' on the object plane 131' can be obtained by a similar technique to the technique of obtaining the light intensities (a, b, and c) of the light beams from the point light sources PA, PB, and PC on the object plane 131. As a result, the restoration image of the object on the object plane 131' can be obtained.

That is, in the imaging device 100 in FIG. 1, the coefficient set group for each distance from the imaging element 121 to the object plane is stored in advance, the simultaneous equations are configured by switching the coefficient set group, and the configured simultaneous equations are solved, whereby restoration images of the object planes at various object distances can be obtained on the basis of one detection image.

That is, by simply capturing a detection image once, a restoration image at an arbitrary distance can be generated by switching the coefficient set group according to the distance to the object plane and obtaining the restoration image in subsequent processing.

That is, computational photography is implemented.

Furthermore, in a case of obtaining image recognition, a visible image, or characteristics of the object other than the visible image, machine learning such as deep learning is applied to the detection signal of the imaging element, and image recognition can be performed using the detection signal itself, without performing image recognition on the basis of the restoration image after the restoration image is obtained.

Furthermore, in a case where the object distance or an angle of view can be specified, the restoration image may be generated using a detection image formed using a detection signal of a pixel having the incident angle directivity suitable for capturing an image of the object plane corresponding to the specified object distance or angle of view, without using all the pixels. By doing so, the restoration image can be obtained using the detection signal of the pixel suitable for capturing an image of the object plane corresponding to the specified object distance or angle of view. Therefore, the restoration image at the specified object distance or with the specified angle of view can be obtained with high accuracy.

Here, reasons for obtaining the restoration image with high accuracy by obtaining the restoration image using the detection signal of the pixel suitable for capturing an image of the object plane corresponding to the specified object distance or angle of view will be described.

Figure 10:
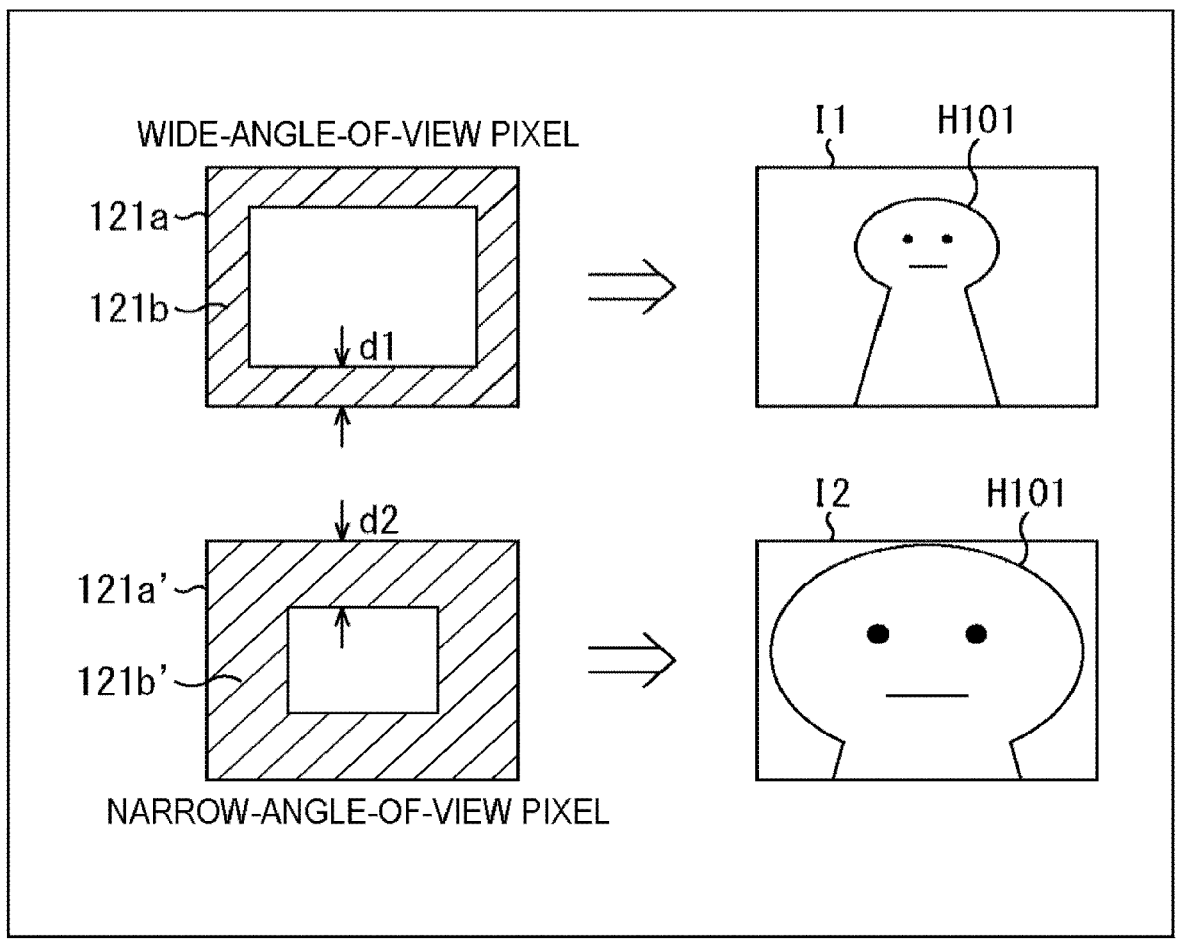
FIG. 10 is a diagram for describing a relationship between a narrow-angle-of-view pixel and a wide-angle-of-view pixel.

For example, consider the pixel 121a shielded by the light-shielding film 121b by a width d1 from respective ends of four sides, as illustrated in the upper part in FIG. 10, and a pixel 121a' shielded by the light-shielding film 121b by a width d2 (>d1) from respective ends of four sides, as illustrated in the lower part in FIG. 10.

Figure 11:
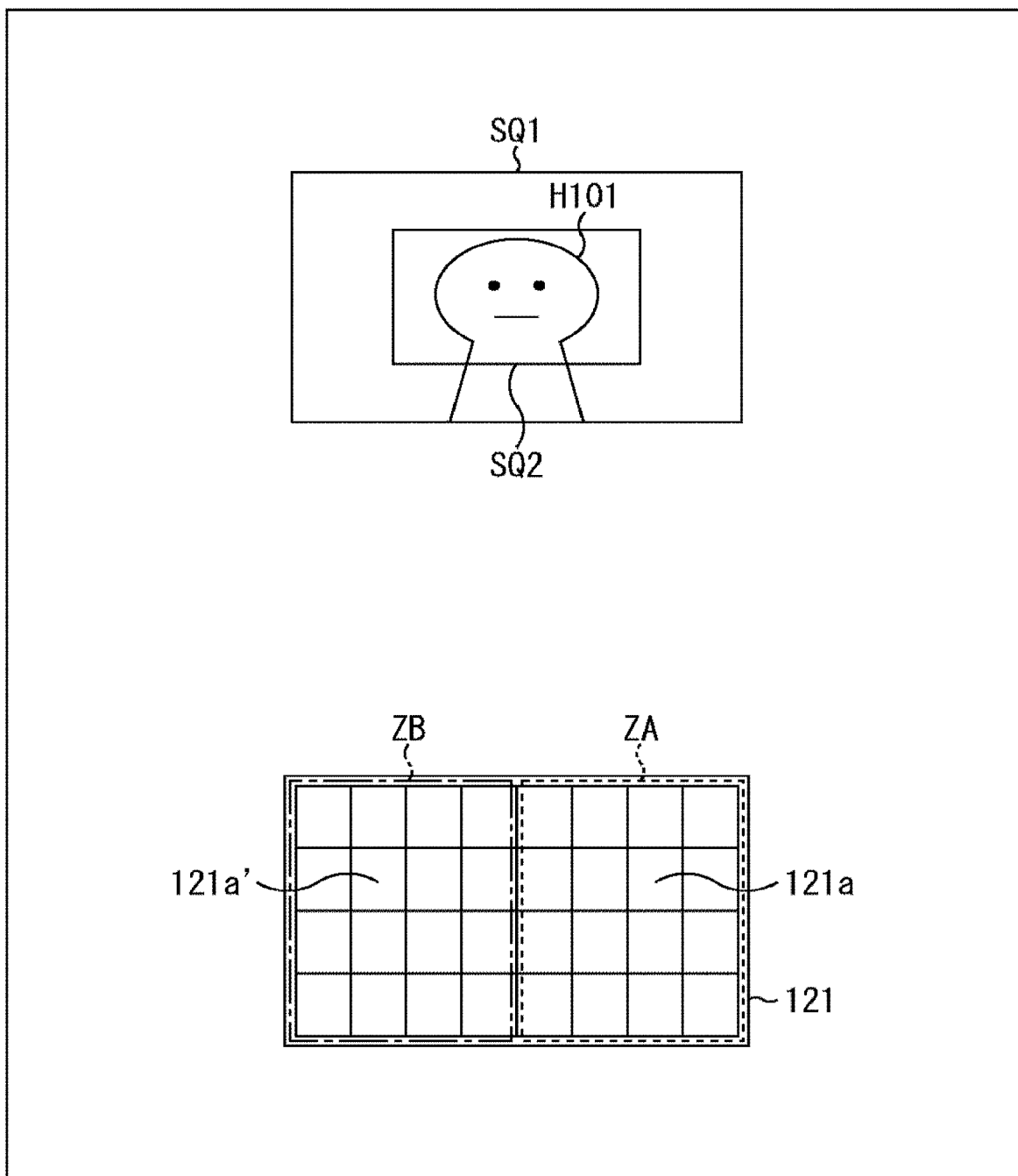
FIG. 11 is a diagram for describing a relationship between a narrow-angle-of-view pixel and a wide-angle-of-view pixel.

The pixel 121a is used for restoring an image I1 in FIG. 10 corresponding to an angle of view SQ1 including the entirety of a person H101 as an object, as illustrated in the upper part in FIG. 11, for example. In contrast, the pixel 121a' is used for restoring an image I2 in FIG. 10 corresponding to an angle of view SQ2 where the face and around the face of the person H101 as an object are zoomed up, as illustrated in the upper part in FIG. 11, for example.

Figure 12:
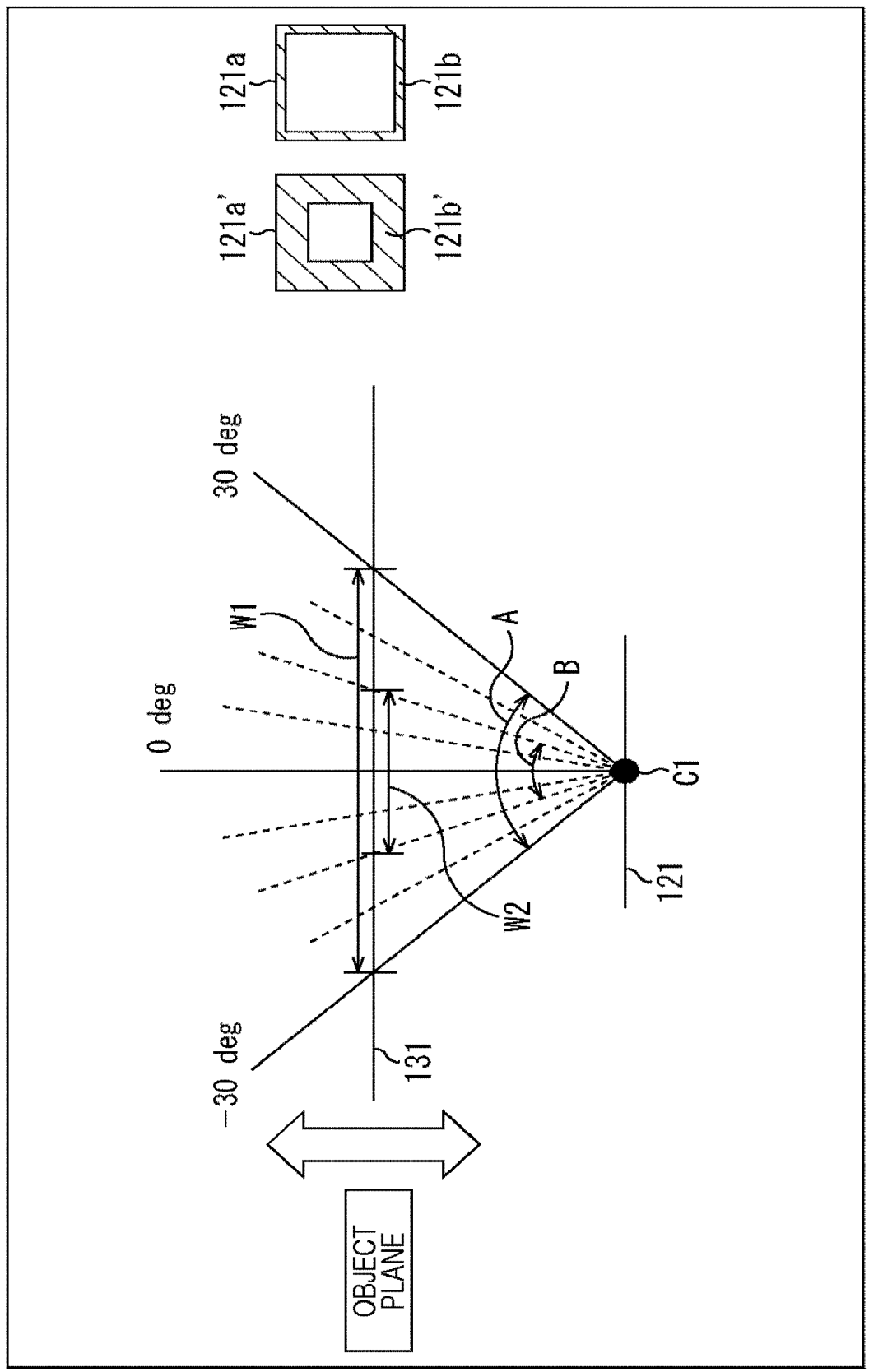
FIG. 12 is a diagram for describing a relationship between a narrow-angle-of-view pixel and a wide-angle-of-view pixel.

This is because the pixel 121a in FIG. 10 falls in an incidental angle range A of the incident light with respect to the imaging element 121, as illustrated in the left part in FIG. 12, and thus can receive the incident light for an object width W1 in the horizontal direction on the object plane 131.

In contrast, the pixel 121a' in FIG. 10 is shielded wider than the pixel 121a in FIG. 10 and thus falls in an incidental angle range B (<A) of the incident light with respect to the imaging element 121, as illustrated in the left part in FIG. 12. Therefore, the pixel 121a' can receive the incident light for an object width W2 (<W1) in the horizontal direction on the object plane 131.

That is, the pixel 121a in FIG. 10 having a narrow light-shielding range is a wide-angle-of-view pixel suitable for capturing an image of a wide range on the object plane 131, whereas the pixel 121a' in FIG. 10 having a wider light-shielding range is a narrow-angle-of-view pixel suitable for capturing an image of a narrow range on the object plane 131. Note that the wide-angle-of-view pixel and the narrow-angle-of-view pixel referred to here are expressions for comparing the pixels 121a and 121a' in FIG. 10, and expressions for comparing pixels of other angles of view are not limited thereto.

Note that FIG. 12 illustrates a relationship between a position on the object plane 131 with respect to a center position C1 of the imaging element 121 and the incident angle of the incident light from the position Furthermore, FIG. 12 illustrates the relationship between a position on the object plane 131 and the incident angle of the incident light from each position on the object plane 131 in the horizontal direction, but the same applies to the vertical direction. Furthermore, the pixels 121a and 121a' in FIG. 10 are illustrated in the right part in FIG. 12.

For example, as illustrated in the lower part in FIG. 11, in a case of configuring the imaging element 121 by arranging a predetermined number of the pixels 121a in FIG. 10 in a range ZA surrounded by the dotted line and a predetermined number of the pixels 121a' in FIG. 10 in a range ZB surrounded by the alternate long and short dash line, an image of the angle of view SQ1 corresponding to the object width W1 can be appropriately restored using the pixels 121a in the range ZA. Similarly, an image of the angle of view SQ2 corresponding to the object width W2 can be appropriately restored using the pixels 121b in the range ZB.

Note that the lower part in FIG. 11 illustrates the configuration in which the predetermined number of pixels 121a' is provided on the left side in FIG. 11 and the predetermined number of pixels 121a is provided on the right side. However, this is an example for simple description. The pixels 121a and the pixels 121a' are desirably randomly arranged in a mixed manner.

Furthermore, since the angle of view SQ2 is narrower than the angle of view SQ1, a restoration image with higher image quality can be obtained when restoring the image of the angle of view SQ2 having a narrower angle of view than when restoring the image of the angle of view SQ1 in the case of restoring the images of the angle of view SQ2 and the angle of view SQ1 using the same predetermined number of pixels.

That is, when considering obtainment of a restoration image using the same number of pixels, a restoration image with higher image quality can be obtained when restoring an image of a narrower angle of view.

Note that, in the case of obtaining an image of a wide angle of view as the restoration image, all of the wide-angle-of-view pixels may be used or some of the wide-angle-of-view pixels may be used. Furthermore, in the case of obtaining an image of a narrow angle of view as the restoration image, all of the narrow-angle-of-view pixels may be used or some of the narrow-angle-of-view pixels may be used.

By using the imaging element 121 like above, an imaging lens, an optical element including a diffraction grating, a pinhole, and the like become unnecessary. Therefore, the degree of freedom in designing the device can be increased. Furthermore, downsizing of the device in the incident direction of the incident light can be implemented, and the manufacturing cost can be reduced. Moreover, a lens corresponding to an imaging lens for forming an optical image, such as a focus lens, is not required.

Furthermore, by using the imaging element 121, restoration images of various object distances and angles of view can be generated by solving the simultaneous equations selectively using the coefficient set group according to the object distances and angles of view to obtain the restoration image, after simply acquiring the detection image. That is, computational photography is implemented.

Moreover, the imaging element 121 can have the incident angle directivity in pixel units and thus can implement a multi-pixel configuration, as compared with a case of using an optical filter and a conventional imaging element as in Patent Document 1, and the imaging element 121 can obtain a captured image with high resolution and high angular resolution.

Furthermore, since the imaging element 121 does not require the optical filter including a diffraction grating and the like, a situation where use environment becomes hot and the optical filter is distorted due to heat does not happen. Therefore, by using such an imaging element 121, a device with high environmental resistance can be implemented.

First Modification

In the right part in FIG. 3, as the configuration of the light-shielding film 121*b* in each pixel 121*a* of the imaging element 121, an example in which the entire pixel 121*a* is shielded in the vertical direction and the light-shielding width and position are changed in the horizontal direction so as to obtain the difference in the incident angle directivity in the horizontal direction has been described. However, the configuration of the light-shielding film 121*b* is not limited to this example. For example, the entire pixel 121*a* may be shielded in the horizontal direction and the width (height) or position in the vertical direction may be changed to obtain the difference in the incident angle directivity in the vertical direction.

Note that, as in the example illustrated in the right part in FIG. 3, the light-shielding film 121*b* that shields the entire pixel 121*a* in the vertical direction and shields the pixel 121*a* with a predetermined width in the horizontal direction is referred to as a horizontal band-type light-shielding film 121*b*. In contrast, the light-shielding film 121*b* that shields the entire pixel 121*a* in the horizontal direction and shields the pixel 121*a* at a predetermined height in the vertical direction is referred to as a vertical band-type light-shielding film 121*b*.

Figure 13:
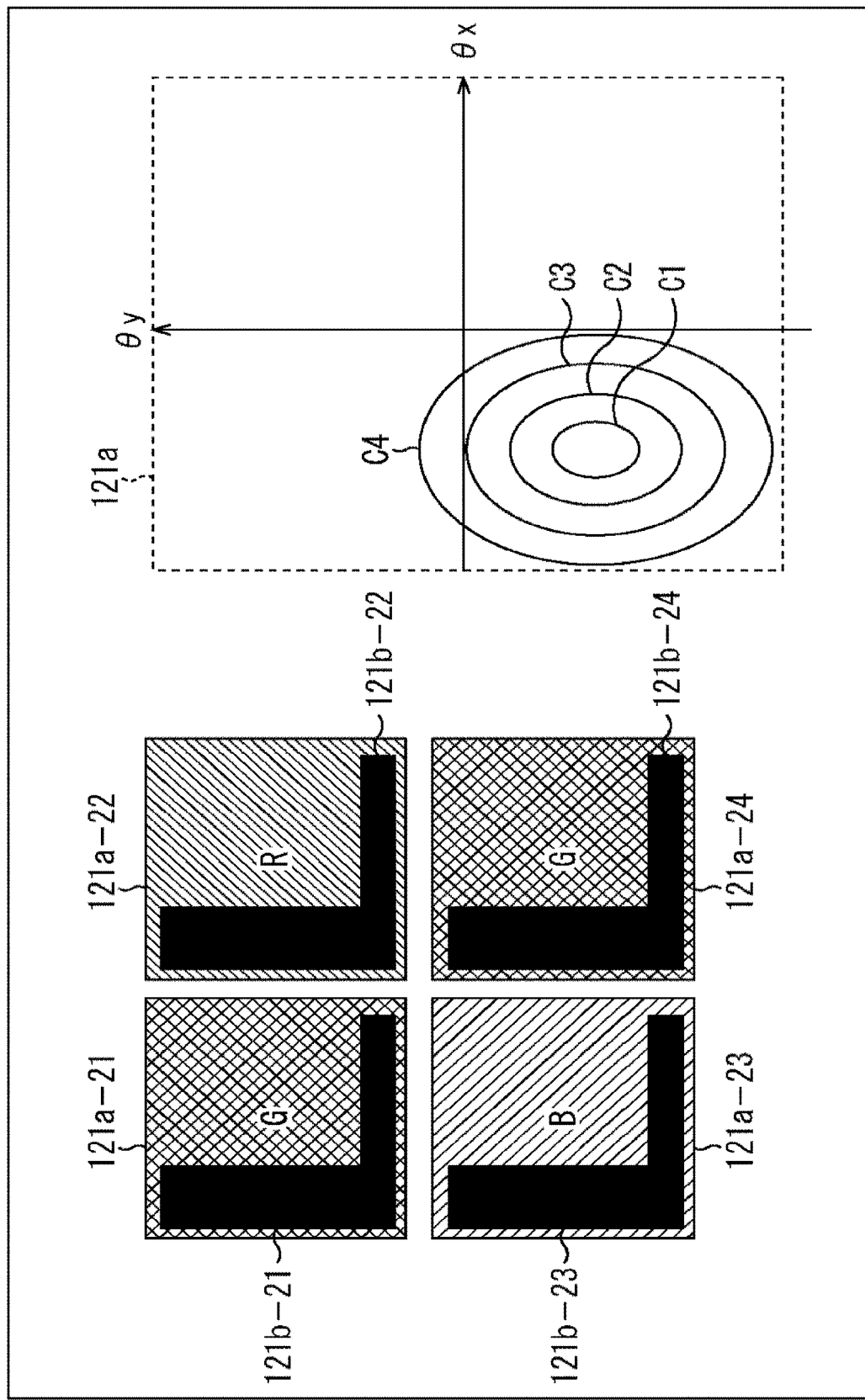
FIG. 13 is a diagram for describing a modification.

Furthermore, as in the examples illustrated in the left part in FIG. 13, the vertical band-type and the horizontal band-type light-shielding films 121*b* may be combined to provide an L-shaped-type light-shielding film 121*b* in the pixel 121*a*. In the left part in FIG. 13, the portions illustrated in black are the light-shielding films 121*b*. That is, light-shielding films 121*b*-21 to 121*b*-24 are the light-shielding films of pixels 121*a*-21 to 121*a*-24, respectively.

Each of these pixels (pixels 121*a*-21 to 121*a*-24) has the incident angle directivity as illustrated in the right part in FIG. 13. The graph in the right part in FIG. 13 illustrates the light-receiving sensitivity in each pixel. The horizontal axis represents the incident angle θx of the incident light in the horizontal direction (x direction), and the vertical axis represents the incident angle θy of the incident light in the vertical direction (y direction). Then, the light-receiving sensitivity within a range C4 is higher than that in the outside of the range C4, the light-receiving sensitivity within a range C3 is higher than that in the outside of the range C3, the light-receiving sensitivity within a range C2 is higher than that in the outside of the range C2, and the light-receiving sensitivity within a range C1 is higher than that in the outside of the range C1.

Therefore, for each pixel, the detection signal level of the incident light that satisfies conditions of the incident angle θx in the horizontal direction (x direction) and the incident angle θy in the vertical direction (y direction) within the range C1 becomes the highest, and the detection signal level decreases in order of the conditions within the range C2, the range C3, the range C4, and the range outside the range C4. Such intensity of the light-receiving sensitivity is determined according to the range shielded by the light-shielding film 121*b*.

Furthermore, in the left part in FIG. 13, the alphabet in each pixel 121*a* represents a color of the color filter (which is illustrated for convenience of description and is not actually written). The pixel 121*a*-21 is a G pixel in which a green color filter is arranged, the pixel 121*a*-22 is an R pixel in which a red color filter is arranged, the pixel 121*a*-23 is a B pixel in which a blue color filter is arranged, and the pixel 121*a*-24 is a G pixel in which a green color filter is arranged. That is, these pixels form a Bayer array. Of course, this is an example, and the array pattern of the color filters is arbitrary. The arrangement of the light-shielding film 121*b* and the color filter are irrelevant. For example, a filter other than a color filter may be provided in some or all of the pixels or no filter may be provided.

The left part in FIG. 13 illustrates an example in which the "L-shaped" light-shielding film 121*b* shields the left side and the lower side of the pixel 121*a* in FIG. 13. However, the direction of the "L-shaped" light-shielding film 121*b* is arbitrary and is not limited to the example in FIG. 13. For example, the "L-shaped" light-shielding film 121*b* may shield the lower side and the right side of the pixel 121*a* in FIG. 13, may shield the right side and the upper side of the pixel 121*a* in FIG. 13, or may shield the upper side and the left side of the pixel 121*a* in FIG. 13. Of course, the direction of the light-shielding film 121*b* can be independently set for each pixel. Note that the "L-shaped" light-shielding film 121*b* is also referred to as "L-shaped-type light-shielding film 121*b*".

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident light directivity equivalent to the incident light directivity by the above-described L-shaped-type light-shielding film 121*b* can be implemented.

Second Modification

In the above description, an example in which the horizontal band-type, vertical band-type, or L-shaped light-shielding film is provided in each pixel has been described. However, for example, like an imaging element 121' in FIG. 14, a rectangular opening is provided in each pixel, and a light-shielding film 121*b* (the range in black in FIG. 14) shielding a periphery of the rectangular opening may be provided. That is, the pixel may be provided with the light-shielding film 121*b* having the incident angle directivity to receive only light beams transmitted through the rectangular opening and received, among the light beams emitted from a point light source configuring an object plane at a predetermined object distance.

Figure 14:
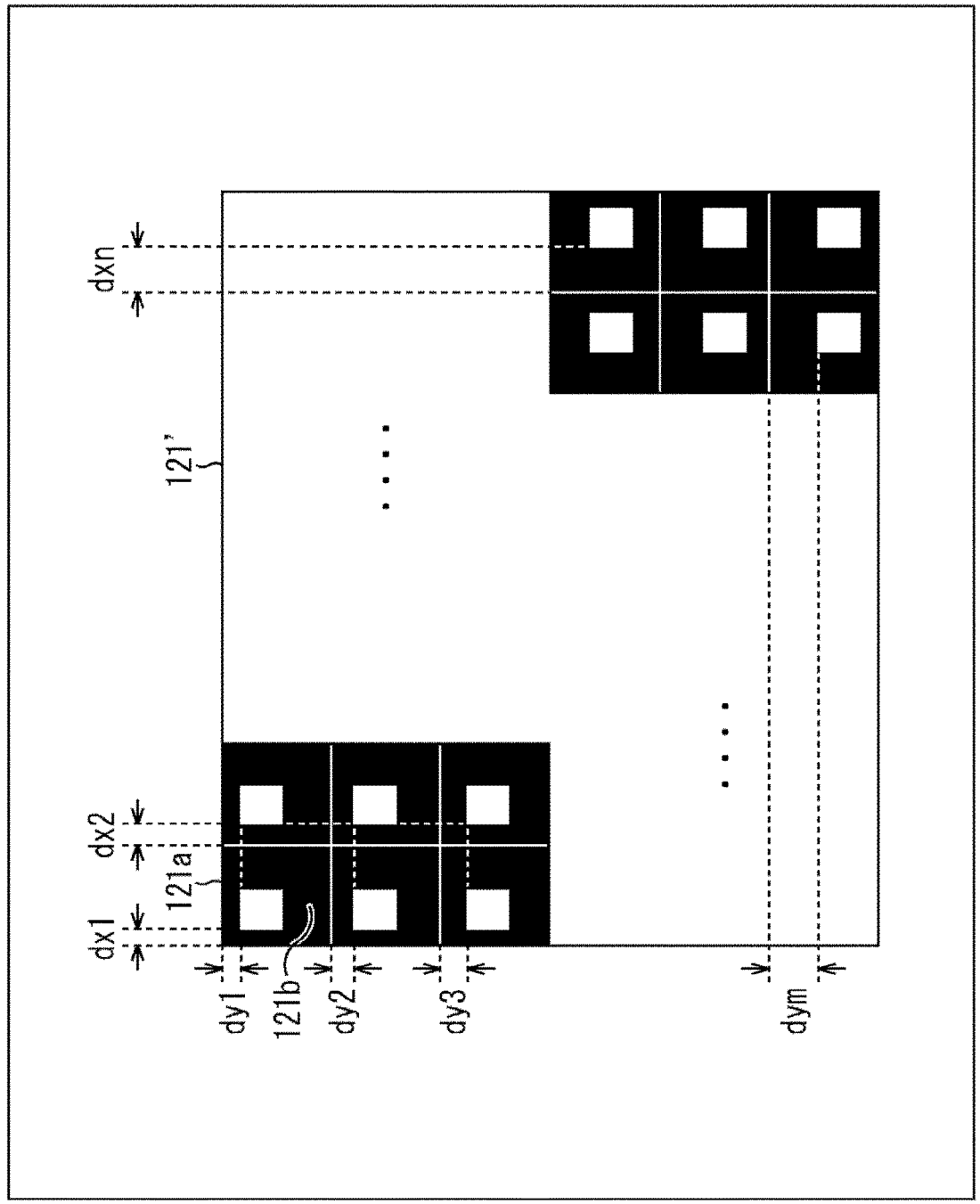
FIG. 14 is a diagram for describing a modification.

Note that, in the imaging element 121' in FIG. 14, the position of the rectangular opening in the pixel 121*a* regularly changes according to the horizontal and vertical positions of the pixel 121*a* in the imaging element 121'. This point will be further described with reference to FIG. 15.

Figure 15:
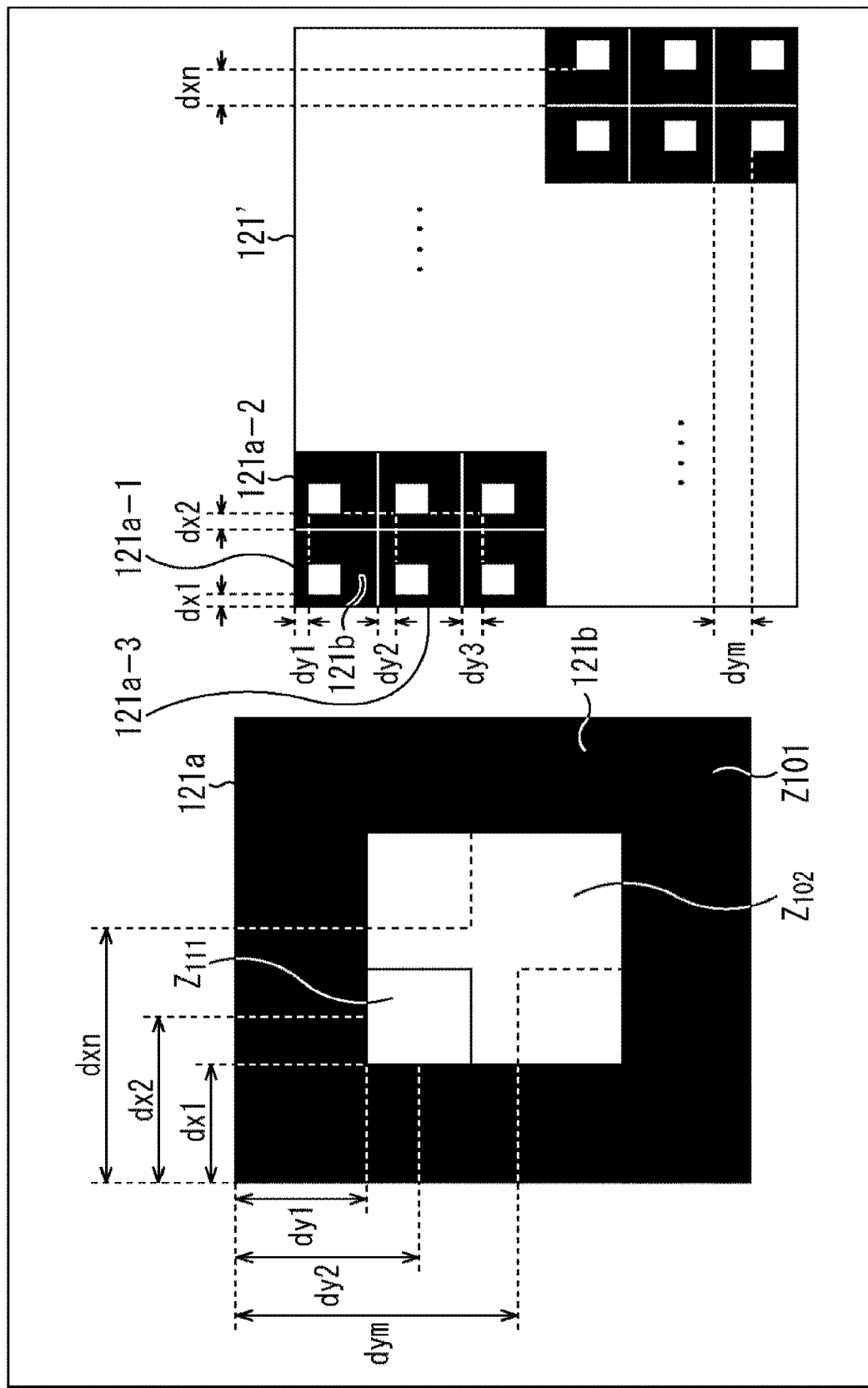
FIG. 15 is a diagram for describing a modification.

Note that the right part in FIG. 15 illustrates a configuration of the same imaging element 121' as in FIG. 14. Furthermore, the left part in FIG. 15 illustrates a configuration of the pixel 121a of the imaging element 121' in the right part in FIG. 15.

A main light-shielding portion Z101 including a range of a width dx1 from the left side and right side of the pixel 121a toward the inside of the pixel 121a, and a range of a height dy1 from the upper side and the lower side toward the inside of the pixel 121a, illustrated as a black portion in the left part in FIG. 15, is common to all the pixels 121a. That is, at least the main light-shielding portion Z101 is shielded in all the pixels 121a.

Furthermore, in all the pixels 121a, a rectangular opening portion Z111 is provided in a rectangular range Z102 surrounded by the main light-shielding portion Z101, the rectangular opening portion Z111 having the same size as the range Z102 and not shielded by the light-shielding film 121b. Therefore, the range other than the rectangular opening portion Z111 in the range Z102 is shielded by the light-shielding film 121b.

Moreover, in the pixel 121a-1 in the left end and the upper end in the imaging element 121', the left side of the rectangular opening portion Z111 is arranged at the position of the width dx1 from the left side of the pixel 121a, and the upper side of the rectangular opening portion Z111 is arranged at the position of the height dy1 from the upper side of the pixel 121a.

In the pixel 121a-2 on the right of the pixel 121a-1, the left side of the rectangular opening portion Z111 is arranged at the position of a width dx2 from the left side of the pixel 121a, and the upper side of the rectangular opening portion Z111 is arranged at the position of the height dy1 from the upper side of the pixel 121a.

Similarly, the left side of the rectangular opening portion Z111 moves to the positions of widths dx1, dx2, . . . , and dxn (dx1<dx2< . . . <dxn) from the left side of the pixel 121a as the position of the pixel 121a moves in the horizontal direction. The interval of change of the widths dx1, dx2, . . . , and dxn becomes equal to a value obtained by subtracting the width of the rectangular opening portion Z111 from the width in the horizontal of the range Z102 and dividing the resultant width by the number of pixels n in the horizontal direction. That is, the interval of change of the widths dx1, dx2, . . . , and dxn is determined by the number of pixels n in the horizontal direction, and depends on the object resolution (angle resolution) to be restored.

Furthermore, the position in the horizontal direction of the rectangular opening portion Z111 in the pixel 121a becomes equal among the pixels 121a (pixels 121a in the same row) at the same position in the horizontal direction in the imaging element 121'.

Moreover, in the pixel 121a-3 adjacent immediately below the pixel 121a-1, the left side of the rectangular opening portion Z111 is arranged at the position of the width dx1 from the left side of the pixel 121a, and the upper side of the rectangular opening portion Z111 is arranged at the position of a height dy2 from the upper side of the pixel 121a.

Hereinafter, similarly, the upper side of the rectangular opening portion Z111 moves to the positions of the heights dy1, dy2, . . . , and dym (dy1<dy2 < . . . < dym) from the upper side of the pixel 121a as the position of the pixel 121a moves in the vertical direction. Here, the interval of change of the heights dy1, dy2, . . . , and dym becomes equal to a value obtained by subtracting the height of the rectangular opening portion Z111 from the height in the vertical direction of the range Z102 and dividing the resultant height by the number of pixels m in the vertical direction. That is, the interval of change of the heights dy1, dy2, . . . , and dym is determined by the number of pixels m in the vertical direction, and depends on the object resolution (angle resolution) to be restored.

Furthermore, the position in the vertical direction of the rectangular opening portion Z111 in the pixel 121a becomes equal among the pixels 121a (pixels 121a in the same column) at the same position in the vertical direction in the imaging element 121'.

As described above, each pixel 121a of the imaging element 121' in FIGS. 14 and 15 has an incident angle directivity in which the light-shielding range changes corresponding to the horizontal and vertical positions in the imaging element 121'.

Note that the angle of view can be changed by changing the main light-shielded portion and the rectangular opening portion of each pixel 121a configuring the imaging element 121'.

Figure 16:
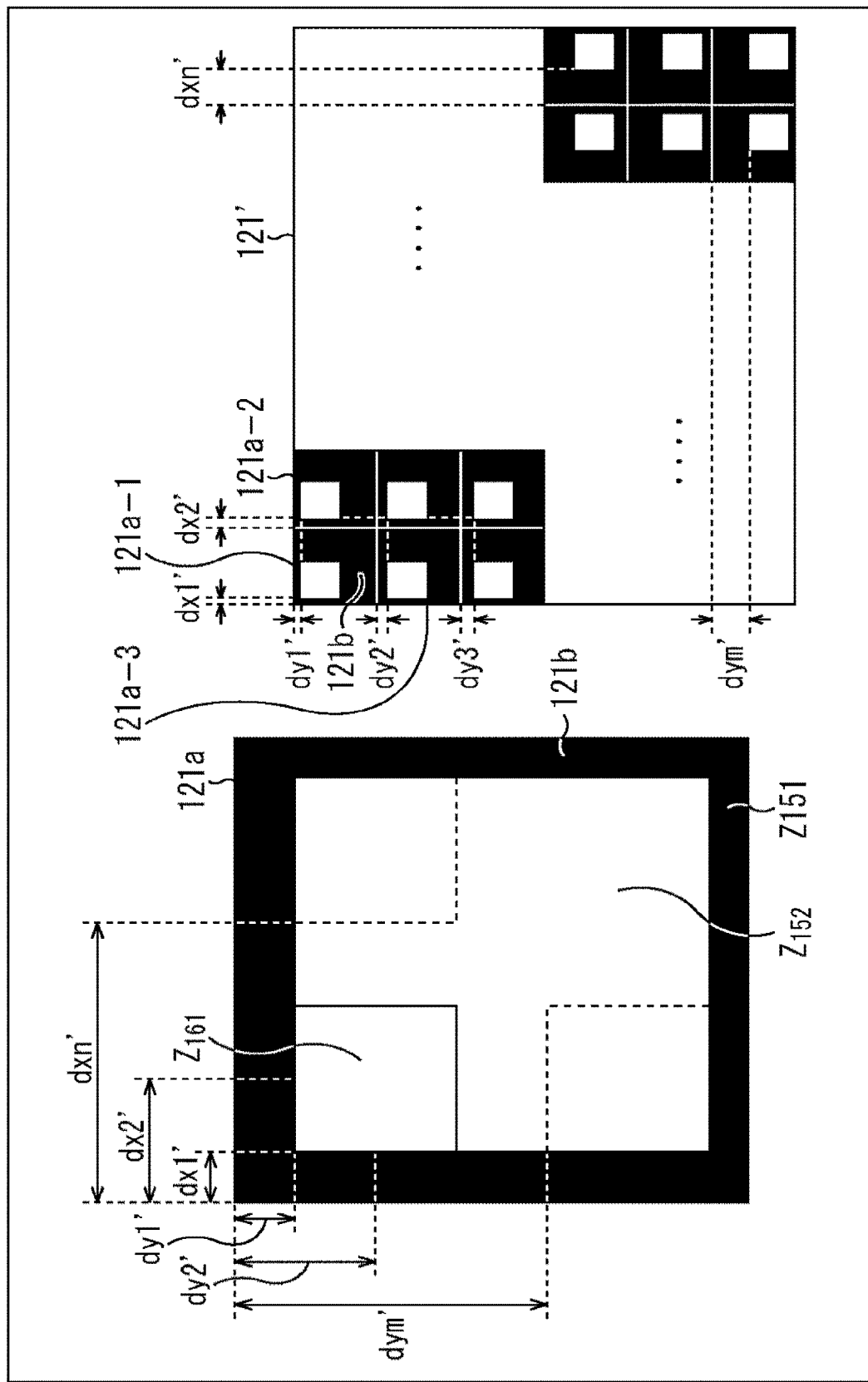
FIG. 16 is a diagram for describing an example of changing an angle of view by applying a modification.

Specifically, the right part in FIG. 16 illustrates a configuration of the imaging element 121' in a case of making the angle of view wider than that of the imaging element 121' in FIG. 15 (FIG. 14). Furthermore, the left part in FIG. 16 illustrates a configuration of the pixel 121a of the imaging element 121' in the right part in FIG. 16.

That is, as illustrated in the left part in FIG. 16, a main light-shielding portion Z151 (the black portion in the left part in FIG. 16) having a narrower light-shielding range than the main light-shielding portion Z101 in FIG. 15 is set in the pixel 121a, for example, and the range other than the main light-shielding portion Z151 is set as a range Z152. Moreover, a rectangular opening portion Z161 having a larger opening area than the rectangular opening portion Z111 is set in the range Z152.

More specifically, the main light-shielding portion Z151 including a range of a width dx1' (<dx1) from the left side and right side of the pixel 121a toward the inside of the pixel 121a, and a range of a height dy1' (<dy1) from the upper side and the lower side toward the inside of the pixel 121a, illustrated as a black portion in the left part in FIG. 16, is common to all the pixels 121a. That is, at least the light-shielding portion Z151 is shielded in all the pixels 121a.

Furthermore, in all the pixels 121a, the rectangular opening portion Z161 is provided in the rectangular range Z152 surrounded by the main light-shielding portion Z151, the rectangular opening portion Z161 having the same size as the range Z152 and not shielded by the light-shielding film 121b. Therefore, the range other than the rectangular opening portion Z161 in the range Z152 is shielded by the light-shielding film 121b.

Moreover, in the pixel 121a-1 in the left end and the upper end in the imaging element 121', the left side of the rectangular opening portion Z161 is arranged at the position of the width dx1' from the left side of the pixel 121a, and the upper side of the rectangular opening portion Z161 is arranged at the position of the height dy1' from the upper side of the pixel 121a.

In the pixel 121a-2 on the right of the pixel 121a-1, the left side of the rectangular opening portion Z161 is arranged at the position of a width dx2' from the left side of the pixel 121a, and the upper side of the rectangular opening portion Z161 is arranged at the position of the height dy1' from the upper side of the pixel 121a.

Similarly, the left side of the rectangular opening portion Z161 moves to the positions of widths dx1', dx2', . . . , and dxn' (dx1'<dx2'< . . . <dxn') from the left side of the pixel 121a as the position of the pixel 121a moves in the horizontal direction. The interval of change of the widths dx1', dx2', . . . , and dxn' becomes equal to a value obtained by subtracting the width of the rectangular opening portion Z161 from the width in the horizontal of the range Z152 and dividing the resultant width by the number of pixels n in the horizontal direction. That is, the interval of change of the widths dx1', dx2', . . . , and dxn' is determined by the number of pixels n in the horizontal direction, and depends on the object resolution (angle resolution) to be restored.

Furthermore, the position in the horizontal direction of the rectangular opening portion Z161 in the pixel 121a becomes equal among the pixels 121a (pixels 121a in the same row) at the same position in the horizontal direction in the imaging element 121'.

Moreover, in the pixel 121a-3 adjacent immediately below the pixel 121a-1, the left side of the rectangular opening portion Z161 is arranged at the position of the width dx1' from the left side of the pixel 121a, and the upper side of the rectangular opening portion Z161 is arranged at the position of a height dy2' from the upper side of the pixel 121a.

Hereinafter, similarly, the upper side of the rectangular opening portion Z161 moves to the positions of the heights dy1', dy2', . . . , and dym' (dy1'<dy2'< . . . <dym') from the upper side of the pixel 121a as the position of the pixel 121a moves in the vertical direction. Here, the interval of change of the heights dy1', dy2', . . . , and dym' becomes equal to a value obtained by subtracting the height of the rectangular opening portion Z161 from the height in the vertical direction of the range Z152 and dividing the resultant height by the number of pixels m in the vertical direction. That is, the interval of change of the heights dy1', dy2', . . . , and dym' is determined by the number of pixels m in the vertical direction, and depends on the object resolution (angle resolution) to be restored.

Furthermore, the position in the vertical direction of the rectangular opening portion Z161 in the pixel 121a becomes equal among the pixels 121a (pixels 121a in the same column) at the same position in the vertical direction in the imaging element 121'.

As described above, by changing the combination of the light-shielding range of the main light-shielded portion and the opening range of the opening, the imaging element 121' including the pixels 121a having various angles of view (having various incident angle directivities) can be implemented.

Moreover, the imaging element 121 may be implemented by combining not only the pixels 121a having the same angle of view but also the pixels 121a having various angles of view.

Figure 17:
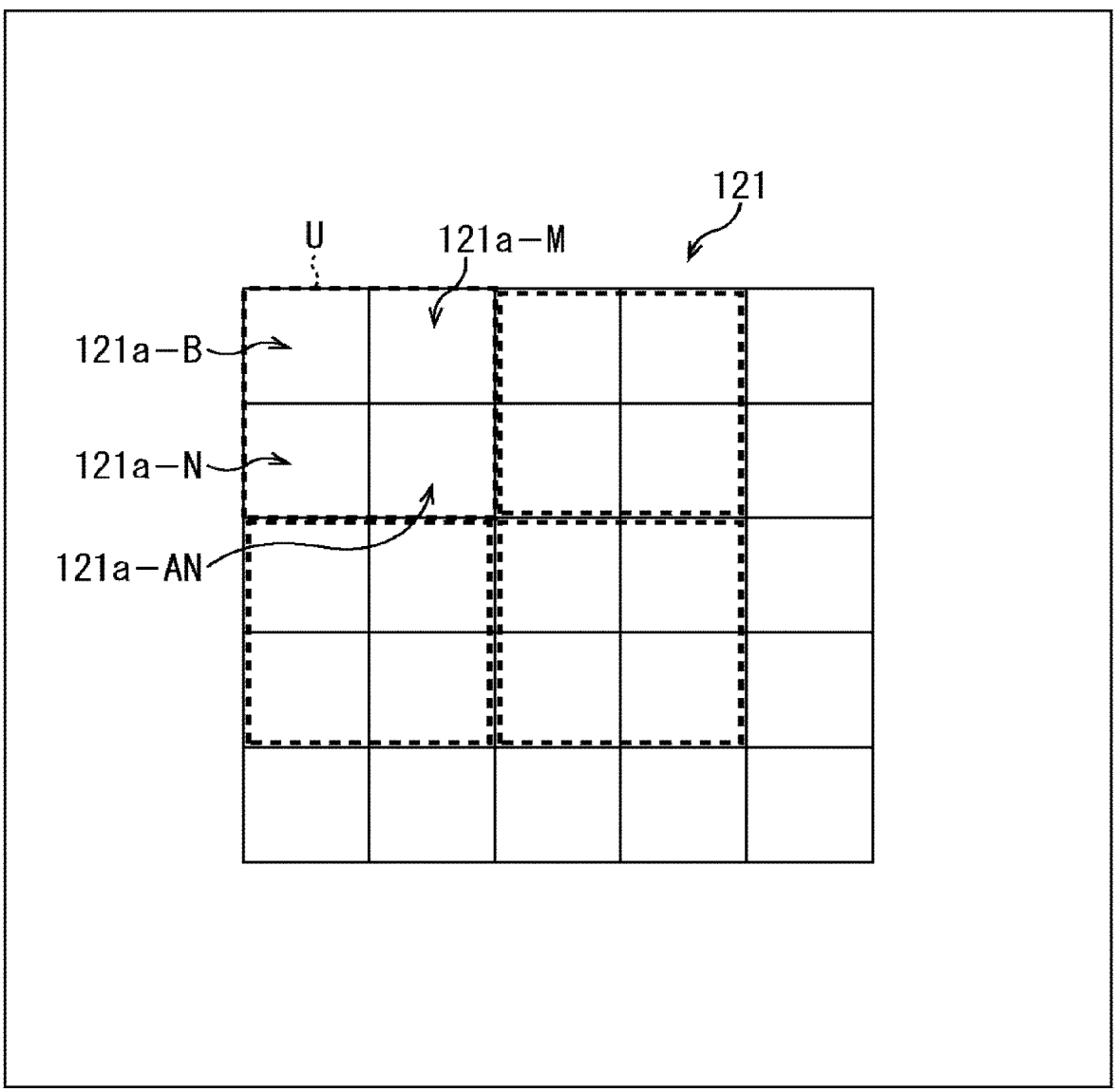
FIG. 17 is a diagram for describing an example of combining pixels of a plurality of angles of view when changing an angle of view by applying a modification.

For example, as illustrated in FIG. 17, four pixels including two pixels×two pixels illustrated by the dotted line is set as one unit U, and each unit U is configured by four pixels of a pixel 121a-W of a wide angle of view, a pixel 121a-M of a middle angle of view, a pixel 121a-N of a narrow angle of view, and a pixel 121a-AN of an extremely narrow angle of view.

In a case where the number of pixels of all the pixels 121a is X, for example, a restoration image can be generated using detection images of X/4 pixels for each of the four types of angles of view. At this time, four different types of coefficient sets are used for the respective angles of view, and restoration images of different angles of view are restored by four different types of simultaneous equations.

Therefore, by restoring a restoration image of an angle of view to be restored using detection images obtained from the pixels suitable for imaging the angle of view to be restored, appropriate restoration images corresponding to the four types of angles of view can be generated.

Furthermore, images of middle angles of view of the four types of angles of view and images of angles of view around the middle angles of view may be interpolated from the images of the four types of angles of view, and a pseudo optical zoom may be implemented by seamlessly generating images of various angles of view.

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident light directivity equivalent to the incident light directivity by the above-described light-shielding film 121b having the rectangular opening can be implemented. Of course, in this case, the imaging element 121 can be implemented by combining the pixels 121a of various angles of view. Furthermore, the image of the middle angle of view and images of angles of view around the middle angle of view may be interpolated from images of a plurality of types of angles of view, and a pseudo optical zoom may be implemented by seamlessly generating images of various angles of view.

Third Modification

By the way, in the case where the light-shielding range of the light-shielding film 121b of the pixel 121a in the imaging element 121 has randomness, the load of processing by the restoration unit 124 and the like becomes larger as the randomness of difference in the light-shielding range of the light-shielding film 121b is larger. Therefore, part of the change in the light-shielding range of the light-shielding film 121b of the pixel 121a may be made regular to reduce the randomness, thereby reducing the processing load.

For example, an L-shaped-type light-shielding film 121b that is a combination of vertical band-type and the horizontal band-type light-shielding films is configured, and horizontal band-type light-shielding films 121b having the same width are combined for a predetermined column direction, and vertical band-type light-shielding films 121b having the same height are combined for a predetermined row direction. Thereby, the light-shielding range of the light-shielding film 121b of each pixel 121a is randomly changed in pixel units while having regularity in the column direction and the row direction. Thereby, the randomness in the incident angle directivity of each pixel may be reduced and the processing load outside the imaging element 121 such as the restoration unit 124 may be reduced.

Figure 18:
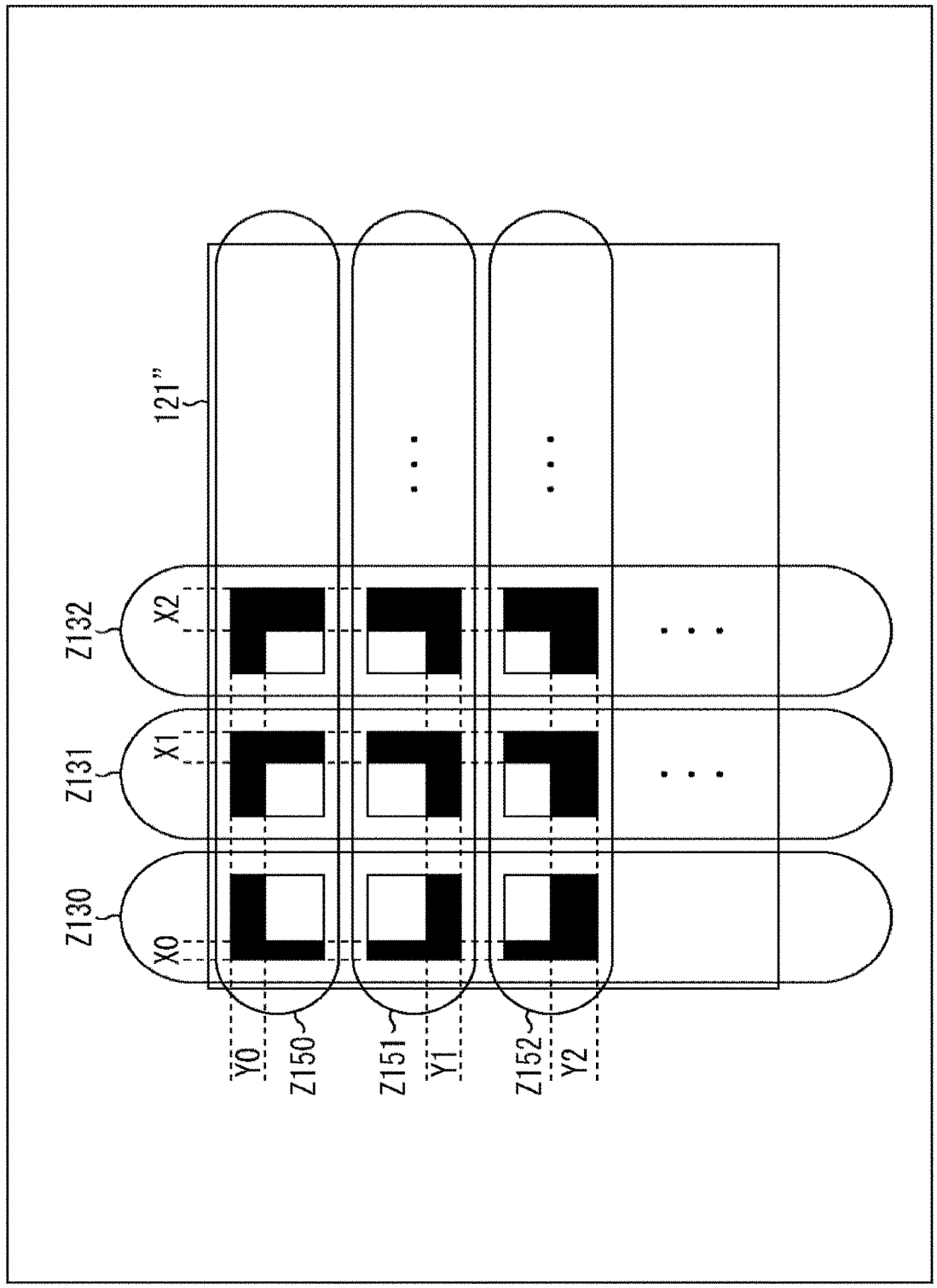
FIG. 18 is a diagram for describing a modification.

That is, for example, in the case of an imaging element 121" in FIG. 18, horizontal band-type light-shielding films 121b having the same width X0 are used for all the pixels in the same column illustrated in a range Z130, and vertical band-type light-shielding films 121b having the same height Y0 are used for all the pixels in the same row illustrated in a range Z150. An L-shaped-type light-shielding film 121b in which the aforementioned horizontal band-type and vertical band-type light-shielding films 121b are combined is set for the pixel 121a specified by each matrix.

Similarly, horizontal band-type light-shielding films 121b having the same width X1 are used for all the pixels in the same column illustrated in a range Z131 adjacent to the range Z130, and vertical band-type light-shielding films 121*b* having the same height Y1 are used for all the pixels in the same row illustrated in a range Z151 adjacent to the range Z150. An L-shaped-type light-shielding film 121*b* in which the aforementioned horizontal band-type and vertical band-type light-shielding films 121*b* are combined is set for the pixel 121*a* specified by each matrix.

Moreover, horizontal band-type light-shielding films having the same width X2 are used for all the pixels in the same column illustrated in a range Z132 adjacent to the range Z131, and vertical band-type light-shielding films having the same height Y2 are used for all the pixels in the same row illustrated in a range Z152 adjacent to the range Z151. An L-shaped-type light-shielding film 121*b* in which the aforementioned horizontal band-type and vertical band-type light-shielding films are combined is set for the pixel 121*a* specified by each matrix.

In this manner, the range of the light-shielding film can be set to a different value in pixel units while the width and position in the horizontal direction and the width and position in the vertical direction of the light-shielding film 121*b* have regularity, whereby the randomness of the incident angle directivity can be suppressed. As a result, patterns of the coefficient sets can be reduced, and the processing load in arithmetic processing in a subsequent stage (for example, the restoration unit 124 or the like) can be reduced.

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident light directivity equivalent to the incident light directivity in the case where part of change in the range shielded by the light-shielding film 121*b* of the pixel 121*a* is made regular can be implemented. By doing so, the randomness in the incident angle directivity of each pixel can be reduced and the processing load outside the imaging element 121 such as the restoration unit 124 can be reduced.

Fourth Modification

Variations in the shape of the light-shielding film 121*b* in pixel units are arbitrary and are not limited to the above examples. For example, different incident angle directivities may be obtained by setting the light-shielding film 121*b* to have a triangular shape and making the range of the triangular shape different, or different incident angle directivities may be obtained by setting the light-shielding film 121*b* to have a circular shape and making the range of the circular shape different. Furthermore, for example, the light-shielding film 121*b* may be a diagonal linear light-shielding film.

Furthermore, a variation (pattern) of the light-shielding film 121*b* may be set in units of a plurality of pixels that configures a unit including a predetermined number of pixels. This one unit may be configured by any type of pixels. For example, the imaging element 121 may include a color filter, and the pattern unit may be configured by pixels configuring a unit of a color array of the color filter. Furthermore, a pixel group in which pixels having different exposure times are combined may be set as a unit. Note that it is more desirable that the patterns of the ranges shielded by the light-shielding films 121*b* of the pixels configuring the unit are highly random, that is, the pixels configuring the unit have different incident angle directivities.

Furthermore, an arrangement pattern of the light-shielding films 121*b* may be set between units. For example, the width and position of the light-shielding film may be changed for each unit. Moreover, the pattern of the range shielded by the light-shielding film 121*b* may be set in a unit including a plurality of pixels classified by different categories or between units.

Although the light-shielding film has been described above, the description of this example can also be applied to the case of obtaining the incident angle directivity by selectively using a plurality of photodiodes arranged in a pixel. That is, by appropriately setting a division position (size and shape of each partial region), or the position, size, shape, and the like of each photodiode, or by appropriately selecting the photodiode, incident light directivity equivalent to the incident light directivity by the light-shielding film having an arbitrary shape such as a triangular, circular, or diagonal linear shape can be implemented, for example.

Furthermore, for example, the setting of the division position (size and shape of each partial region), setting of the position, size, shape, and the like of each photodiode, selecting of the photodiode, or the like may be set for each unit, similarly to the case of the above-described light-shielding film 121*b*.

Control of Photodiode

In the case of selectively using a plurality of photodiodes arranged in a pixel as described above with reference to FIG. 5, the incident angle directivity of the output pixel value of the pixel output unit may be variously changed by switching the presence or absence or the degree of contribution of each of the plurality of photodiodes 121*f* to the output pixel value of the pixel output unit.

Figure 19:
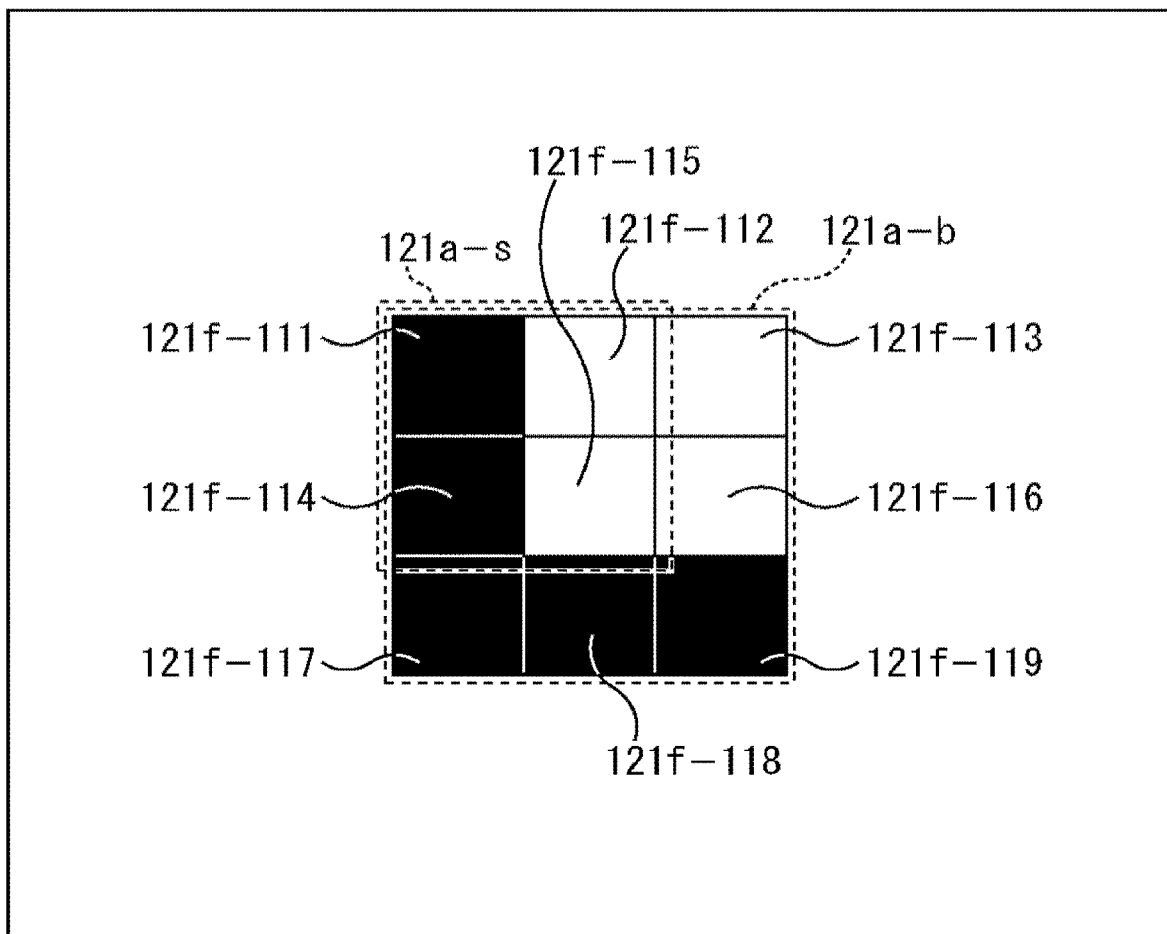
FIG. 19 is a diagram for describing a modification.

For example, as illustrated in FIG. 19, it is assumed that nine photodiodes 121*f*-111 to 121*f*-119 (vertically 3×horizontally 3) are arranged in the pixel 121*a*. In this case, the pixel 121*a* may be used as a pixel 121*a*-*b* having the photodiodes 121*f*-111 to 121*f*-119, or as a pixel 121*a*-*s* having the photodiodes 121*f*-111, 121*f*-112, 121*f*-114, and 121*f*-115.

For example, in the case where the pixel 121*a* is the pixel 121*a*-*b*, the incident angle directivity of the output pixel value is controlled by controlling the presence or absence or the degree of contribution of the photodiodes 121*f*-111 to 121*f*-119 to the output pixel value of the pixel 121*a*. In contrast, in the case where the pixel 121*a* is the pixel 121*a*-*s*, the incident angle directivity of the output pixel value is controlled by controlling the presence or absence or the degree of contribution of the photodiodes 121*f*-111, 121*f*-112, 121*f*-114, and 121*f*-115 to the output pixel value of the pixel 121*a*. In this case, the other photodiodes 121*f* (photodiodes 121*f*-113, 121*f*-116, and 121*f*-117 to 121*f*-119) are controlled not to contribute to the output pixel value.

That is, for example, in a case where the incident angle directivities of the output pixel values are different from each other between a plurality of the pixels 121*a*-*b*, the presence or absence or the degree of contribution of at least one of the photodiodes 121*f*-111 to 121*f*-119 to the output pixel value is different. In contrast, for example, in a case where the incident angle directivities of the output pixel values are different from each other between a plurality of the pixels 121*a*-*s*, the presence or absence or the degree of contribution of at least one of the photodiodes 121*f*-111, 121*f*-112, 121*f*-114, and 121*f*-115 to the output pixel value is different, and the other photodiodes 121*f*-113, 121*f*-116, and 121f-117 to 121f-119 do not contribute to the output pixel value in common between these pixels.

Note that whether the pixel 121a is the pixel 121a-b or the pixel 121a-s can be set for each pixel. Furthermore, this setting may be able to be performed for each unit (for each plurality of pixels).

Figure 20:
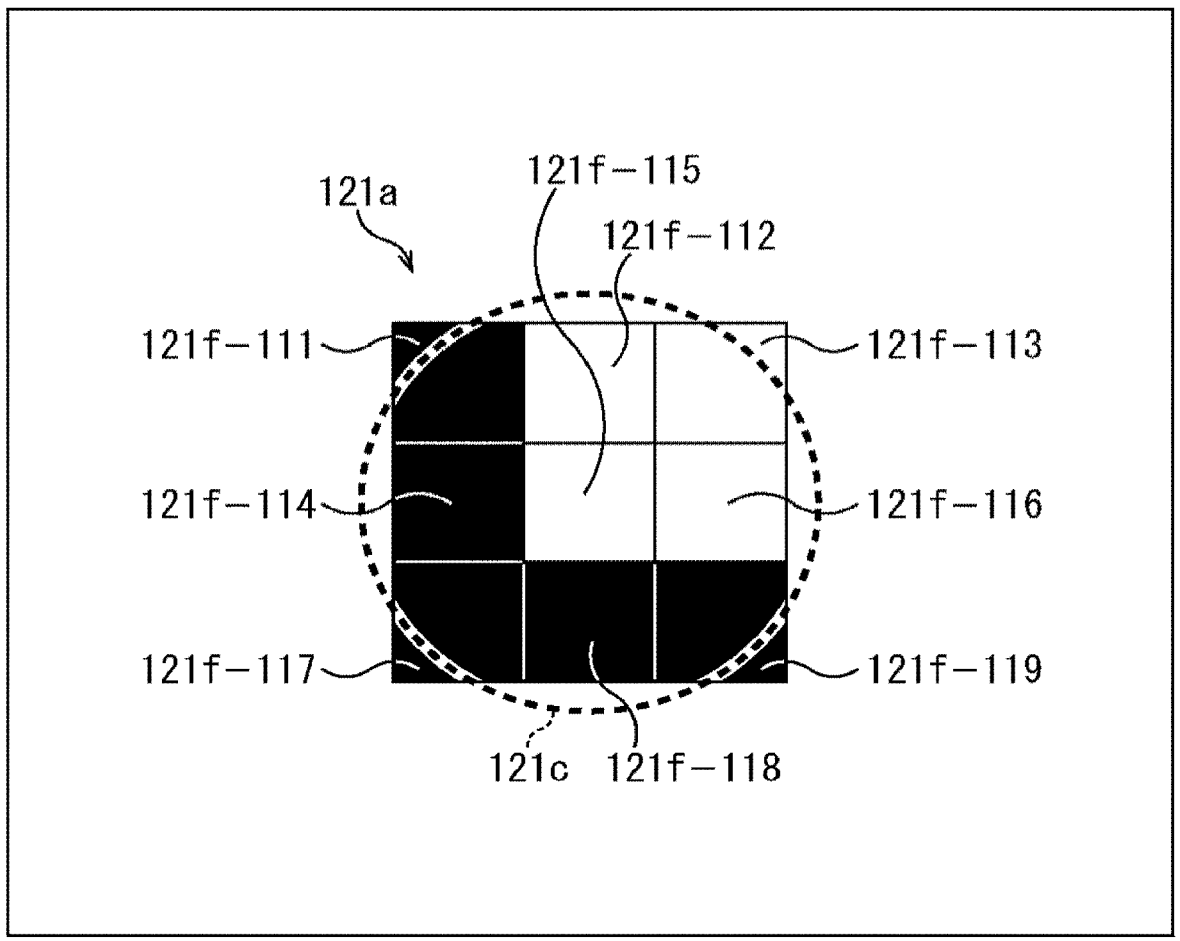
FIG. 20 is a diagram for describing a modification.

Furthermore, as described above, one on-chip lens is formed for each pixel (each pixel output unit) of the imaging element 121. That is, in the case where the pixel 121a has a configuration as illustrated in FIG. 19, one on-chip lens 121c is provided for the photodiodes 121f-111 to 121f-119, as illustrated in FIG. 20. Therefore, in the case where the pixel 121a is the pixel 121a-b or the pixel 121a-s, as described with reference to FIG. 19, one pixel (one pixel output unit) and one on-chip lens 121c correspond on a one-to-one basis.

Resolution Control of Detection Image

The imaging element 121 has been described. In the imaging device 100 in FIG. 1 uses the above-described imaging element 121. As described above, the imaging element 121 has the incident angle directivity for each pixel (pixel output unit). For example, as illustrated in FIG. 21, the incident angle directivity is formed by the light-shielding film 121b shielding a part of the pixel 121a (pixel output unit).

The resolution of the detection image cannot be controlled by a conventional imaging element. That is, the detection signals of all the pixels (pixel output units) of the imaging element have been read, and a detection image has been generated using all the read detection signals. Then, how to process the detection image to convert the resolution is not disclosed. Patent Document 1 has neither description nor suggestion.

Therefore, for example, to lower the resolution of a captured image, the resolution needs to be reduced after converting the detection image into the captured image. That is, even when the resolution is reduced, readout of the detection image from the imaging element 121 and conversion from the detection image into the captured image (image processing) needs to be performed in a high resolution state. Therefore, there is a possibility that the load is unnecessarily increased and the power consumption is unnecessarily increased.

Figure 21:
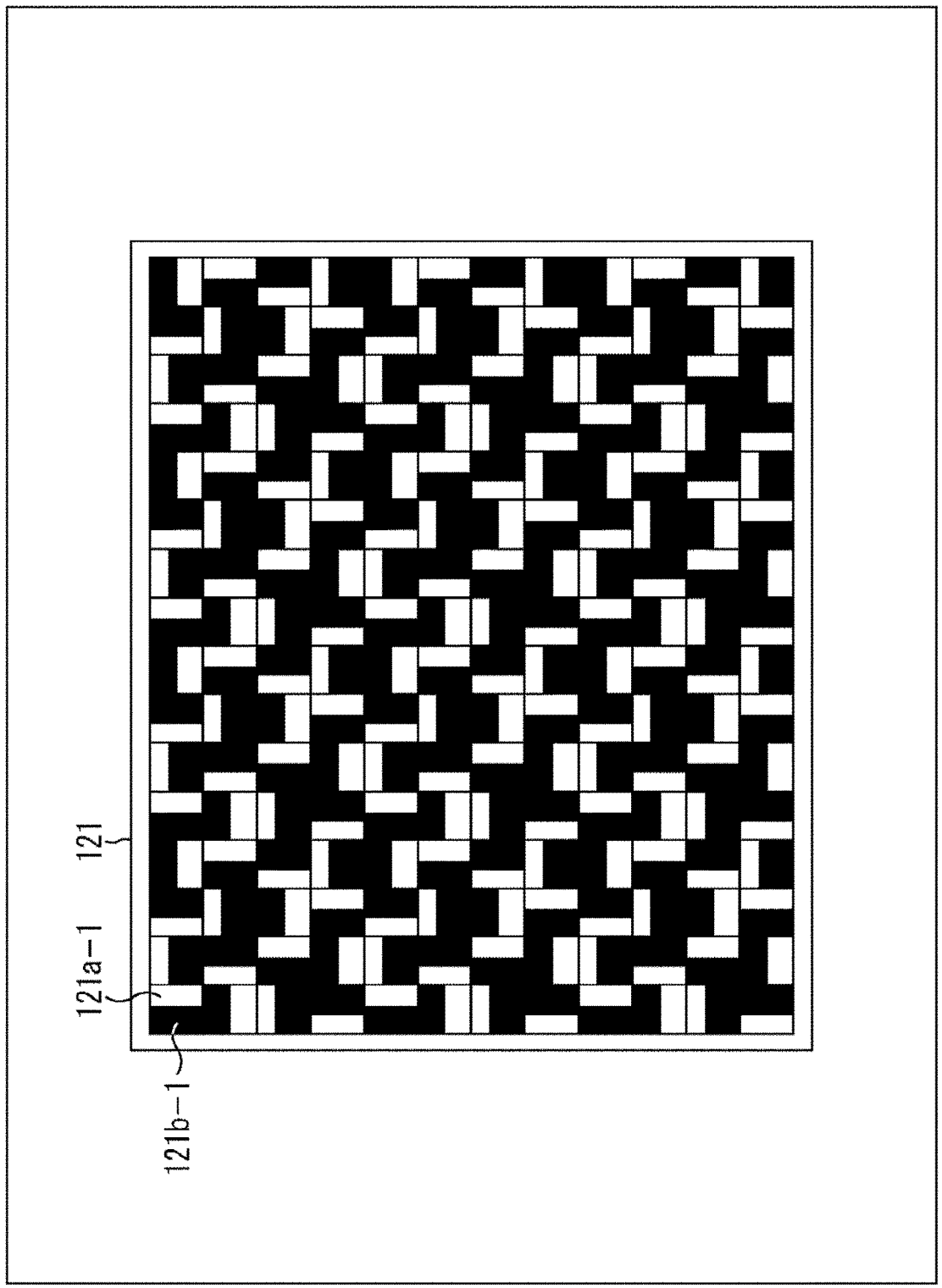
FIG. 21 is a diagram illustrating an example of a mask pattern by a light-shielding film.

In contrast, in the imaging device 100, the imaging element 121 has the incident angle directivity for each pixel (pixel output unit), as illustrated in FIG. 21. Therefore, the imaging device 100 can select the detection signal for each pixel (pixel output unit). The read control unit 122 controls readout of the detection image from such an imaging element 121, and selects the detection signal to be included in the detection image from among the detection signals that are detection results of incident light obtained in the pixel output units of the imaging element 121, thereby controlling the resolution of the detection image. Therefore, for example, the resolution of the detection image can be made lower than the resolution of the imaging element 121. That is, unnecessary increase in power consumption can be suppressed.

All-Pixel Mode

Figure 22:
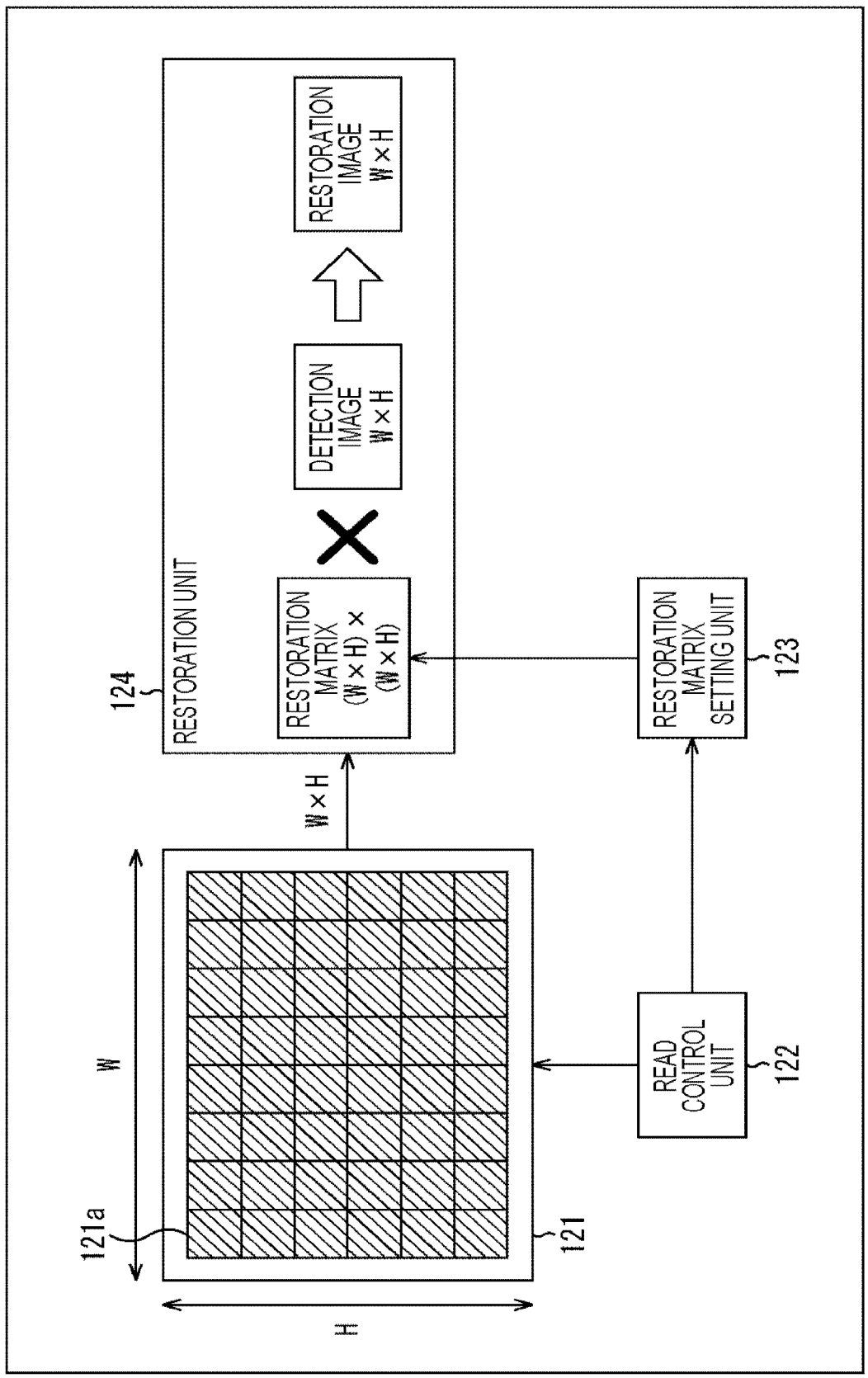
FIG. 22 is a diagram for describing an outline of a method of reading all of pixels.

Next, control by the read control unit 122 will be described. As illustrated in FIG. 22, the imaging device 100 can read the detection signals of all the pixels of the imaging element 121 and convert the detection image into the restoration image, using all the detection signals as the detection image. Such an operation mode is referred to as an all-pixel mode.

In FIG. 22, each square of the imaging element 121 represents the pixel 121a (pixel output unit), and a pixel array state is schematically illustrated in the imaging element 121. Note that FIG. 22 illustrates a pixel array of 8 pixels in the horizontal direction and 6 pixels in the vertical direction, but the number of pixels of the imaging element 121 is arbitrary. In the present specification, it is assumed that the imaging element 121 has a pixel array of W pixels in the horizontal direction and H pixels in the vertical direction.

In the case of the all-pixel mode, the read control unit 122 supplies a read control signal to the imaging element 121 and reads the detection signal from all the pixels of the imaging element 121. That is, the detection image of resolution (W×H) is read from the imaging element 121. In FIG. 22, the oblique pattern of the pixel 121a represents the pixel 121a from which the detection signal is read. That is, in the case of the all-pixel mode, the detection signal is read from all the pixels of the pixel array of the imaging element 121.

Furthermore, the read control unit 122 also supplies the read control signal to the restoration matrix setting unit 123. In a case of generating a restoration image of resolution (W×H), the restoration matrix setting unit 123 sets a restoration matrix including vertically (W×H) and horizontally (W×H) coefficients, corresponding to the detection image of the resolution (W×H) and the restoration image of the resolution (W×H), according to the read control signal.

In a case where the restoration unit 124 generates the restoration image, the restoration unit 124 acquires the detection image of the resolution (W×H) read from the imaging element 121, acquires the restoration matrix including vertically (W×H) and horizontally (W×H) coefficients set by the restoration matrix setting unit 123, and generates the restoration image of the resolution (W×H) using the acquired image and matrix.

This detection image is obtained in the imaging element 121 and is information having the characteristics described above with reference to FIGS. 1 to 20. That is, the detection image is a detection image in which an object cannot be visually recognized, the detection image including detection signals obtained in pixel output units, the detection signal being obtained by an imaging element capturing an image of the object, the imaging element including a plurality of pixel output units each configured to receive incident light incident without through both of an imaging lens and a pinhole, and having a configuration for making the incident angle directivities with respect to the incident light from the object different from each other, the incident angle directivities being of the output pixel values of at least two pixel output units among the plurality of pixel output units.

Then, the restoration matrix is the restoration matrix described above with reference to FIGS. 1 to 20 and has the above-described characteristics. That is, this restoration matrix is a matrix of coefficients used when generating a restoration image from a detection image in which an object cannot be visually recognized. The restoration unit 124 generates the restoration image from the detection image using such a restoration matrix.

Pixel Arbitrary Thinning Mode

Figure 23:
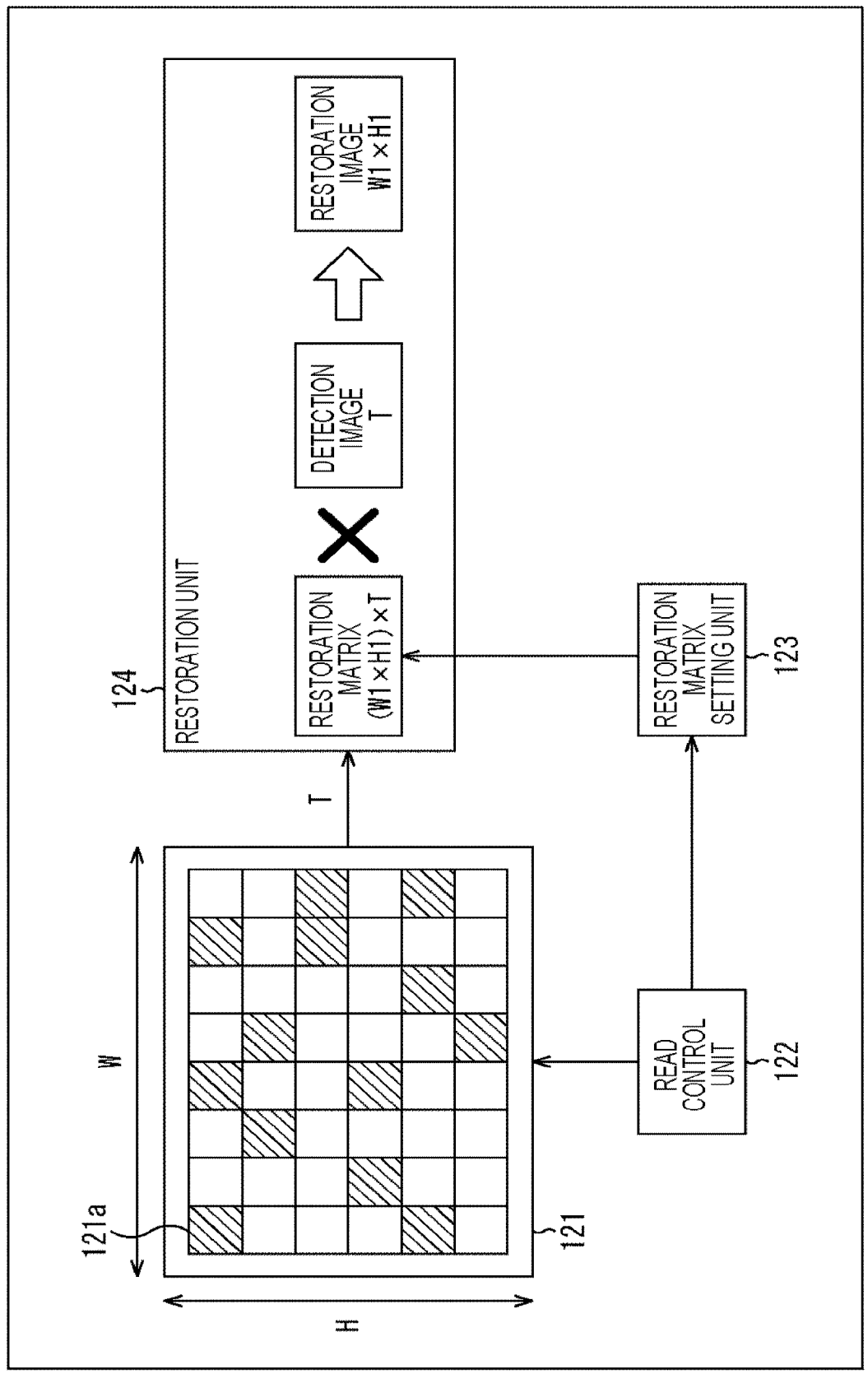
FIG. 23 is a diagram for describing an outline of a method of reading some arbitrary pixels.

Furthermore, as illustrated in FIG. 23, the imaging device 100 can read the detection signals of some arbitrary pixels of the imaging element 121 and convert the detection image into the restoration image, using the read detection signals of the some arbitrary pixels as the detection image. Such an operation mode is referred to as a pixel arbitrary thinning mode.

FIG. 23 illustrates a pixel array in the imaging element 121, similarly to the case in FIG. 22.

In the case of the pixel arbitrary thinning mode, the read control unit 122 supplies the read control signal to the imaging element 121, selects some pixels 121a (pixel output units) at arbitrary positions from among (a plurality of pixel output units of) the pixel array of the imaging element 121, and reads the detection signals from the selected pixels 121a (the pixels in the oblique patterns in FIG. 23). The read control unit 122 can select an arbitrary number of pixels. For example, the read control unit 122 can select T pixels. That is, a detection image including T detection signals is read from the imaging element 121.

Note that the read control unit 122 may supply the read control signal to the imaging element 121, read the detection signals from all the pixels 121a of the pixel array of the imaging element 121, and select detection signals read from some arbitrary pixels from among the read detection signals as the detection signals to be included in the detection image.

Of course, the pixels 121a selected in FIG. 23 are an example, and the selected pixels 121a are not limited to this example. Which (detection signal of which) pixel is selected (from which pixel the detection signal is read, or which detection signal read from which pixel is selected) may be determined in advance. Alternatively, a plurality of candidates for the setting of which pixel to select (pixel selection setting) may be prepared in advance, and the read control unit 122 may select pixels from the plurality of candidates. In this case, the read control unit 122 may perform the selection on the basis of arbitrary conditions such as imaging operation mode, frame rate, resolution setting, object distance, brightness, time, position, or a user's instruction, for example.

Note that the candidates for the pixel selection setting may be stored in an arbitrary processing unit or the like of the imaging device 100, such as a memory (not illustrated) in the read control unit 122 or the storage unit 113. In that case, the candidates may be stored at the time of shipping the imaging device 100 from a factory or may be stored (or updated) after shipment from the factory. Needless to say, the candidates for the pixel selection setting may be prepared outside the imaging device 100, and the read control unit 122 may select pixels from among the outside candidates.

Furthermore, the read control unit 122 may arbitrarily set which (detection signals of) pixels to select. In this case, for example, an initial value (initial setting) of the pixel selection setting is prepared, and the read control unit 122 may update the initial setting on the basis of arbitrary conditions (for example, imaging operation mode, frame rate, resolution setting, object distance, brightness, time, positions, or user's instruction). Furthermore, for example, the read control unit 122 may set pixels to select on the basis of arbitrary information or at random.

Furthermore, the read control unit 122 also supplies the read control signal, which is supplied to the imaging element 121, to the restoration matrix setting unit 123. In a case of generating a restoration image of resolution (W1×H1), the restoration matrix setting unit 123 sets a restoration matrix including vertically (W1×H1) and horizontally T coefficients, corresponding to the detection image of T detection signals and the restoration image of the resolution (W1×H1), according to the read control signal.

In a case where the restoration unit 124 generates the restoration image, the restoration unit 124 acquires the detection image including T detection signals from the imaging element 121 or the read control unit 122, acquires the restoration matrix including vertically (W1×H1) and horizontally T coefficients set by the restoration matrix setting unit 123, and generates the restoration image of the resolution (W1×H1) using the acquired image and matrix.

Pixel Regularity Thinning Mode

Figure 24:
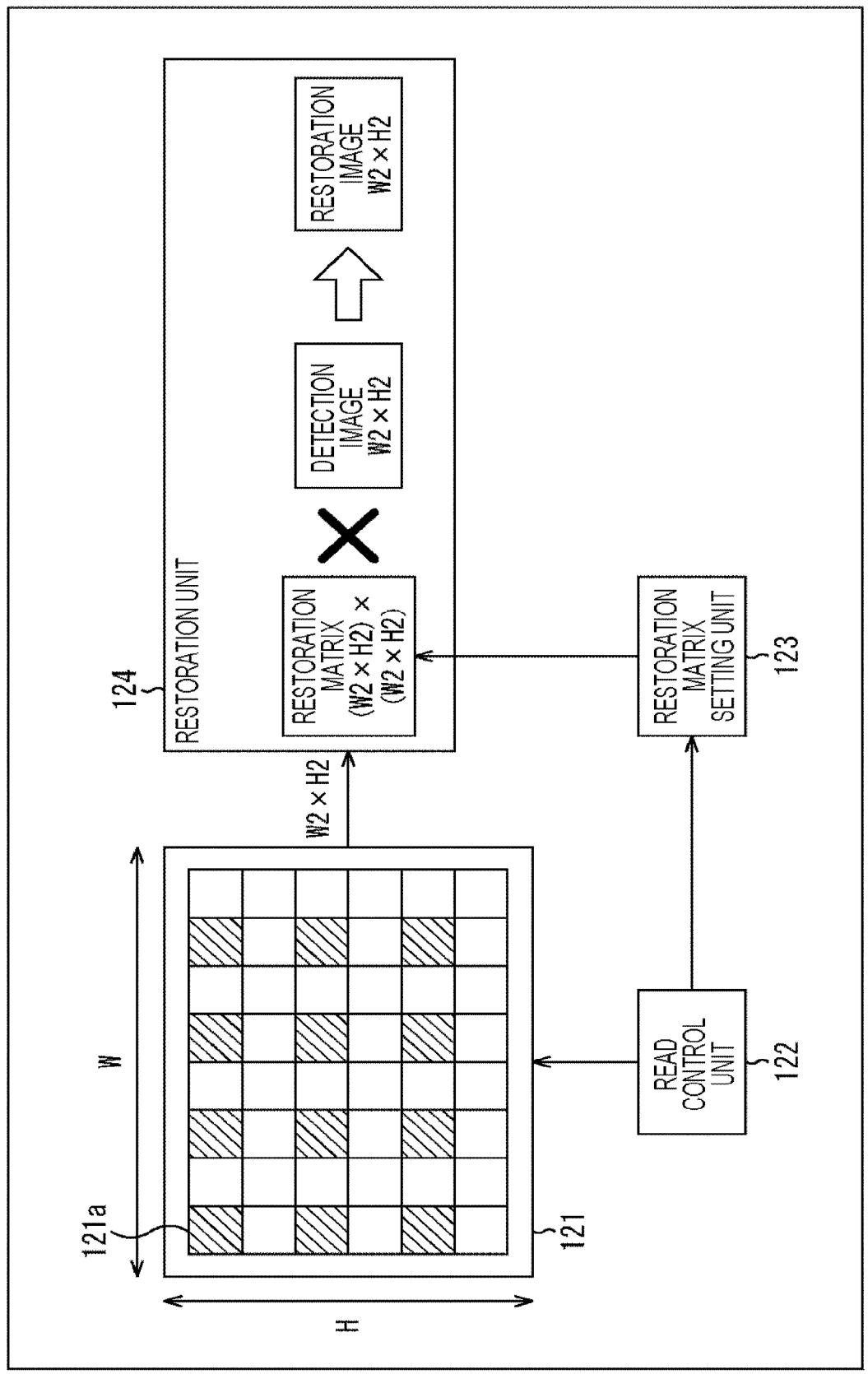
FIG. 24 is a diagram for describing an outline of a method of regularly reading some pixels.

Furthermore, as illustrated in FIG. 24, the imaging device 100 can read the detection signals of some pixels in a positional relationship having predetermined regularity of the imaging element 121 and convert the detection image into the restoration image, using the read detection signals of the some pixels in a positional relationship having predetermined regularity as the detection image. Such an operation mode is referred to as a pixel regularity thinning mode.

FIG. 24 illustrates a pixel array in the imaging element 121, similarly to the case in FIG. 22.

In the case of the pixel regularity thinning mode, the read control unit 122 supplies the read control signal to the imaging element 121, selects some pixels 121a (pixel output units) at positions in the positional relationship having predetermined regularity, from among (a plurality of pixel output units of) the pixel array of the imaging element 121, and reads the detection signals from the selected pixels 121a (the pixels in the oblique patterns in FIG. 24). The read control unit 122 can select an arbitrary number of pixels. For example, horizontally W2 pixels×vertically H2 pixels can be selected. That is, the detection image of resolution (W2×H2) is read from the imaging element 121.

Note that the read control unit 122 may supply the read control signal to the imaging element 121, read the detection signals from all the pixels 121a of the pixel array of the imaging element 121, and select detection signals read from some arbitrary pixels in the positional relationship having predetermined regularity from among the read detection signals as the detection signals to be included in the detection image.

In FIG. 24, the pixel 121a is selected every other pixel, but this selection is an example, and the selected pixel 121a is not limited to this example. Which pixel is selected may be determined in advance, may be selected by the read control unit 122 from among a plurality of candidates, or may be arbitrarily set by the read control unit 122, similarly to the case of the pixel arbitrary thinning mode.

Furthermore, the read control unit 122 also supplies the read control signal, which is supplied to the imaging element 121, to the restoration matrix setting unit 123. In a case of generating a restoration image of resolution (W2×H2), the restoration matrix setting unit 123 sets a restoration matrix including vertically (W2×H2) and horizontally (W2×H2) coefficients, corresponding to the detection image of the resolution (W2×H2) and the restoration image of the resolution (W2×H2), according to the read control signal.

In a case where the restoration unit 124 generates the restoration image, the restoration unit 124 acquires the detection image of the resolution (W2×H2) from the imaging element 121 or the read control unit 122, acquires the restoration matrix including vertically (W2×H2) and horizontally (W2×H2) coefficients set by the restoration matrix setting unit 123, and generates the restoration image of the resolution (W2×H2) using the acquired image and matrix.

Area Drive Mode

Figure 25:
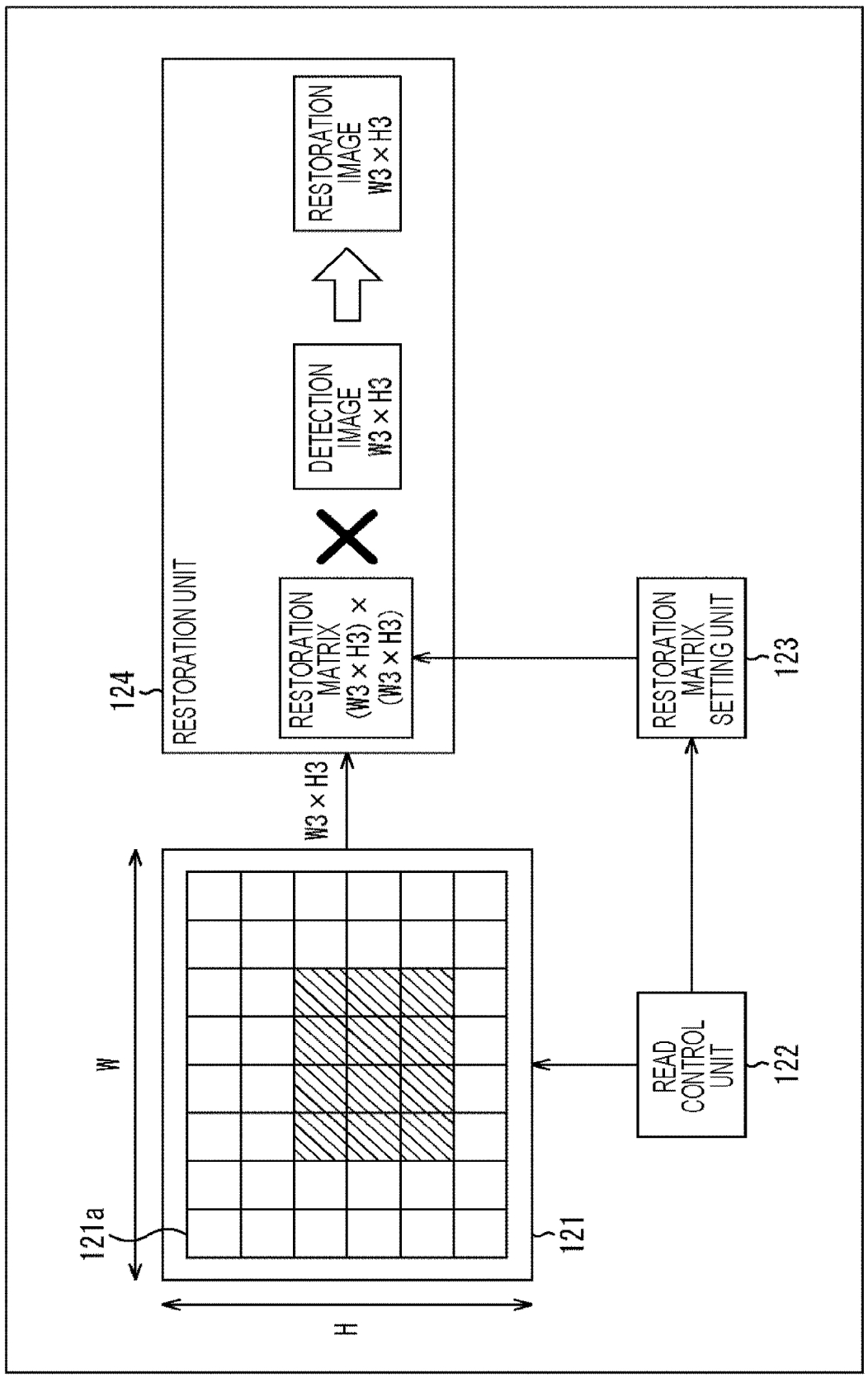
FIG. 25 is a diagram for describing an outline of a method of reading pixels in a partial region.

Furthermore, as illustrated in FIG. 25, the imaging device 100 can read the detection signals of pixels formed in one partial region, of a region (pixel region) where a pixel array of the imaging element 121 is formed, and convert the detection image into the restoration image, using the read detection signals of the pixels in the partial region as the detection image. Such an operation mode is referred to as an area drive mode.

FIG. 25 illustrates a pixel array in the imaging element 121, similarly to the case in FIG. 22.

In the case of the area drive mode, the read control unit 122 supplies the read control signal to the imaging element 121, selects pixels 121a (pixel output units) formed in one partial region of the pixel region of the imaging element 121, and reads the detection signals from the selected pixels 121a (the pixels in the oblique patterns in FIG. 25). The read control unit 122 can select an arbitrary number of pixels. For example, horizontally W3 pixels×vertically H3 pixels can be selected. That is, the detection image of resolution (W3×H3) is read from the imaging element 121.

Note that the read control unit 122 may supply the read control signal to the imaging element 121, read the detection signals from all the pixels 121a of the pixel array of the imaging element 121, and select detection signals read from pixels 121a formed in a predetermined partial region of a pixel region from among the read detection signals as the detection signals to be included in the detection image.

In FIG. 25, a total of 12 pixels including 4 pixels in the horizontal direction and 3 pixels in the vertical direction are selected, but this selection is an example, and the selected pixels 121a are not limited to this example. Which pixel is selected may be determined in advance, may be selected by the read control unit 122 from among a plurality of candidates, or may be arbitrarily set by the read control unit 122, similarly to the case of the pixel arbitrary thinning mode.

Furthermore, the read control unit 122 also supplies the read control signal, which is supplied to the imaging element 121, to the restoration matrix setting unit 123. In a case of generating a restoration image of resolution (W3×H3), the restoration matrix setting unit 123 sets a restoration matrix including vertically (W3×H3) and horizontally (W3×H3) coefficients, corresponding to the detection image of the resolution (W3×H3) and the restoration image of the resolution (W3×H3), according to the read control signal.

In a case where the restoration unit 124 generates the restoration image, the restoration unit 124 acquires the detection image of the resolution (W3×H3) from the imaging element 121 or the read control unit 122, acquires the restoration matrix including vertically (W3×H3) and horizontally (W3×H3) coefficients set by the restoration matrix setting unit 123, and generates the restoration image of the resolution (W3×H3) using the acquired image and matrix.

Pixel Addition Mode

Figure 26:
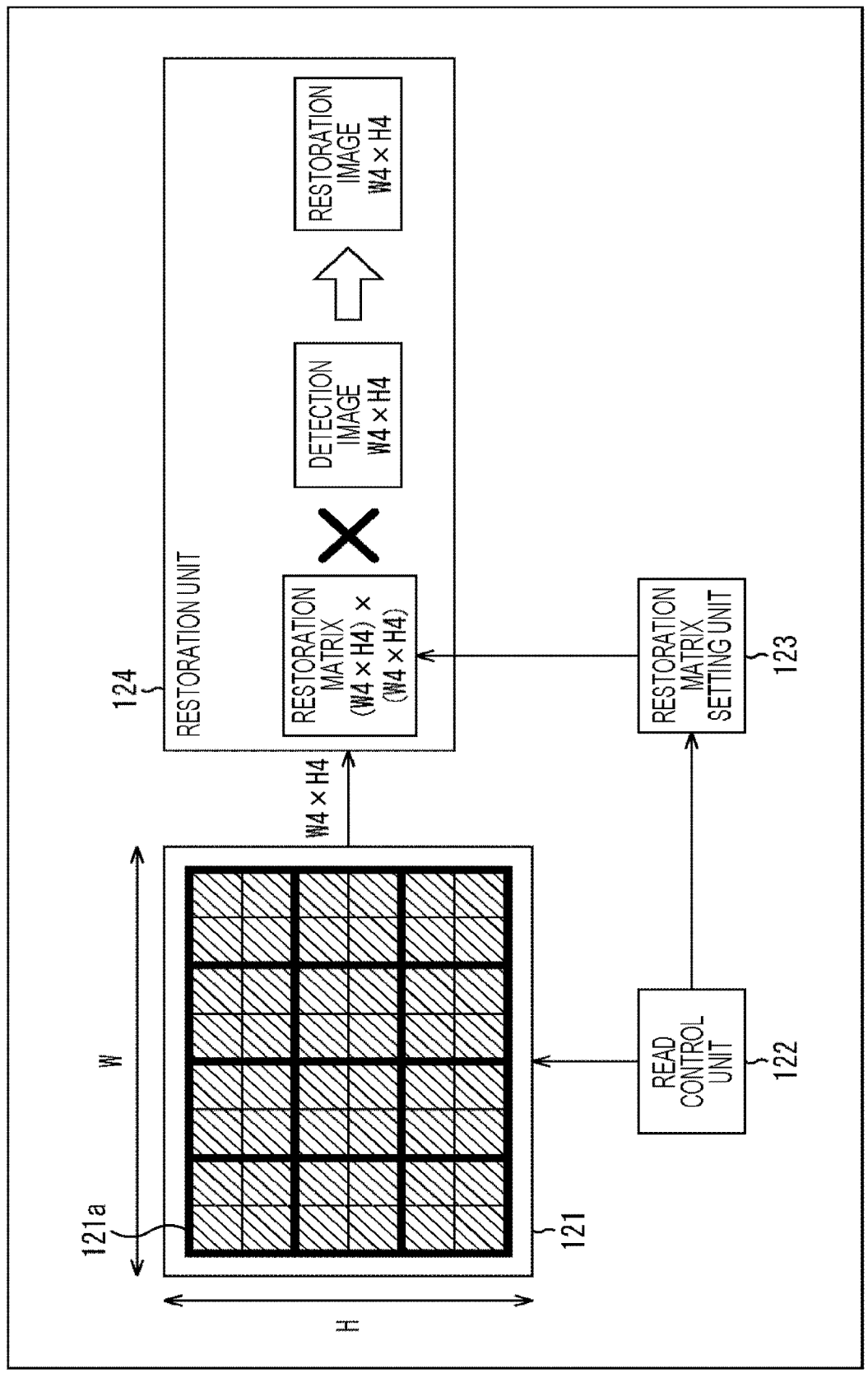
FIG. 26 is a diagram for describing an outline of a method of performing pixel addition.

Furthermore, as illustrated in FIG. 26, the imaging device 100 can read the detection signals of all the pixels 121a of the imaging element 121 and add the read detection signals of the pixels for every predetermined number. Such an operation mode is referred to as a pixel addition mode.

FIG. 26 illustrates a pixel array in the imaging element 121, similarly to the case in FIG. 22.

In the pixel addition mode, the read control unit 122 supplies the read control signal to the imaging element 121, reads the detection signals from all the pixels 121a of the pixel array of the imaging element 121, and adds the read detection signals of the pixels for every predetermined number. The addition can be performed every arbitrary number of pixels. That is, the resolution of the detection image after addition is arbitrary. For example, the read control unit 122 can convert the detection image of the resolution (W×H) read from the imaging element 121 into the detection image of the resolution (W4×H4).

In FIG. 26, the detection signals for vertically 2 pixels× horizontally 2 pixels are added. This is an example, and how to add the detection signals (how many detection signals of pixels in what type of relationship are added) is arbitrary and is not limited to this example. How to add the detection signals (pixel addition setting) may be determined in advance. Alternatively, a plurality of candidates for pixel addition setting may be prepared in advance, and the read control unit 122 may select pixels from the plurality of candidates. In this case, the read control unit 122 may perform the selection on the basis of arbitrary conditions such as imaging operation mode, frame rate, resolution setting, object distance, brightness, time, position, or a user's instruction, for example.

Note that the candidates for the pixel addition setting may be stored in an arbitrary processing unit or the like of the imaging device 100, such as a memory (not illustrated) in the read control unit 122 or the storage unit 113. In that case, the candidates for the pixel addition setting may be stored at the time of shipping the imaging device 100 from a factory or may be stored (or updated) after shipment from the factory. Needless to say, the candidates for the pixel addition setting may be prepared outside the imaging device 100, and the read control unit 122 may select pixels from among the outside candidates.

Furthermore, the read control unit 122 may arbitrarily set how to add the detection signals. In this case, for example, an initial value (initial setting) of the pixel addition setting is prepared in advance, and the read control unit 122 may update the initial setting on the basis of arbitrary conditions (for example, imaging operation mode, frame rate, resolution setting, object distance, brightness, time, positions, or user's instruction). Furthermore, for example, the read control unit 122 may set which detection signals of which pixels are added on the basis of arbitrary information or at random.

Furthermore, the read control unit 122 also supplies the read control signal to the restoration matrix setting unit 123. In a case of generating a restoration image of resolution (W4×H4), the restoration matrix setting unit 123 sets a restoration matrix including vertically (W4×H4) and horizontally (W4×H4) coefficients, corresponding to the detection image of the resolution (W4×H4) and the restoration image of the resolution (W4×H4), according to the read control signal.

In a case where the restoration unit 124 generates the restoration image, the restoration unit 124 acquires the detection image of the resolution (W4×H4) converted by the read control unit 122, acquires the restoration matrix including vertically (W4×H4) and horizontally (W4×H4) coefficients set by the restoration matrix setting unit 123, and generates the restoration image of the resolution (W4×H4) using the acquired image and matrix.

Comparison of Modes

A comparison example of the modes is illustrated in the table in FIG. 27. In the case where the operation mode (readout system) is the all-pixel mode, the imaging device 100 can obtain the detection image including the detection signals of all the pixels of the imaging element 121. That is, the imaging device 100 can obtain the restoration image with higher resolution than the other modes.

In the case where the operation mode is the pixel arbitrary thinning mode, the imaging device 100 can obtain the detection image with lower resolution than the case of the all-pixel mode. Therefore, the load of the imaging element 121 and the conversion processing into the restoration image can be reduced, and an increase in power consumption can be suppressed. Furthermore, the imaging device 100 can set which detection signal of which pixel is included in the detection image, and thus can arbitrarily set (control) the resolution of the detection image in a range equal to or lower than the resolution of the detection image in the case of the all-pixel mode. Moreover, since the detection signals can be read from some pixels of the imaging element 121, the operation from imaging by the imaging element 121 to reading of the detection signals can be speeded up as compared with the case of the all-pixel mode. For example, in a case where a moving image is obtained by the imaging element 121, the frame rate of the moving image can be set higher than that in the all-pixel mode.

In the case where the operation mode is the pixel regularity thinning mode, the imaging device 100 can obtain a similar effect to the pixel arbitrary thinning mode. Note that, generally, the pixel regularity thinning mode is more easily designed than the pixel arbitrary thinning mode. On the contrary, in general, the pixel arbitrary thinning mode has a higher degree of freedom in design than the pixel regularity thinning mode.

In the case where the operation mode is the area drive mode, the imaging device 100 can obtain a similar effect to the pixel arbitrary thinning mode. Note that, in general, the area drive mode is more easily designed than the pixel regularity thinning mode. Furthermore, in general, the pixel arbitrary thinning mode has a higher degree of freedom in design than the area drive mode.

In the case where the operation mode is the pixel addition mode, the imaging device 100 can obtain the detection image with lower resolution than the case of the all-pixel mode. Therefore, the load of the conversion processing into the restoration image can be reduced, and an increase in power consumption can be suppressed. Furthermore, the imaging device 100 can set how to add the detection signals and thus can arbitrarily set (control) the resolution of the detection image in a range equal to or lower than the resolution of the detection image in the case of the all-pixel mode. Moreover, the operation from imaging by the imaging element 121 to reading of the detection signals can be speeded up as compared with the case of the all-pixel mode. For example, in a case where a moving image is obtained by the imaging element 121, the frame rate of the moving image can be set higher than that in the all-pixel mode. Furthermore, in this mode, the detection signals of a plurality of pixels are added. Therefore, an S/N ratio of the detection image can be improved as compared with the other modes. That is, reduction in the image quality of the restoration image can be suppressed.

Angle of View Setting

Note that, in the case of reducing the resolution of the detection image as in the case of the pixel arbitrary thinning mode, the pixel regularity thinning mode, the area drive mode, or the pixel addition mode, the incident angle directivity of the entire detection image after the resolution reduction may be made equal to the incident angle directivity of the entire detection image before the resolution reduction, that is, the incident angle directivity of the entire detection image in the all-pixel mode.

The incident angle directivity being equal means capable of capturing an image of an object plane in the same range, that is, the angle of view being equal. For example, as illustrated in the upper part in FIG. 28, it is assumed that a range 312 is captured when the imaging element 121 captures an image of an object plane 311 at an angle of view 313. When considering only the horizontal direction in FIG. 28, the centers of gravity of the incident angle directivities of the pixels of the imaging element 121 are distributed in the range of the angle of view 313. In other words, an angle range of the center of gravity of the incident angle directivity of each pixel of the imaging element 121 is the angle of view 313. In other words, in a case of selecting pixels such that the incident angle directivities become equivalent, (the detection signals of) the pixels are selected such that the angle ranges of the centers of gravity of the incident angle directivities of the pixels become equal before and after resolution reduction.

When a target resolution of the range 312 is determined, the size of resolution 314 of the angle of view is determined. In other words, the resolution 314 is an angular difference in the centers of gravity of the incident angle directivities of the pixels. That is, when the resolution is reduced, the angular difference of the centers of gravity of the incident angle directivities of the pixels needs to be made large.

Figure 28:
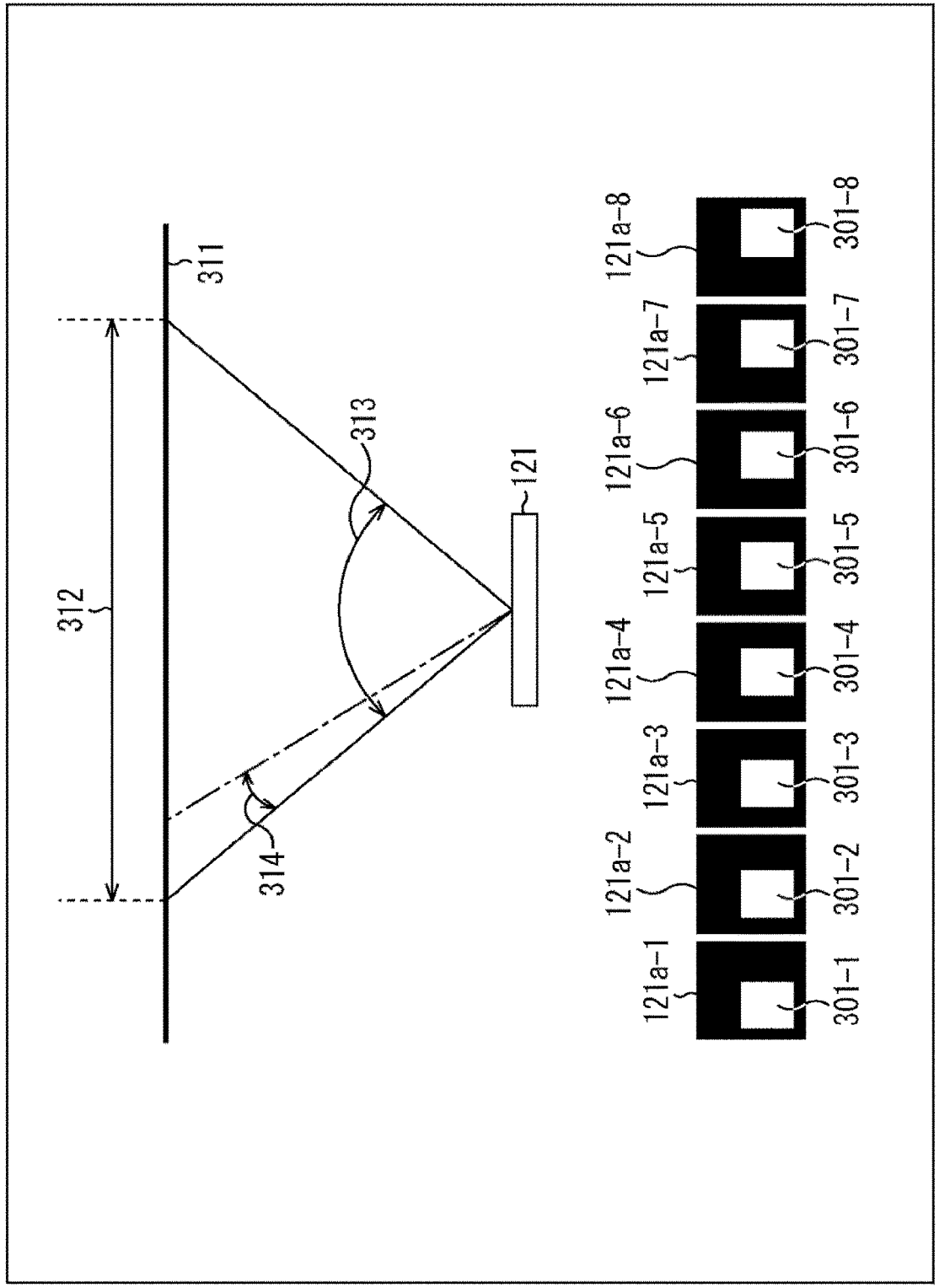
FIG. 28 is a diagram for describing a method of equalizing directivities.

This can also be said from the fact that the number of pixels implementing the angle of view 313 is reduced. For example, as illustrated in the lower part in FIG. 28, it is assumed that the angle of view 313 is implemented by pixels (pixels 121*a*-1 to 121*a*-8) having openings formed in eight types of position in the horizontal direction. An opening 301-1 is formed in a light incident plane of the pixel 121*a*-1. Similarly, openings 301-2 to 301-8 are formed in the light incident planes of the pixels 121*a*-2 to 121*a*-8, respectively. As illustrated in FIG. 28, the positions of the openings 301-1 to 301-8 in the pixels are shifted from one another from the left to right in the horizontal direction, and the opening 301-1 is formed in the leftmost side in the pixel, and the opening 301-8 is formed in the rightmost side in the pixel. For example, when the pixels 121*a*-1, 121*a*-3, 121*a*-5, and 121*a*-7 are selected, the angular difference in the centers of gravity of the incident angle directivities of the pixels is approximately doubled, and the resolution can be reduced while keeping the angle of view 313 substantially equal.

That is, the incident angle directivities of the detection images can be made equal before and after resolution reduction by increasing the angular difference in the centers of gravity of the incident angle directivities indicated by the pixel output units of the detection image and reducing the resolution while keeping the angle of view 313.

The description has been made regarding the horizontal direction but this similarly applied to the vertical direction. That is, for all directions, the incident angle directivities of the detection images can be made equal before and after resolution reduction by increasing the angular difference in the centers of gravity of the incident angle directivities indicated by the pixel output units of the detection image and reducing the resolution while keeping the angle of view.

By doing so, the resolution can be reduced without reducing the angle of view (field of view (FOV)) of the restoration image. That is, the resolution can be reduced without changing the content of the restoration image.

To perform the above setting in the pixel arbitrary thinning mode, the read control unit 122 is only required to select pixel output units such that the selected pixel output units as a whole have the incident angle directivity equivalent to all the pixel output units of the imaging element 121.

To perform the above setting in the pixel regularity thinning mode, a pixel output unit group as a whole in the positional relationship having predetermined regularity of the imaging element 121 needs to be designed to have the incident angle directivity equivalent to all the pixel output units of the imaging element 121. The read control unit 122 is only required to select the pixel output unit group thus designed.

To perform the above setting in the area drive mode, a pixel output unit group as a whole formed in a predetermined partial region of the pixel region of the imaging element 121 needs to be designed to have the incident angle directivity equivalent to all the pixel output units of the imaging element 121. The read control unit 122 is only required to select the pixel output unit group in the partial region thus designed.

To perform the above setting in the pixel addition mode, each pixel output unit of the imaging element 121 needs to be designed to have equivalent incident angle directivity before and after pixel output unit addition. Then, the read control unit 122 is only required to add the pixel output units by an addition method according to the design.

How to Add Pixel

Note that, in the pixel addition mode, the read control unit 122 may add detection signals of the pixel output units having similar incident angle directivity.

The incident angle directivity included in the detection signal after addition is an addition result of the incident angle directivities of the pixel output units of which the detection signals are added. Therefore, in general, regarding the incident angle directivity included in the detection signal after addition, the directivity becomes weaker as the difference between the incident angle directivities of the pixel output units of which the detection signals are added is larger. That is, since the difference in the incident angle directivity between the pixel output units becomes small, restoration performance is reduced and subjective image quality of the restoration image may be reduced. In other words, reduction in the directivity can be suppressed as the difference in the incident angle directivity between the pixel output units of which the detection signals are added is smaller.

That is, in the pixel addition mode, the reduction in subjective image quality of the restoration image can be suppressed by the read control unit 122 adding the detection signals of the pixel output units having similar incident angle directivity.

In other words, in the pixel addition mode, in a combination of the pixel output units of which the detection signals are added by the read control unit 122, the imaging element 121 is designed such that the incident angle directivities become similar, so that the reduction in subjectivity image quality of the restoration image can be suppressed.

Furthermore, in the pixel addition mode, the read control unit 122 may add the detection signals between the pixel output units close to each other.

Without considering the incident angle directivity, a light source position of incident light detected in a pixel output unit depends on the position of the pixel output unit. Therefore, for example, the incident light from light sources at close positions can be detected by pixel output units at physically close positions. That is, there is a high possibility that the same object is captured. Therefore, mixture of a plurality of target images can be suppressed by the addition of the detection signals, and the reduction in image quality of the restoration image can be suppressed.

That is, in the pixel addition mode, the read control unit 122 adds the detection signals between the pixel output units close to each other, the reduction in subjective image quality of the restoration image can be suppressed.

In other words, in the pixel addition mode, in a combination of the pixel output units of which the detection signals are added by the read control unit 122, the imaging element 121 is designed such that the pixel output units become closer to each other, so that the reduction in subjective image quality of the restoration image can be suppressed.

Mode Selection

As examples of the operation mode for resolution control, the all-pixel mode, the pixel arbitrary thinning mode, the pixel regularity thinning mode, the area drive mode, and the pixel addition mode have been described. However, the operation mode for resolution control is arbitrary and is not limited to the example.

Furthermore, the read control unit 122 may be able to select any one from a plurality of operation modes. For example, the above-described all-pixel mode, pixel arbitrary thinning mode, pixel regularity thinning mode, area drive mode, and pixel addition mode are prepared as candidates, and the read control unit 122 may select and apply any of the modes and control resolution in the operation mode.

By doing so, the imaging device 100 can more easily obtain detection images (or restoration images) in various specifications by simply switching the operation mode for resolution control of the read control unit 122.

Note that the basis for mode selection is arbitrary. For example, the mode may be selected on the basis of the imaging operation mode or may be specified by the user. The mode switching timing is also arbitrary. Of course, the candidate operation mode is arbitrary.

Restoration Matrix

The restoration matrix setting unit 123 sets the restoration matrix corresponding to the detection image with controlled resolution and the restoration image as described above. This setting method is arbitrary. For example, the restoration matrix may be determined in advance, may be selected by the restoration matrix setting unit 123 from a plurality of candidates, or the restoration matrix setting unit 123 may arbitrarily set the restoration matrix.

Design of Restoration Matrix

The method of designing the restoration matrix is arbitrary. For example, the restoration matrix may be designed on the basis of a physical model. The captured image (same as the restoration image) is an image configured using pixel values for forming an image of an object and visually recognizable by the user. In the imaging element 121, this captured image is converted into a detection image according to parameters such as the incident angle directivity of each pixel and the object distance.

Figure 29:
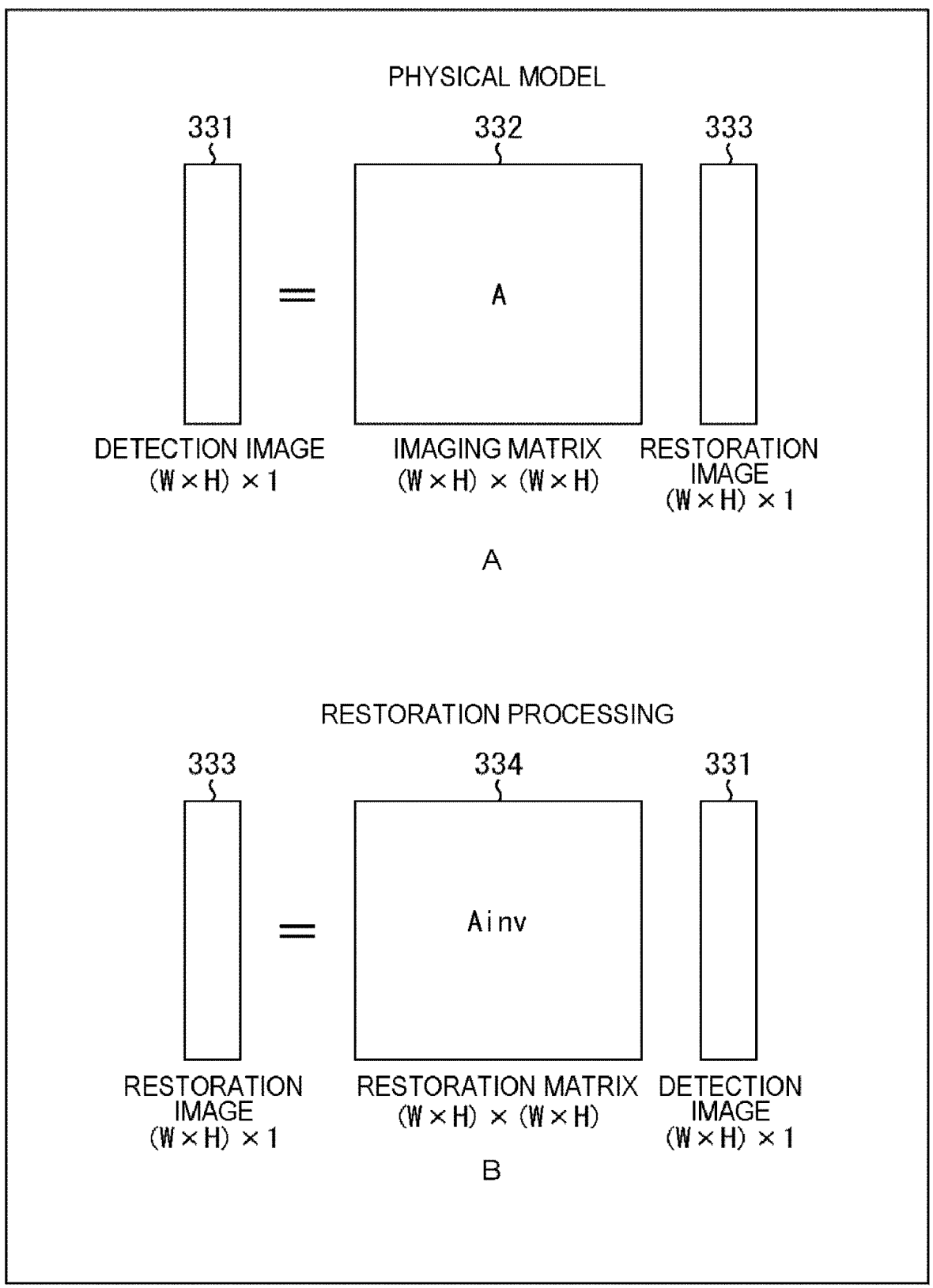
FIG. 29 is a diagram for describing a restoration matrix.
Figure 30:
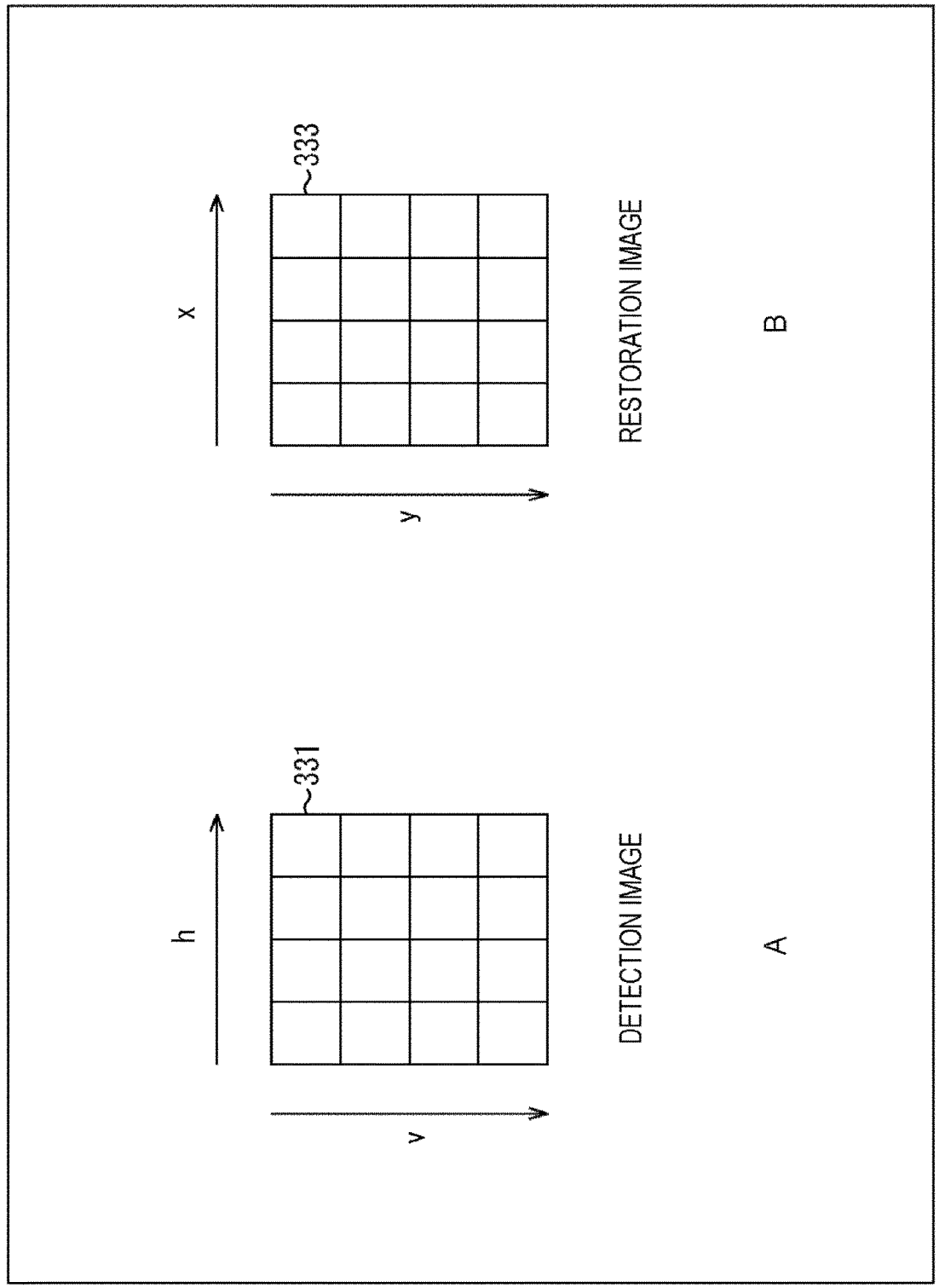
FIG. 30 is a diagram for describing a restoration matrix of the method of reading all of pixels.
Figure 32:
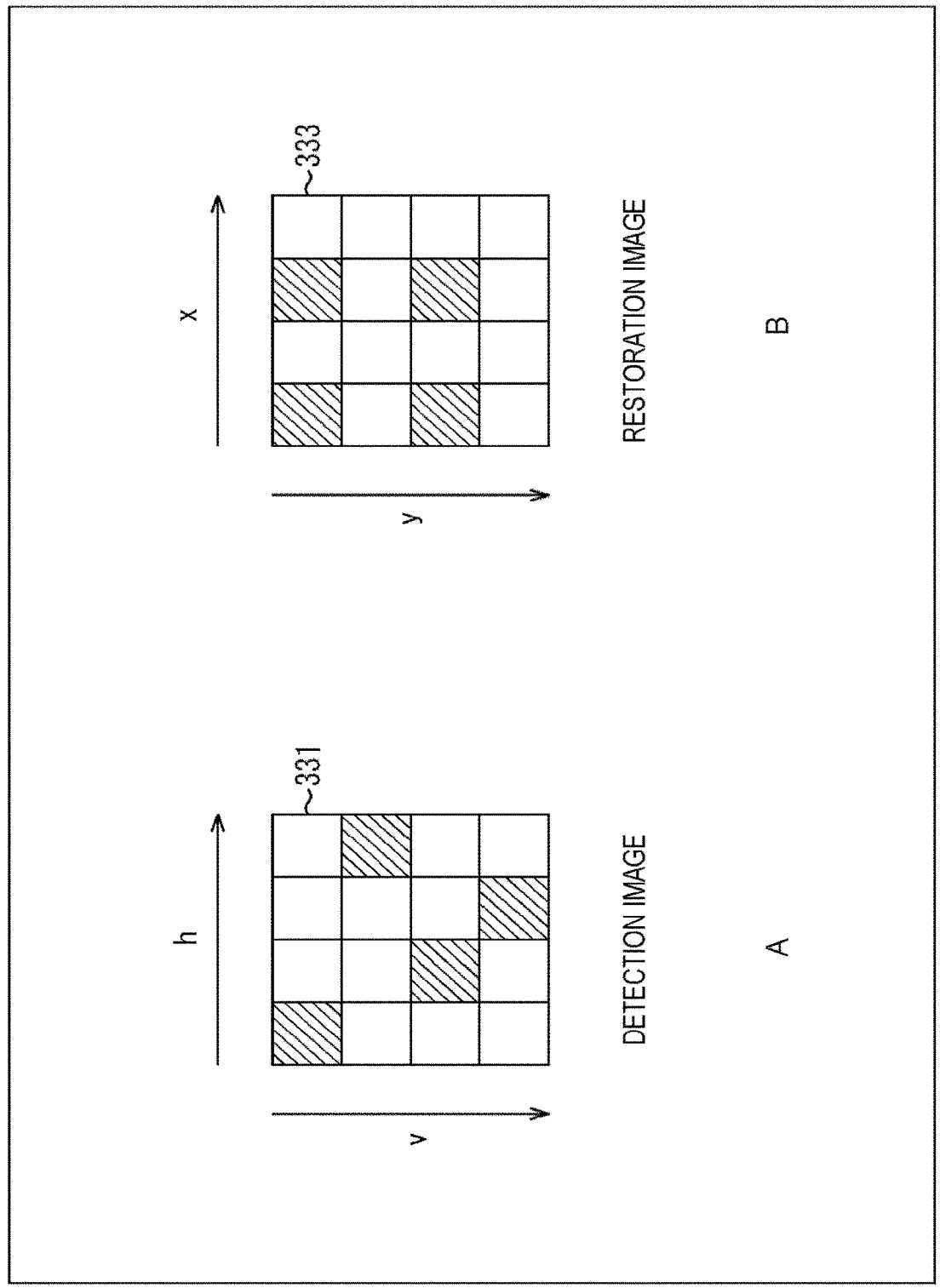
FIG. 32 is a diagram for describing a restoration matrix of the method of reading some arbitrary pixels.
Figure 34:
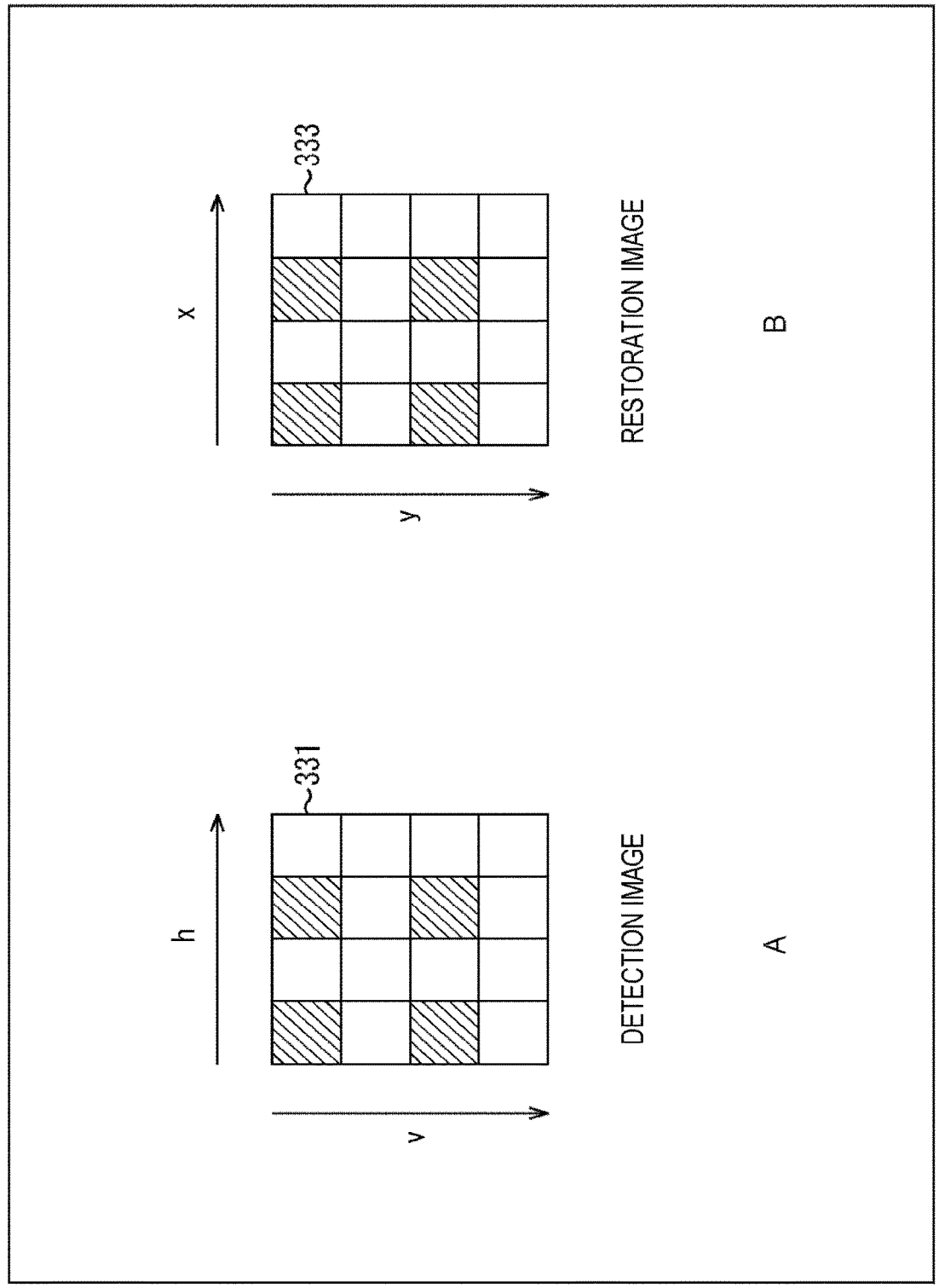
FIG. 34 is a diagram for describing a restoration matrix of the method of regularly reading some pixels.
Figure 36:
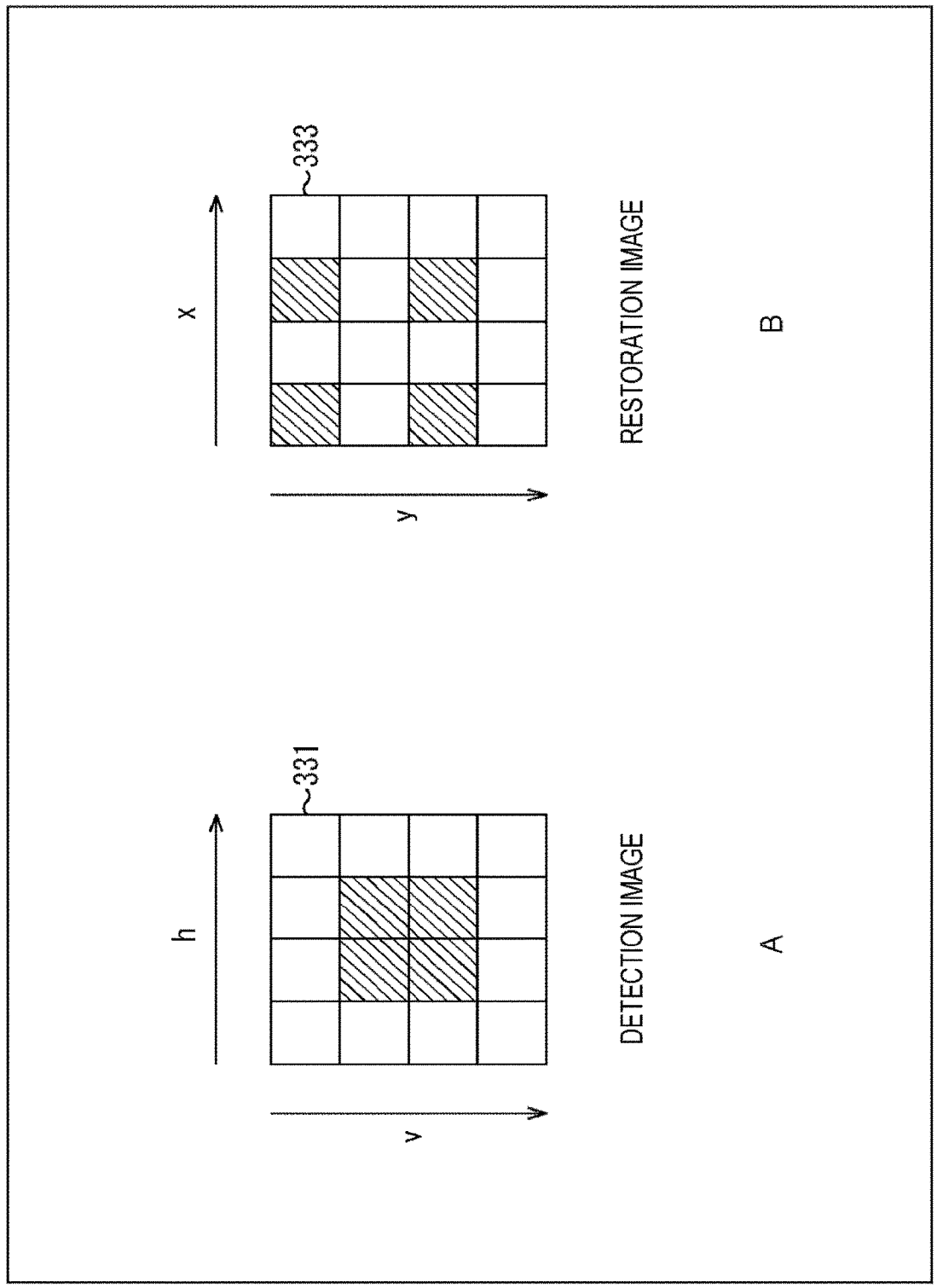
FIG. 36 is a diagram for describing a restoration matrix of the method of reading pixels in a partial region.
Figure 38:
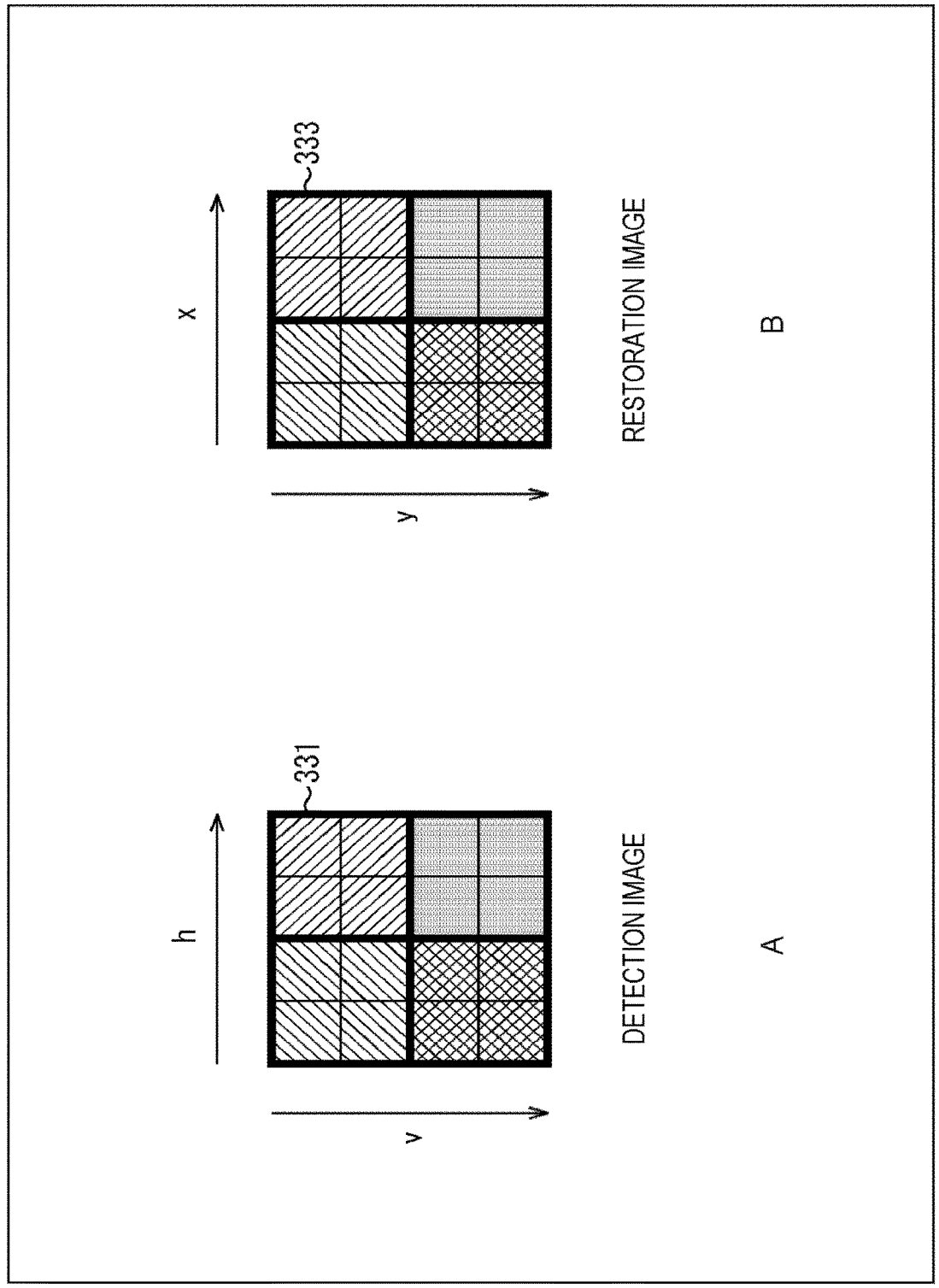
FIG. 38 is a diagram for describing a restoration matrix of the method of performing pixel addition.

That is, in the case of the all-pixel mode, as illustrated in A in FIG. 29, a matrix of a detection image 331 can be expressed by a product of an imaging matrix 332(A) and a matrix of a restoration image 333. Note that, in this determinant, the matrix of the detection image 331 is obtained by rearranging the detection signals of the columns of the detection image 331 of resolution (W×H) into one column, and is a matrix of vertically (W×H)×horizontally 1. Furthermore, the matrix of the restoration image 333 is obtained by rearranging the detection signals of the columns of the restoration image 333 of resolution (W×H) into one column, and is a matrix of vertically (W×H)×horizontally 1. The imaging matrix 332(A) includes vertically (W×H)×horizontally (W×H) coefficients. The value of each coefficient is determined by the incident angle directivity of each pixel of the imaging element 121, the object distance, or the like.

In other words, the restoration processing in the case of the all-pixel mode can be expressed by the determinant as illustrated in B in FIG. 29. That is, as illustrated in B in FIG. 29, the matrix of the restoration image 333 can be expressed by a product of a restoration matrix 334 and the detection image 331. In this determinant, the matrix of the detection image 331 is a matrix of vertically (W×H)×horizontally 1. Furthermore, the matrix of the restoration image 333 is a matrix of vertically (W×H)×horizontally 1. The restoration matrix 334 is an inverse matrix (Ainv) of the imaging matrix 332(A) and includes vertically (W×H)×horizontally (W×H) coefficients.

As described above, in the case of the all-pixel mode, the imaging matrix 332 may be designed on the basis of the incident angle directivity of each pixel of the imaging element 121, the object distance, and the like, and an inverse matrix thereof may be adopted as the restoration matrix 334.

In the other modes, a similar determinant is basically established. However, the resolution of the detection image and the restoration image is different from the all-pixel mode, and thus the numbers of rows and columns of the imaging matrix 332 and the restoration matrix 334 need to be set according to the difference.

Case of All-Pixel Mode

A more specific example of the case of the all-pixel mode will be described. It is assumed that the detection image 331 has 4×4 pixel output units as illustrated in A in FIG. 30 and the restoration image 333 has 4×4 pixels as illustrated in B in FIG. 30.

Figure 31:
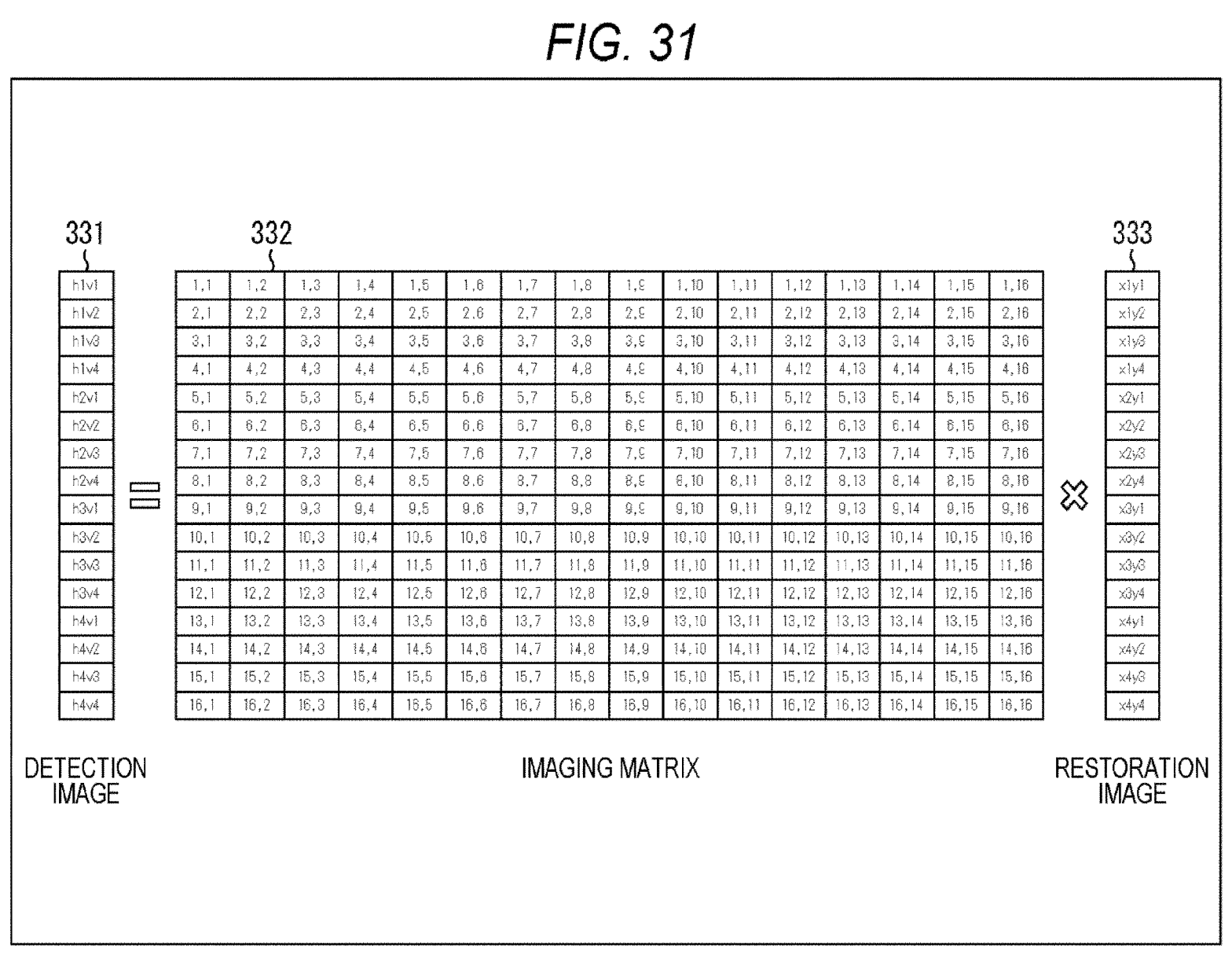

In the case of the all-pixel mode, in the determinant illustrated in A in FIG. 29, the detection image 331 and the restoration image 333 are each expressed by a 16×1 matrix as illustrated in FIG. 31. Therefore, the imaging matrix 332 is a 16×16 matrix. Therefore, the restoration matrix is also a 16×16 matrix.

Case of Pixel Arbitrary Thinning Mode

Next, the case of the pixel arbitrary thinning mode will be described. For example, as illustrated in A in FIG. 32, it is assumed that four pixel output units having the oblique pattern are selected from the detection image 331 of 4×4 pixel output units. Further, as illustrated in B in FIG. 32, in the restoration image 333, four pixels are evenly arranged.

Figure 33:
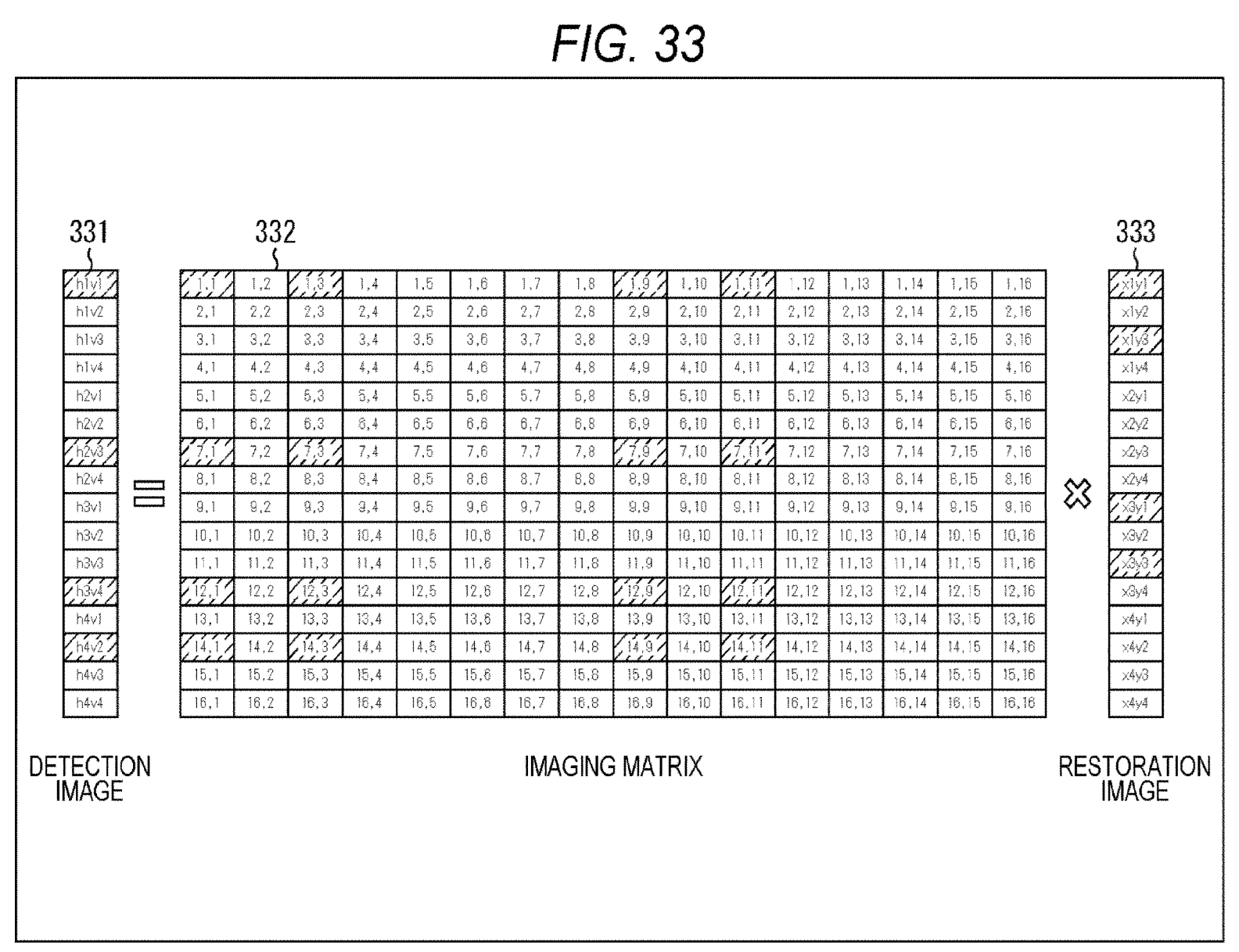

The imaging matrix in the pixel arbitrary thinning mode can be designed on the basis of the imaging matrix in the all-pixel mode. For example, the corresponding coefficient is only required to be extracted in each matrix of the determinant in the all-pixel mode in FIG. 31. That is, the detection signal in each pixel output unit in the oblique pattern of the detection image 331 illustrated in A in FIG. 32 corresponds to the coefficient illustrated in the oblique pattern of the matrix of the detection image 331 in the all-pixel mode, as illustrated in FIG. 33. Furthermore, the pixel value of each pixel in the oblique pattern of the restoration image 333 illustrated in B in FIG. 32 corresponds to the coefficient in the oblique pattern of the matrix of the restoration image 333 in the all-pixel mode, as illustrated in FIG. 33.

Therefore, the imaging matrix 332 in the pixel arbitrary thinning mode corresponds to, as illustrated in FIG. 33, the coefficients (the coefficients in the oblique pattern) at the positions of the imaging matrix in the all-pixel mode, the positions corresponding to the coefficients in the oblique pattern of the matrix of the detection image 331 and the coefficients in the oblique pattern of the matrix of the restoration image 333. Therefore, the imaging matrix 332 in the pixel arbitrary thinning mode can be generated by extracting (selecting and reading) these coefficients. That is, in the case in FIG. 33, the 4×4 imaging matrix 332 is obtained.

Case of Pixel Regularity Thinning Mode

Next, the case of the pixel regularity thinning mode will be described. Even in the pixel regularity thinning mode, the imaging matrix can be designed by basically a similar method to the pixel arbitrary thinning mode. For example, as illustrated in A in FIG. 34, it is assumed that four pixel output units (in the oblique pattern) are selected at equal intervals from the detection image 331 of 4×4 pixel output units. Further, as illustrated in B in FIG. 34, in the restoration image 333, four pixels are evenly arranged.

Figure 35:
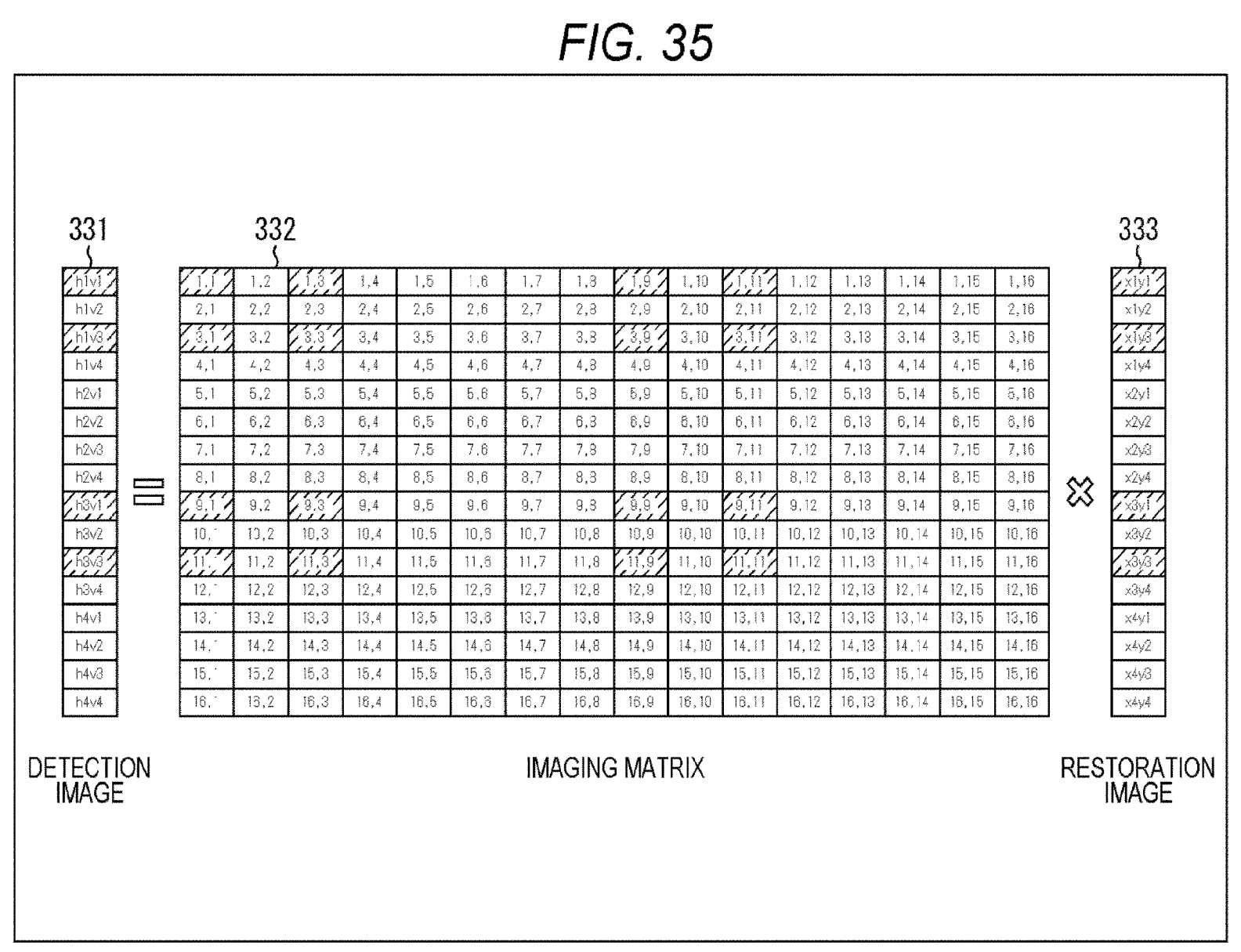

That is, also in this case, the corresponding coefficient is only required to be extracted in each matrix of the determinant of the all-pixel mode in FIG. 31. In FIG. 35, the coefficients in the oblique pattern of the matrix of the detection image 331 correspond to the detection signals of the pixel output units in the oblique pattern of the detection image 331 illustrated in A in FIG. 34. Furthermore, in FIG. 35, the coefficients in the oblique pattern of the matrix of the restoration image 333 correspond to the pixel values of the pixels in the oblique pattern of the restoration image 333 illustrated in B in FIG. 34. The imaging matrix 332 in the pixel regularity thinning mode corresponds to the coefficients (the coefficients in the oblique pattern) at positions corresponding to the aforementioned coefficients, as illustrated in FIG. 35. Therefore, the imaging matrix 332 in the pixel regularity thinning mode can be generated by extracting (selecting and reading) these coefficients. That is, in the case in FIG. 35, the 4×4 imaging matrix 332 is obtained.

Case of Area Drive Mode

Next, the case of the area drive mode will be described. Even in the area drive mode, the imaging matrix can be designed by basically a similar method to the pixel arbitrary thinning mode. For example, as illustrated in A in FIG. 36, it is assumed that the central 2×2 pixel output units (in the oblique pattern) are selected from the detection image 331 of 4×4 pixel output units. Further, as illustrated in B in FIG. 36, in the restoration image 333, four pixels are evenly arranged.

Figure 37:
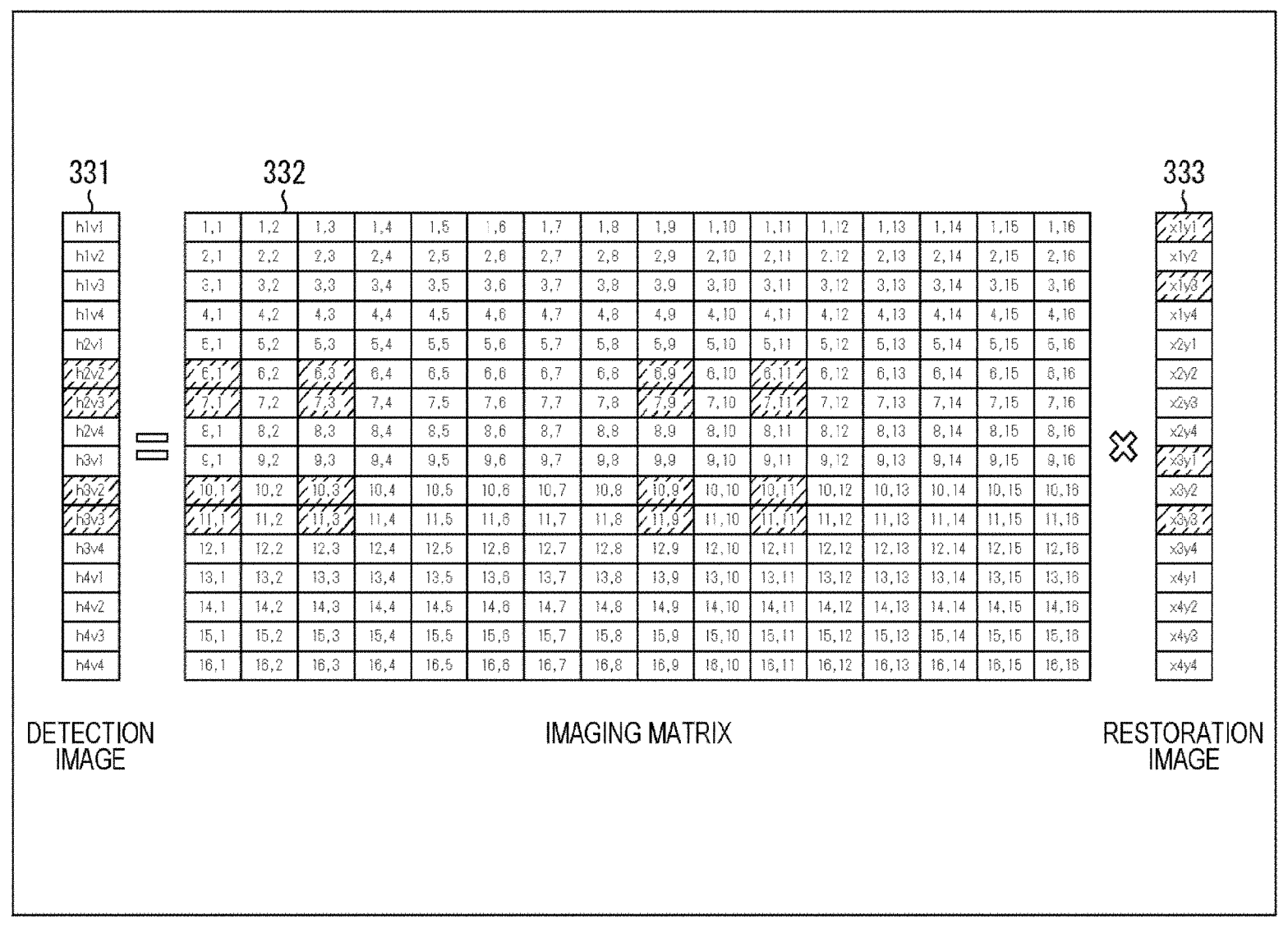

That is, also in this case, the corresponding coefficient is only required to be extracted in each matrix of the determinant of the all-pixel mode in FIG. 31. In FIG. 37, the coefficients in the oblique pattern of the matrix of the detection image 331 correspond to the detection signals of the pixel output units in the oblique pattern of the detection image 331 illustrated in A in FIG. 36. Furthermore, in FIG. 37, the coefficients in the oblique pattern of the matrix of the restoration image 333 correspond to the pixel values of the pixels in the oblique pattern of the restoration image 333 illustrated in B in FIG. 36. The imaging matrix 332 in the area drive mode corresponds to the coefficients (the coefficients in the oblique pattern) at positions corresponding to the aforementioned coefficients, as illustrated in FIG. 37. Therefore, the imaging matrix 332 in the area drive mode can be generated by extracting (selecting and reading) these coefficients. That is, in the case in FIG. 37, the 4×4 imaging matrix 332 is obtained.

Case of Pixel Addition Mode

Next, the case of the pixel addition mode will be described. Even in the pixel addition mode, the imaging matrix can be designed by basically a similar method to the pixel arbitrary thinning mode. For example, as illustrated in A in FIG. 38, it is assumed that the detection signals of the detection image 331 of 4×4 pixel output units are added for each 2×2 pixel output units. Even in this case, as illustrated in B in FIG. 38, a pixel value equivalent to a pixel value obtained by adding pixel values of 4×4 pixels for each 2×2 pixels can be obtained in the restoration image 333.

Figure 39:
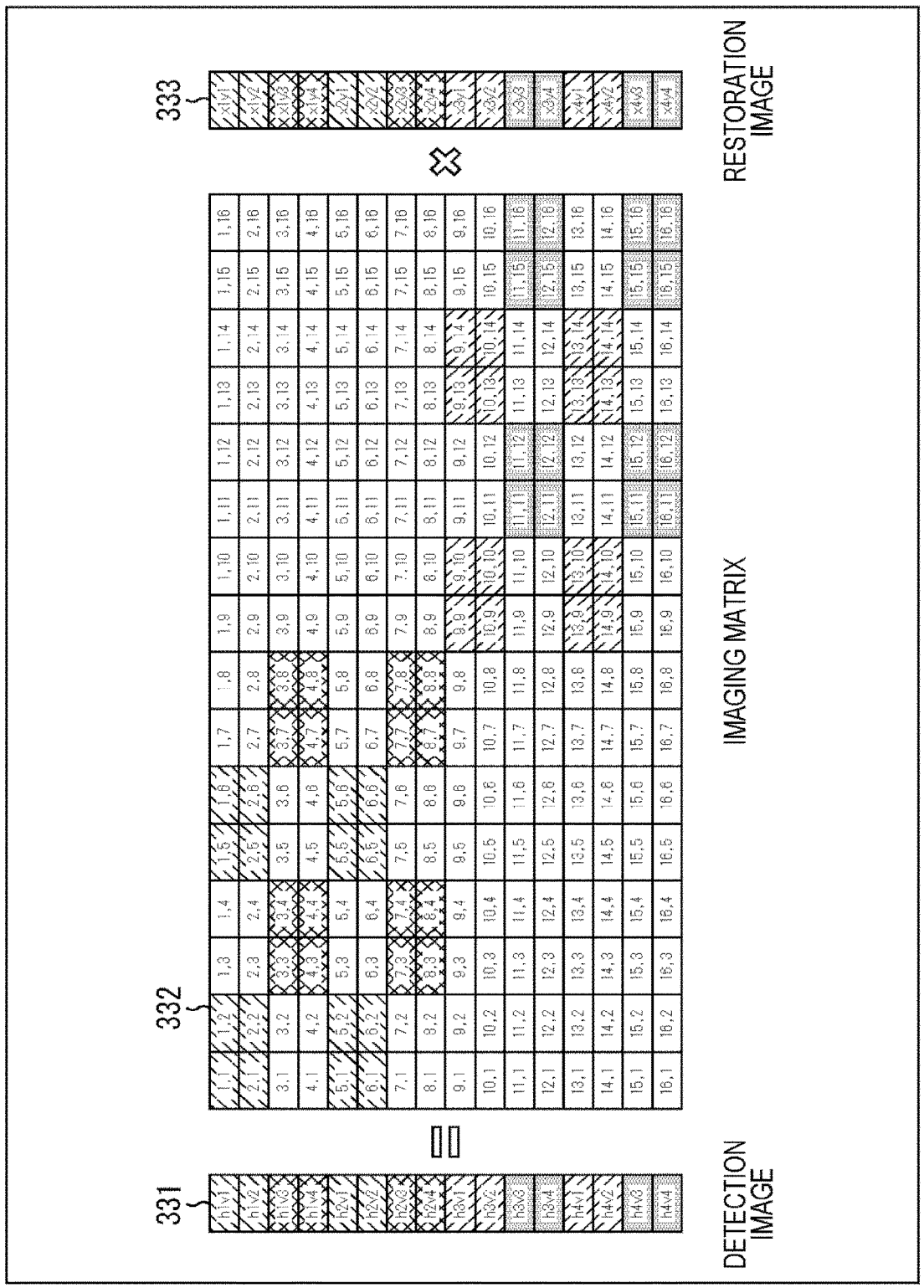
FIG. 39 is a diagram for describing the restoration matrix of the method of performing pixel addition.

That is, also in this case, the corresponding coefficient is only required to be extracted in each matrix of the determinant of the all-pixel mode in FIG. 31. In FIG. 39, the upper right and lower left coefficients in the oblique pattern of the matrix of the detection image 331 correspond to the detection signals of the upper right and lower left pixel output units in the oblique pattern of the detection image 331 illustrated in A in FIG. 38. Similarly, the upper left and lower right coefficients in the oblique pattern of the matrix of the detection image 331 in FIG. 39 correspond to the detection signals of the upper left and lower right pixel output units in the oblique pattern of the detection image 331 illustrated in A in FIG. 38. Furthermore, the coefficients in the half-tone dot meshing pattern of the matrix of the detection image 331 in FIG. 39 correspond to the detection signals of the pixel output units in the half-tone dot meshing pattern of the detection image 331 illustrated in A in FIG. 38. Furthermore, the coefficients in gray of the matrix of the detection image 331 in FIG. 39 correspond to the detection signals of the pixel output units in gray of the detection image 331 illustrated in A in FIG. 38.

The above similarly applies to the restoration image 333. In FIG. 39, the upper right and lower left coefficients in the oblique pattern of the matrix of the restoration image 333 correspond to the pixel values of the upper right and lower left pixels in the oblique pattern of the restoration image 333 illustrated in B in FIG. 38. Similarly, the upper left and lower right coefficients in the oblique pattern of the matrix of the restoration image 333 in FIG. 39 correspond to the pixel values of the upper left and lower right pixels in the oblique pattern of the restoration image 333 illustrated in B in FIG. 38. Furthermore, the coefficients in the half-tone dot meshing pattern of the matrix of the restoration image 333 in FIG. 39 correspond to the pixel values of the pixels in the half-tone dot meshing pattern of the restoration image 333 illustrated in B in FIG. 38. Furthermore, the coefficients in gray of the matrix of the restoration image 333 in FIG. 39 correspond to the pixel values of the pixels in gray of the restoration image 333 illustrated in B in FIG. 38.

The imaging matrix 332 in the pixel addition mode corresponds to the coefficients (the coefficients illustrated in pattern or color) at positions corresponding to the aforementioned coefficients, as illustrated in FIG. 39. Therefore, the imaging matrix 332 in the pixel addition mode can be generated by extracting (calculating an average value of the coefficients in the same pattern, for example) these coefficients.

Inverse Matrix of Imaging Matrix

As described above, the restoration matrix can be obtained as the inverse matrix of the imaging matrix. That is, as illustrated in the upper right part in FIG. 40, in the case of obtaining a restoration image of N×N pixels from a detection image Pic of N pixels×N pixels, the relationship as illustrated in the left part in FIG. 40 is established according to a matrix A of (N×N) rows×(N×N) columns including a vector x having pixel values of pixels of the restoration image of (N×N) rows×1 column as elements, a vector y having pixel values of pixels of the detection image of (N×N) rows×1 column as elements, and a coefficient set.

Figure 40:
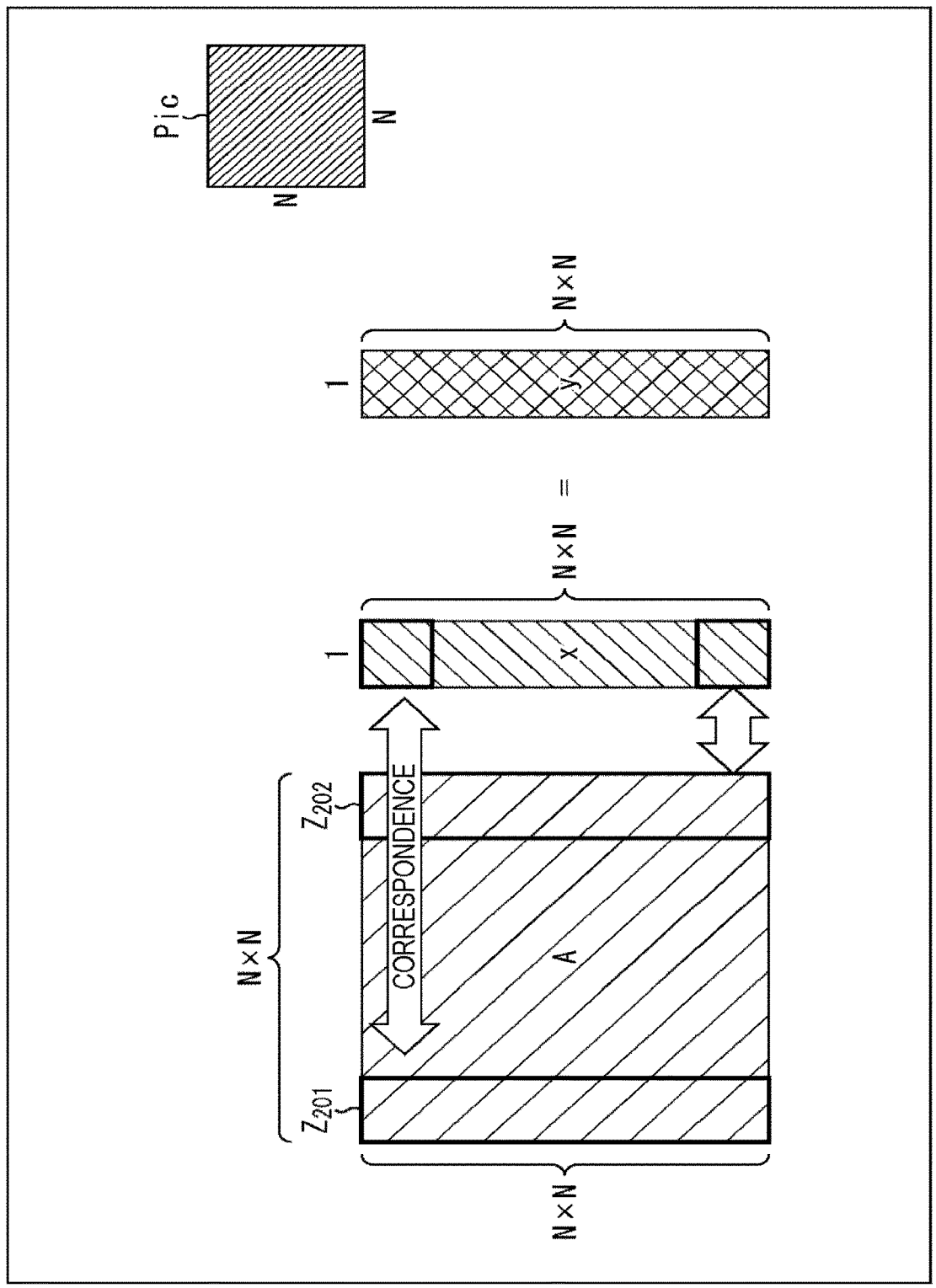
FIG. 40 is a diagram for describing a reason for reducing a calculation amount and a memory capacity by providing a rule for a light-shielding region in each of horizontal direction and vertical direction.

That is, FIG. 40 illustrates that a result of multiplication of the elements of the matrix A (imaging matrix) of (N×N) rows×(N×N) columns including the coefficient set and the vector x of (N×N) rows×1 column representing the restoration image becomes the vector y of (N×N) rows×1 column representing the detection image. From this relationship, simultaneous equations are formed.

Note that, in FIG. 40, each element in the first column in a range Z201 of the matrix A corresponds to an element in the first row of the vector x, and each element in the (N×N)th column in a range Z202 of the matrix A corresponds to an element in the (N×N)th row of the vector x.

In other words, the restoration image can be obtained by obtaining each element of the vector x by solving the simultaneous equations based on the determinant shown in FIG. 40. Furthermore, in the case of using a pinhole, and in the case of using a light condensing function such as an imaging lens for making incident light incident from the same direction enter pixel output units adjacent to each other, the relationship between the position of each pixel and the incident angle of light is uniquely determined. Therefore, the matrix A is a square matrix and is a diagonal matrix in which all diagonal components ((i, i) elements) are 1 and all components other than the diagonal components are 0. On the contrary, in the case of using neither a pinhole nor an imaging lens, like the imaging element 121 in FIG. 2, the relationship between the position of each pixel and the incident angle of light is not uniquely determined, and therefore the matrix A is not a diagonal matrix.

Figure 41:
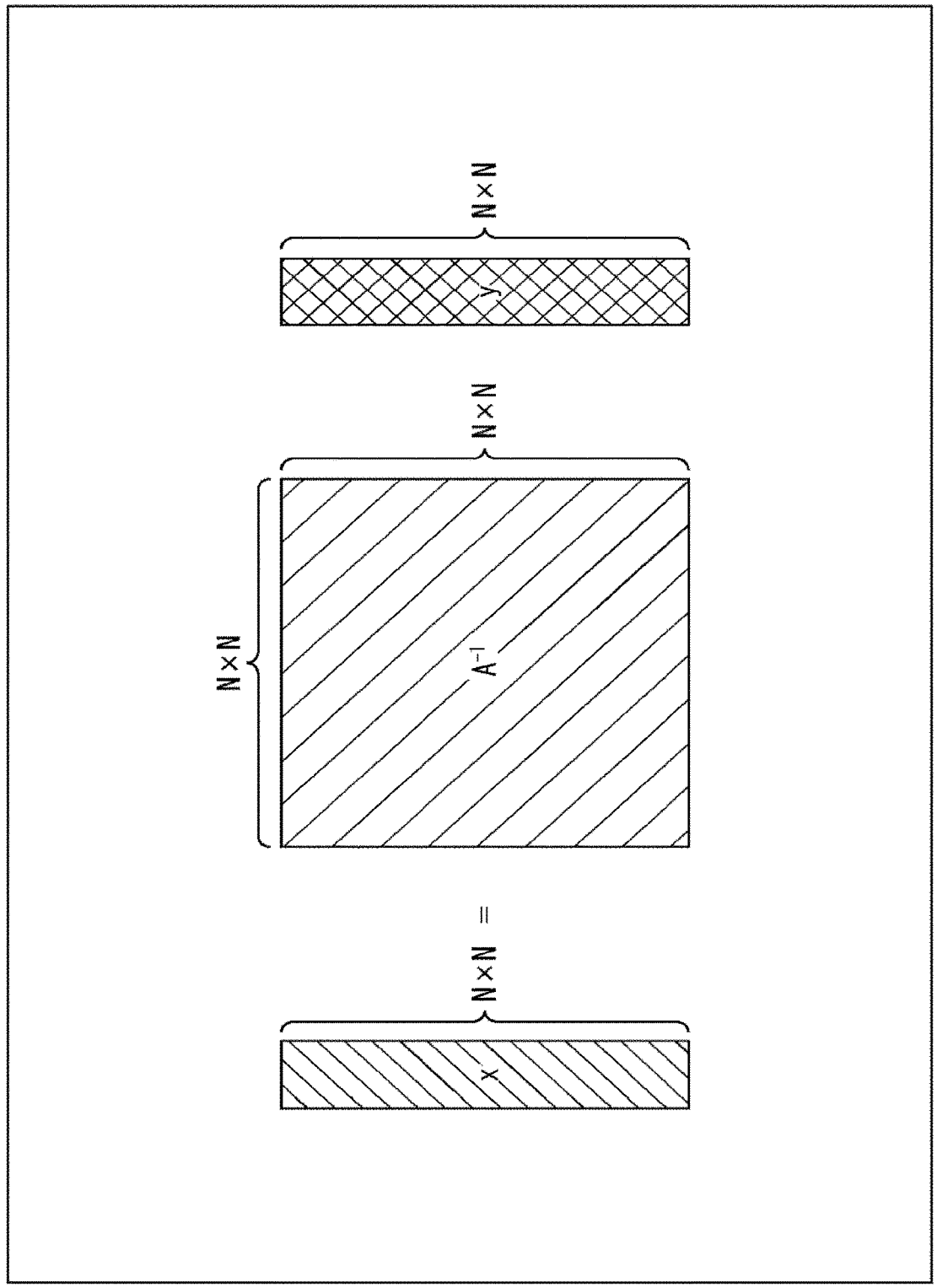
FIG. 41 is a diagram for describing a reason for reducing a calculation amount and a memory capacity by providing a rule for a light-shielding region in each of horizontal direction and vertical direction.

By the way, generally, the determinant in FIG. 40 is transformed as illustrated in FIG. 41 by multiplying both sides by an inverse matrix $A^{-1}$ (restoration matrix) of the matrix A from the left, and each element of the vector x representing the restoration image is obtained by multiplying the vector y representing the detection image by the inverse matrix $A^{-1}$ from the right.

However, in some cases, the simultaneous equations cannot be solved by any of or a combination of reasons that the real matrix A cannot be accurately obtained, cannot be accurately measured, cannot be solved in a case where the basis vector of the matrix A is close to linear dependency, or each element of the detection image contains noise.

Therefore, the following equation (7) using the concept of regularized least squares, is adopted considering a robust structure against various errors.

[Math. 1]

$$\hat{x} = \min \|A\hat{x} - y\|^2 + \|\gamma \hat{x}\|^2 \qquad (7)$$

Here, in the equation (7), x with "^" in the upper part represents the vector x, A represents the matrix A, y represents the vector x, and γ represents the regularization parameter, and ||A|| represents the L2 norm (root sum of squares). Here, the first term is the norm for minimizing the difference between both sides in FIG. 40, and the second term is the regularization term.

Note that the regularization parameter γ is a parameter for adjusting the balance between the error of the least square method and the size of the solution. By properly setting the regularization parameter γ, the restoration accuracy of the restoration image is improved and the image quality of the restoration image is improved.

When this equation (7) is solved for x, the solution is expressed by the following equation (8).

[Math. 2]

$$\hat{x} = (A^t A + \gamma I)^{-1} A^t y \quad (8)$$

However, as illustrated in FIG. 31, for example, the imaging matrix A has an enormous size, so calculation time and a large amount of memory are required for calculation.

Figure 42:
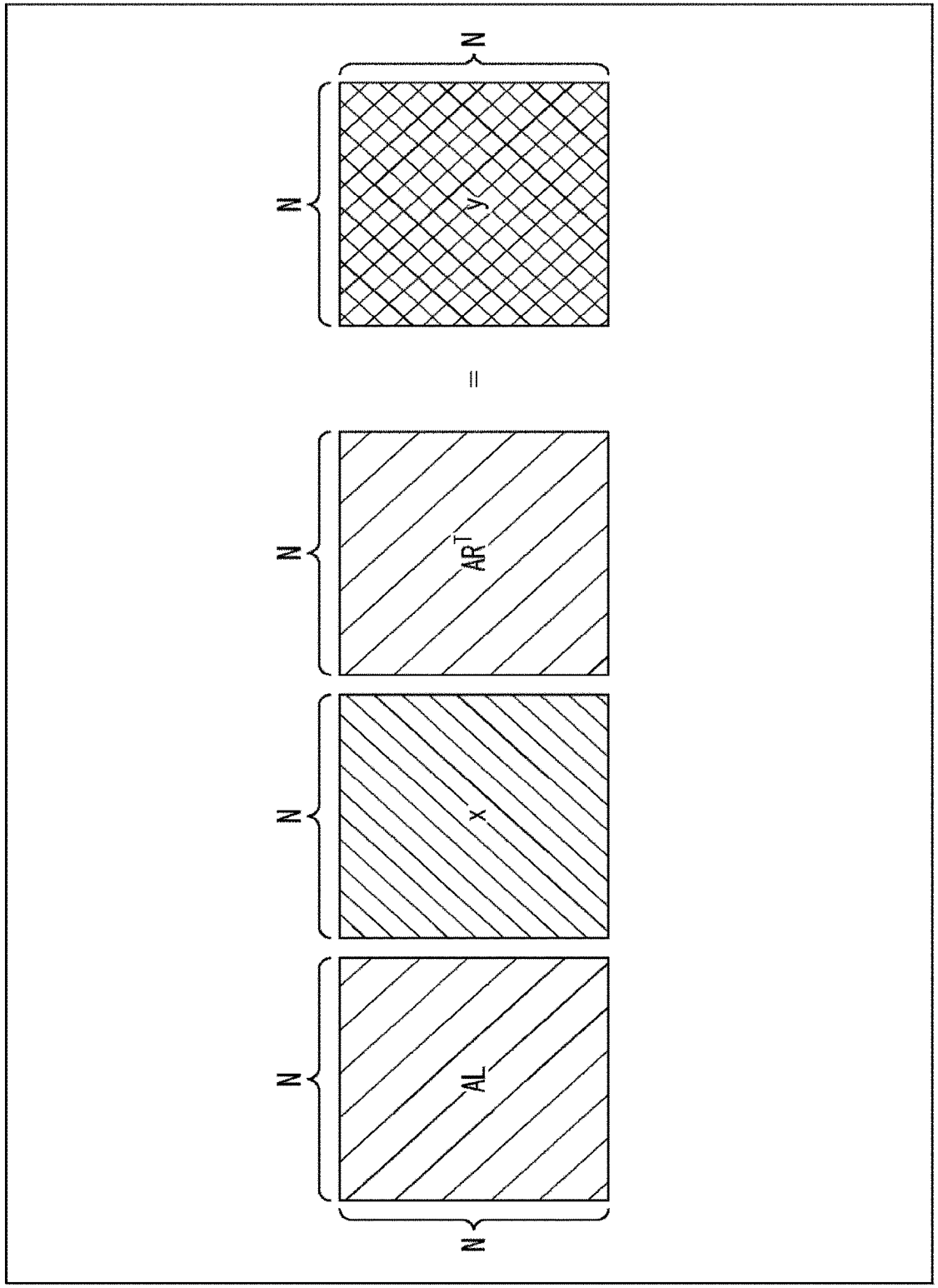
FIG. 42 is a diagram for describing a reason for reducing a calculation amount and a memory capacity by providing a rule for a light-shielding region in each of horizontal direction and vertical direction.

Therefore, for example, as illustrated in FIG. 42, consider a case in which the matrix A is decomposed into an N-row×N-column matrix AL and an N-row×N-column matrix $AR^T$, and a result obtained by multiplying the N-row×N-column matrix x representing the restoration image by the respective matrices from a front stage and a rear stage becomes an N-row×N-column matrix y representing the detection image. As a result, for the matrix A with the number of elements (N×N)×(N×N), the matrices AL and $AR^T$ with the number of elements is (N×N) are obtained, so the number of elements can be reduced to 1/(N×N). As a result, it is only necessary to use the two matrices AL and $AR^T$ having the number of elements (N×N). Therefore, the calculation amount and the memory capacity can be reduced.

Here, $A^T$ is a transposed matrix of the matrix A, γ represents a parameter, and I represents an identity matrix. The determinant illustrated in FIG. 42 is implemented by setting the matrix AL for the matrix in the bracket in the equation (8) and setting the matrix $AR^T$ for the inverse matrix of the transposed matrix of the matrix A.

Figure 43:
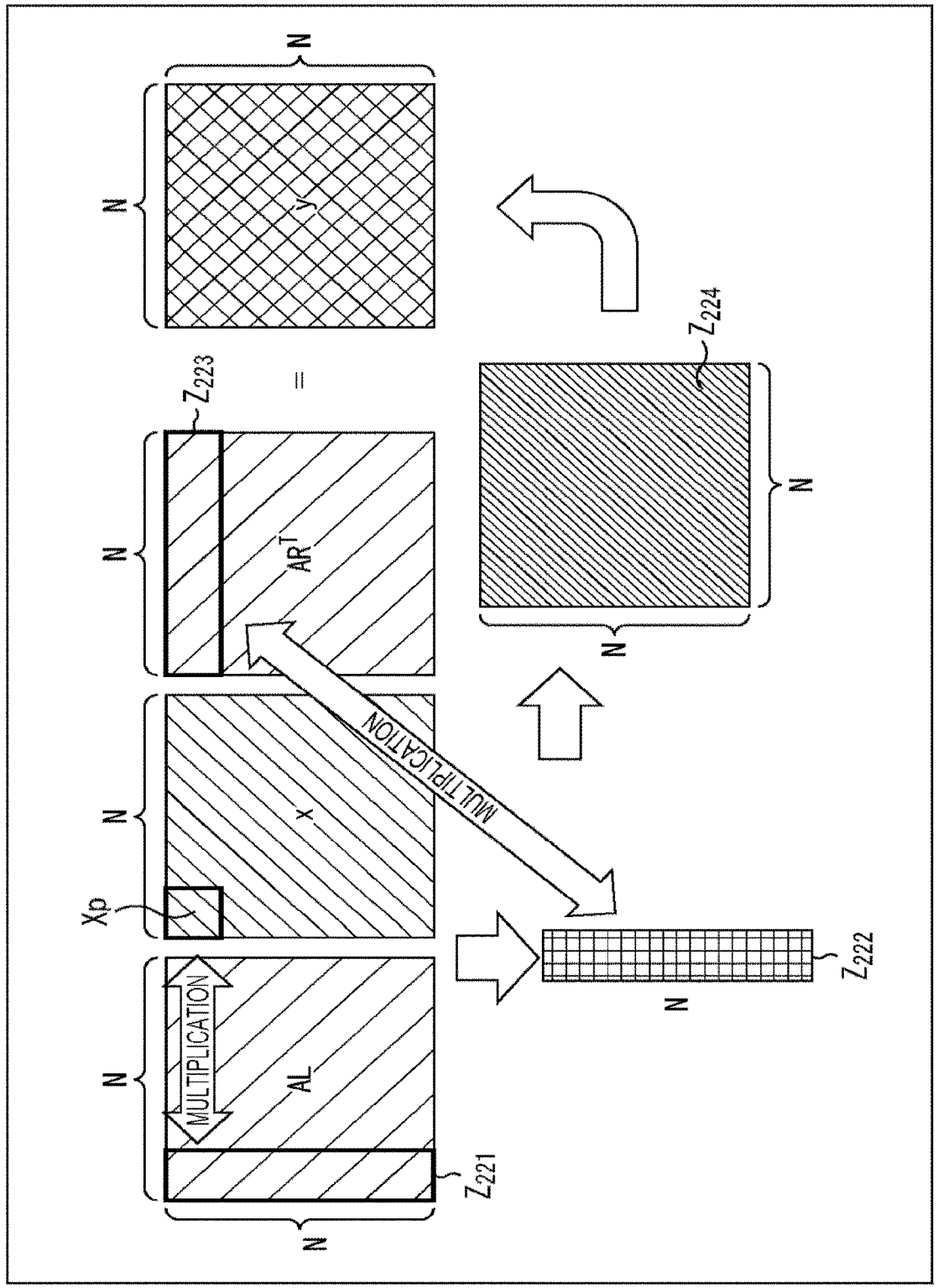
FIG. 43 is a diagram for describing a reason for reducing a calculation amount and a memory capacity by providing a rule for a light-shielding region in each of horizontal direction and vertical direction.

In the calculation illustrated in FIG. 42, an element group Z222 is obtained by multiplying an element of interest Xp in the matrix x by each element group Z221 in the column corresponding to the matrix AL, as illustrated in FIG. 43. Furthermore, a two-dimensional response Z224 corresponding to the element of interest Xp is obtained by multiplying the element group Z222 and the element of the row corresponding to the element of interest Xp of the matrix $AR^T$. Then, the matrix y is obtained by accumulating the two-dimensional responses Z224 corresponding to all the elements of the matrix x.

Therefore, the element group Z221 corresponding to each row of the matrix AL has a coefficient set corresponding to the incident angle directivity of the horizontal band-type pixel 121a set to the same width for each column of the imaging element 121 illustrated in FIG. 18.

Similarly, the element group Z223 in each row of the matrix $AR^T$ has a coefficient set corresponding to the incident angle directivity of the vertical band-type pixel 121a set to the same height for each row of the imaging element 121 illustrated in FIG. 18.

As a result, the matrix used when generating the restoration image on the basis of the detection image can be made small. Therefore, the calculation amount is reduced, the processing speed is improved, and the power consumption related to calculation can be reduced. Furthermore, since the matrix can be made small, the capacity of the memory used for the calculation can be reduced, and the device cost can be reduced.

Note that FIG. 18 illustrates the case of changing the range (receivable range) shielded in pixel units while having the predetermined regularity in the horizontal direction and the vertical direction. In the present technology, the range (receivable range) shielded in pixel units somehow randomly set although not completely random is also regarded as a randomly set range. In other words, in the present technology, not only the case where the range (light-receivable range) shielded in pixel units is randomly set but also a somewhat random case (for example, in a case where some pixels have a range having regularity but the other range is random among all the pixels) or a case that is unlikely to have regularity to some extent (in the case of arrangement that cannot be confirmed to be arranged according to the rule described with reference to FIG. 18 among all pixels) is also regarded as random.

Although the light-shielding film has been described above, the description of this example can also be applied to the case of obtaining the incident angle directivity by selectively using a plurality of photodiodes arranged in a pixel. That is, for example, by appropriately setting a division position (size and shape of each partial region), or the position, size, shape, and the like of each photodiode, or by appropriately selecting the photodiode, incident light directivity equivalent to the incident light directivity in the case where part of change in the range shielded by the light-shielding film 121b of the pixel 121a is made regular can be implemented. By doing so, the randomness in the incident angle directivity of each pixel can be reduced and the processing load outside the imaging element 121 such as the restoration unit 124 can be reduced.

Flow of Imaging Processing

An example of a flow of imaging processing executed by the above-described imaging device 100 will be described with reference to the flowchart in FIG. 44.

When the imaging processing is started, in step S101, the read control unit 122 sets the pixel of the imaging element 121 from which the detection signal is read. The read control unit 122 sets the pixel from which the detection signal is read by, for example, selecting the above-described operation mode.

In step S102, the imaging element 121 captures an image of an object.

In step S103, the read control unit 122 reads the detection signal (detection image) obtained by the imaging in step S102 from the pixel set in step S101.

In step S104, the restoration matrix setting unit 123 sets the restoration matrix corresponding to the pixel set in step S101.

In step S105, the restoration unit 124 or the association unit 125 generates output data using the detection image read in step S103 and the restoration matrix set in step S104.

For example, the restoration unit 124 converts the detection image into the restoration image using a restoration coefficient. The restoration unit 124 uses the data of the restoration image as output data. Furthermore, for example, the association unit 125 associates the data of the detection image with the data of the restoration coefficient to generate output data.

In step S106, the output data is output. This output includes any technique. For example, this output may include displaying an image, outputting and printing the data to another device, storing the data in a storage medium, transmitting the data to a communication partner, recording the data in the recording medium 116, and the like.

First, the case of outputting the raw image (which may be the restoration image after the demosaic processing) will be described. For example, in the case where the output is "display", the restoration unit 124 supplies the raw image data and the like to the output unit 112. The output unit 112 displays the raw image on an image display device (for example, a liquid crystal display (LCD)) or projects the raw image from a projector. Furthermore, for example, in the case where the output is "output", the restoration unit 124 supplies the raw image data and the like to the output unit 112. The output unit 112 outputs the raw image data and the like from an external output terminal to another device. Moreover, for example, in the case where the output is "storage", the restoration unit 124 supplies the raw image data and the like to the storage unit 113. The storage unit 113 stores the raw image data and the like in its own storage medium. Furthermore, for example, in the case where the output is "transmission", the restoration unit 124 supplies the raw image data and the like to the communication unit 114. The communication unit 114 communicates with another device using a predetermined communication method, and transmits the raw image data and the like to the communication partner. Moreover, for example, in the case where the output is "recording", the restoration unit 124 supplies the raw image data and the like to the recording/reproduction unit 115. The recording/reproduction unit 115 records the raw image data and the like on the recording medium 116 mounted thereon.

Next, a case of outputting the data of the detection image and the image restoration coefficient and the like associated with each other will be described. For example, in the case where the output is "display", the association unit 125 supplies the data of the detection image and the image restoration coefficient and the like associated with each other to the output unit 112. The output unit 112 displays information such as images and characters regarding the data of the detection image and the image restoration coefficient and the like on an image display device (for example, a liquid crystal display (LCD)) or projects the information from a projector. Furthermore, for example, in the case where the output is "output", the association unit 125 supplies the data of the detection image and the image restoration coefficient and the like associated with each other to the output unit 112. The output unit 112 outputs the data of the detection image and the image restoration coefficient and the like associated with each other from an external output terminal to another device. Moreover, for example, in the case where the output is "storage", the association unit 125 supplies the data of the detection image and the image restoration coefficient and the like associated with each other to the storage unit 113. The storage unit 113 stores the data of the detection image and the image restoration coefficient and the like associated with each other in a storage medium of the storage unit 113. Furthermore, for example, in the case where the output is "transmission", the association unit 125 supplies the data of the detection image and the image restoration coefficient and the like associated with each other to the communication unit 114. The communication unit 114 communicates with another device using a predetermined communication method, and transmits the data of the detection image and the image restoration coefficient and the like associated with each other to the communication partner. Moreover, for example, in the case where the output is "recording", the association unit 125 supplies the data of the detection image and the image restoration coefficient and the like associated with each other to the recording/reproduction unit 115. The recording/reproduction unit 115 records the data of the detection image and the image restoration coefficient and the like associated with each other in the recording medium 116 mounted to the recording/reproduction unit 115.

When the output data is output, the imaging processing is terminated. By performing the imaging processing as described above, the resolution of the detection image can be controlled.

Color Image

Figure 45:
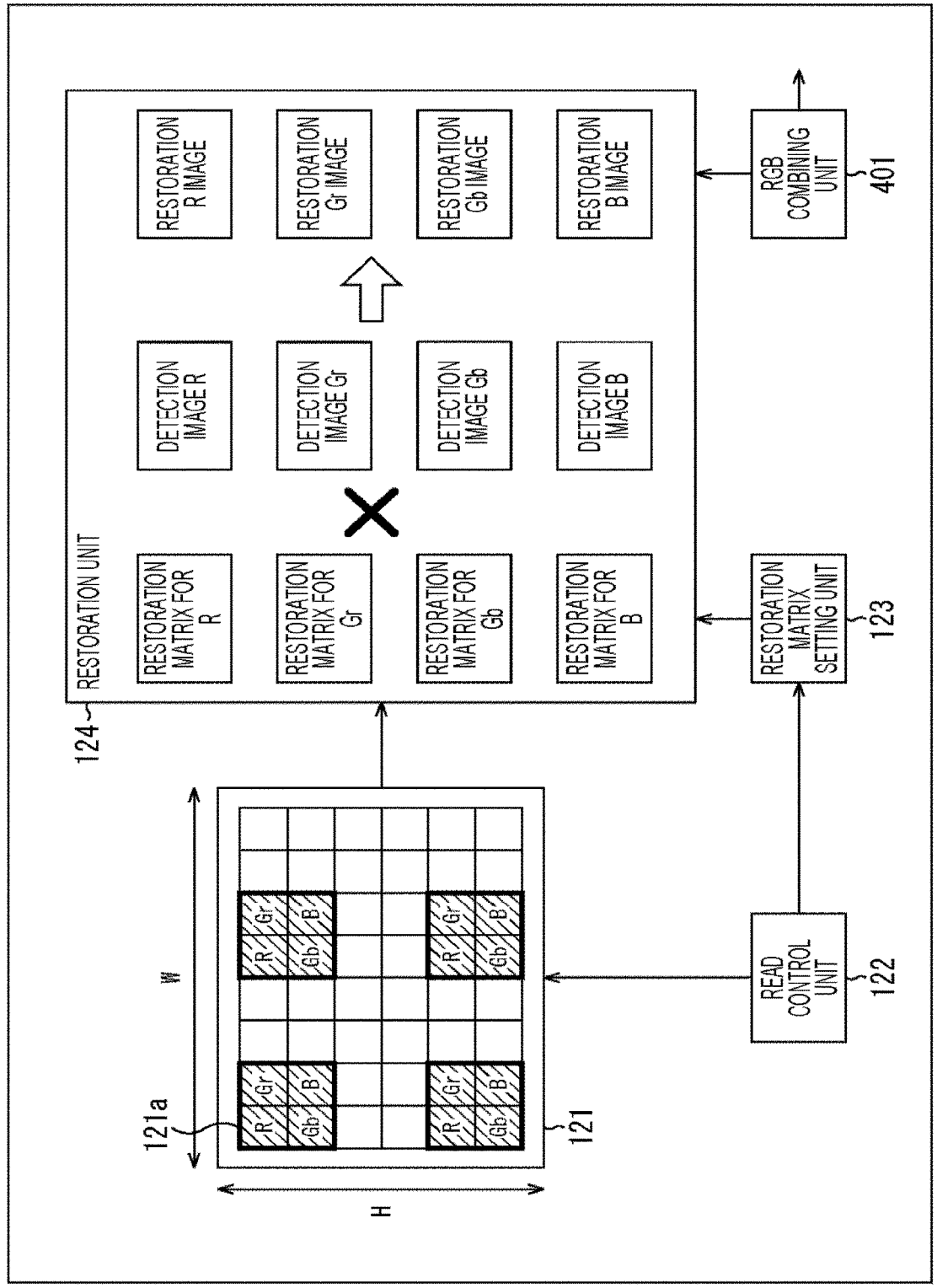
FIG. 45 is a diagram for describing an outline of a reading method in a case of a color image.

The present technology can also be applied to color images. In that case, as illustrated in FIG. 45, similar processing to the above-described case is simply performed for each color component. That is, the detection image is read for each color component and the restoration matrix is calculated for each color component, and the restoration image is generated using the detection image and the restoration matrix, for each color component. In that case, for example, an RGB combining unit 401 may be provided, and the restoration images of the color components may be combined by the RGB combining unit 401 to obtain a color restoration image.

2. First Embodiment

Next, a first embodiment of the present technology will be described with reference to FIGS. 46 to 61.

Restoration processing of converting a detection image into a restoration image using a restoration matrix requires a large calculation amount and a large required memory capacity when similar restoration processing is performed for all the detection images even if the processing described above with reference to FIG. 42 is performed. Therefore, if the processing capability of an imaging device 100 is insufficient, an operation of the imaging device 100 may become heavy, the restoration processing may take a lot of time, or the restoration processing may fail, for example.

The first embodiment is to selectively perform restoration processing using setting information, thereby reducing a load in arithmetic processing. Furthermore, the restoration processing is performed by a server (an external information processing device), and processing from capturing an image of an object to generating a restoration image is distributed, thereby reducing processing of a client having an imaging element 121.

Configuration Example of Information Processing System 501

Figure 46:
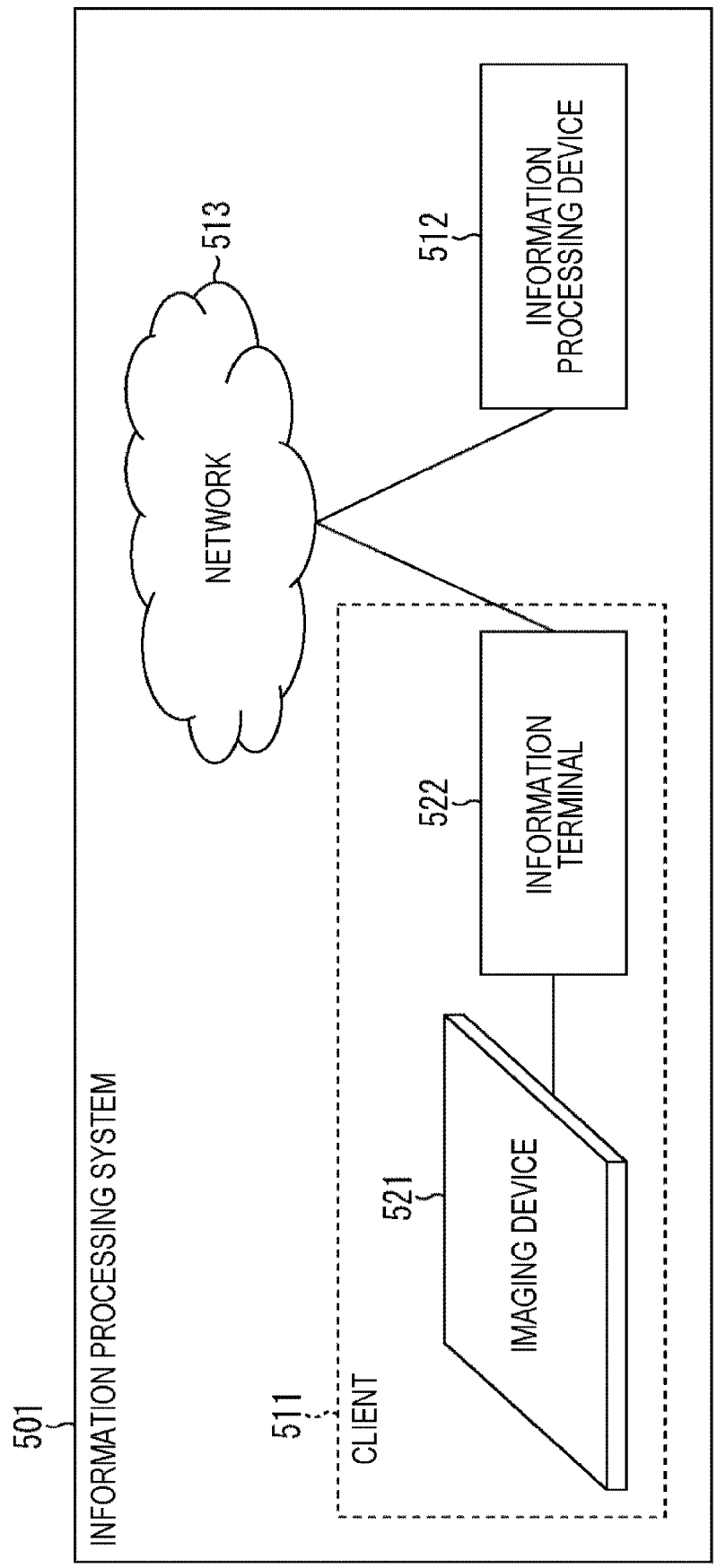
FIG. 46 is a block diagram illustrating a configuration example of an information processing system.

FIG. 46 is a block diagram illustrating a configuration example of an information processing system 501 according to the first embodiment of the present technology.

The information processing system 501 includes a client 511, an information processing device 512, and a network 513. The client 511 includes an imaging device 521 and an information terminal 522. The information terminal 522 and the information processing device 512 are connected via the network 513 and communicate with each other.

The imaging device 521 includes an above-described imaging element 121. The imaging device 521 supplies data of a detection image obtained by the imaging element 121 to the information terminal 522.

The information terminal 522 includes, for example, an information processing device such as a smartphone, a personal computer (PC), or a tablet PC. For example, the information terminal 522 transmits input information including the data of the detection image to the information processing device 512 via the network 513. Furthermore, the information terminal 522 receives output information including data of the restoration image restored using the detection image from the information processing device 512 via the network 513, and performs various types of processing using the restoration image.

The information processing device 512 includes, for example, a server used for cloud computing or the like. For example, the information processing device 512 converts the detection image included in the input information received from the information terminal 522 into the restoration image. The information processing device 512 transmits the output information including the data of the restoration image to the information terminal 522 via the network 513.

Furthermore, the information processing device 512 performs various types of processing using the restoration image. For example, the information processing device 512 recognizes a gesture of a user who uses the client 511 on the basis of the restoration image and transmits gesture recognition information including a recognition result to the information terminal 522 via the network 513.

The network 513 is a communication network capable of data communication, and is, for example, the Internet. Note that the network 513 may be configured by a network other than the Internet such as a local area network (LAN) or a controller area network (CAN), or may be configured by combining a plurality of types of networks.

Note that the information terminal 522 and the information processing device 512 do not necessarily need to communicate via the network, and may directly communicate, for example. Furthermore, the information terminal 522 may include the function of the information processing device 512.

Configuration Example of Imaging Device 521

Figure 47:
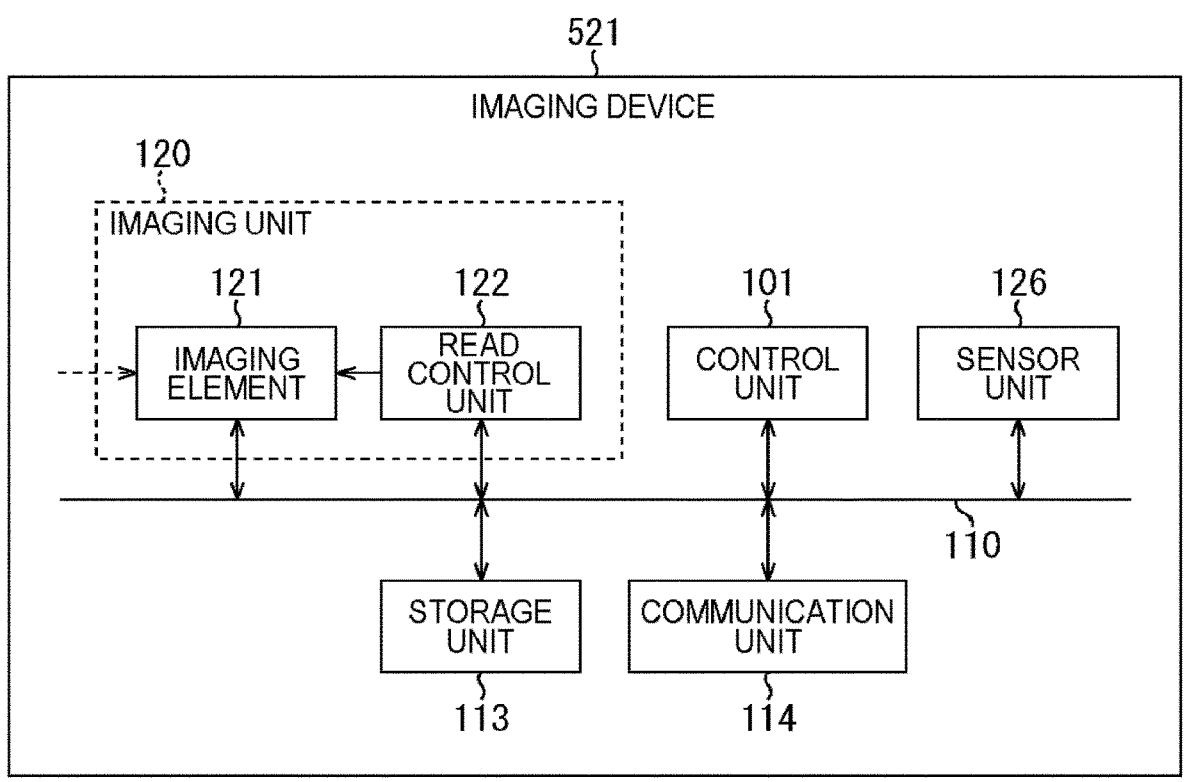
FIG. 47 is a block diagram illustrating a configuration example of the imaging device.

FIG. 47 illustrates a configuration example of the imaging device 521 in FIG. 46. Note that, in FIG. 47, a portion corresponding to the imaging device 100 in FIG. 1 is denoted by the same reference numeral, and description thereof is appropriately omitted.

The imaging device 521 has a configuration in which the input unit 111, the output unit 112, the communication unit 114, the recording/reproduction unit 115, the recording medium 116, the restoration matrix setting unit 123, the restoration unit 124, and the association unit 125 are omitted from the imaging device 100 in FIG. 1.

The imaging device 521 captures an image of an object, using the imaging element 121, under the control of the information terminal 522, and supplies the data of the obtained detection image to the information terminal 522 via the communication unit 114.

Note that, for simplifying the description, a bus 110 in a case where each unit of the imaging device 521 transmits or receives data via the bus 110 is omitted.

Configuration Example of Information Terminal 522

Figure 48:
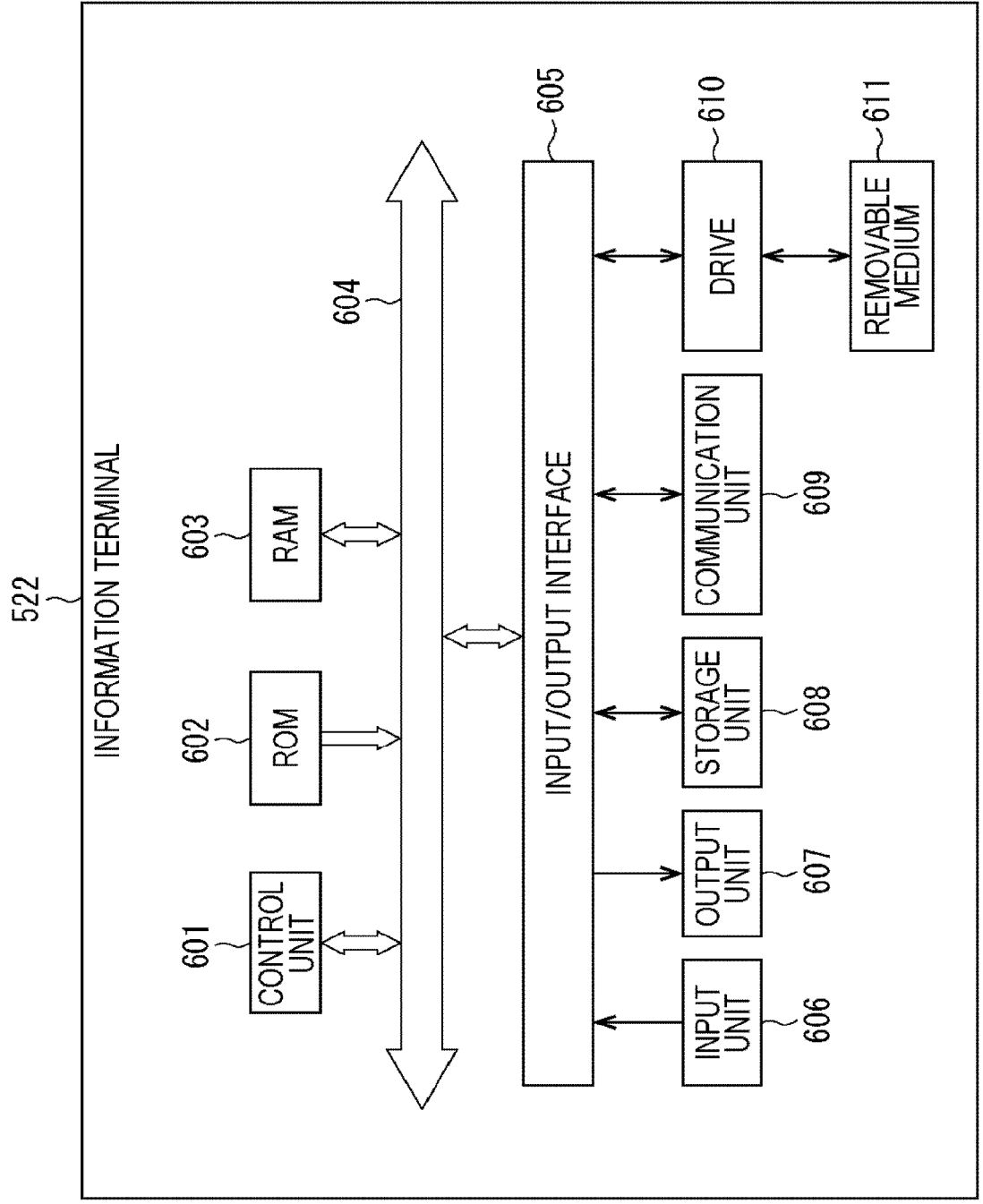
FIG. 48 is a block diagram illustrating a configuration example of an information terminal.

FIG. 48 illustrates a configuration example of the information terminal 522 in FIG. 46.

The information terminal 522 includes a control unit 601, a ROM 602, a RAM 603, an input unit 606, an output unit 607, a storage unit 608, a communication unit 609, and a drive 610. The control unit 601, the ROM 602, and the RAM 603 are connected to one another by a bus 604. The input unit 606, the output unit 607, the storage unit 608, the communication unit 609, and the drive 610 are connected to an input/output interface 605. The input/output interface 605 is also connected to the bus 604.

The control unit 601 includes, for example, one or more types of devices that perform the arithmetic processing, such as a CPU, a graphics processing unit (GPU), and a field programmable gate array (FPGA). The control unit 601 performs processing regarding control of each unit in the information terminal 522 and the imaging device 521.

The ROM 602 stores information (programs, commands, data, and the like) used for the processing of the information terminal 522, for example.

The RAM 603 temporarily stores information (programs, commands, data, and the like) used for the processing of the information terminal 522.

The input unit 606 has, for example, a similar configuration to the input unit 111 of the imaging device 100 in FIG. 1 and performs similar processing.

The output unit 607 has, for example, a similar configuration to the output unit 112 of the imaging device 100 in FIG. 1 and performs similar processing.

The storage unit 608 has, for example, a similar configuration to the storage unit 113 of the imaging device 100 in FIG. 1 and performs similar processing.

The communication unit 609 has, for example, a similar configuration to the communication unit 114 of the imaging device 100 in FIG. 1 and performs similar processing.

The drive 610 drives a removable medium 611.

The removable medium 611 includes, for example, a magnetic disk, an optical disk, a magneto-optical disk, a semiconductor memory, or the like.

Note that, in the information terminal 522, for example, the control unit 601 loads a program stored in the storage unit 608 into the RAM 603 and executes the program via the input/output interface 605 and the bus 604, thereby performing a series of processing.

The program to be executed by the information terminal 522 (control unit 601) can be recorded on the removable medium 611 as a package medium and the like, for example, and provided. For example, the program is read from the removable medium 611 by mounting the removable medium 611 in the drive 610, and is installed in the storage unit 608 via the input/output interface 605.

Furthermore, the program can be provided via a wired or wireless transmission medium such as a local area network, the Internet, or digital satellite broadcasting. For example, the program is received by the communication unit 609 via a wired or wireless transmission medium and installed in the storage unit 608.

Moreover, other than the above method, the program can be installed in the ROM 602 or the storage unit 608 in advance.

Note that, hereinafter, the description of the bus 604 and the input/output interface 605 in a case where each unit of the information terminal 522 performs data transmission/reception and the like via at least one of the bus 604 or the input/output interface 605 is omitted. For example, in the case where the input unit 606 supplies data to the control unit 601 via the input/output interface 605 and the bus 604, it is described that the input unit 606 supplies data to the control unit 601.

Configuration Example of Information Processing Unit 631

Figure 49:
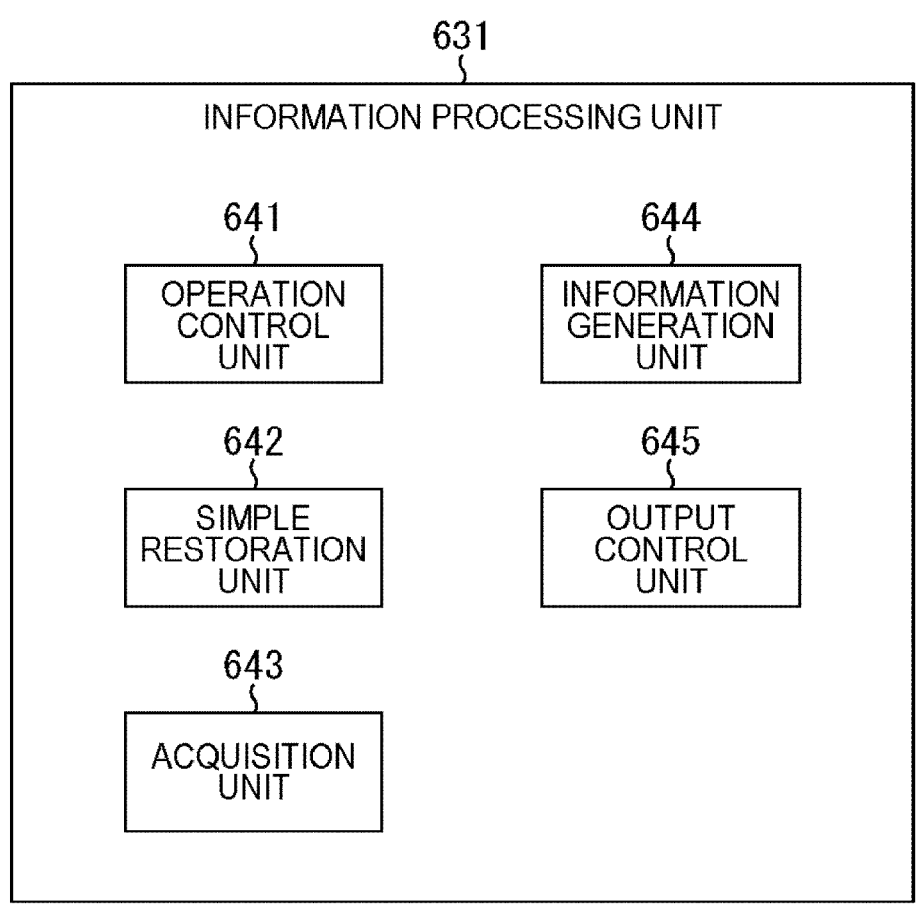
FIG. 49 is a block diagram illustrating a configuration example of an information processing unit implemented by the information terminal.

FIG. 49 illustrates a functional configuration example of an information processing unit 631 implemented when the control unit 601 of the information terminal 522 executes a predetermined control program.

The information processing unit 631 includes an operation control unit 641, a simple restoration unit 642, an acquisition unit 643, an information generation unit 644, and an output control unit 645.

The operation control unit 641 controls the operation of each unit of the information terminal 522 and the imaging device 521.

The simple restoration unit 642 performs simple restoration processing for simply restoring the restoration image using the detection image supplied from the imaging device 521. Note that, hereinafter, the restoration image restored by the simple restoration processing is referred to as a simple restoration image.

The acquisition unit 643 acquires various types of information via the input unit 606, the communication unit 609, and the like. For example, the acquisition unit 643 acquires various types of information from the imaging device 521 or the information processing device 512 via the communication unit 609.

The information generation unit 644 generates various types of information to be supplied to the imaging device 521, the information processing device 512, and the like.

The output control unit 645 controls an output of various types of information from the output unit 607, the communication unit 609, and the like. For example, the output control unit 645 controls the output of various types of information from the output unit 607. Furthermore, for example, the output control unit 645 controls the output of various types of information to the imaging device 521 or the information processing device 512 via the communication unit 609.

Configuration Example of Information Processing Device 512

Figure 50:
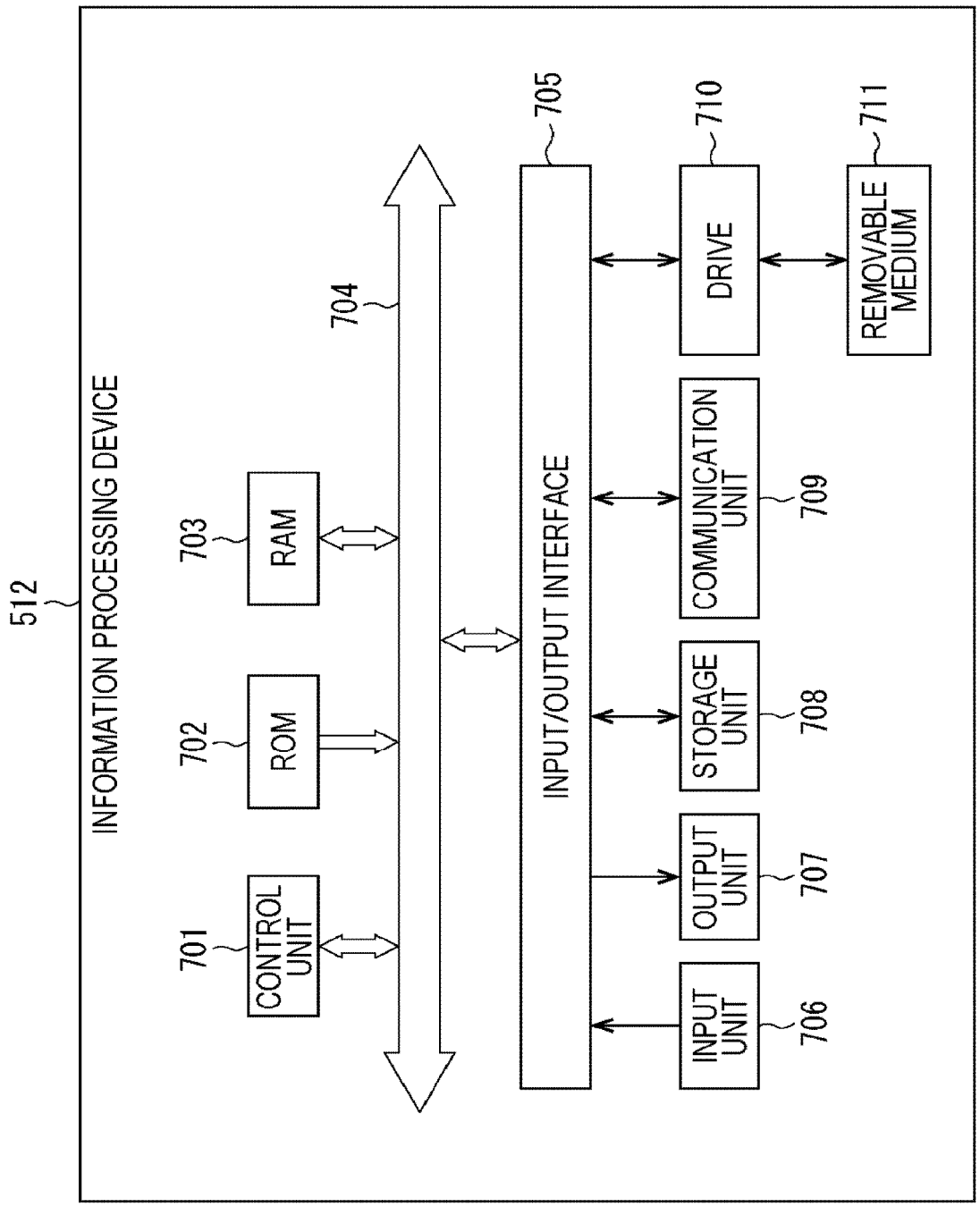
FIG. 50 is a block diagram illustrating a configuration example of an information processing device.

FIG. 50 illustrates a configuration example of the information processing device 512 in FIG. 46.

The information processing device 512 includes a control unit 701, a ROM 702, a RAM 703, an input unit 706, an output unit 707, a storage unit 708, a communication unit 709, and a drive 710. The control unit 701, the ROM 702, and the RAM 703 are connected to one another by a bus 704. The input unit 706, the output unit 707, the storage unit 708, the communication unit 709, and the drive 710 are connected to an input/output interface 705. An input/output interface 705 is also connected to the bus 704.

The control unit 701 includes, for example, one or more types of devices that perform the arithmetic processing, such as a CPU, a GPU, and an FPGA. The control unit 701 controls each unit of the information processing device 512.

The ROM 702 stores information (programs, commands, data, and the like) used for the processing of the information processing device 512, for example.

The RAM 703 temporarily stores information (programs, commands, data, and the like) used for the processing of the information processing device 512.

The input unit 706 has, for example, a similar configuration to the input unit 111 of the imaging device 100 in FIG. 1 and performs similar processing.

The output unit 707 has, for example, a similar configuration to the output unit 112 of the imaging device 100 in FIG. 1 and performs similar processing.

The storage unit 708 has, for example, a similar configuration to the storage unit 113 of the imaging device 100 in FIG. 1 and performs similar processing.

The communication unit 709 has, for example, a similar configuration to the communication unit 114 of the imaging device 100 in FIG. 1 and performs similar processing.

The drive 710 drives a removable medium 711.

The removable medium 711 includes, for example, a magnetic disk, an optical disk, a magneto-optical disk, a semiconductor memory, or the like.

Note that, in the information processing device 512, the control unit 701 loads a program stored in the storage unit 708 into the RAM 703, for example, and executes the program via the input/output interface 705 and the bus 704, thereby performing a series of processing.

The program to be executed by the information processing device 512 (control unit 701) can be recorded on the removable medium 711 as a package medium and the like, for example, and provided. For example, the program is read from the removable medium 711 by mounting the removable medium 711 in the drive 710, and is installed in the storage unit 708 via the input/output interface 705.

Furthermore, the program can be provided via a wired or wireless transmission medium such as a local area network, the Internet, or digital satellite broadcasting. For example, the program is received by the communication unit 709 via a wired or wireless transmission medium and installed in the storage unit 708.

Moreover, other than the above method, the program can be installed in the ROM 702 or the storage unit 708 in advance.

Note that, hereinafter, the description of the bus 704 and the input/output interface 705 in a case where each unit of the information processing device 512 performs data transmission/reception and the like via at least one of the bus 704 or the input/output interface 705 is omitted. For example, in the case where the input unit 706 supplies data to the control unit 701 via the input/output interface 705 and the bus 704, it is described that the input unit 706 supplies data to the control unit 701.

Functional Configuration Example of Information Processing Unit 731

Figure 51:
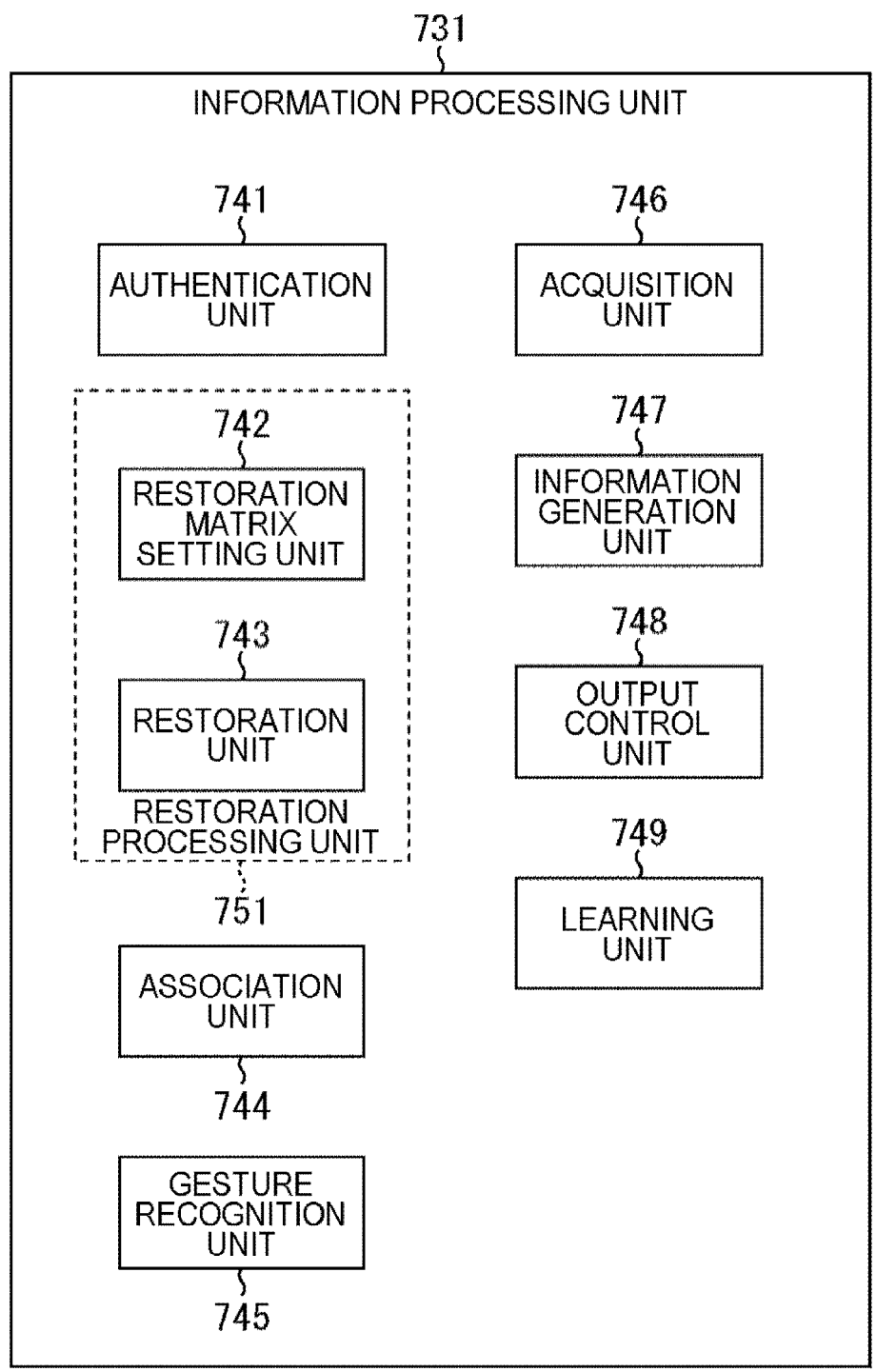
FIG. 51 is a block diagram illustrating a configuration example of an information processing unit implemented by the information processing device.

FIG. 51 illustrates a functional configuration example of an information processing unit 731 implemented when the control unit 701 of the information processing device 512 executes a predetermined control program.

The information processing unit 731 includes an authentication unit 741, a restoration matrix setting unit 742, a restoration unit 743, an association unit 744, a gesture recognition unit 745, an acquisition unit 746, an information generation unit 747, an output control unit 748, and a learning unit 749.

The authentication unit 741 performs authentication processing for the information terminal 522 (or the user of the information terminal 522).

The restoration matrix setting unit 742 performs processing regarding setting of a restoration matrix, similarly to the restoration matrix setting unit 123 in FIG. 1.

The restoration unit 743 performs processing regarding generation of a restoration image, similarly to the restoration unit 124 in FIG. 1.

Note that the restoration matrix setting unit 742 and the restoration unit 743 form a restoration processing unit 751 that performs image restoration processing.

The association unit 744 performs processing regarding data association, similarly to the association unit 125 in FIG. 1.

The gesture recognition unit 745 performs processing of recognizing the user's gesture on the basis of the restoration image.

The acquisition unit 746 acquires various types of information via the input unit 706, the communication unit 709, and the like. For example, the acquisition unit 746 acquires various types of information from the information terminal 522 via the communication unit 709.

The information generation unit 747 generates various types of information to be supplied to the information terminal 522 and the like.

The output control unit 748 controls an output of various types of information from the output unit 707, the communication unit 709, and the like. For example, the output control unit 748 controls the output of various types of information from the output unit 707. Furthermore, for example, the output control unit 748 controls the output of the various types of information to the information terminal 522 via the communication unit 709.

The learning unit 749 performs machine learning regarding various types of processing of the information processing system 501.

Process of Information Processing System 501

Next, the processing of the information processing system 501 will be described with reference to FIGS. 52 to 61.

Imaging Processing

First, the imaging processing executed by the client 511 will be described with reference to the flowchart in FIG. 52 and the sequence diagram in FIG. 53.

Note that this processing is started when the information terminal 522 is powered on and is terminated when the information terminal 522 is powered off, for example.

Figure 54:
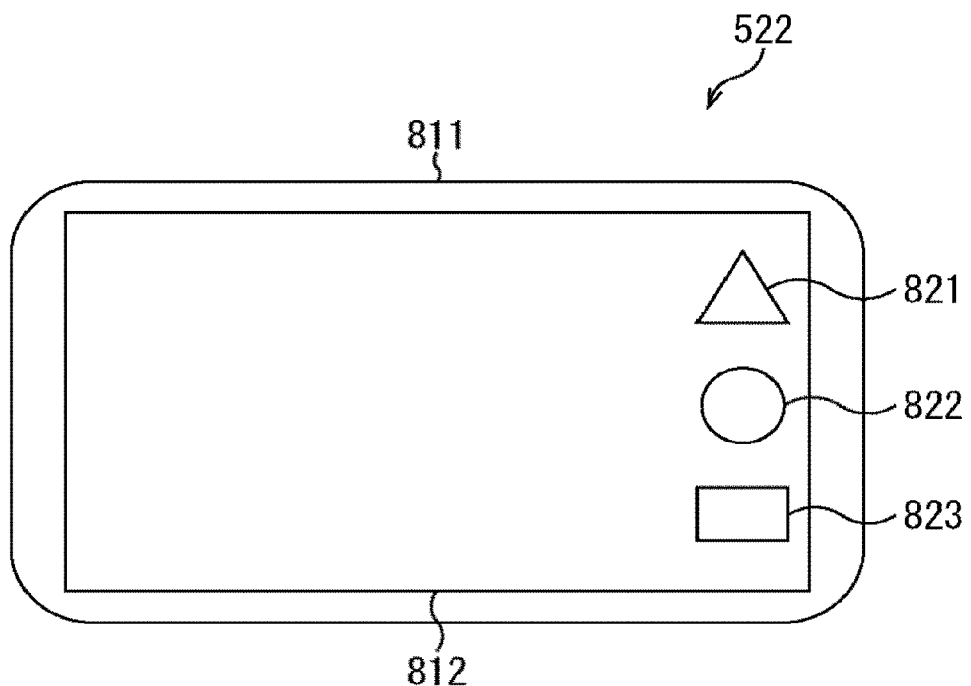
FIG. 54 is a diagram illustrating an example of the information terminal.

Furthermore, hereinafter, description will be given appropriately taking a case in which the information terminal 522 is a smartphone, as illustrated in FIG. 54, as an example. Note that FIG. 54 illustrates only a housing 811 and a display 812 of the information terminal 522. Furthermore, an example in which a setting icon 821, an imaging icon 822, and a selection icon 823 are displayed on the display 812.

In step S201, the operation control unit 641 determines whether or not to set an imaging mode. This determination processing is repeatedly executed until the mode is determined to be set to the imaging mode, and the processing proceeds to step S202 in the case where the mode is determined to be set to the imaging mode.

For example, in the case of setting the information terminal 522 in the imaging mode, the user touches the imaging icon 822 displayed on the display 812 in FIG. 54. When the operation control unit 641 is notified by the input unit 606 that the imaging icon 822 is touched, the operation control unit 641 determines to set the imaging mode, and the processing proceeds to step S202.

In step S202, the operation control unit 641 sets the imaging mode for the information terminal 522.

In step S203, the information terminal 522 acquires setting information.

For example, in a case where the user inputs the setting information, the user touches the setting icon 821 displayed on the display 812 in FIG. 54. When the operation control unit 641 is notified by the input unit 606 that the setting icon 821 is touched, the operation control unit 641 sets the information terminal 522 to a setting mode.

When the information terminal 522 is set to the setting mode, the output control unit 645 causes the display 812 to display a setting screen. The user inputs various types of setting information according to the setting screen.

Note that the content and a setting range of the setting information and the like may differ depending on a predetermined condition, may differ depending on, for example, a service plan contracted by the information terminal 522 (or the user). Here, specific examples of the service plan will be described with reference to FIGS. 55 and 56.

FIG. 55 illustrates two types of service plans: free plan and plan A. The service plan defines the content of items of "authentication", "type", "region designation function", "recognition function", and "restoration processing".

The "authentication" is an item indicating whether or not authentication of the information terminal 522 (or the user) is required to use the service. In the "authentication", "necessary" or "unnecessary" is set. In a service plan that requires authentication of the information terminal 522 to use the service, the "authentication" is set to the "necessary". In a service plan that does not require authentication of the information terminal 522 to use the service, the "authentication" is set to the "unnecessary".

The "image type" is an item indicating a type of a restorable image. For the "image type", for example, "normal image", "fisheye image", or "360-degree image" is set. A normal image is, for example, an image with an angle of view that is less than a predetermined threshold value (for example, 100 degrees). A fish-eye image is, for example, an image with an angle of view that is a predetermined threshold value (for example, 100 degrees) or more. A 360-degree image is also referred to as a spherical image, and is an image captured in 360 degrees in at least one of a horizontal direction or a vertical direction.

The "region designation function" is an item indicating presence or absence of a function to designate a region of an image to be restored. In the "region designation function", either "present" or "absent" is set. In a service plan in which the region designation function is available, the "region designation function" is set to the "present". In the service plan in which the region designation function is not available, the "region designation function" is set to "absent".

The "recognition function" is an item indicating presence or absence of a function to perform object recognition processing and focus a specified object (hereinafter referred to as focus target). In the "recognition function", "present" or "absent" is set. In a service plan in which the recognition function is available, the "recognition function" is set to the "present". In a service plan in which the recognition function is not available, the "recognition function" is set to the "absent".

The "restoration processing" is an item indicating a calculation model for the restoration processing. In the "restoration processing", for example, "calculation model A", "region designation+calculation model A", "calculation model B", or "region designation+calculation model B" is set. The calculation model A is a calculation model that does not support the recognition function, and the calculation model B is a model that supports the recognition function. The "region designation+calculation model A" indicates that a region designated using the calculation model A is restored. The "region designation+calculation model B" indicates that a region designated using the calculation model B is restored.

The free plan is a plan that can be used without authentication of the information terminal 522. With the free plan, normal images can be restored, and the region designation function and the recognition function are not available.

The plan A is a plan that requires authentication of the information terminal 522. In the plan A, normal images can be restored, and the recognition function is available but the region designation function is not available.

In the example in FIG. 56, plan B to plan E are added in addition to the free plan and the plan A.

The plan B is a plan that requires authentication of the information terminal 522. In the plan B, normal images can be restored, and the region designation function is available but the recognition function is not available.

The plan C is a plan that requires authentication of the information terminal 522. With the plan C, normal images can be restored, and the region designation function and the recognition function are available.

The plan D is a plan that requires authentication of the information terminal 522. In the plan D, normal images, fisheye images, and 360-degree images can be restored, and the recognition function is available but the region designation function is not available.

The plan E is a plan that requires authentication of the information terminal 522. In the plan E, normal images, fisheye images, and 360-degree images can be restored, and the recognition function and the region designation function are available.

Next, an example of the setting information will be described. The setting information is information that can be set by the user, and includes, for example, one or more of setting parameters for presence or absence of high image quality processing, object distance, focus target, angle of view, number of pixels, restoration region, and restoration timing.

The presence or absence of high image quality processing is a parameter indicating whether or not to execute high image quality processing. The high image quality processing includes, for example, processing of increasing the number of pixels of a restoration image by interpolation or the like, processing of optimizing the restoration parameter to be used for restoring an image (for example, the object distance, the regularization parameter γ of the above-described equations (7) and (8), or the like), or the like. With this parameter, for example, the image quality of the restoration image is adjusted, and as a result, the calculation amount of the restoration processing can be adjusted.

Note that the content of the high image quality processing may be changed according to the service plan. For example, the number of retries of the restoration processing may be changed according to the service plan in order to optimize the restoration parameter.

The object distance is a parameter indicating the distance from the imaging element 121 to the object to be focused.

Note that a setting interval of the object distance may be changed according to the service plan, for example.

Figure 57:
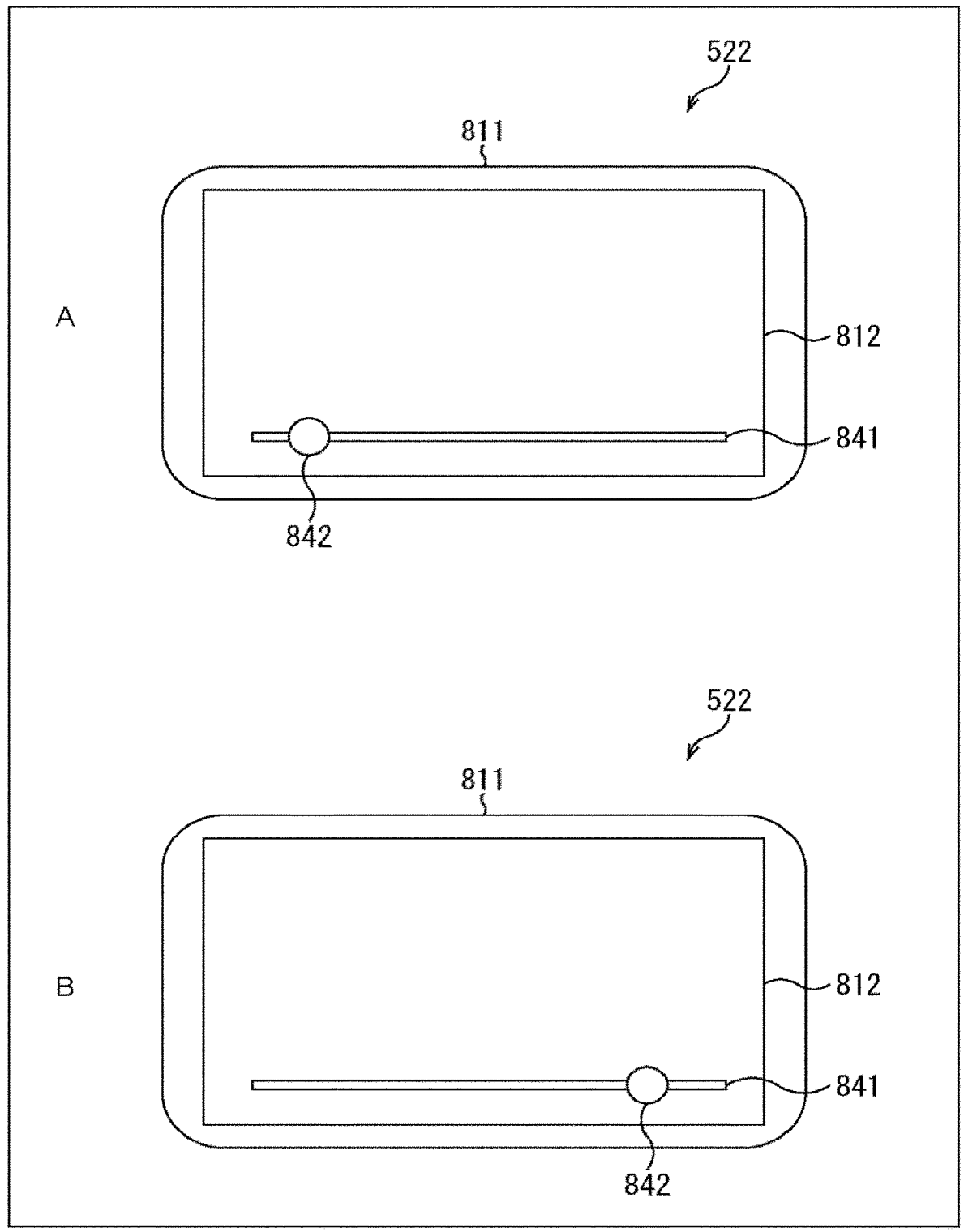
FIG. 57 is a diagram illustrating a first example of an object distance setting screen.

A and B in FIG. 57 illustrate examples of the setting screen for the object distance in the case where the service plan is one of the plan A to the plan E. Specifically, a bar 841 extending in the horizontal direction is displayed in a lower part of the display 812, and a slider 842 is displayed above the bar 841. The slider 842 can be continuously moved in the left-right direction on the bar 841, and the object distance is set by the position of the slider 842.

Note that the object distance becomes shorter as the slider 842 moves leftward, and the object distance becomes longer as the slider 842 moves rightward. Therefore, the object distance is shorter in A in FIG. 57 than B in FIG. 57.

Figure 58:
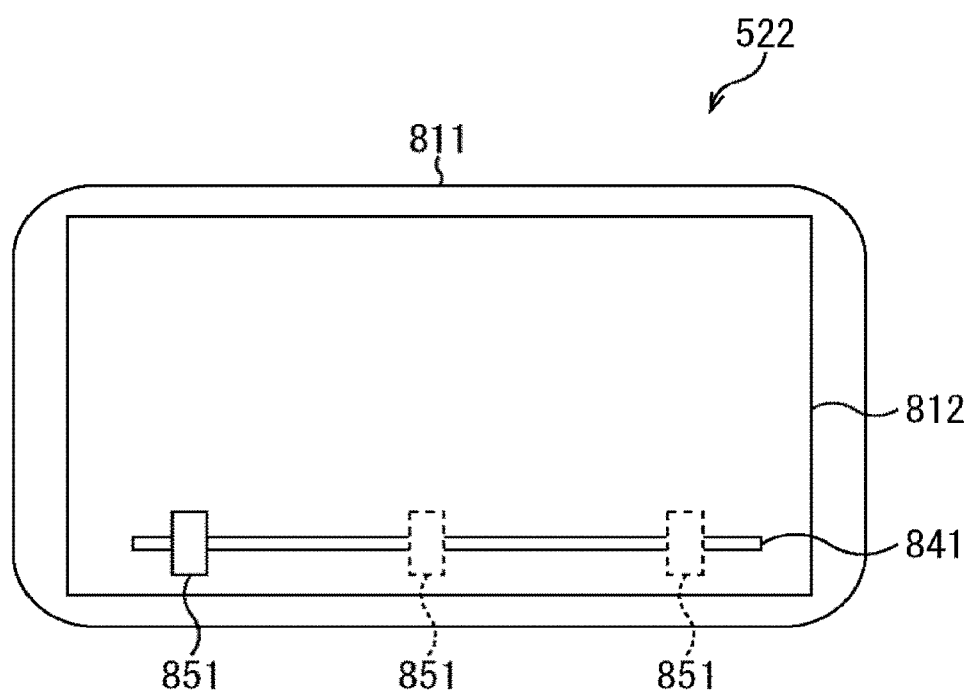
FIG. 58 is a diagram illustrating a second example of the object distance setting screen.

FIG. 58 illustrates an example of the setting screen for the object distance in the case where the service plan is the free plan. Specifically, the bar 841 extending in the horizontal direction is displayed in a lower part of the display 812, similarly to the example in FIG. 58. Furthermore, a slider 851 is displayed above the bar 841. The slider 851 can be discretely moved in the left-right direction on the bar 841, and the object distance is discretely set by the position of the slider 851.

Note that the slider 851 can be set at three positions of the solid line position and the dotted line positions in FIG. 58. The object distance becomes the shortest when the slider 851 is set to the left-end position, the object distance becomes the longest when the slider 851 is set to the right-end position, and the object distance is set to a middle distance when the slider 851 is set to the center position.

The focus target can be set in the service plan in which the recognition function is available, and is a parameter indicating a type (for example, a face of a human) of the object to be focused. With this parameter, for example, the object to be focused and to enhance the image quality in the restoration image can be selected. Note that, in the case where the focus target is set, the setting for the object distance is invalid, for example.

The angle of view can be set in a case where the imaging element 121 supports a plurality of angles of view, as described above with reference to FIGS. 10 to 12, and FIG. 17, and the like, for example, and is a parameter indicating an angle of view of the restoration image. As the angle of view, for example, one of the angles of view supported by the imaging element 121 is set.

The number of pixels is a parameter indicating the number of pixels (resolution) of the restoration image. Note that the number of pixels of the restoration image can be made larger or smaller than the number of pixels of the imaging element 121. With this parameter, for example, the resolution of the restoration image is adjusted, and as a result, the calculation amount of the restoration processing can be adjusted. Furthermore, for example, in the case where the high image quality processing is set to "present", the number of pixels may be automatically set.

The restoration region can be set in the service plan in which the region designation function is available, and is a parameter indicating the region to be restored within the imaging range of the imaging element 121. With this parameter, for example, the position and area of the region to be restored are adjusted within the imaging range, and as a result, the calculation amount of the restoration processing can be adjusted. Furthermore, in the case where the detection image is a normal image or a fisheye image, the parameter is specified according to the range of the pixels in the image, and in the case where the detection image is a 360-degree image, for example, the parameter is specified according to the range of an angle in the horizontal direction or the vertical direction of the 360-degree image.

The restoration timing is a parameter indicating the timing to perform restoration processing, and can set, for example, execution of the restoration processing only when Wi-Fi is connected, or execution of highly accurate restoration processing in a case where resources of the information terminal 522 are available. Furthermore, with this parameter, for example, a detection image to be restored and a detection image not to be restored can be selected.

The input unit 606 supplies the setting information input by the user to the acquisition unit 643. The acquisition unit 643 causes at least either the RAM 603 or the storage unit 608 to store the setting information.

Note that, for example, in a case where the previous setting information is taken over without change, the processing in step S203 can be omitted.

Furthermore, setting or change of the setting information is not necessarily performed at this timing, but can be performed at any timing. For example, the object distance, the focus target, the restoration region, and the like may be set by the user while viewing a preview display to be described below.

In step S204, the client 511 starts the imaging processing.

Figure 44:
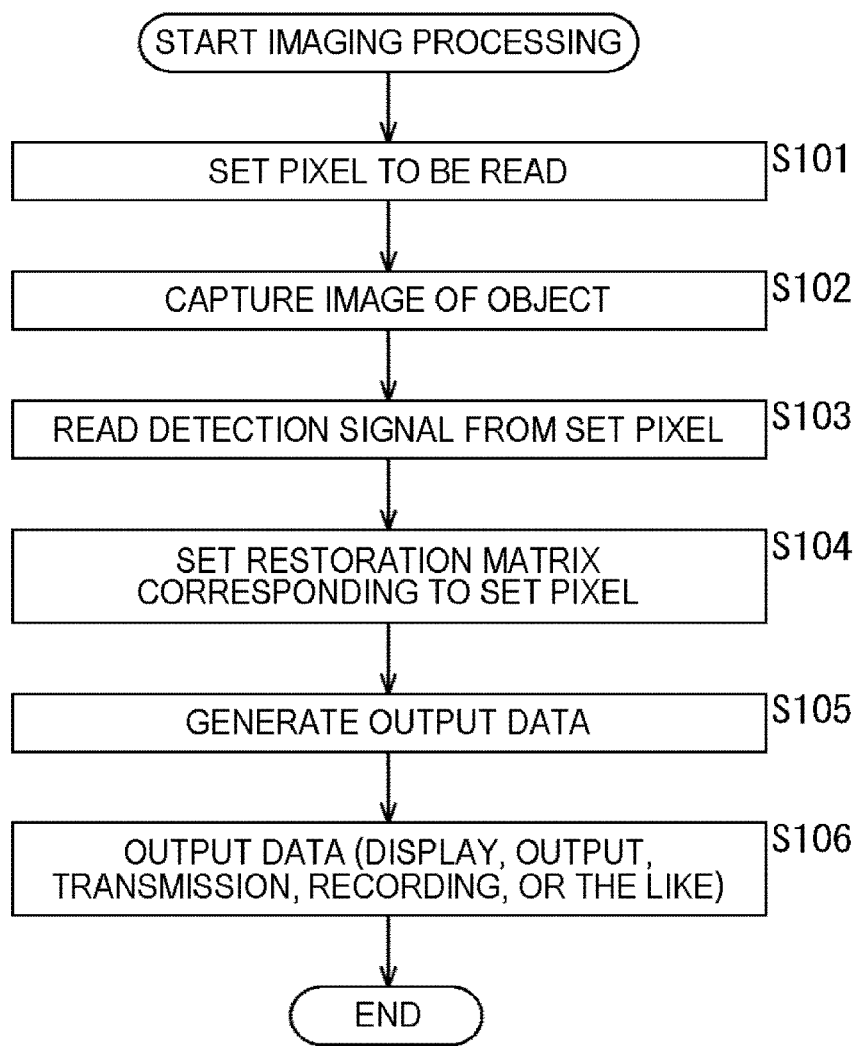
FIG. 44 is a flowchart for describing an example of a flow of imaging processing.

Specifically, the imaging device 521 starts processing similar to steps S101 to S103 in FIG. 44. Furthermore, the communication unit 114 of the imaging device 521 starts the processing of transmitting the data of the detection image to the information terminal 522.

Note that, for example, in a case where the angle of view of the restoration image is not set, the all-pixel mode is set. That is, the detection signal is read from all the pixels of the imaging element 121, and a detection image including the read detection signals is generated.

Meanwhile, for example, in a case where the angle of view of the restoration image is set, one of the pixel arbitrary thinning mode, pixel regularity thinning mode, or area drive mode is set. That is, the detection signal is read from the pixel corresponding to the set angle of view of the imaging element 121, and a detection image including the read detection signal is generated.

The acquisition unit 643 of the information terminal 522 starts processing of receiving the data of the detection image from the imaging device 521 via the communication unit 609 and causing at least either the RAM 603 or the storage unit 608 to store the data. The detection image is erased after being stored in at least either the RAM 603 the storage unit 608 for a predetermined time (for example, 1 second), for example.

In step S205, the information terminal 522 starts preview display. For example, the following processing is started.

The simple restoration unit 642 starts processing of converting the detection image into a simple restoration image using the restoration matrix. This restoration processing is simple processing so that the load on the information terminal 522 does not become heavy. For example, a predetermined pixel of the detection image is thinned out, and the restoration processing is performed with a small number of pixels.

Further, for example, the object distance and the restoration parameters such as the regularization parameter γ are fixed regardless of the content of the setting information, and the same restoration matrix is used. Therefore, the image quality of the simple restoration image is not always favorable.

The output control unit 645 starts processing of displaying a through image based on the restoration image on the display 812.

In step S206, the operation control unit 641 determines whether or not to perform terminal authentication. For example, the operation control unit 641 determines to perform the terminal authentication in a case where the user performs an operation for performing the terminal authentication via the input unit 606, and the processing proceeds to step S207. Alternatively, for example, the operation control unit 641 unconditionally determines to perform the terminal authentication in a case where the information terminal 522 (or the user) has subscribed to a service plan that requires authentication, and the processing proceeds to step S207.

In step S207, the output control unit 645 transmits authentication information of the information terminal 522 to the information processing device 512 via the communication unit 609 and the network 513. The authentication information may include at least information that can identify the information terminal 522. For example, the authentication information includes at least a terminal ID for individually identifying the information terminal 522.

The information processing device 512 receives the authentication information in step S251 in FIG. 59 to be described below, and transmits authentication result information indicating an authentication result in step S253.

In step S208, the acquisition unit 643 receives the authentication result information from the information processing device 512 via the network 513 and the communication unit 609.

Note that, in the case where a contract is made to use any one of the plan A to plan E for the information terminal 522, the contracted service plan becomes available when the authentication of the information terminal 522 is successful. On the other hand, when the authentication of the information terminal 522 fails, the contracted service plan cannot be used and only the free plan can be used and available functions are limited.

Thereafter, processing proceeds to step S209.

On the other hand, the operation control unit 641 determines not to perform the terminal authentication in step S206, and the processing in steps S207 and S208 is skipped and the processing proceeds to step S209.

In step S209, the operation control unit 641 determines whether or not an instruction for imaging has been given.

For example, in a case where the user gives an instruction for imaging, the user touches the imaging icon 822 displayed on the display 812 in FIG. 54. When the operation control unit 641 is notified by the input unit 606 that the imaging icon 822 is touched, the operation control unit 641 determines that the instruction for imaging has been given, and the processing proceeds to step S210.

Note that, at this point, the imaging processing has already been started, and the preview display using the simple restoration image based on the captured detection image is being performed. Therefore, strictly speaking, what is given for instruction in the processing in step S209 is not imaging but image restoration.

In step S210, the information generation unit 644 generates input information. The input information includes, for example, the data of the detection image and restoration information used for restoring the detection image into the restoration image. The restoration information includes the above-described setting information and terminal information.

Note that the input information includes, for example, at least the data of the detection image captured at around a time when the user has performed an imaging operation (the user has touched the imaging icon 822), for example.

Specifically, for example, the input information includes the data of the detection image captured a predetermined time before the time when the user has performed the imaging operation. Here, the detection image captured before a predetermined time is adopted because a time difference occurs from when the user recognizes appropriate imaging timing to when the user actually performs the imaging operation. The predetermined time may be a fixed value or may be set by the user, for example. Alternatively, for example, an appropriate time may be learned by machine learning.

Furthermore, the input information may include data of detection images of a plurality of frames. For example, the input information may include data of detection images captured within a predetermined period based on the time when the user has performed the imaging operation (for example, a period from 100 milliseconds before to 100 milliseconds after the user performs the imaging operation). Alternatively, the information generation unit 644 may select one or more appropriate images from the detection images captured within the predetermined period and include the data of the selected detection images in the input information. The method of selecting the detection image is learned by machine learning, for example.

Note that, in the case where the input information includes the data of the detection images of a plurality of frames, the information processing device 512 may select an image suitable for restoration from the detection images of the plurality of frames and use the selected detection image for the restoration processing, for example. The method of selecting the detection image is learned by machine learning, for example.

Here, the image suitable for restoration is, for example, an image in which an object desired by the user is captured in a favorable state. The image is, for example, an image in which a face of a person is captured with good expression (for example, with smile).

Note that, for example, in a case where the focus target is set, an image in which the focus target is captured in a favorable state is selected as the image suitable for restoration.

Furthermore, for example, in a case where the restoration region is set, an image in which an object in the restoration region is captured in a favorable state is set as the image suitable for restoration.

The terminal information includes information unique to the imaging element 121 of the information terminal 522, and includes at least information that can identify the information terminal 522 and information that can identify the type of the imaging element 121, for example. For example, the terminal information includes at least the above-described terminal ID and identification information for identifying a pattern of the incident angle directivity of the imaging element 121 (hereinafter referred to as incident angle directivity pattern).

Here, the incident angle directivity pattern of the imaging element 121 is expressed by, for example, a combination of a spatial position (for example, coordinates in a pixel array) of each pixel of the imaging element 121 and the incident angle directivity. For example, when the combinations of the spatial positions of all the pixels and the incident angle directivities are equal between two imaging elements 121, the incident angle directivity patterns of the two imaging elements 121 are considered to be the same. Meanwhile, when the combinations of the spatial positions and the incident angle directivities are different even in one pixel between two imaging elements 121, the incident angle directivity patterns of the two imaging elements 121 are considered to be different.

Furthermore, the identification information for identifying the incident angle directivity pattern of the imaging element 121 is, for example, an imaging element ID for individually identifying the imaging element 121 or a pattern ID for identifying the incident angle directivity pattern of the imaging element 121.

In step S211, the output control unit 645 transmits the input information to the information processing device 512 via the communication unit 609 and the network 513.

The information processing device 512 receives the input information in step S254 in FIG. 59 to be described below, and transmits the output information including the data of the restoration image in step S257.

In step S212, the acquisition unit 643 receives the output information via the network 513 and the communication unit 609. The acquisition unit 643 causes at least either the RAM 603 or the storage unit 608 to store the output information, as needed.

In step 213, the display 812 displays the restoration image included in the output information received from the information processing device 512 under the control of the output control unit 645.

Thereafter, processing proceeds to step S214.

Meanwhile, in the case where it is determined in step S209 that the instruction for imaging has not been given, the processing in steps S210 to S213 is skipped and the processing proceeds to step S214.

In step S214, the operation control unit 641 determines whether or not to cancel the imaging mode. The operation control unit 641 determines not to cancel the imaging mode in a case where the user has not performed an operation to cancel the imaging mode, and the processing returns to step S206.

After that, the processing of steps S206 to S214 is repeatedly executed until cancellation of the imaging mode is determined in step S214.

On the other hand, in step S214, in a case where the user has performed the operation to cancel the imaging mode via the input unit 606, the operation control unit 641 determines to cancel the imaging mode, and the processing proceeds to step S215.

In step S215, the operation control unit 641 cancels the imaging mode of the information terminal 522.

After that, the processing returns to step S201, and the processing in step S201 and the subsequent steps is executed.

Restore Processing

Next, the restoration processing executed by the information processing device 512 corresponding to the imaging processing of the client 511 in FIG. 52 will be described with reference to the flowchart in FIG. 59.

Note that this processing is started when the information processing device 512 is powered on and is terminated when the information processing device 512 is powered off, for example.

In step S251, the acquisition unit 746 determines whether or not the authentication information has been received. In the case where the information terminal 522 has transmitted the authentication information in step S207 in FIG. 52 above, the communication unit 709 receives the authentication information via the network 513 and supplies the received authentication information to the acquisition unit 746. Thereby, the acquisition unit 746 determines that the authentication information has been received, and the processing proceeds to step S252.

In step S252, the authentication unit 741 authenticates the information terminal 522 on the basis of the authentication information. For example, the authentication unit 741 searches a database stored in the storage unit 608 for a record including a terminal ID that matches the terminal ID included in the authentication information. In the case where the desired record has been found, the authentication unit 741 determines that the authentication of the information terminal 522 has succeeded. Furthermore, the authentication unit 741 recognizes a service plan available in the information terminal 522 that has been successfully authenticated, and permits use of the service plan. Note that, for example, in a case where an upper limit is set for the number of times of use or a use time of the service plan, the authentication unit 741 does not permit the use of the service plan in the case where the upper limit is exceeded.

On the other hand, in the case where the desired record is not found in the database stored in the storage unit 608, the authentication unit 741 determines that the authentication of the information terminal 522 has failed.

In step S253, the information processing device 512 transmits the authentication result information. Specifically, the information generation unit 747 generates the authentication result information indicating an authentication result of the information terminal 522. The output control unit 748 transmits the authentication result information to the information terminal 522 via the communication unit 709 and the network 513.

Thereafter, processing proceeds to step S254.

On the other hand, in the case where it is determined in step S251 that the authentication information has not been received, the processing in steps S252 and S253 is skipped and the processing proceeds to step S254.

In step S254, the acquisition unit 746 determines whether or not the input information has been received. In the case where the information terminal 522 has transmitted the input information in step S211 in FIG. 52 above, the communication unit 709 receives the input information via the network 513 and supplies the received input information to the acquisition unit 746. Thereby, the acquisition unit 746 determines that the input information has been received, and the processing proceeds to step S255.

In step S255, the restoration matrix setting unit 742 sets the restoration matrix. Specifically, the restoration matrix setting unit 742 reads a coefficient set group used for the restoration matrix from the storage unit 608.

Figure 60:
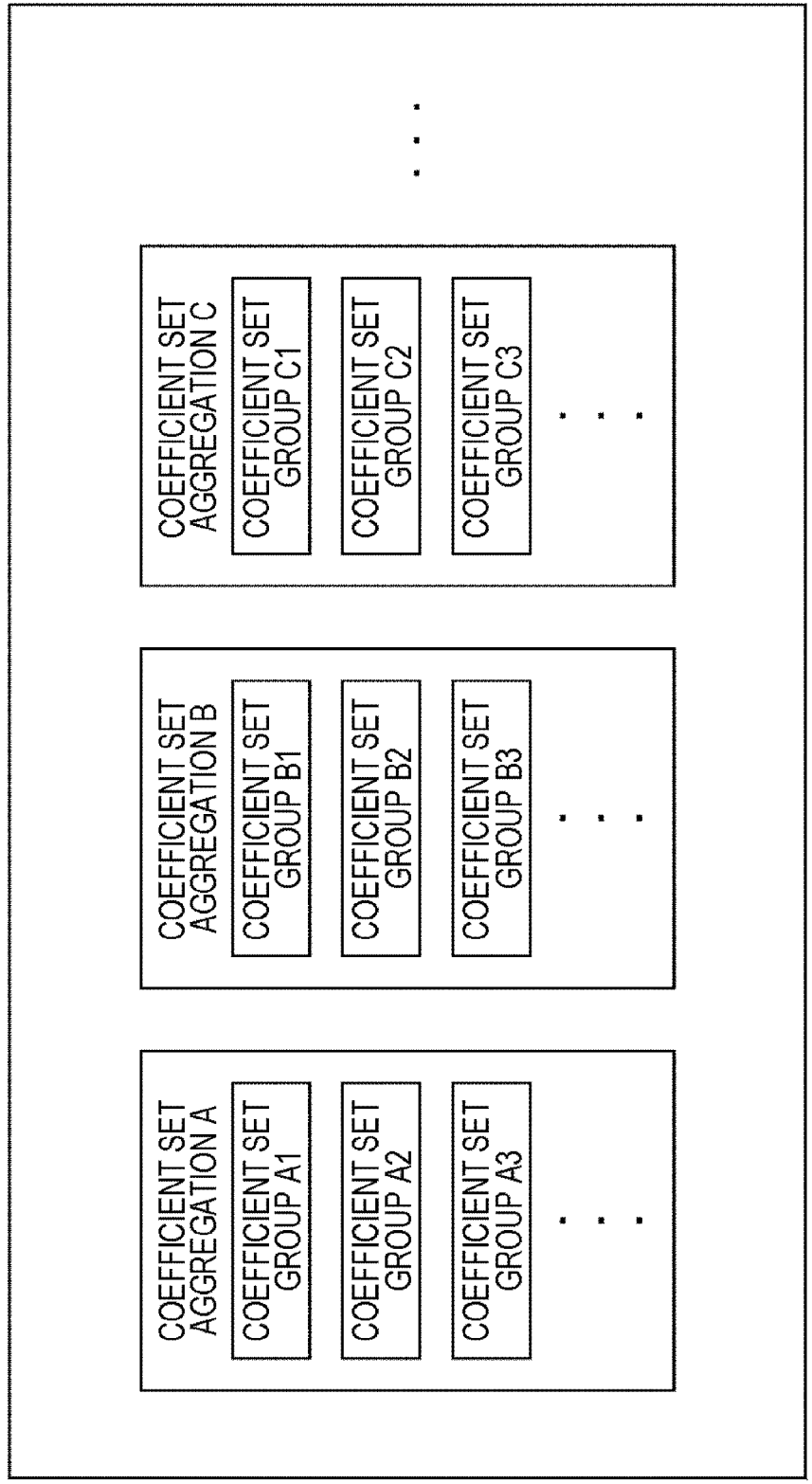
FIG. 60 is a diagram illustrating an example of a coefficient set aggregation.

FIG. 60 illustrates examples of coefficient set aggregations stored in the storage unit 608. The storage unit 608 stores a plurality of coefficient set aggregations that differ for each incident angle directivity pattern of the imaging element 121.

Each coefficient set aggregation includes a plurality of coefficient set groups. In a case where the imaging element 121 corresponds to only one angle of view, each coefficient set group corresponds to each different object distance. That is, a different coefficient set group is prepared for each object distance.

Meanwhile, in a case where the imaging element 121 corresponds to a plurality of angles of view, each coefficient set group corresponds to a different combination of an object distance and an angle of view. That is, a different coefficient set group is prepared for each combination of an object distance and an angle of view.

The restoration matrix setting unit 742 reads a coefficient set group corresponding to an object distance, or a combination of an object distance and an angle of view included in the input information, from the coefficient set aggregation corresponding to the incident angle directivity pattern of the imaging element 121 recognized with the imaging element ID or the pattern ID included in the input information, from the storage unit 608.

Note that in the case where the focus target is set (in the case where the recognition function is used), the object distance is not set. In this case, for example, the restoration matrix setting unit 742 sets a predetermined initial value for the object distance and reads the coefficient set group from the storage unit 608 on the basis of the set initial value.

Then, the restoration matrix setting unit 742 sets the restoration matrix on the basis of the read coefficient set group.

Note that, in a case where the restoration region is not set and the number of pixels of the restoration image is set to a value smaller than the number of pixels of the detection image, that is, in a case where the entire region of the restoration image is the restoration target and the resolution is reduced, the restoration processing is performed after thinning or adding (the detection signal of) the pixel of the detection image so that the number of pixels of the detection image matches the number of pixels of the restoration image, for example. In this case, the restoration matrix setting unit 742 thins a coefficient from the coefficient set group corresponding to the position of the pixel to be thinned or the position of the pixel to be added in the detection image by processing similar to the pixel arbitrary thinning mode, pixel regularity thinning mode, area drive mode, or pixel addition mode, for example, and sets the restoration matrix.

In step S256, the restoration unit 743 restores the image. Specifically, the restoration unit 743 converts the detection image into the restoration image using the restoration matrix set by the restoration matrix setting unit 742.

At this time, in the case where the entire region of the restoration image is the restoration target and the resolution is reduced, the restoration unit 743 thins or adds (the detection signal of) the pixel of the detection image so that the number of pixels of the detection image matches the number of pixels of the restoration image, and then converts the detection image into the restoration image.

Note that, in this case, the restoration matrix setting unit 742 may set the restoration matrix of the numbers of rows and columns according to the number of pixels of the detection image and the number of pixels of the targeted restoration image, for example, and the restoration unit 743 may convert the detection image into the restoration image using the set restoration matrix without performing the thinning processing or the adding processing for a pixel of the detection image.

Furthermore, for example, the restoration matrix setting unit 742 and the restoration unit 743 reset the restoration matrix while adjusting (changing) the restoration parameters until the restoration accuracy reaches a predetermined level or higher, and repeat processing of reconverting the detection image into the restoration image (hereinafter also referred to as retry processing) using the reset restoration matrix.

Note that the restoration parameters to be adjusted include, for example, at least one of the object distance, the regularization parameter $\gamma$, the position at which the pixel of the detection image is thinned, or the position to which the pixel of the detection image is added.

Furthermore, the restoration accuracy is calculated on the basis of, for example, the degree of dispersion of edges in the restoration image, a spatial frequency, or the like.

Note that, in the case where the restoration region is set, the restoration matrix setting unit 742 and the restoration unit 743 repeat the retry processing until the restoration region is focused, and the restoration accuracy of the restoration region reaches a predetermined level or higher, for example. In this case, the restoration accuracy is calculated on the basis of, for example, the degree of dispersion of edges in the image in the restoration region, the spatial frequency, or the like.

Then, the restoration unit 743 extracts an image of the restoration region from the restored image, and generates the restoration image by interpolating, thinning, or adding a pixel so that the number of pixels of the extracted image matches the set number of pixels.

Furthermore, in the case where the focus target is set, the restoration unit 743 detects the focus target in the restoration image. Note that an arbitrary technique can be used for detecting the focus target. For example, the focus target may be detected on the basis of a predetermined rule or algorithm. Alternatively, for example, the method of detecting the focus target may be learned by machine learning.

Then, the restoration matrix setting unit 742 and the restoration unit 743 repeat the retry processing until the focus target is focused and the restoration accuracy of the focus target reaches a predetermined level or higher. In this case, the restoration accuracy is calculated on the basis of, for example, the degree of dispersion of edges in the image of the focus target, the spatial frequency, or the like.

Note that an upper limit may be set for the number of times of the retry processing (hereinafter referred to as the number of retries). The upper limit value of the number of retries is set on the basis of, for example, the service plan and the presence or absence of the setting of the high image quality processing. For example, in the case of the free plan, the upper limit value of the number of retries is set to a value smaller than other service plans or set to 0 times (no retry processing). Furthermore, for example, in the case where the high image quality processing is set, the upper limit value of the number of retries is set to a larger value than that of a case where the high image quality processing is not set.

In step S257, the information generation unit 747 generates output information. The output information includes at least the data of the restoration image.

In step S258, the information processing device 512 transmits the output information. Specifically, the output control unit 748 transmits the output information to the information terminal 522 via the communication unit 709 and the network 513.

After that, the processing returns to step S251, and the processing in step S251 and the subsequent steps is executed.

On the other hand, in the case where it is determined in step S254 that the input information has not been received, the processing returns to step S251, and the processing in step S251 and the subsequent steps is executed.

As described above, the processing from capturing the detection image by the imaging element 121 to generating the restoration image (processing regarding computational photography using the detection image) is performed in a distributed manner (selectively performed) between the client 511 and the information processing device 512.

Here, the information processing device 512 can easily achieve higher performance than the client 511. Therefore, the information processing device 512 performs the restoration processing with a large calculation amount, so that the entire processing can be speeded up. Furthermore, since processing with a larger calculation amount becomes possible, the resolution (the number of pixels) of the detection image can be made larger or the resolution (the number of pixels) of the restoration image can be made larger, for example. Furthermore, since the processing of the client 511 is reduced, the manufacturing cost or downsizing of the imaging device 521 and the information terminal 522 becomes possible, for example.

Furthermore, for example, the load of arithmetic processing of the entire information processing system 501 can be reduced by selectively performing the restoration processing using the setting information. For example, the calculation amount of the restoration processing can be reduced by selecting the detection image or the region to be restored or reducing the number of pixels of the restoration image. Note that by reducing the calculation amount of the restoration processing in this way, the information terminal 522 can be allowed to perform the restoration processing even if the information terminal 522 does not have such high performance, for example.

Learning Processing

Figure 61:
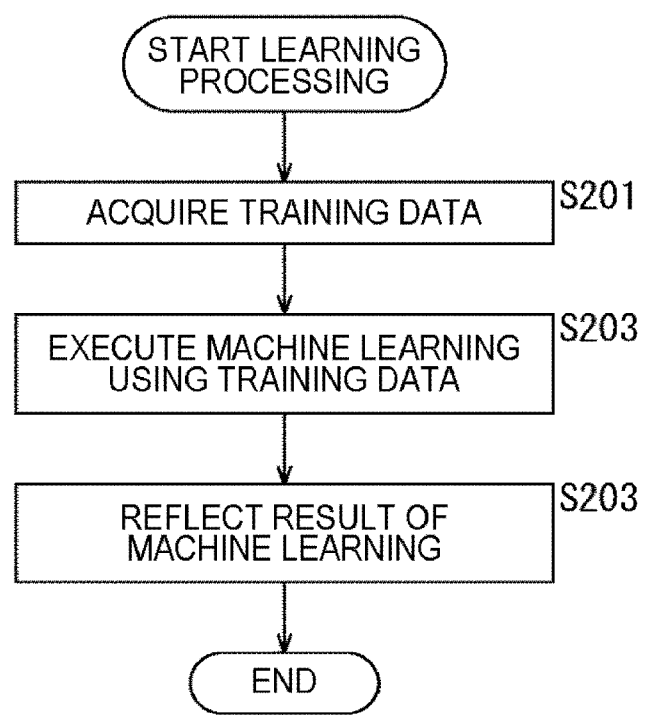
FIG. 61 is a flowchart for describing an example of a flow of learning processing.

Next, learning processing executed by the information processing device 512 will be described with reference to the flowchart in FIG. 61.

In step S201, the learning unit 749 acquires learning data. The learning data includes at least input data, and includes correct answer data (label), as needed. The input data includes at least the data of the detection image, and includes all or part of other information (for example, the setting information, the terminal information, or the like) included in the above-described input information, as needed. Furthermore, for example, in the case of learning the method of setting the restoration parameter, for example, the input data includes the data of the detection image, and the correct answer data includes the restoration parameter.

In step S202, the learning unit 749 executes machine learning using the learning data.

Here, an example of the learning content is given.

For example, learning of a combination of the detection image and an appropriate restoration parameter is performed. In other words, a method of appropriately setting the restoration parameter is learned on the basis of the detection image.

Note that, since the preference for image quality (for example, color, brightness, contrast, or the like) differs for each user, a favorite restoration parameter may be learned for each user, for example.

Furthermore, for example, a method of selecting the detection image is learned. For example, in the case where the restoration region and the focus target are not set, in the case where the restoration region is set, and in the case where the focus target is set, a method of selecting the detection image suitable for restoration from among the detection images of a plurality of frames is learned. Alternatively, for example, a method of selecting the detection image suitable for restoration on the basis of a time point when the user has performed the imaging operation is learned.

Moreover, for example, a method of detecting the focus target (that is, an object of a specified type) in the restoration image is learned.

Furthermore, for example, a method of recognizing the type of an object in an image is learned on the basis of the detection image before restoration.

Note that an arbitrary method such as a multilayer neural network can be used as the learning method, for example. Furthermore, the learning method is properly used depending on a learning target. For example, in the case of using a multilayer neural network, parameters generated by inputting the learning data to the multilayer neural network are recorded, and the information processing system 501 updates the restoration parameters on the basis of the parameters.

Furthermore, for example, the learning processing may be performed by properly using a learning model used for machine learning according to the imaging mode. For example, machine learning is performed using a learning model suitable for restoration of an image of a sports scene, for a sports mode suitable for capturing a scene of sports.

In step S203, the information processing system 501 reflects a result of the machine learning. For example, the restoration matrix setting unit 742 and the restoration unit 743 update the respective processing contents on the basis of the result of the machine learning.

Furthermore, for example, the information generation unit 747 generates learning result information indicating the result of the machine learning. The output control unit 748 transmits the learning result information to the information terminal 522 via the communication unit 709 and the network 513.

For example, the read control unit 122 of the imaging device 521, and the operation control unit 641 and the simple restoration unit 642 of the information terminal 522 update the respective processing contents on the basis of the learning result information.

Then, the learning processing is terminated.

By performing the learning processing in this way and reflecting the learning result, the processing of computational photography using the detection image is optimized or speeded up, for example.

Modification of First Embodiment

Next, modifications of the above-described first embodiment of the present technology will be described.

For example, the restoration parameters and the restoration matrix used for generating the simple restoration image for preview display may be supplied from the information processing device 512 to the information terminal 522. This improves the security of the restoration parameters and the restoration matrix.

Furthermore, for example, the information terminal 522 may transmit the input information including the data of the detection image to the information processing device 512 every time the detection image is captured after the imaging processing is started. Then, the information processing device 512 may generate the simple restoration image for preview display and transmit the simple restoration image for preview display to the information terminal 522. This further reduces the processing of the information terminal 522.

Moreover, for example, the information processing device 512 may transmit the output information including the data of the restoration image to the information terminal 522 after the first restoration processing is performed and every time the subsequent retry processing is performed, and the information terminal 522 may display the restoration image. Then, for example, the user may check the restoration image and determine whether or not to continue the retry processing. Thereby, a restoration image with higher user satisfaction can be obtained.

Note that the restoration image transmitted to the information terminal 522 in this case may be a simple restoration image with a reduced number of pixels. Thereby, the data transfer amount between the information processing device 512 and the information terminal 522 can be reduced, and for example, communication costs can be reduced.

Furthermore, in a case where the information processing device 512 generates a restoration image, for example, the information processing device 512 may generate a simply restored simple restoration image and an officially restored restoration image, transmit information including data of the simple restoration image to the information terminal 522, and store information including data of the restoration image in the information processing device 512 Thereby, the data transfer amount between the information processing device 512 and the information terminal 522 can be reduced, and for example, communication costs can be reduced.

Moreover, for example, in the case where the information terminal 522 cannot use the service of the information processing device 512, such as, in a case where the information terminal 522 is offline, in the case where the authentication of the information terminal 522 has failed, or in the case where the number of times of use of the service plan or the use time exceeds the upper limit, the information terminal 522 may store the data of the detection image in the information terminal 522. Then, after the information terminal 522 becomes able to use the service of the information processing device 512, the information terminal 522 may transmit the input information including the data of the detection image to the information processing device 512 and obtain the restoration image.

Furthermore, for example, in the case where the number of pixels of the restoration image is set to a smaller value than the number of pixels of the detection image, the imaging device 521 or the information terminal 522 may thin or add (the detection signal of) a pixel of the detection image to match the number of pixels of the detection image with the number of pixels of the restoration image, and then transmit the input information including the data of the detection image to the information processing device 512. Thereby, the data transfer amount between the information processing device 512 and the information terminal 522 can be reduced, and for example, communication costs can be reduced.

Moreover, the functions of the imaging device 521, the information terminal 522, and the information processing device 512 can be selected as needed, and sharing of the functions among the devices can be changed as appropriate. For example, some or all of the functions of the imaging device 521 can be transferred to the information terminal 522, or some or all of the functions of the information terminal 522 can be transferred to the imaging device 521. For example, the read control unit 122 of the imaging device 521 may be provided in the information terminal 522. Furthermore, for example, the imaging device 521 and the information terminal 522 may be integrated.

Moreover, for example, some or all of the functions of the information processing device 512 can be transferred to the information terminal 522, or some or all of the functions of the information terminal 522 can be transferred to the information processing device 512. For example, the information terminal 522 may perform up to the restoration processing. Furthermore, for example, the information terminal 522 may select the coefficient set group that forms the restoration matrix used for the restoration processing, and transmit the restoration information including the selected coefficient set group to the information processing device 512. Moreover, for example, in a case where gesture recognition is not performed, the gesture recognition unit 745 of the information processing unit 731 in FIG. 51 can be deleted.

Specific Example of Client 511

Next, specific examples of the client 511 in FIG. 46 will be described with reference to FIGS. 62 to 67.

First Specific Example

Figure 62:
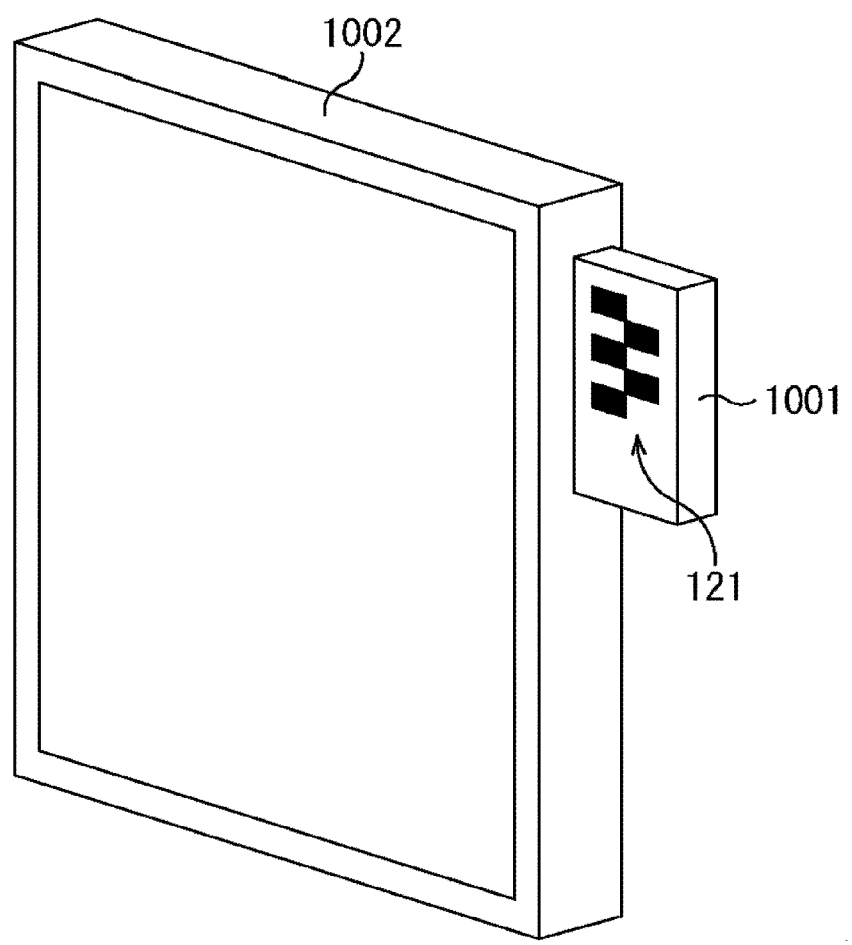
FIG. 62 is a diagram for describing a first specific example of a client.

FIG. 62 illustrates a first specific example of the client 511. In this example, the imaging device 521 is configured by an imaging module 1001, and the information terminal 522 is configured by a smartphone 1002.

The imaging module 1001 includes the imaging element 121 and can be attached to and detached from the smartphone 1002. By attaching the imaging module 1001 to the smartphone 1002, the imaging function is added to the smartphone 1002.

Figure 63:
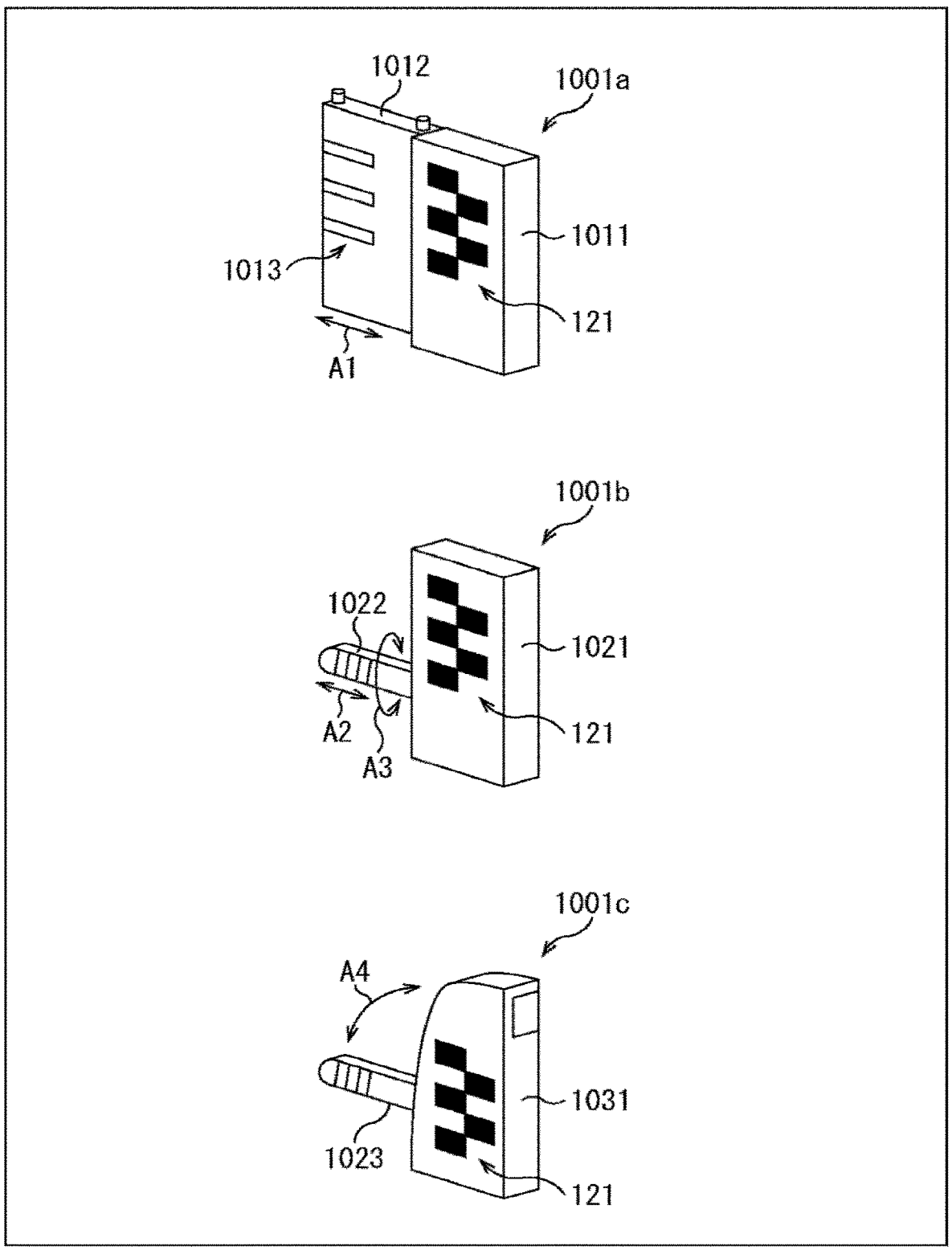
FIG. 63 is a diagram illustrating a configuration example of an imaging module.

FIG. 63 illustrates imaging modules 1001*a* to 1001*c* as specific configuration examples of the imaging module 1001.

The imaging module 1001*a* includes a main body 1011 and a mounting portion 1012.

The main body 1011 includes the imaging element 121.

The mounting portion 1012 is slidable with respect to the main body 1011 in the direction of arrow A1 in FIG. 63, and the mounting portion 1012 can be overlapped with the main body 1011 or can be separated from the main body 1011.

The mounting portion 1012 is provided with a terminal 1013. The terminal 1013 is connected to a terminal (not illustrated) inside the smartphone 1002 by inserting the mounting portion 1012 to a predetermined position of the smartphone 1002. Thereby, the imaging module 1001*a* and the smartphone 1002 can communicate with each other, and for example, the acquisition unit 643 of the smartphone 1002 can acquire the data of the detection image from the imaging module 1001*a*.

The imaging module 1001*b* includes a main body 1021 and a mounting portion 1022.

The main body 1021 includes the imaging element 121.

The mounting portion 1022 is slidable with respect to the main body 1021 in the direction of arrow A2 in FIG. 63. Thereby, the mounting portion 1022 can be housed in the main body 1021 or can be projected outside the main body 1021 as illustrated in FIG. 63.

The mounting portion 1022 also serves as a terminal, and the mounting unit 1022 is connected to an internal terminal (not illustrated) of the smartphone 1002 by inserting the mounting unit 1022 into a predetermined position of the smartphone 1002. Thereby, the imaging module 1001*b* and the smartphone 1002 can communicate with each other, and for example, the acquisition unit 643 of the smartphone 1002 can acquire the data of the detection image from the imaging module 1001*b*.

Furthermore, in the state where the mounting portion 1022 is mounted in the smartphone 1002, the main body 1021 can be rotated about the mounting unit 1022 in the direction of arrow A3 in FIG. 63. Thereby, the imaging direction of the imaging element 121 can be easily changed.

The imaging module 1001*c* includes a main body 1031 and a mounting portion 1032.

The main body 1031 includes the imaging element 121.

The mounting portion 1032 can be rotated about the main body 1031 in the direction of arrow A4 in FIG. 63. Thereby, the mounting portion 1032 can be housed in the main body 1031 or can be projected outside the main body 1031 as illustrated in FIG. 63.

The mounting portion 1032 also serves as a terminal, and the mounting unit 1032 is connected to an internal terminal (not illustrated) of the smartphone 1002 by inserting the mounting unit 1032 into a predetermined position of the smartphone 1002. Thereby, the imaging module 1001*c* and the smartphone 1002 can communicate with each other, and for example, the acquisition unit 643 of the smartphone 1002 can acquire the data of the detection image from the imaging module 1001*c*.

Note that, by externally attaching the imaging module 1001, the layout of the imaging element 121 does not need to be taken into account in the smartphone 1002, and the degree of freedom in design is improved. Furthermore, since the imaging module 1001 is replaceable, the function and performance of the imaging module 1001 can be easily improved, and a plurality of the imaging modules 1001 can be properly used according to purpose of use.

Second Specific Example

Figure 64:
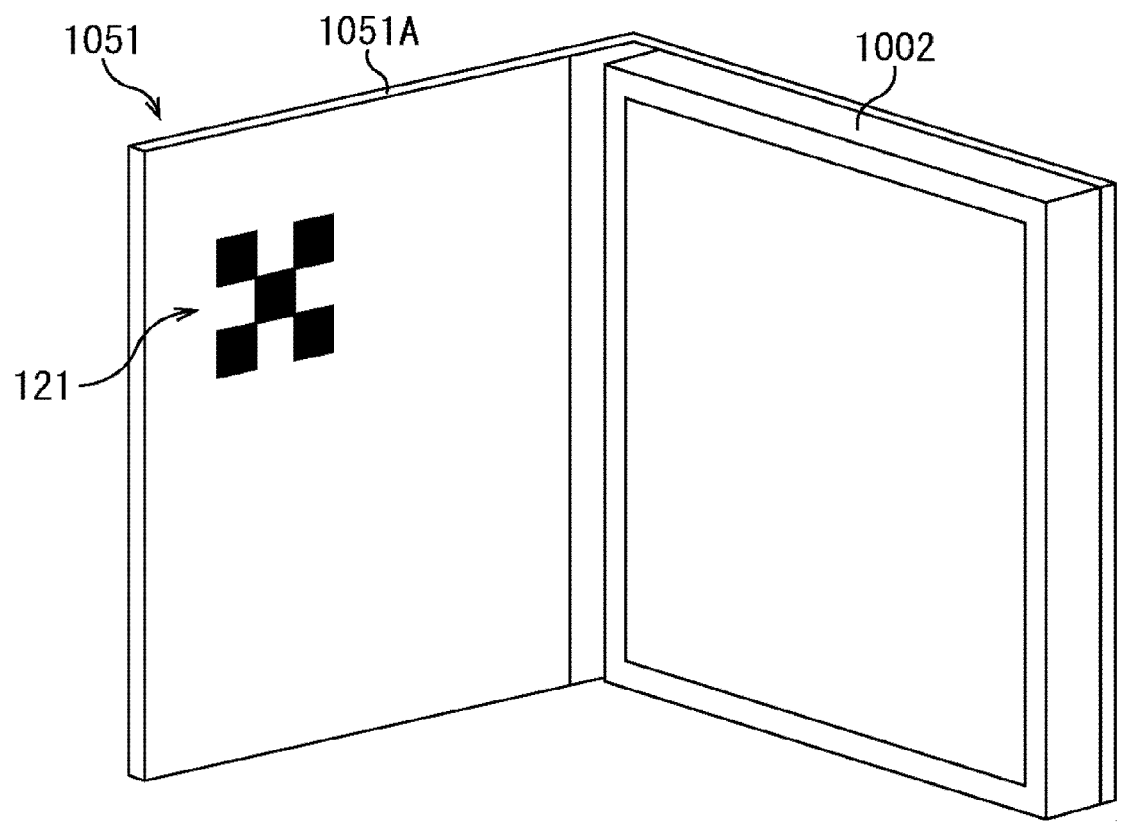
FIG. 64 is a diagram illustrating a second specific example of the client.

FIG. 64 illustrates a second specific example of the client 511. In this example, the imaging device 521 is configured by a case 1051, and the information terminal 522 is configured by the smartphone 1002. The smartphone 1002 can be housed in the case 1051.

The imaging element 121 is provided inside a cover 1051A of the case 1051. A communication unit (not illustrated) is built in the case 1051, and the case 1051 and the smartphone 1002 perform wireless communication or wired communication. Thereby, for example, the acquisition unit 643 of the smartphone 1002 can acquire the data of the detection image from the case 1051.

In this case, by simply replacing the case 1051, the imaging performance can be improved or the imaging function can be changed.

Furthermore, the imaging direction of the imaging element 121 can be easily changed by moving the cover 1051A in an opening and closing direction.

Note that the imaging element 121 may be provided in a housing member other than the case 1051 and supply the data of the detection image to the smartphone 1002.

Third Specific Example

Figure 65:
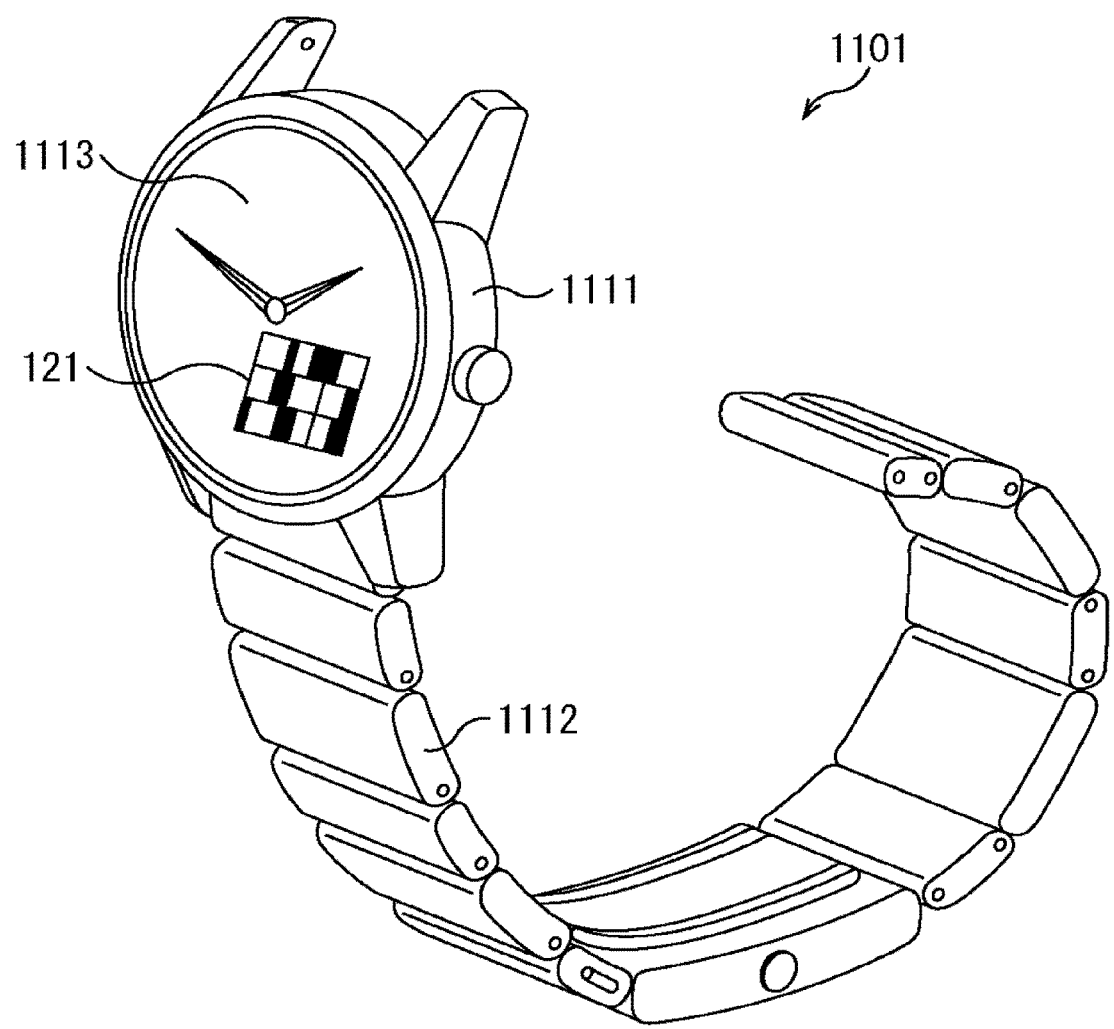
FIG. 65 is a diagram illustrating a third specific example of the client.

FIG. 65 illustrates a third specific example of the client 511. In this example, the imaging device 521 and the information terminal 522 are integrated and configured by a wristwatch-type wearable device 1101.

The wearable device 1101 includes a main body 1111 and a band 1112. The imaging element 121 is provided in the main body 1111, and a light-receiving surface of the imaging element 121 is provided on a face 1113. The imaging element 121 does not need a lens and thus can be provided in the main body 1111 without thickening the main body 1111.

Note that the detection image captured by the imaging element 121 is used for gesture recognition, for example. For example, when the user makes a gesture with a finger in front of the face 1113, the gesture is recognized, and processing corresponding to the recognized gesture is performed.

Figure 66:
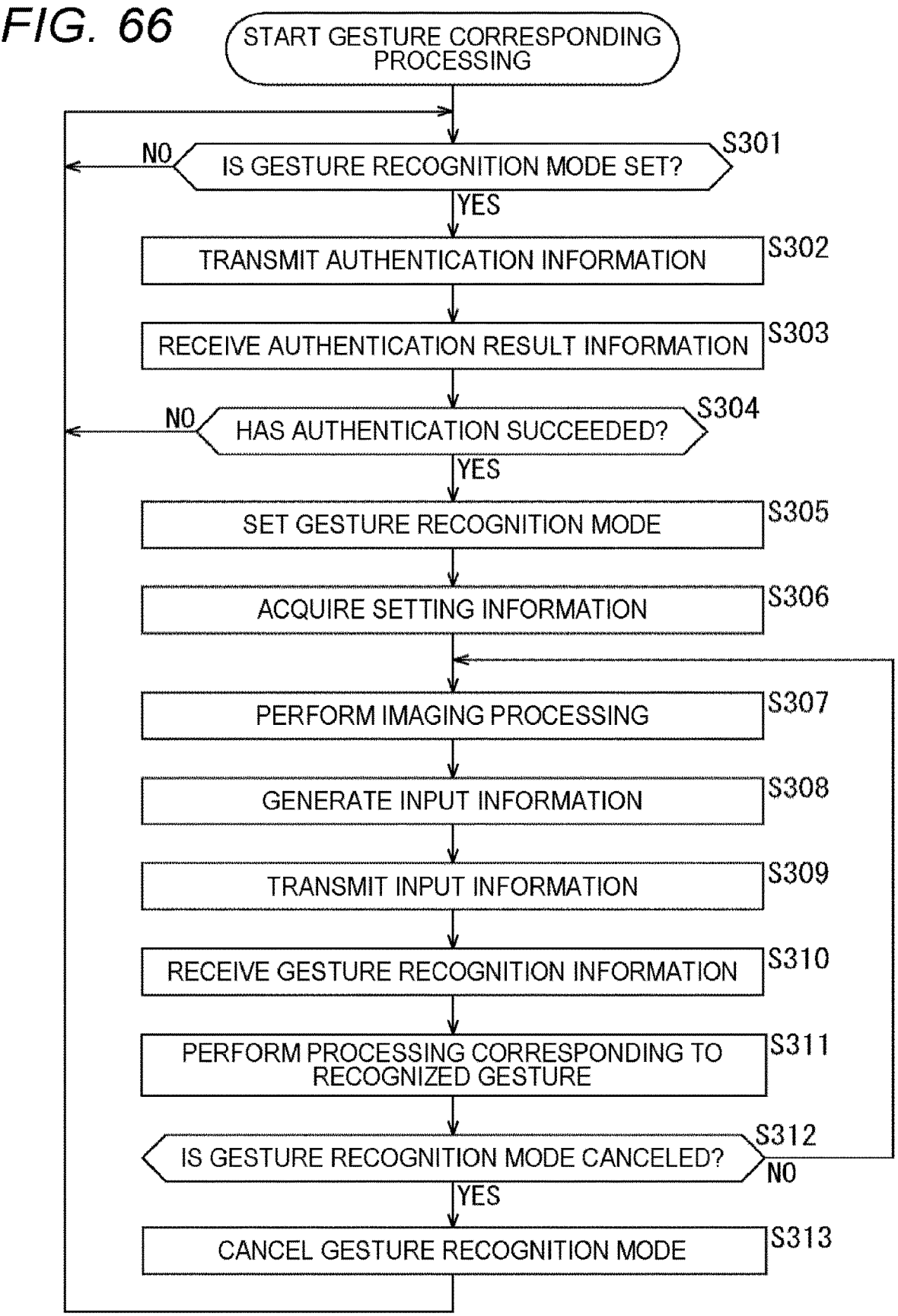
FIG. 66 is a flowchart for describing an example of a flow of gesture corresponding processing.
Figure 67:
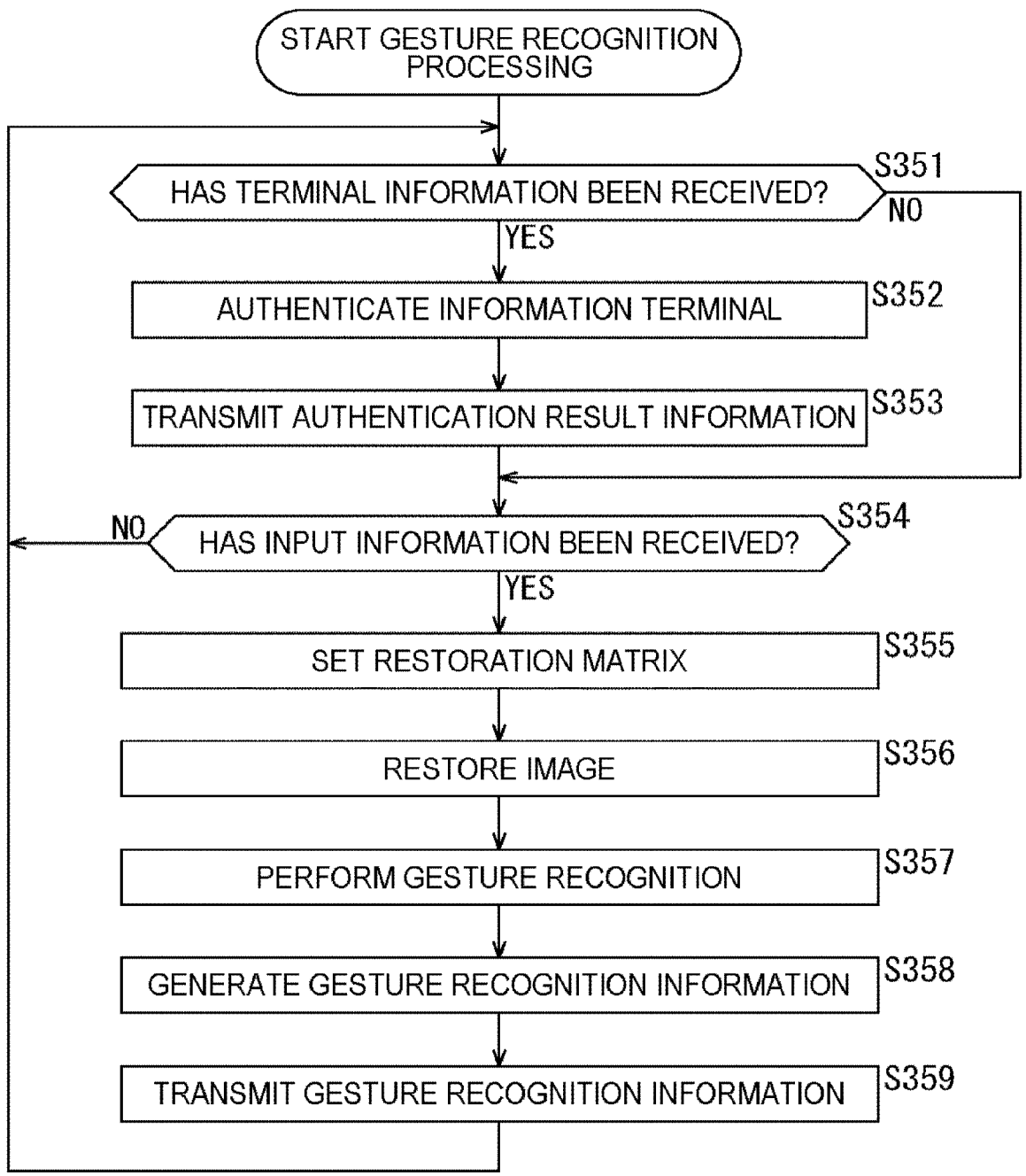
FIG. 67 is a flowchart for describing an example of a flow of gesture recognition processing.

Here, processing of recognizing the gesture of the user in the case where the client 511 of the information processing system 501 is configured by the wearable device 1101 will be described with reference to FIGS. 66 and 67.

Gesture Corresponding Processing

First, gesture corresponding processing executed by the wearable device 1101 will be described with reference to the flowchart in FIG. 66.

In step S301, the operation control unit 641 determines whether or not to set a gesture recognition mode. This determination processing is repeatedly executed until the mode is determined to be set to the gesture recognition mode, and the processing proceeds to step S302 in the case where the mode is determined to be set to the gesture recognition mode.

For example, in the case of setting the gesture recognition mode for the wearable device 1101, the user performs a setting operation of the gesture recognition mode via the input unit 606. When the operation control unit 641 is notified by the input unit 606 that the setting operation of the gesture recognition mode has been performed, the operation control unit 641 determines to set the gesture recognition mode, and the processing proceeds to step S302.

Figure 52:
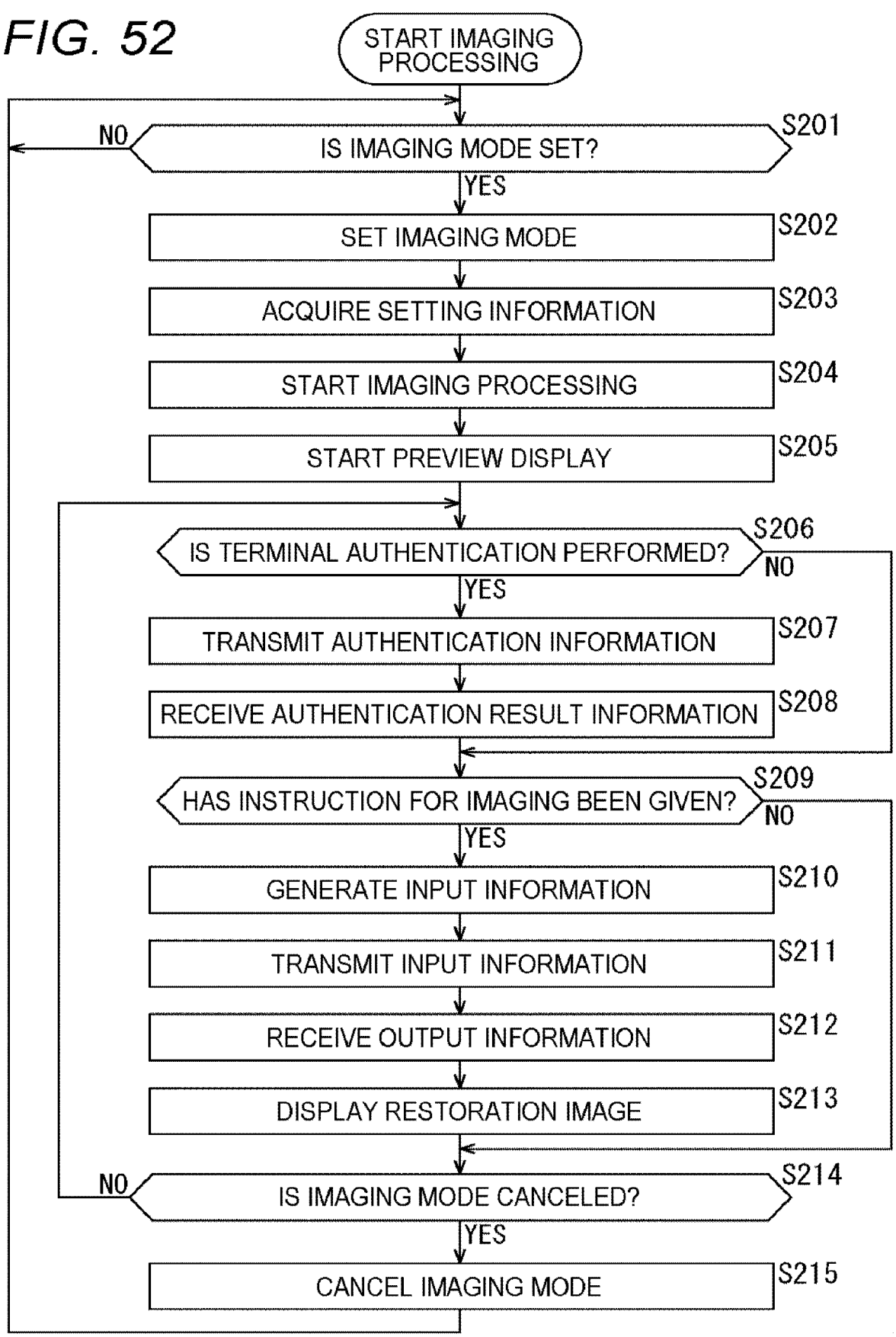
FIG. 52 is a flowchart for describing an example of a flow of imaging processing.
Figure 53:
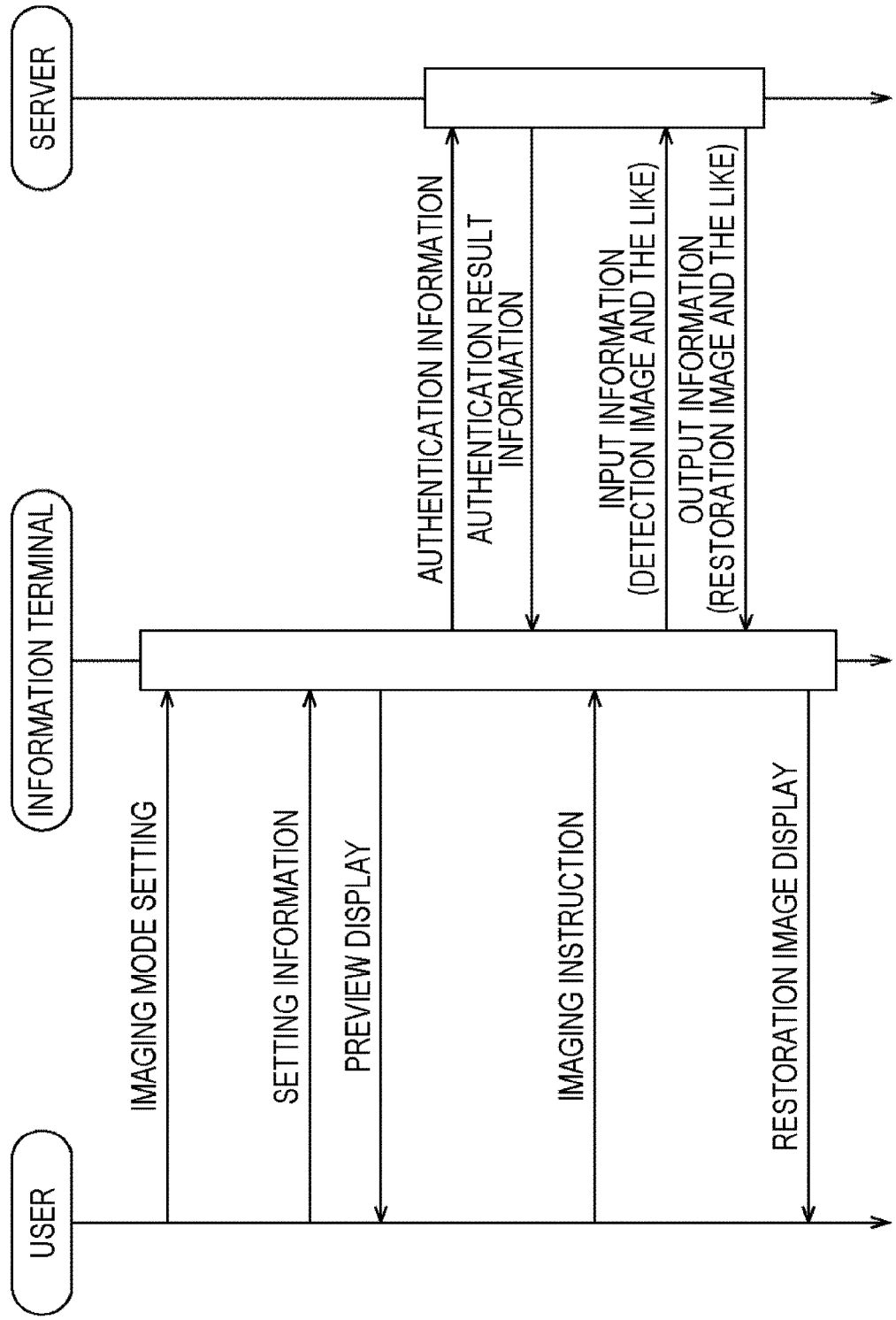
FIG. 53 is a sequence diagram illustrating processing of the information processing system.

In step S302, the authentication information is transmitted to the information processing device 512 similarly to the processing in step S207 in FIG. 52.

In step S303, the authentication result information is received from the information processing device 512 similarly to the processing in step S208 in FIG. 52.

In step S304, the operation control unit 641 determines whether or not the authentication has succeeded on the basis of the authentication result information. In the case where it is determined that the authentication has failed, the processing returns to step S301 and the processing in step S301 and the subsequent steps is executed.

On the other hand, in the case where it is determined in step S304 that the authentication has succeeded, the processing proceeds to step S305.

In step S305, the operation control unit 641 sets the gesture recognition mode for the wearable device 1101.

In step S306, the setting information is acquired similarly to the processing in step S203 in FIG. 52.

In step S307, the imaging processing is performed similarly to the processing in step S204 in FIG. 52.

In step S308, the input information is generated similarly to the processing in step S210 in FIG. 52.

In step S309, the input information is transmitted to the information processing device 512 similarly to the processing in step S211 in FIG. 52.

The information processing device 512 receives the input information in step S354 in FIG. 67 to be described below, and transmits gesture recognition information including a gesture recognition result to the wearable device 1101 in step S359.

In step S311, the wearable device 1101 performs processing corresponding to the recognized gesture. Specifically, the operation control unit 641 controls the operation of each unit of the wearable device 1101 so as to perform the processing corresponding to the gesture recognized by the information processing device 512 on the basis of the gesture recognition information.

Note that the wearable device 1101 may transfer the gesture recognition information to another information processing device or the like, and the another information processing device or the like may execute the processing corresponding to the recognized gesture.

In step S312, the operation control unit 641 determines whether or not to cancel the gesture recognition mode. The operation control unit 641 determines not to cancel the gesture recognition mode in a case where the user has not performed an operation to cancel the gesture recognition mode, and the processing returns to step S307.

Thereafter, in step S312, the processing in steps S307 to S312 is repeatedly executed until cancellation of the gesture recognition mode is determined.

On the other hand, in step S312, in a case where the user has performed the operation to cancel the gesture recognition mode via the input unit 606, the operation control unit 641 determines to cancel the gesture recognition mode, and the processing proceeds to step S313.

In step S313, the operation control unit 641 cancels the gesture recognition mode of the wearable device 1101.

After that, the processing returns to step 301, and the processing in step S301 and the subsequent steps is executed.

Next, gesture recognition processing executed by the information processing device 512 corresponding to the gesture corresponding processing of the wearable device 1101 in FIG. 66 will be described with reference to the flowchart in FIG. 67.

Figure 59:
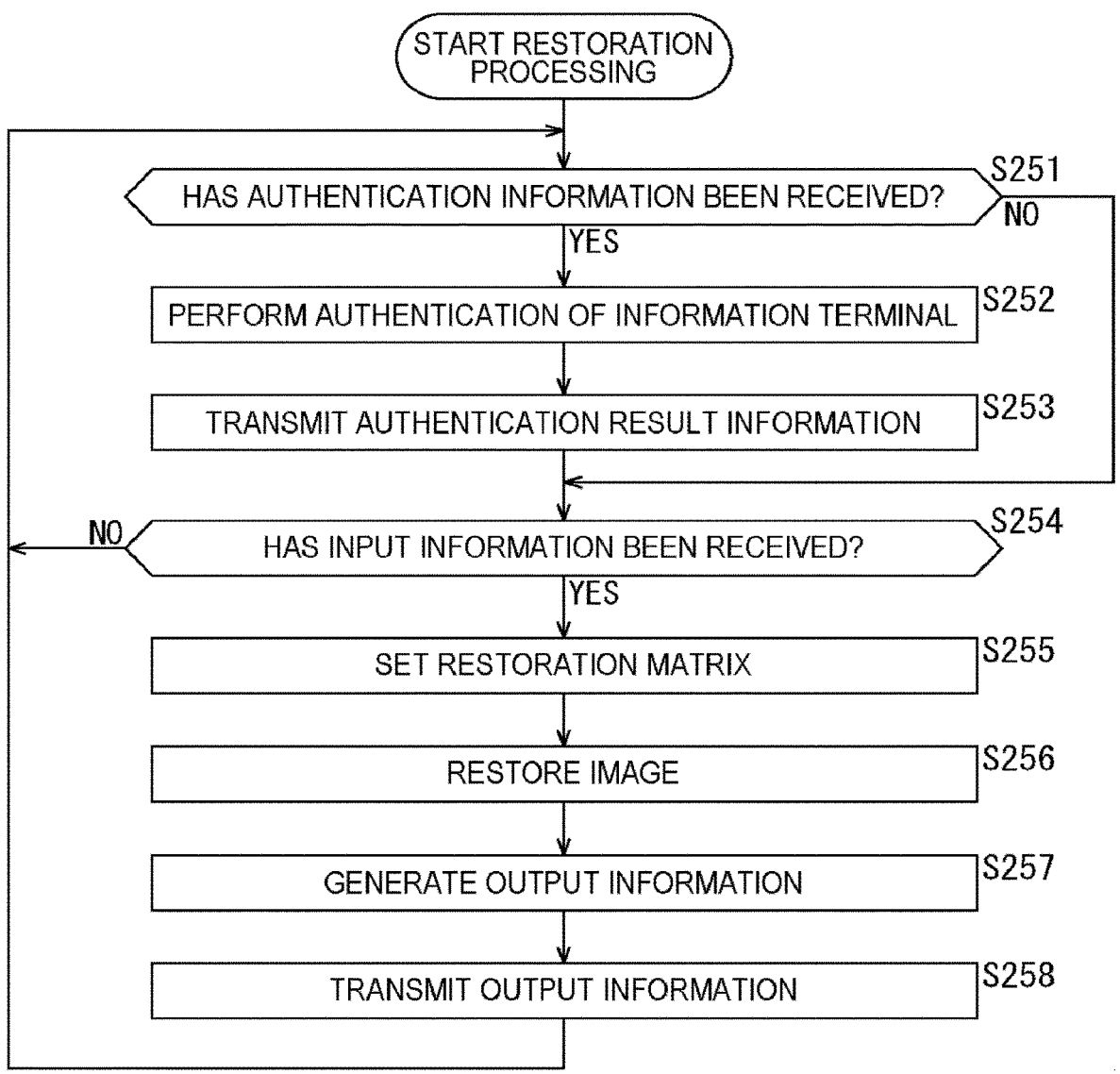
FIG. 59 is a flowchart for describing an example of a flow of restoration processing.

In steps S351 to S356, processing is executed similarly to the processing in steps S251 to S256 in FIG. 59.

In step S357, the gesture recognition unit 745 performs gesture recognition on the basis of the restoration image obtained in the processing in step S356.

Note that an arbitrary method can be used as a gesture recognition method.

In step S358, the information generation unit 747 generates gesture recognition information. The gesture recognition information includes, for example, a gesture recognition result.

In step S359, the output control unit 748 transmits the gesture recognition information to the information terminal 522 via the communication unit 709 and the network 513.

After that, the processing returns to step S351, and the processing in step S351 and the subsequent steps is executed.

As described above, the gesture of the user can be recognized and the processing corresponding to the recognized gesture can be performed.

Furthermore, since the information processing device 512 performs the image restoration processing and the gesture recognition processing, the load on the wearable device 1101 is reduced.

Note that the wearable device 1101 may be used not only as a camera for gesture recognition but also as a normal camera by user setting or the like.

3. Second Embodiment

Next, a second embodiment of the present technology will be described with reference to FIG. 68.

Figure 68:
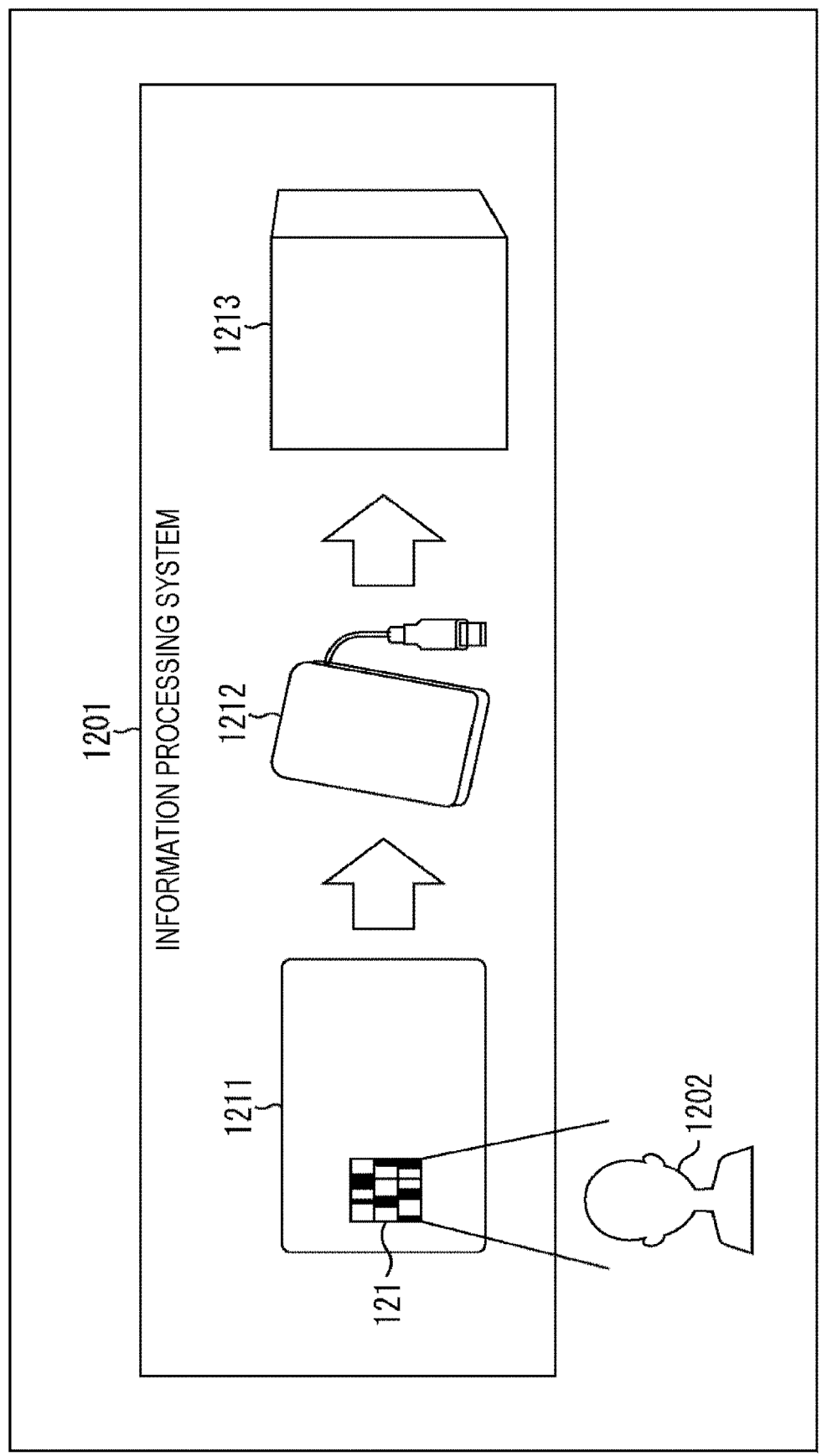
FIG. 68 is a block diagram illustrating a configuration example of an information processing system.

FIG. 68 illustrates a configuration example of an information processing system 1201 according to the second embodiment of the present technology.

The information processing system 1201 includes a card 1211, a reader 1212, and a server 1213.

The card 1211 includes an imaging element 121, and captures an image of the face of a user 1202.

The reader 1212 reads data of a detection image obtained by capturing an image of the face of the user 1202 and a card ID for identifying the card 1211 from the card 1211. Then, the reader 1212 transmits authentication information including the data of the detection image and the card ID to the server 1213 via a network or the like (not illustrated).

The server 1213 generates a restoration image from the detection image included in the authentication information. Furthermore, the server 1213 also searches a database for face image data corresponding to the card ID included in the authentication information. Then, the server 1213 compares the user's face image in the restoration image with the face image corresponding to the card ID. In a case where the images match, the server 1213 determines that authentication of the user 1202 has succeeded and permits use of the card 1211. On the other hand, in a case where the images do not match, the server 1213 determines that the authentication of the user 1202 has failed and does not permit the use of the card 1211.

4. Third Embodiment

Next, a third embodiment of the present technology will be described with reference to FIG. 69.

Figure 69:
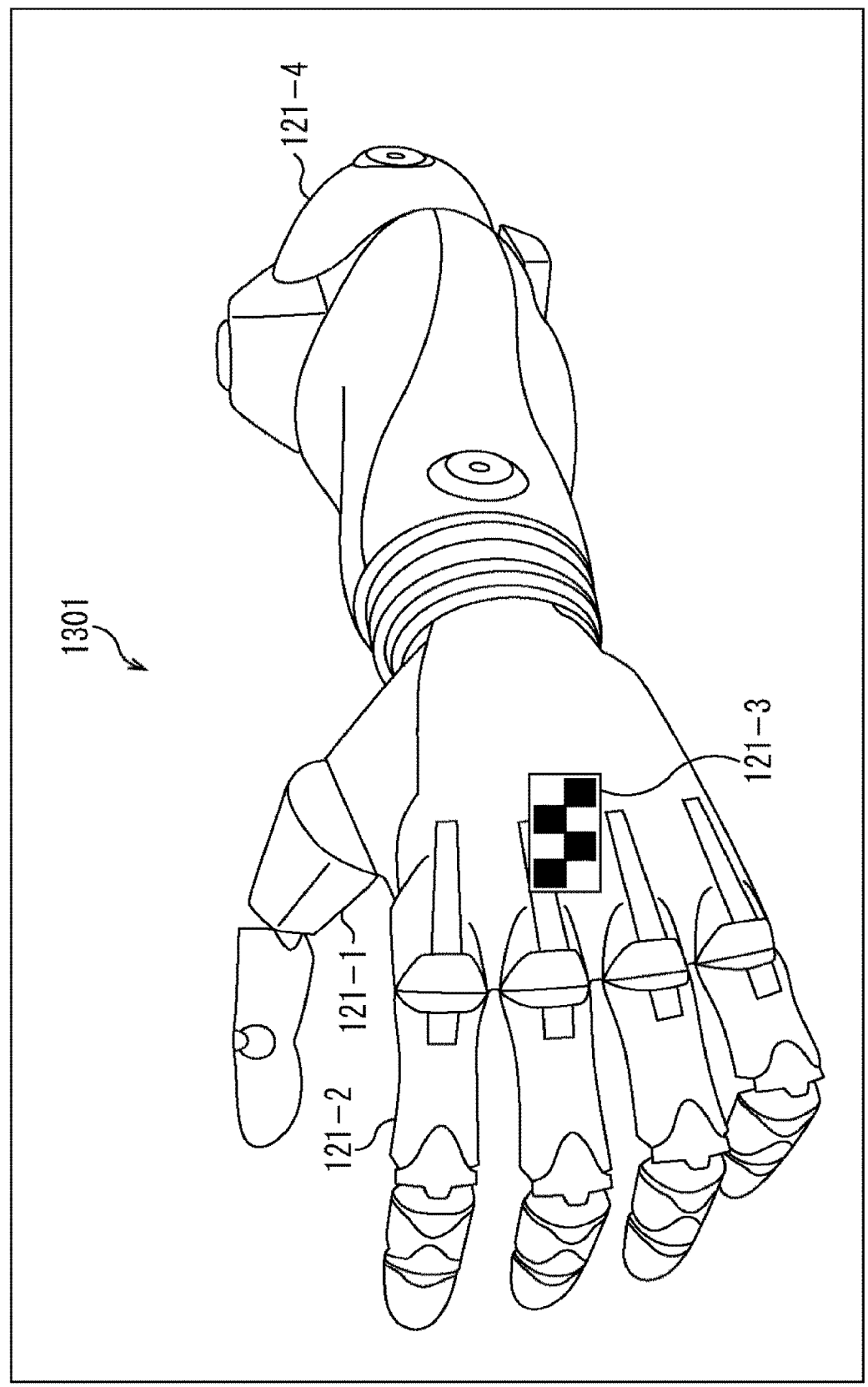
FIG. 69 is a schematic diagram of a configuration example of an appearance of a prosthetic hand.

FIG. 69 schematically illustrates a configuration example of an appearance of a prosthetic hand 1301 according to the third embodiment of the present technology.

The prosthetic hand 1301 is provided with imaging elements 121-1 to 121-4.

The imaging element 121-1 is provided such that a light-receiving surface (not illustrated) is arranged inside a thumb of the prosthetic hand 1301 (palm side). The imaging element 121-2 is provided such that a light-receiving surface (not illustrated) is arranged inside an index finger of the prosthetic hand 1301 (palm side). A restoration image restored from detection images captured by the imaging element 121-1 and the imaging element 121-2 is used for recognizing an object to be grabbed by the prosthetic hand 1301, for example. Then, for example, the degree of opening of fingers of the prosthetic hand 1301 and the degree of force application of each part are controlled on the basis of the size and shape of the recognized object.

The imaging element 121-3 is provided such that the light-receiving surface is arranged on a back of the prosthetic hand 1301. The restoration image restored from the detection image captured by the imaging element 121-3 is used for recognizing an object approaching the back of the prosthetic hand 1301, for example. Then, for example, control such as bending of a wrist joint is performed so that the object does not hit the back of the prosthetic hand 1301.

The imaging element 121-4 is provided such that a light-receiving surface (not illustrated) is arranged on a surface of the prosthetic hand 1301 connected to an arm of the user. The restoration image restored from the detection image captured by the imaging element 121-4 is used for recognizing a state of a portion of the arm of the user to which the prosthetic hand 1301 is mounted (the portion will be hereinafter referred to as a mounting portion), for example. Then, for example, in a case where an abnormality such as redness occurs in the mounting portion of the user's arm, a notification is given to recommend removal of the prosthetic hand 1301.

5. Fourth Embodiment

Next, a fourth embodiment of the present technology will be described with reference to FIG. 70.

Figure 70:
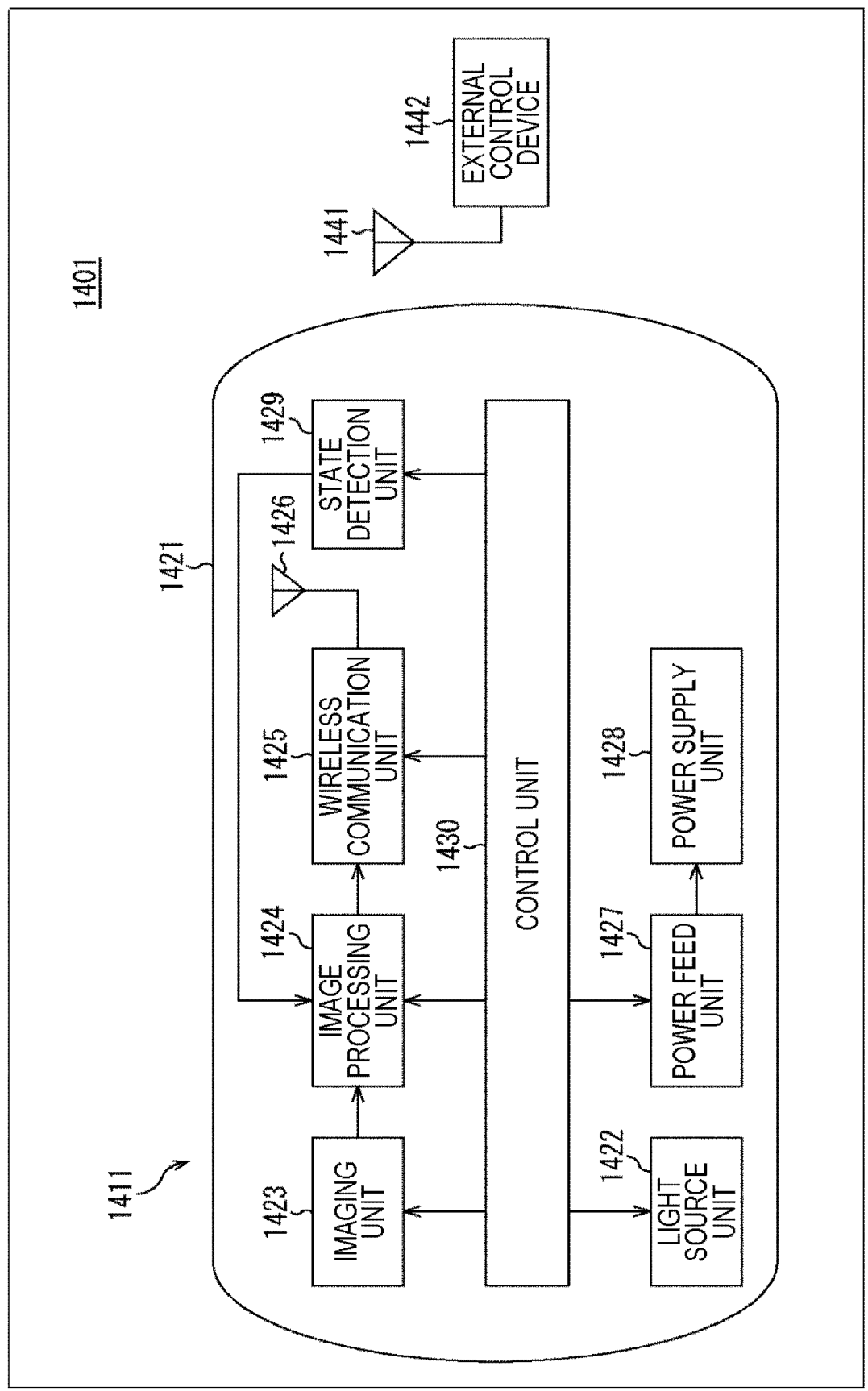
FIG. 70 is a diagram illustrating a configuration example of an in-vivo information acquisition system.

FIG. 70 illustrates a configuration example of an in-vivo information acquisition system 1401 according to the fourth embodiment of the present technology.

The in-vivo information acquisition system 1401 includes a capsule endoscope 1411 and an external control device 1442 that integrally controls an operation of the in-vivo information acquisition system 1401. The capsule endoscope 1411 is swallowed by a patient at the time of examination. The capsule endoscope 1411 has an imaging function and a wireless communication function, and sequentially captures images of inside of organs (hereinafter also referred to as in-vivo images) at predetermined intervals while moving inside the organs such as stomach and intestine by peristaltic movement or the like until the patient naturally discharges the capsule endoscope 1411 and sequentially wirelessly transmits information of the in-vivo images (detection images) to the external control device 1442 outside the body.

The external control device 1442 generates a restoration image for displaying the in-vivo images on a display device (not illustrated) on the basis of the received information of the in-vivo images. As described above, the in-vivo information acquisition system 1401 can acquire the in-vivo images obtained by imaging the inside of the patient's body as needed during a period from when the capsule endoscope 1411 is swallowed to when the capsule endoscope 1411 is discharged.

The capsule endoscope 1411 includes, in a capsule housing 1421, a light source unit 1422, an imaging unit 1423, an image processing unit 1424, a wireless communication unit 1425, a power feed unit 1427, a power supply unit 1428, a state detection unit 1429, and a control unit 1430.

The light source unit 1422 includes, for example, a light source such as a light emitting diode (LED), and irradiates an imaging field of the imaging unit 1423 with light.

The imaging unit 1423 includes an imaging element 121. The imaging unit 1423 is provided such that a light-receiving surface covers a surface of the housing 1421. Note that the light-receiving surface of the imaging unit 1423 does not necessarily need to cover the entire surface of the housing 1421. By configuring the imaging unit 1423 with the imaging element 121, an imaging lens is not required, and the capsule endoscope 1411 can be downsized. The data of the detection image (in-vivo image) generated by the imaging unit 1423 is supplied to the image processing unit 1424.

Note that, for example, the imaging unit 1423 may be a hexahedron, a light-receiving surface may be provided on each surface, the housing 1421 may be a round transparent case, and the imaging unit 1423 may be housed in the housing 1421.

The image processing unit 1424 includes a processor such as a CPU or a GPU, and performs various types of image processing for data of the detection image generated by the imaging unit 1423. The signal processing is, for example, minimum processing for transmitting the data of the detection image to the external control device 1442 (for example, compression of the image data, conversion of a frame rate, conversion of a data rate and/or conversion of a format). The image processing unit 1424 supplies the data of the detection image to which the image processing has been applied to the wireless communication unit 1425. Note that, in a case where information regarding a state (motion, posture, or the like) of the capsule endoscope 1411 has been acquired by the state detection unit 1429, the image processing unit 1424 may supply the data of the detection image in association with the information to the wireless communication unit 1425. Thereby, a position in the body at which the detection image has been captured, an imaging direction of the detection image, and the like can be associated with the detection image.

The wireless communication unit 1425 transmits input information to the external control device 1442 via an antenna 1426. The input information includes, for example, the data of the detection image and information regarding the state (motion, posture, or the like) of the capsule endoscope 1411. Furthermore, the wireless communication unit 1425 receives a control signal related to drive control of the capsule endoscope 1411 from the external control device 1442 via the antenna 1426. The wireless communication unit 1425 supplies the received control signal to the control unit 1430.

The power feed unit 1427 generates power using, for example, a principle of contactless charging. The power generated by the power feed unit 1427 is stored in the power supply unit 1428.

The power supply unit 1428 includes a secondary battery, and stores the power generated by the power feed unit 1427.

The power stored in the power supply unit 1428 is supplied to each unit of the capsule endoscope 1411 and used to drive the each unit.

The state detection unit 1429 includes a sensor such as an acceleration sensor or a gyro sensor for detecting the state of the capsule endoscope 1411. The state detection unit 1429 acquires information regarding the state of the capsule endoscope 1411 from a detection result of the sensor. The state detection unit 1429 supplies the acquired information regarding the state of the capsule endoscope 1411 to the image processing unit 1424.

The control unit 1430 includes a processor such as a CPU, and operates according to a predetermined program, thereby integrally controlling the operation of the capsule endoscope 1411. The control unit 1430 appropriately controls driving of the light source unit 1422, the imaging unit 1423, the image processing unit 1424, the wireless communication unit 1425, the power feed unit 1427, the power supply unit 1428, and the state detection unit 1429 according to the control signal transmitted from the external control device 1442, thereby implementing the functions in the respective units as described above.

The external control device 1442 can be a processor such as a CPU or a GPU, a microcomputer in which a processor and a memory element such as a memory are mixed, a control board, or the like. The external control device 1442 includes an antenna 1441 and can transmit and receive various types of information to and from the capsule endoscope 1411 via the antenna 1441. Specifically, the external control device 1442 transmits a control signal to the control unit 1430 of the capsule endoscope 1411, thereby controlling the operation of the capsule endoscope 1411. For example, an irradiation condition of light with respect to an observation target in the light source unit 1422 can be changed according to the control signal from the external control device 1442. Furthermore, imaging conditions (for example, a frame rate, an exposure value, and the like in the imaging unit 1423) can be changed according to the control signal from the external control device 1442. Furthermore, the content of the processing in the image processing unit 1424, and conditions for transmitting an image signal by the wireless communication unit 1425 (for example, a transmission interval, the number of transmitted images, and the like) may be changed according to the control signal from the external control device 1442.

Furthermore, the external control device 1442 generates a restoration image from the detection image included in the input information transmitted from the capsule endoscope 1411. The external control device 1442 controls the display device (not illustrated) to display the in-vivo image on the basis of the restoration image, for example. Alternatively, the external control device 1442 may cause a recording device (not illustrated) to record the data of the restoration image or cause a printing device (not illustrated) to print out the data of the restoration image.

6. Fifth Embodiment

Next, a fifth embodiment of the present technology will be described with reference to FIGS. 71 to 76.

FIGS. 71 to 76 illustrate examples of an installation position of (an imaging unit including) an imaging element 121.

Figure 71:
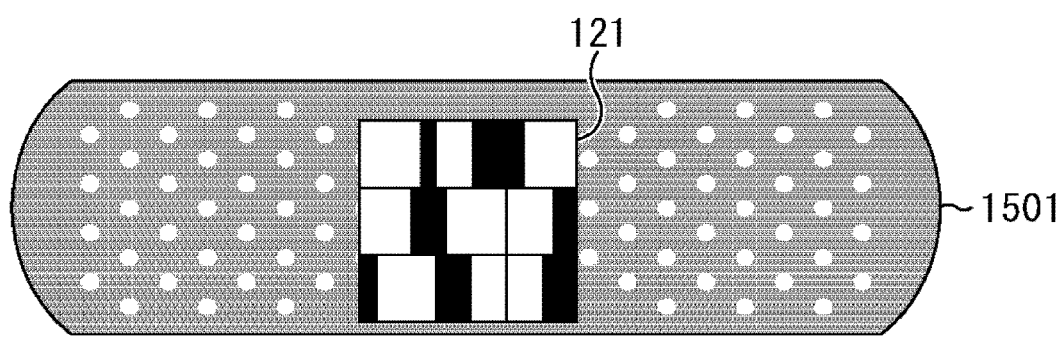
FIG. 71 is a diagram illustrating an example of an installation position of an imaging element.

FIG. 71 illustrates an example in which the imaging element 121 is provided on an adhesive member 1501 such as an adhesive plaster, a tape, or a seal. Thereby, the imaging element 121 can be stuck to a desired position on a human body, an article, or the like.

Figure 72:
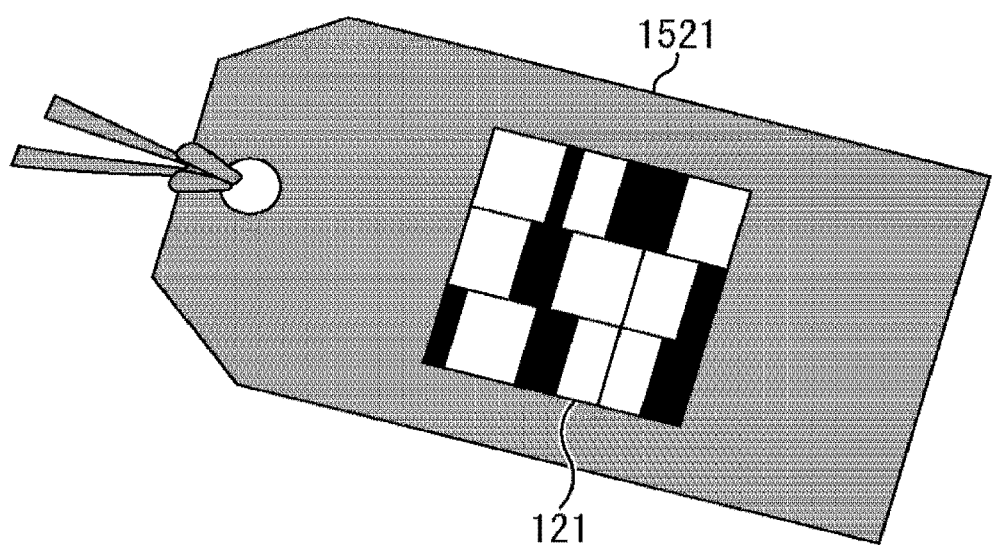
FIG. 72 is a diagram illustrating an example of the installation position of the imaging element.

FIG. 72 illustrates an example in which a tag 1521 is provided with the imaging element 121. Thereby, the imaging element 121 can be attached to a desired position on an article, or the like.

Figure 73:
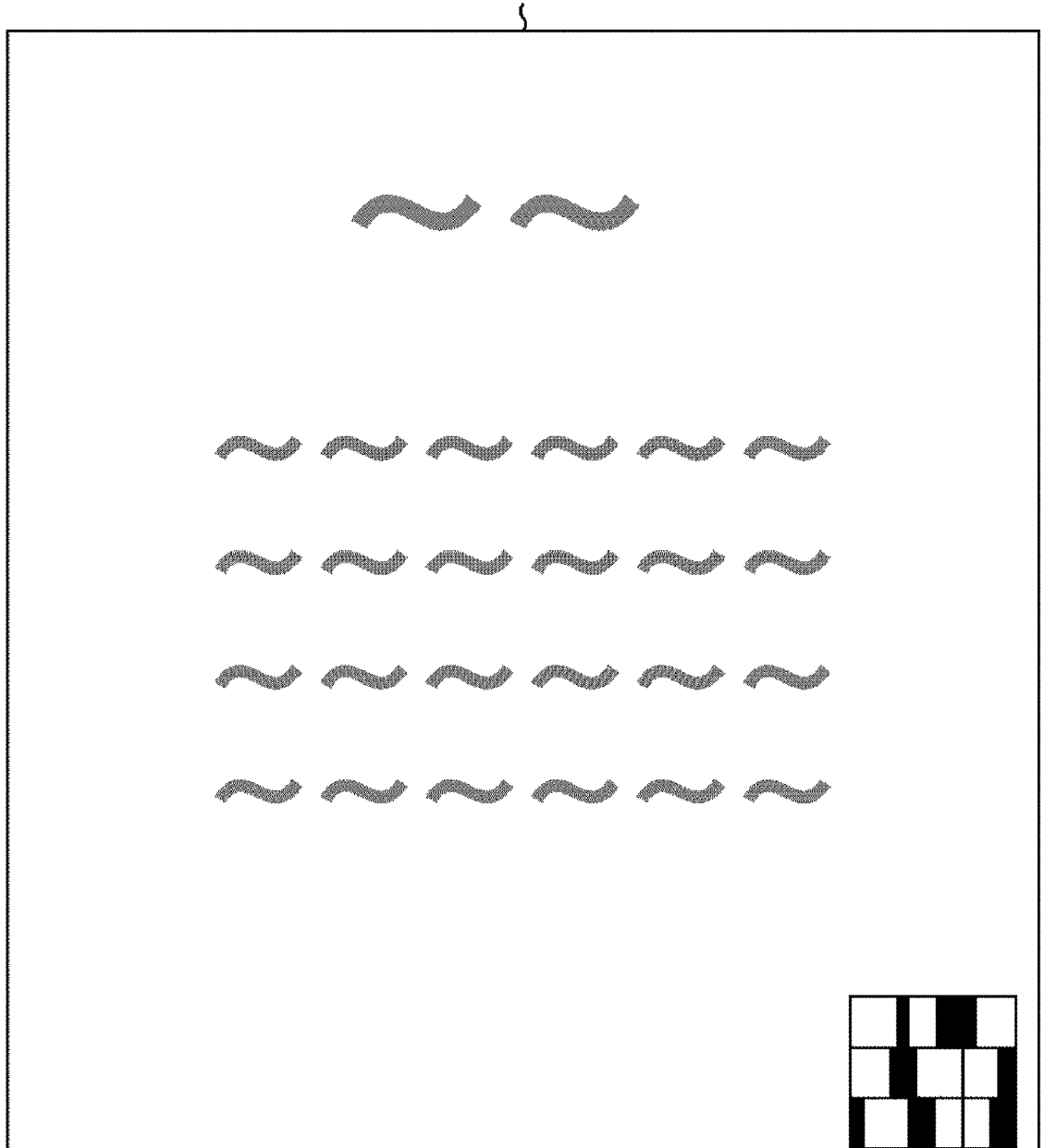
FIG. 73 is a diagram illustrating an example of the installation position of the imaging element.

FIG. 73 illustrates an example in which a poster 1541 is provided with the imaging element 121. Thereby, the imaging element 121 can be attached to a desired position on a wall, or the like.

For example, since a normal imaging element needs to include an imaging lens, an imaging unit including the imaging lens and the imaging element becomes thick. In contrast, the adhesive member, the adhesive member 1501, the tag 1521, or the poster 1541 is thin, the portion where the imaging unit is provided becomes thick and gives an unnatural impression.

Meanwhile, the imaging unit including the imaging element 121 is thin because an imaging lens is unnecessary. Therefore, even if the imaging unit is provided on the adhesive member 1501, the tag 1521, or the poster 1541, the portion where the imaging unit is provided does not become thick and does not give an unnatural impression.

Figure 74:
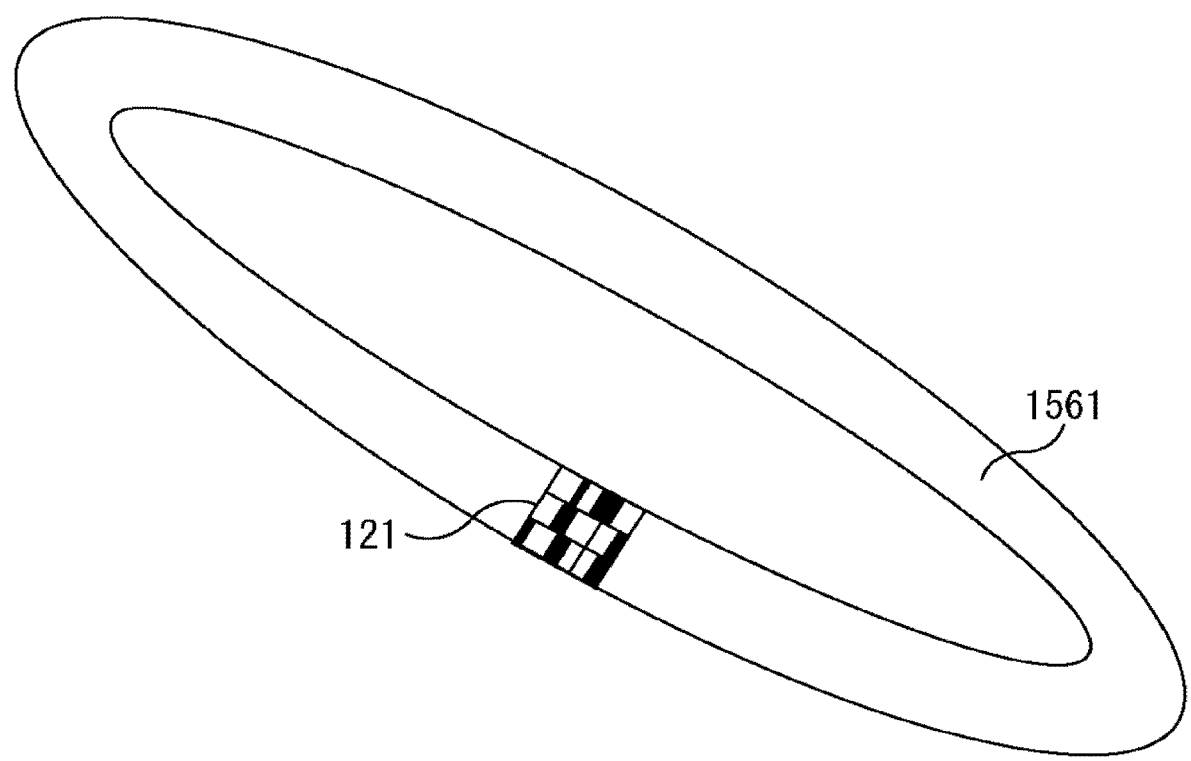
FIG. 74 is a diagram illustrating an example of an installation position of an imaging element.

FIG. 74 illustrates an example in which a band 1561 is provided with the imaging element 121. Thereby, the imaging element 121 can be attached to a desired position on a human body, an article, or the like.

For example, in a case where an imaging unit including a normal imaging lens and imaging element is provided in the band 1561, the center of gravity of the imaging unit is separated from the band 1561 because the imaging unit is thick, and the moment applied to the band 1561 by the imaging unit becomes large. As a result, for example, the mounting position of the band 1561 moves or the band 1561 extends.

Meanwhile, the imaging unit including the imaging element 121 is thin, as described above, and thus the center of gravity of the imaging unit is at substantially the same position as the band 1561. Therefore, the moment applied to the band 1561 by the imaging unit is reduced, and, for example, movement of the mounting position of the band 1561 and extension of the band 1561 are suppressed.

Note that in the example in FIGS. 71 to 74, the imaging unit including the imaging element 121 may be provided with a wireless communication device such as a communication device that performs wireless communication such as a radio frequency identifier (RFID) or Wi-Fi, or a power generation device that performs energy harvesting, for example. Thereby, the imaging element 121 can be driven even if power is not supplied from the outside. Furthermore, the data of the detection image captured by the imaging element 121 can be transmitted to the outside.

Furthermore, various types of processing can be performed on the basis of a restoration image obtained by converting the detection image captured by the imaging element 121.

For example, in a case where the poster 1541 is configured by an electronic poster or the like with variable display content, the display content may be changed on the basis of attributes (for example, gender, age, or the like) of a person recognized on the basis of the restoration image. For example, advertisement content displayed on the poster 1541 can be changed on the basis of the attribute of the person.

Furthermore, the tag 1521 can be attached to a suitcase to prevent the suitcase from theft. For example, in a case where it is detected that the suitcase is moving on the basis of a surrounding state of the suitcase recognized on the basis of the restoration image, the tag 1521 can output an alarm sound or send an email giving a notification of theft of the suitcase to a user's smartphone or the like.

Figure 75:
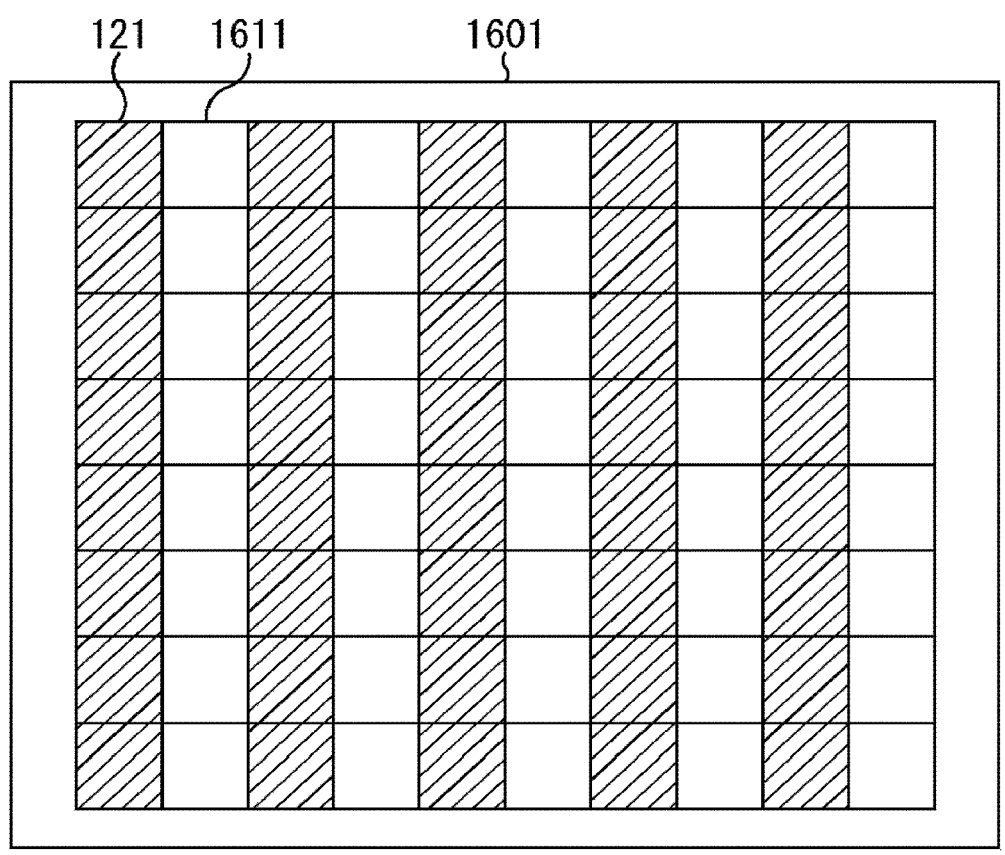
FIG. 75 is a diagram illustrating an example in which the imaging element is provided in a micro LED display.
Figure 76:
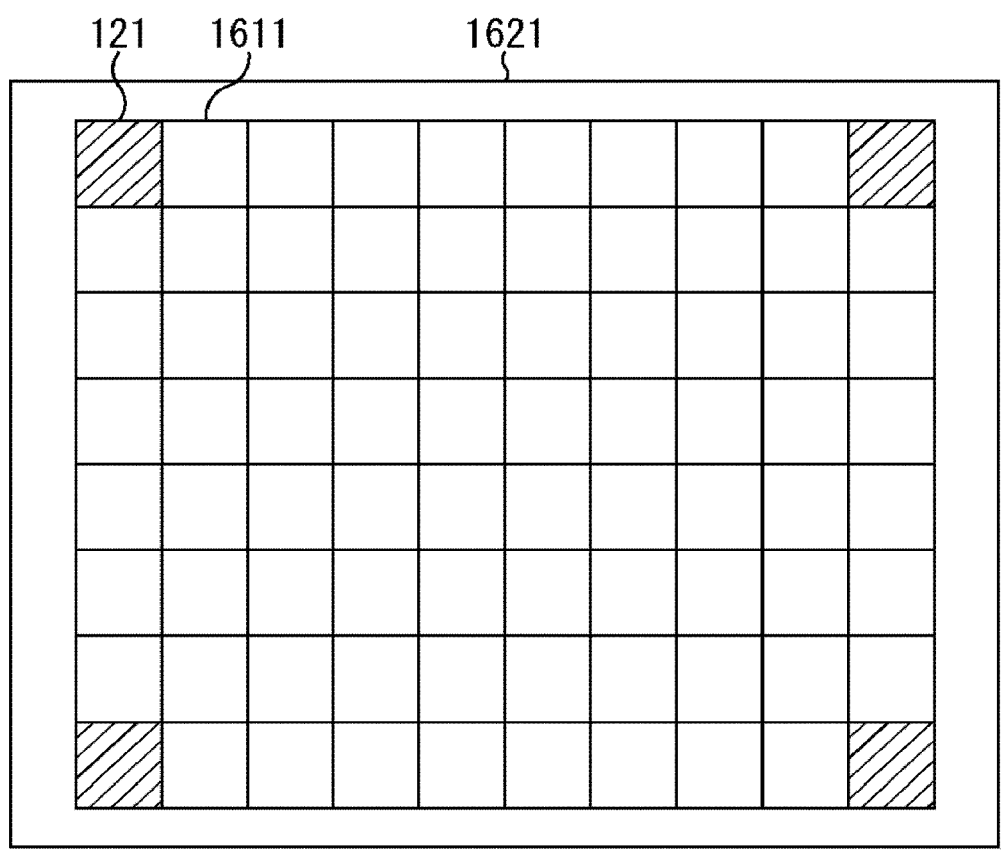
FIG. 76 is a diagram illustrating an example in which the imaging element is provided in the micro LED display.

FIGS. 75 and 76 illustrate examples in which a micro LED display is provided with the imaging element 121.

Note that FIGS. 75 and 76 schematically illustrate arrangement examples of pixels including a micro LED 1611 illustrated by white frames and pixels including the imaging element 121 illustrated by oblique-line frames.

In a micro LED display 1601 in FIG. 75, the pixels including the micro LED 1611 and the pixels including the imaging element 121 are alternately arranged in every other column.

In a micro LED display 1621 in FIG. 76, the pixels including the imaging element 121 are arranged at the four corners of a region where the pixels including the micro LED 1611 are arranged in a two-dimensional array.

In each pixel of the micro LED display 1601 and the micro LED display 1621, the area occupied by the micro LED 1611 as a light source is very small. Therefore, the imaging element 121 can be easily arranged in a gap or the like between the adjacent micro LEDs 1611.

With the configuration, the surroundings (for example, a viewer or the like) of the micro LED display 1601 or the micro LED display 1621 can be captured using the imaging element 121 while displaying an image using the micro LED 1611.

Note that a display element is not limited to the micro LED. For example, the display element may be an organic EL element.

Figure 77:
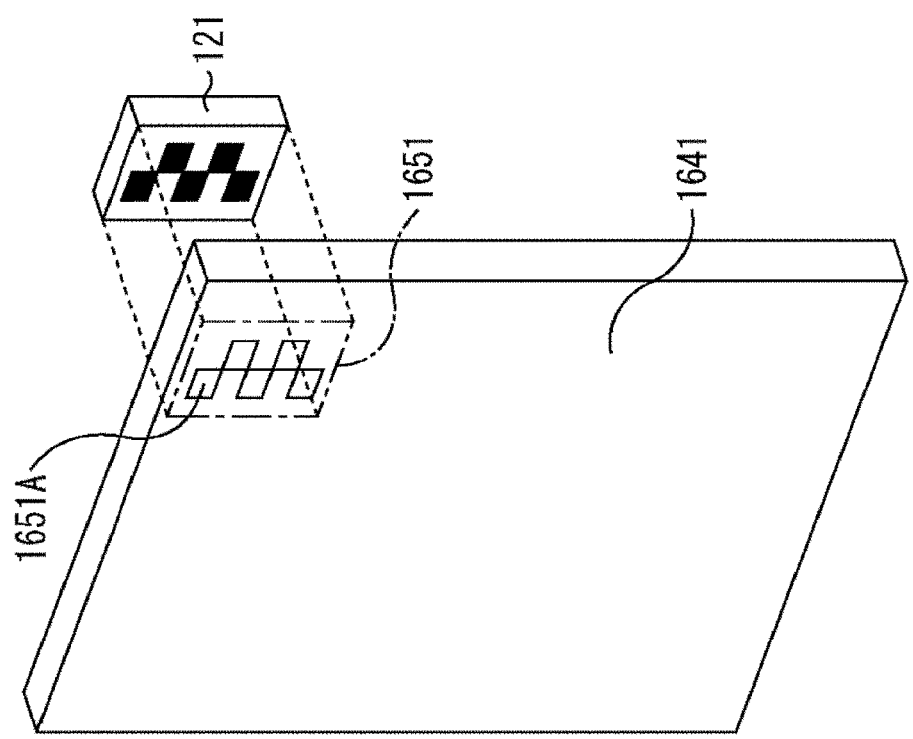
FIG. 77 is a diagram illustrating an example in which the imaging element is provided in a display element provided with a passage region.

Furthermore, as illustrated in FIG. 77, a passage region 1651 including a plurality of passage portions (openings or transmission portions using a transmission member) 1651A may be provided in a display element 1641, and the imaging element 121 may be provided at a position where light having passed through the plurality of passage portions 1651A can be received. For example, when a display surface of the display element 1641 is a front surface and an opposite surface is a back surface, the imaging element 121 is provided on the back surface of the display element 1641 so that the imaging element 121 can receive light having passed through the passage portions 1651A. Thereby, the user can perform imaging via the display element 1641. At this time, the passage portion 1651A may be a member having a pinhole function similar to a pinhole, or a member having a pinhole function (for example, a plate-like member in which a plurality of holes is formed) may be interposed between the display element 1641 and the imaging element 121. Note that, in the case of using the member having a pinhole function, the imaging element 121 may be replaced with a general imaging element including pixels having the same incident angle directivity. Note that a transparent display may be used for the passage portion. For example, the passage portion may be configured to temporarily transmit light in an imaging mode and the passage portion may be used as a display in a mode that is not the imaging mode.

Furthermore, for example, terminal information of a device including the display element 1641 may include information regarding a relationship between the passage portion 1651A and the imaging element 121 (for example, information indicating a positional relationship or an angular relationship between the passing portion 1651A and an imaging pixel, information indicating which imaging pixel the light having passed through which passage portion 1651A enters, information indicating optical effects such as aberration caused by the passage portion 1651A, information indicating a relationship between imaging pixels caused by the passage portion 1651A, such as a calibration value for correcting optical effects caused by the passage portion 1651A, the degree of overlap of incident light, and the like). This enables more accurate restoration processing and image processing that considers the influence of the passage portion 1651A. Furthermore, in the case of providing the member having a pinhole function between the display element 1641 and the imaging element 121, the terminal information may include information regarding a relationship between a hole and the imaging element 121 (for example, information indicating a positional relationship or an angular relationship between a hole and an imaging pixel, information indicating which imaging pixel the light having passed through which hole enters, or the like).

7. Modification

Hereinafter, modifications of the above-described embodiment of the present technology will be described.

Modification Regarding Imaging Element

In the present technology, the configuration of the imaging element is arbitrary as long as the imaging element includes a plurality of pixel output units, and characteristics with respect to an incident angle of incident light from an object are different from each other between at least two pixel output units among the plurality of pixel output units.

For example, light entering an imaging plane of an imaging element may be modulated according to a black and white pattern or light interference, using a random black and white pattern mask or an optical interference mask as a modulation element.

Figure 78:
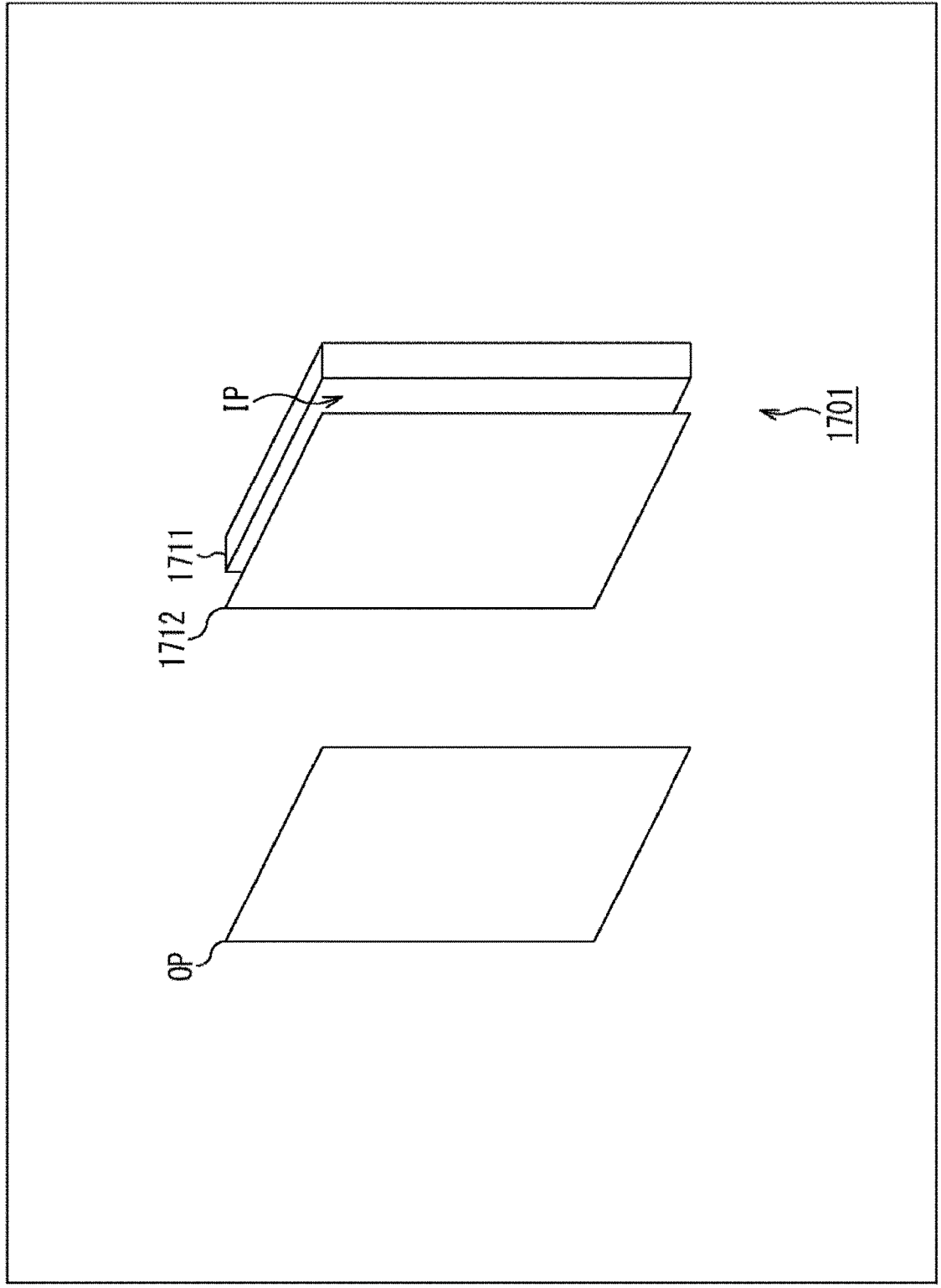
FIG. 78 is a diagram illustrating a main configuration example of the imaging element.

An imaging element 1701 in FIG. 78 has a mask 1712 fixed to an imaging element 1711 with a predetermined space with respect to an imaging plane IP of the imaging element 1711. Light from an object plane OP enters the imaging plane IP of the imaging element 1711 after being modulated by the mask 1712.

Figure 79:
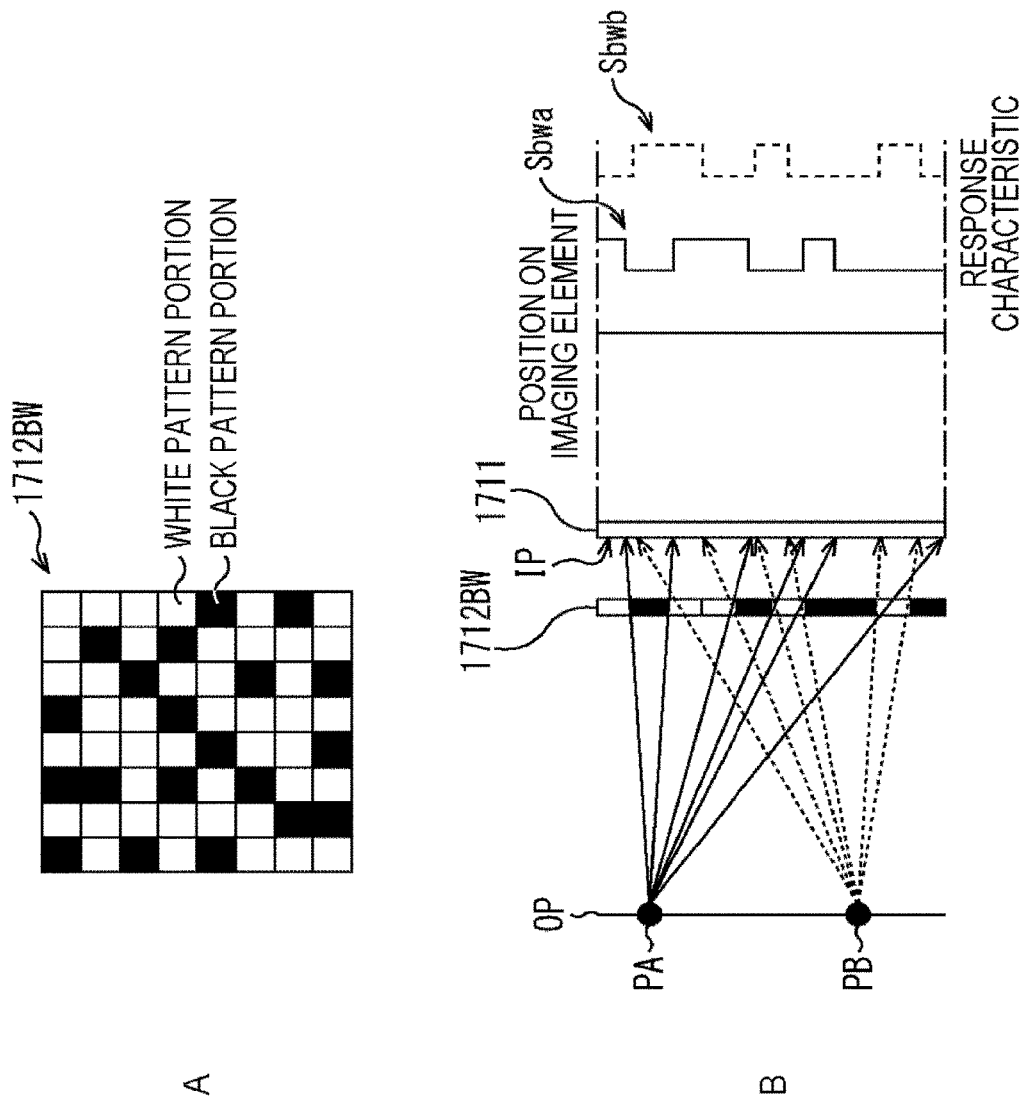
FIG. 79 is a diagram illustrating a case of using a black and white pattern mask.

FIG. 79 illustrates an example of a case of using a black and white pattern mask for the mask 1712 in FIG. 78.

A in FIG. 79 illustrates the black and white pattern mask. A black and white pattern mask 1712BW has a configuration in which white pattern portions that transmit light and black pattern portions that shield light are randomly arranged, and the pattern size is independently set of the pixel size of the imaging element 1711.

B in FIG. 79 schematically illustrates an emission state of light emitted from a point light source PA and light emitted from a point light source PB to the imaging plane IP. Furthermore, B in FIG. 79 schematically and individually illustrates an example of response of the imaging element in the case of using the black and white pattern mask 1712BW with respect to the light emitted from the point light source PA and the light emitted from the point light source PB. The light from the object plane OP enters the imaging plane IP of the imaging element 1711 after being modulated by the black and white pattern mask 1712BW. Therefore, the response of the imaging element 1711 corresponding to the light emitted from the point light source PA at the object plane OP is Sbwa. Furthermore, the response of the imaging element 1711 corresponding to the light emitted from the point light source PB at the object plane OP is Sbwb. Therefore, pixel output information output from the imaging element 1711 is information of combined responses of the point light sources for each pixel output unit.

The incident angle directivity pattern of the imaging element 1701 of this system is represented by, for example, a combination of the pattern of the black and white pattern mask 1712BW and the pixel array pattern of the imaging element 1701.

Note that details of the imaging element 1701 of this system are disclosed in Non-Patent Document 1, for example.

Figure 80:
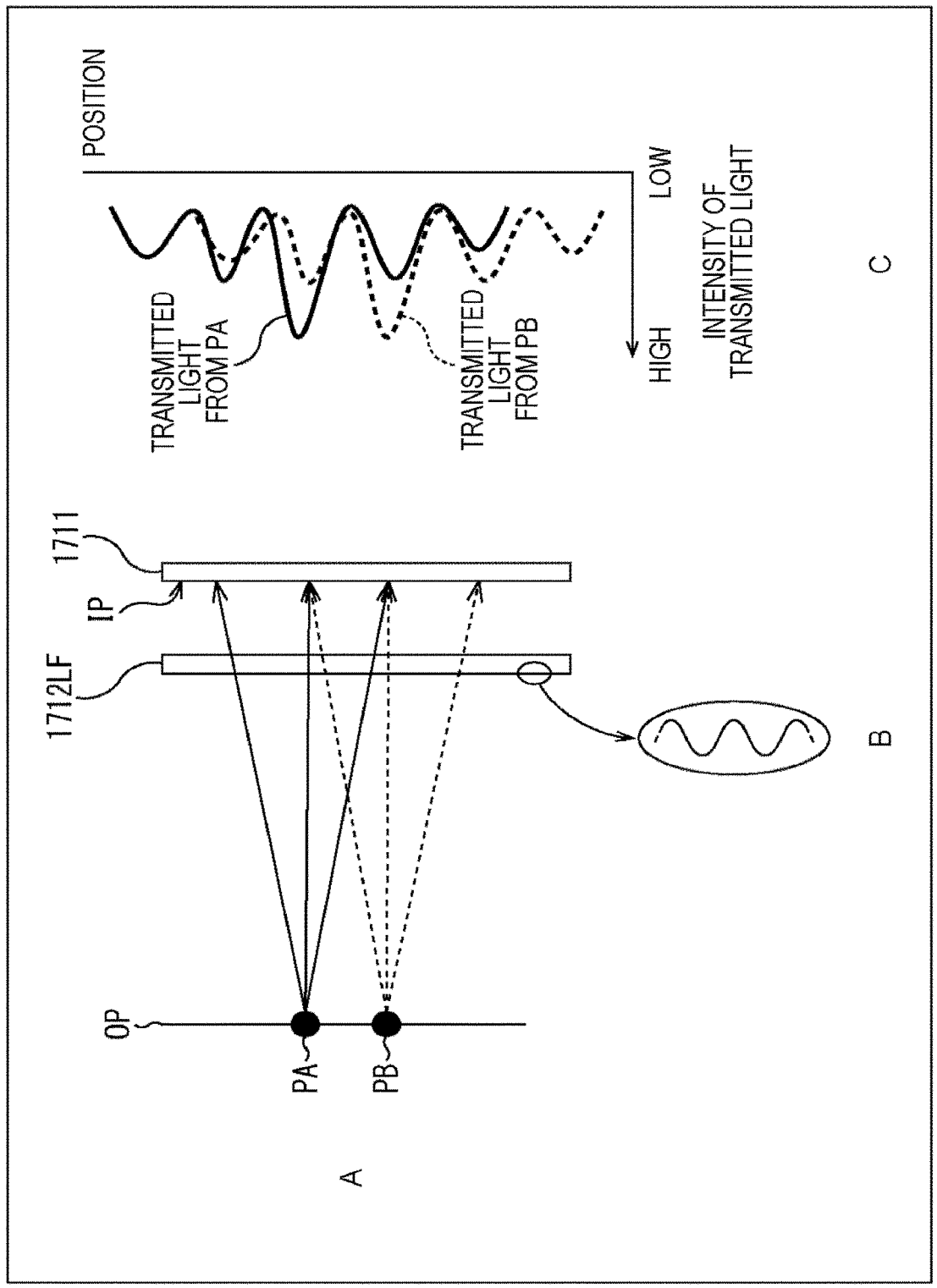
FIG. 80 is a diagram illustrating a case of using an optical interference mask.

FIG. 80 illustrates a case of using an optical interference mask for the mask 1712 in FIG. 78.

As illustrated in A in FIG. 80, the light emitted from the point light sources PA and PB on the object plane OP is emitted to the imaging plane IP of the imaging element 1711 via an optical interference mask 1712LF.

Unevenness of about a wavelength is provided in a light incident plane, for example, of the optical interference mask 1712LF, as illustrated in B in FIG. 80. Furthermore, the optical interference mask 1712LF has the maximum transmission of light having a specific wavelength emitted from a vertical direction. When a change in the incident angle (an inclination to the vertical direction) of the light having a specific wavelength emitted from the point light sources PA and PB on the object plane OP with respect to the optical interference mask 1712LF becomes large, an optical path length changes.

Here, when the optical path length is an odd multiple of a half wavelength, the light is weakened, and when the optical path length is an even multiple of the half wavelength, the light is intensified. That is, as illustrated in C of FIG. 80, the intensity of transmitted light having the specific wavelength emitted from the point light sources PA and PB and transmitted through the optical interference mask 1712LF is modulated according to the incident angle with respect to the optical interference mask 1712LF and the transmitted light enters the imaging plane IP of the imaging element 1711. Therefore, pixel output information output from the imaging element 1711 is information obtained by combining the modulated light intensities of the point light sources for each pixel output unit.

The incident angle directivity pattern of the imaging element 1701 of this system is represented by, for example, a combination of the pattern of the optical interference mask 1712LF and the pixel array pattern of the imaging element 1701.

Note that details of the imaging element 1701 of this system are disclosed in International Publication No. 2014/137922, for example.

Furthermore, the mask 1712 may be provided with a linear polarization element in an equal polarization direction on a front surface and a back surface of the mask, using a black pattern illustrated in FIG. 79 as a λ/2 wavelength plate (λ is a wavelength). In this case, when the light of wavelength λ is emitted from the point light source, polarized light transmitted through the λ/2 wavelength plate has a reduced amount of light as compared with the white pattern portion because the polarization plane is rotated, and the pixel output information can be generated similarly to the case in FIG. 79. Note that, by using far infrared light, for example, as the light of a specific wavelength emitted from the point light source, the pixel output information according to the object in an image capturing region can be generated even if the image capturing region is dark.

Moreover, for example, a concentric transparent film can be used for the mask 1712 although not illustrated. In this case, the light from the object plane OP is modulated by the mask 1712 so that a concentric circle shadow is projected on the imaging plane IP of the imaging element 1711. A concentric circle pattern by signal processing is further superimposed on pixel output information of the imaging element 1711 to generate moiré fringes, and the moiré fringes are analyzed by Fourier transform or the like, whereby light intensity after modulation of each point light source can be calculated for each pixel output. Therefore, pixel output information output from the imaging element 1711 is information obtained by combining the modulated light intensities of the point light sources for each pixel output unit.

The incident angle directivity pattern of the imaging element 1701 of this system is represented by, for example, a combination of the pattern of the concentric transparent film and the pixel array pattern of the imaging element 1701.

Note that content of input information transmitted from the information terminal 522 to the information processing device 512 is similar to that in the case of using the imaging element 121, regardless of which of the imaging elements 1701 of the systems being used in place of the imaging element 121. That is, the input information includes, for example, data of a detection image and restoration information. Furthermore, the restoration information includes setting information and terminal information, for example.

Note that the imaging element 1701 needs to have another configuration such as the mask. Therefore, the imaging element 121 can be more downsized.

8. Others

Application Example

The present technology can be applied to any device or system as long as the device or system has an imaging function. Furthermore, the present technology can be applied to any device or system as long as the device or system processes an image obtained by the imaging function. Furthermore, the present technology can be applied to a device or system used in an arbitrary field such as traffic, medical care, crime prevention, agriculture, livestock industry, mining, beauty, factory, household appliance, weather, or natural surveillance, for example.

For example, the present technology can be applied to a device or system that handles images used for viewing, such as a digital camera or a mobile device with a camera function. Furthermore, the present technology can also be applied to a device or system that handles images used for crime prevention, surveillance, observation, or the like, such as a surveillance camera. Furthermore, the present technology can also be applied to a device or system that handles images used for person authentication, image analysis, distance measurement, or the like, for example. Furthermore, the present technology can also be applied to a device or system that handles images used for controlling machines and the like, such as automatic driving of an automobile or a robot.

Software

The above-described series of processing can be executed by hardware or by software. Furthermore, part of the processing can be executed by hardware and other part of the processing can be executed by software.

Supplement

Embodiments of the present technology are not limited to the above-described embodiments, and various modifications can be made without departing from the gist of the present technology.

For example, the present technology can be implemented as any configuration constituting a device or a system, such as a processor as a system large scale integration (LSI) or the like, a module using a plurality of processors or the like, a unit using a plurality of modules or the like, or a set in which other functions are added to the unit (that is, a configuration of a part of the device), for example.

Furthermore, the above-described each processing unit can be implemented by an arbitrary configuration. For example, the each processing unit may be configured by a circuit, an LSI, a system LSI, a processor, a module, a unit, a set, a device, an apparatus, a system, or the like. Furthermore, a plurality of the aforementioned configurations may be combined. At this time, for example, the same type of configurations such as a plurality of circuits or a plurality of processors may be combined, or different types of configurations such as a circuit and an LSI may be combined.

Note that, in this specification, the term "system" means a set of a plurality of configuration elements (devices, modules (parts), and the like), and whether or not all the configuration elements are in the same casing is irrelevant. Therefore, a plurality of devices housed in separate housings and connected via a network, and one device that houses a plurality of modules in one casing are both systems.

Further, for example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Further, for example, in the present technology, a configuration of cloud computing in which one function is shared and processed in cooperation by a plurality of devices via a network can be adopted.

Furthermore, for example, the above-described program can be executed by an arbitrary device. In that case, the device is only required to have necessary functions (functional blocks and the like) and obtain necessary information.

Further, for example, the steps described in the above-described flowcharts can be executed by one device or can be executed by a plurality of devices in a shared manner. Moreover, in the case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

In the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs. Moreover, the processing of the steps describing the program may be executed in parallel with the processing of another program, or may be executed in combination with the processing of another program.

The plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

The present technology can also have the following configurations.

(1)

An information processing device including:

an acquisition unit configured to acquire a detection image output from an imaging element that receives incident light incident without through an imaging lens, and restoration information including setting information set by a user and to be used to generate a restoration image from the detection image;

a restoration processing unit configured to perform restoration processing of generating the restoration image using the detection image and the restoration information; and an output control unit configured to control an output of the restoration image.

(2)

The information processing device according to (1), in which the restoration information further includes information unique to the imaging element.

(3)

The information processing device according to (2), in which the restoration processing unit sets a restoration parameter on the basis of the restoration information, and generates the restoration image on the basis of the restoration parameter.

(4)

The information processing device according to (3), in which the restoration processing unit sets a restoration matrix used to convert the detection image into the restoration image on the basis of the restoration parameter, and generates the restoration image, using the detection image and the restoration matrix.

(5)

The information processing device according to (4), in which the restoration processing unit repeats the processing of generating the restoration image a predetermined number of times while changing the restoration parameter.

(6)

The information processing device according to (5), in which the restoration processing unit resets the restoration matrix on the basis of the changed restoration parameter.

(7)

The information processing device according to any one of (3) to (6), in which the restoration parameter includes at least one of an object distance that is a distance between the imaging element and an object, a position where a pixel of the detection image is thinned, a position where a pixel of the detection image is added, or a regularization parameter in a case of using a least squares method for generation of the restoration image.

(8)

The information processing device according to any one of (3) to (7), further including:

a learning unit configured to perform machine learning for the detection image before restoration and the restoration parameter before restoration used for restoration of the detection image as learning data, in which the restoration processing unit sets the restoration parameter on the basis of the detection image, using a result of the machine learning.

(9)

The information processing device according to any one of (2) to (8), in which the information unique to the imaging element includes identification information for identifying a pattern of an incident angle directivity indicating a directivity of the imaging element with respect to an incident angle of the incident light.

(10)

The information processing device according to any one of (1) to (9), in which the setting information includes at least one of an object distance that is a distance between the imaging element and an object, a focus target indicating a type of an object to focus on, a restoration region indicating a region to restore, a number of pixels of the restoration image, an angle of view of the restoration image, or timing to perform restoration.

(11)

The information processing device according to (10), in which the restoration processing unit generates the restoration image after matching the number of pixels of the detection image with the number of pixels of the restoration image by thinning or adding of a pixel of the detection image.

(12)

The information processing device according to (10) or (11), in which the restoration processing unit repeats the processing of generating the restoration image on the basis of restoration accuracy of an image of the focus target or an image of the restoration region.

(13)

The information processing device according to any one of (1) to (12), in which the acquisition unit acquires the detection image and the restoration information from another information processing device, and the output control unit controls an output of the restoration image to the another information processing device.

(14)

An information processing method including:

acquiring a detection image output from an imaging element that receives incident light incident without through an imaging lens, and restoration information including setting information set by a user and to be used to generate a restoration image from the detection image;

performing restoration processing of generating the restoration image using the detection image and the restoration information; and controlling an output of the restoration image.

(15)

A program for causing a computer to execute processing of:

acquiring a detection image output from an imaging element that receives incident light incident without through an imaging lens, and restoration information including setting information set by a user and to be used to generate a restoration image from the detection image;

performing restoration processing of generating the restoration image using the detection image and the restoration information; and controlling an output of the restoration image.

(16)

An information processing device including:

an output control unit configured to control an output of a detection image output from an imaging element that receives incident light incident without through an imaging lens, and restoration information including setting information set by a user and to be used to generate a restoration image from the detection image; and an acquisition unit configured to acquire the restoration image generated using the detection image and the restoration information.

(17)

The information processing device according to (16), in which the setting information includes at least one of an object distance that is a distance between the imaging element and an object, a focus target indicating a type of an object to focus on, a restoration region indicating a region to restore, a number of pixels of the restoration image, an angle of view of the restoration image, or timing to perform restoration.

(18)

The information processing device according to (17), further including:

a read control unit configured to selectively read a detection signal for each pixel output unit of the imaging element, in which the read control unit matches the number of pixels of the detection image with the number of pixels of the restoration image.

(19)

The information processing device according to any one of (16) to (18), in which the restoration information further includes identification information for identifying a pattern of an incident angle directivity indicating a directivity of the imaging element with respect to an incident angle of the incident light.

(20)

The information processing device according to any one of (16) to (19), in which an imaging device including the imaging element is attachable to and detachable from the information processing device, and the acquisition unit acquires the detection image from the imaging device.

(21)

The information processing device according to any one of (16) to (19), in which the information processing device is able to be stored in a storage member including the imaging element, and the acquisition unit acquires the detection image from the storage member.

(22)

The information processing device according to any one of (16) to (21), further including:
the imaging element.

(23)

The information processing device according to any one of (16) to (22), in which
the output control unit controls the output of the detection image and the restoration information to another information processing device, and
the acquisition unit acquires the restoration image from the another information processing device.

(24)

An information processing method including:
controlling an output of a detection image output from an imaging element that receives incident light incident without through an imaging lens, and restoration information including setting information set by a user and to be used to generate a restoration image from the detection image; and
acquiring the restoration image generated using the detection image and the restoration information.

(25)

A program for causing a computer to execute processing of:
controlling an output of a detection image output from an imaging element that receives incident light incident without through an imaging lens, and restoration information including setting information set by a user and to be used to generate a restoration image from the detection image; and
acquiring the restoration image generated using the detection image and the restoration information.

(26)

An information processing system including:
a first information processing device; and
a second information processing device, in which
the first information processing device includes
a first output control unit configured to control an output of a detection image output from an imaging element that receives incident light incident without through an imaging lens, and restoration information including setting information set by a user and to be used to generate a restoration image from the detection image, to the second information processing device, and
a first acquisition unit configured to acquire the restoration image generated using the detection image and the restoration information from the second information processing device, and
the second information processing device includes a second acquisition unit configured to acquire the detection image and the restoration information from the first information processing device,
a restoration processing unit configured to perform restoration processing of generating the restoration image using the detection image and the restoration information, and
a second output control unit configured to control an output of the restoration image to the first information processing device.

Note that the effects described in the present specification are merely examples and are not limited, and other effects may be exhibited.

REFERENCE SIGNS LIST

100 Imaging device
120 Imaging unit
121 Imaging element
121a Pixel
121b Light-shielding film
122 Read control unit
123 Restoration matrix setting unit
124 Restoration unit
501 Information processing system
511 Client
512 Information processing device
513 Network
521 Imaging device
522 Information terminal
601 Control unit
631 Information processing unit
641 Operation control unit
642 Simple restoration unit
643 Acquisition unit
644 Information generation unit
645 Output control unit
701 Control unit
731 Information processing unit
742 Restoration matrix setting unit
743 Restoration unit
745 Gesture recognition unit
746 Acquisition unit
747 Information generation unit
748 Output control unit
749 Output control unit
751 Restoration processing unit
1001 Imaging module
1002 Smartphone
1051 Case

The invention claimed is:

1. An information processing device comprising:
processing circuitry configured to
acquire a detection image output from an imaging element that receives incident light incident without through an imaging lens, and restoration information including setting information set by a user and to be used to generate a restoration image from the detection image, the restoration information further including information unique to the imaging element,
perform restoration processing of generating the restoration image using the detection image and the restoration information, and
control an output of the restoration image, wherein
the processing circuitry is further configured to
set a restoration parameter on a basis of the restoration information, and generate the restoration image on a basis of the restoration parameter,
set a restoration matrix used to convert the detection image into the restoration image on a basis of the restoration parameter, and generate the restoration image, using the detection image and the restoration matrix,
repeat the processing of generating the restoration image a predetermined number of times while changing the restoration parameter, and
reset the restoration matrix on a basis of the changed restoration parameter.

2. The information processing device according to claim 1, wherein
the restoration parameter includes at least one of an object distance that is a distance between the imaging element and an object, a position where a pixel of the detection image is thinned, a position where a pixel of the detection image is added, or a regularization parameter in a case of using a least squares method for generation of the restoration image.

3. The information processing device according to claim 1, wherein
the information unique to the imaging element includes identification information for identifying a pattern of an incident angle directivity indicating a directivity of the imaging element with respect to an incident angle of the incident light.

4. The information processing device according to claim 1, wherein
the the processing circuitry is configured to
acquire the detection image and the restoration information from a second information processing device, and
control an output of the restoration image to the second information processing device.

5. The information processing device according to claim 1, wherein
the setting information includes at least one of an object distance that is a distance between the imaging element and an object, a focus target indicating a type of an object to focus on, a restoration region indicating a region to restore, a number of pixels of the restoration image, an angle of view of the restoration image, or timing to perform restoration.

6. The information processing device according to claim 5, wherein
the processing circuitry is configured to generate the restoration image after matching the number of pixels of the detection image with the number of pixels of the restoration image by thinning or adding of a pixel of the detection image.

7. The information processing device according to claim 5, wherein
the processing circuitry is configured to repeat the processing of generating the restoration image on a basis of restoration accuracy of an image of the focus target or an image of the restoration region.

8. An information processing device, comprising:
processing circuitry configured to
acquire a detection image output from an imaging element that receives incident light incident without through an imaging lens, and restoration information including setting information set by a user and to be used to generate a restoration image from the detection image, the restoration information further includes information unique to the imaging element,
perform restoration processing of generating the restoration image using the detection image and the restoration information, and
control an output of the restoration image, wherein the processing circuitry is further configured to
set a restoration parameter on a basis of the restoration information, and generate the restoration image on a basis of the restoration parameter,
perform machine learning for the detection image before restoration and the restoration parameter before restoration used for restoration of the detection image as learning data, and
set the restoration parameter on a basis of the detection image, using a result of the machine learning.

9. An information processing method comprising:
acquiring a detection image output from an imaging element that receives incident light incident without through an imaging lens, and restoration information including setting information set by a user and to be used to generate a restoration image from the detection image, the restoration information further including information unique to the imaging element;
performing restoration processing of generating the restoration image using the detection image and the restoration information; and
controlling an output of the restoration image, wherein the method further comprises
setting a restoration parameter on a basis of the restoration information, and generate the restoration image on a basis of the restoration parameter,
setting a restoration matrix used to convert the detection image into the restoration image on a basis of the restoration parameter, and generating the restoration image, using the detection image and the restoration matrix,
repeating the processing of generating the restoration image a predetermined number of times while changing the restoration parameter, and
resetting the restoration matrix on a basis of the changed restoration parameter.

10. A non-transitory computer-readable storage medium including computer executable instructions, wherein the instructions, when executed by a computer, cause the computer to perform a method, the method comprising:
acquiring a detection image output from an imaging element that receives incident light incident without through an imaging lens, and restoration information including setting information set by a user and to be used to generate a restoration image from the detection image, the restoration information further including information unique to the imaging element;
performing restoration processing of generating the restoration image using the detection image and the restoration information; and
controlling an output of the restoration image, wherein the method further comprises
setting a restoration parameter on a basis of the restoration information, and generate the restoration image on a basis of the restoration parameter,
setting a restoration matrix used to convert the detection image into the restoration image on a basis of the restoration parameter, and generating the restoration image, using the detection image and the restoration matrix,
repeating the processing of generating the restoration image a predetermined number of times while changing the restoration parameter, and
resetting the restoration matrix on a basis of the changed restoration parameter.

11. An information processing device comprising:
processing circuitry configured to
control an output of a detection image output from an imaging element that receives incident light incident without through an imaging lens, and restoration information including setting information set by a user and to be used to generate a restoration image from the detection image, the restoration information further including information unique to the imaging element, and
acquire the restoration image generated using the detection image and the restoration information, the restoration image being generated by setting a restoration parameter on a basis of the restoration information, and generating the restoration image on a basis of the restoration parameter, setting a restoration matrix used to convert the detection image into the restoration image on a basis of the restoration parameter, and generating the restoration image, using the detection image and the restoration matrix, repeating processing of generating the restoration image a predetermined number of times while changing the restoration parameter, and resetting the restoration matrix on a basis of the changed restoration parameter.

12. The information processing device according to claim 11, wherein the restoration information further includes identification information for identifying a pattern of an incident angle directivity indicating a directivity of the imaging element with respect to an incident angle of the incident light.

13. The information processing device according to claim 11, wherein an imaging device including the imaging element is attachable to and detachable from the information processing device, and the processing circuitry is configured to acquire the detection image from the imaging device.

14. The information processing device according to claim 11, wherein the processing circuitry is configured to acquire the detection image from a storage member.

15. The information processing device according to claim 11, further comprising:

the imaging element.

16. The information processing device according to claim 11, wherein the processing circuitry is configured to control the output of the detection image and the restoration information to a second information processing device, and acquire the restoration image from the second information processing device.

17. The information processing device according to claim 11, wherein the setting information includes at least one of an object distance that is a distance between the imaging element and an object, a focus target indicating a type of an object to focus on, a restoration region indicating a region to restore, a number of pixels of the restoration image, an angle of view of the restoration image, or timing to perform restoration.

18. The information processing device according to claim 17, wherein the processing circuitry is configured to selectively read a detection signal for each pixel output unit of the imaging element, match the number of pixels of the detection image with the number of pixels of the restoration image.

19. A non-transitory computer-readable storage medium including computer executable instructions, wherein the instructions, when executed by a computer, cause the computer to perform a method, the method comprising:

controlling an output of a detection image output from an imaging element that receives incident light incident without through an imaging lens, and restoration information including setting information set by a user and to be used to generate a restoration image from the detection image, the restoration information further including information unique to the imaging element; and acquiring the restoration image generated using the detection image and the restoration information, the restoration image being generated by setting a restoration parameter on a basis of the restoration information, and generating the restoration image on a basis of the restoration parameter, setting a restoration matrix used to convert the detection image into the restoration image on a basis of the restoration parameter, and generating the restoration image, using the detection image and the restoration matrix, repeating processing of generating the restoration image a predetermined number of times while changing the restoration parameter, and resetting the restoration matrix on a basis of the changed restoration parameter.

20. An information processing system comprising:

a first information processing device; and a second information processing device, wherein the first information processing device includes first processing circuitry configured to control an output of a detection image output from an imaging element that receives incident light incident without through an imaging lens, and restoration information including setting information set by a user and to be used to generate a restoration image from the detection image, to the second information processing device, and acquire the restoration image generated using the detection image and the restoration information from the second information processing device, and the second information processing device includes second processing circuitry configured to acquire the detection image and the restoration information from the first information processing device, perform restoration processing of generating the restoration image using the detection image and the restoration information, and control an output of the restoration image to the first information processing device.

* * * * *